United States Patent [19]

Epstein et al.

[11] Patent Number: 5,016,162
[45] Date of Patent: May 14, 1991

[54] CONTENTION REVOLUTION IN A DIGITAL COMPUTER SYSTEM

[75] Inventors: David I. Epstein, Framingham; Mark D. Hummel, Bellingham; Jeffrey F. Hatalsky, Wakefield; Rona J. Newmark, Northboro; Rosemarie Alicandro, Millbury; Peter C. Bixby, Northboro; Donald D. Burn, Westboro; Eric H. Enberg, Westboro; Paul K. Marino; Paul W. Woodbury, both of Hopkinton; Michael A. Pogue, Framingham; Morgan J. Dempsey, Framingham; Shreyaunsh R. Shah, Milford; Leo C. Waible, III, Northboro, all of Mass.

[73] Assignee: Data General Corp., Westboro, Mass.

[21] Appl. No.: 175,458

[22] Filed: Mar. 30, 1988

[51] Int. Cl.⁵ .......................................... G06F 13/374
[52] U.S. Cl. .................................. 364/200; 340/825.5
[58] Field of Search ... 364/200 MS File, 900 MS File; 340/825.5, 825.51

[56] References Cited

U.S. PATENT DOCUMENTS

| | | | |
|---|---|---|---|
| 4,009,470 | 2/1977 | Danilenko et al. | 364/200 |
| 4,096,571 | 6/1978 | Vander Mey | 364/200 |
| 4,499,538 | 2/1985 | Finger et al. | 364/200 |
| 4,504,906 | 3/1985 | Itaya et al. | 364/200 |

FOREIGN PATENT DOCUMENTS 2110847 6/1983 United Kingdom .

Primary Examiner—David L. Clark

[57] ABSTRACT

A method of assigning priorities and resolving bus contention in a distributed computer system is disclosed. Each system node is assigned an identifier. Priorities are reassigned at each change in bus access such that the node that most recently had access to the bus is assigned the lowest priority with the node having the next identifier in sequence being assigned the highest priority and all other nodes assigned priority in accordance with their identifier's position in the sequence. The identifiers are logically treated as organized in a circular fashion such that the lowest node identifier is considered to come next in the sequence after the highest node identifier.

5 Claims, 122 Drawing Sheets

FIG. 102 OVERVIEW
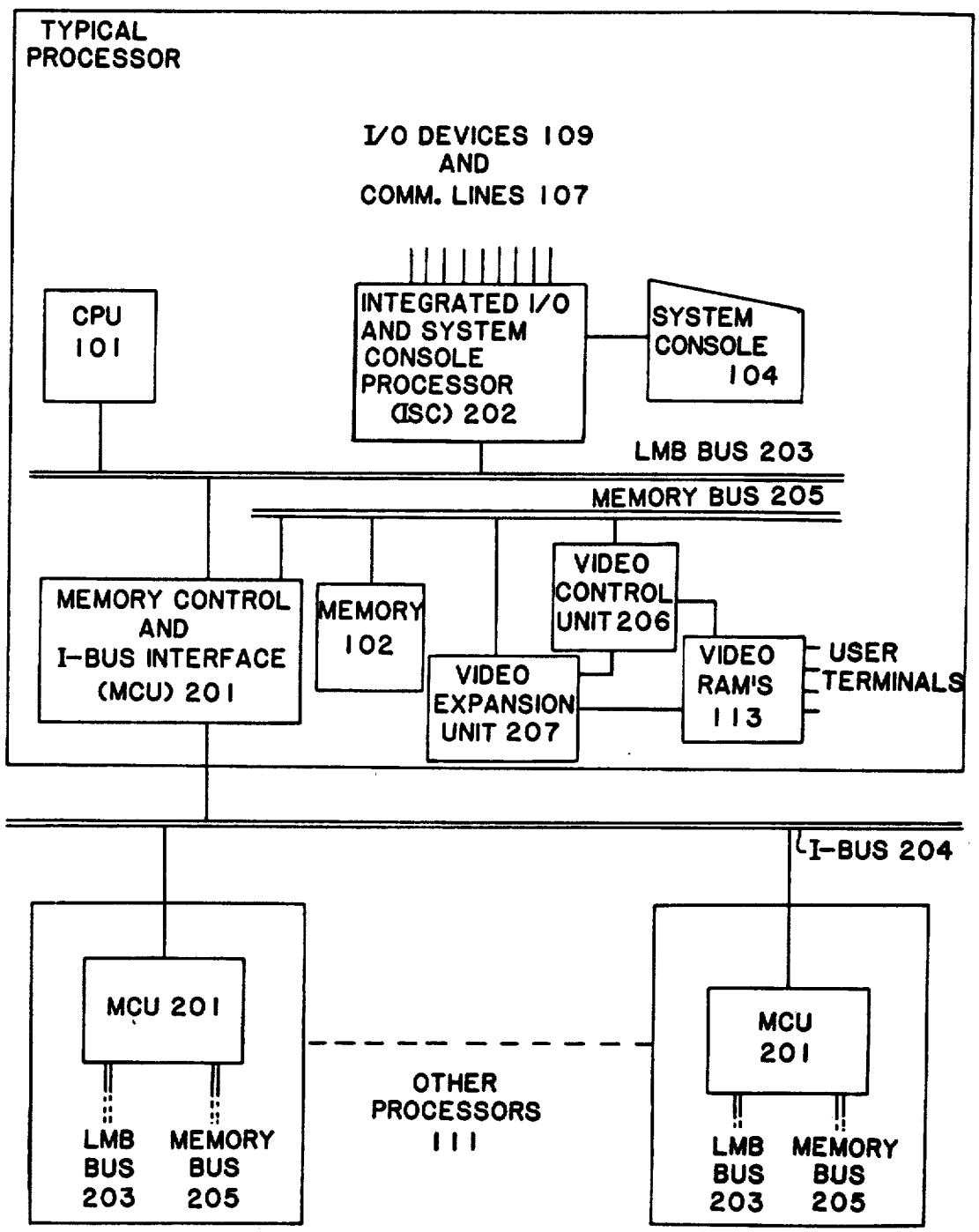

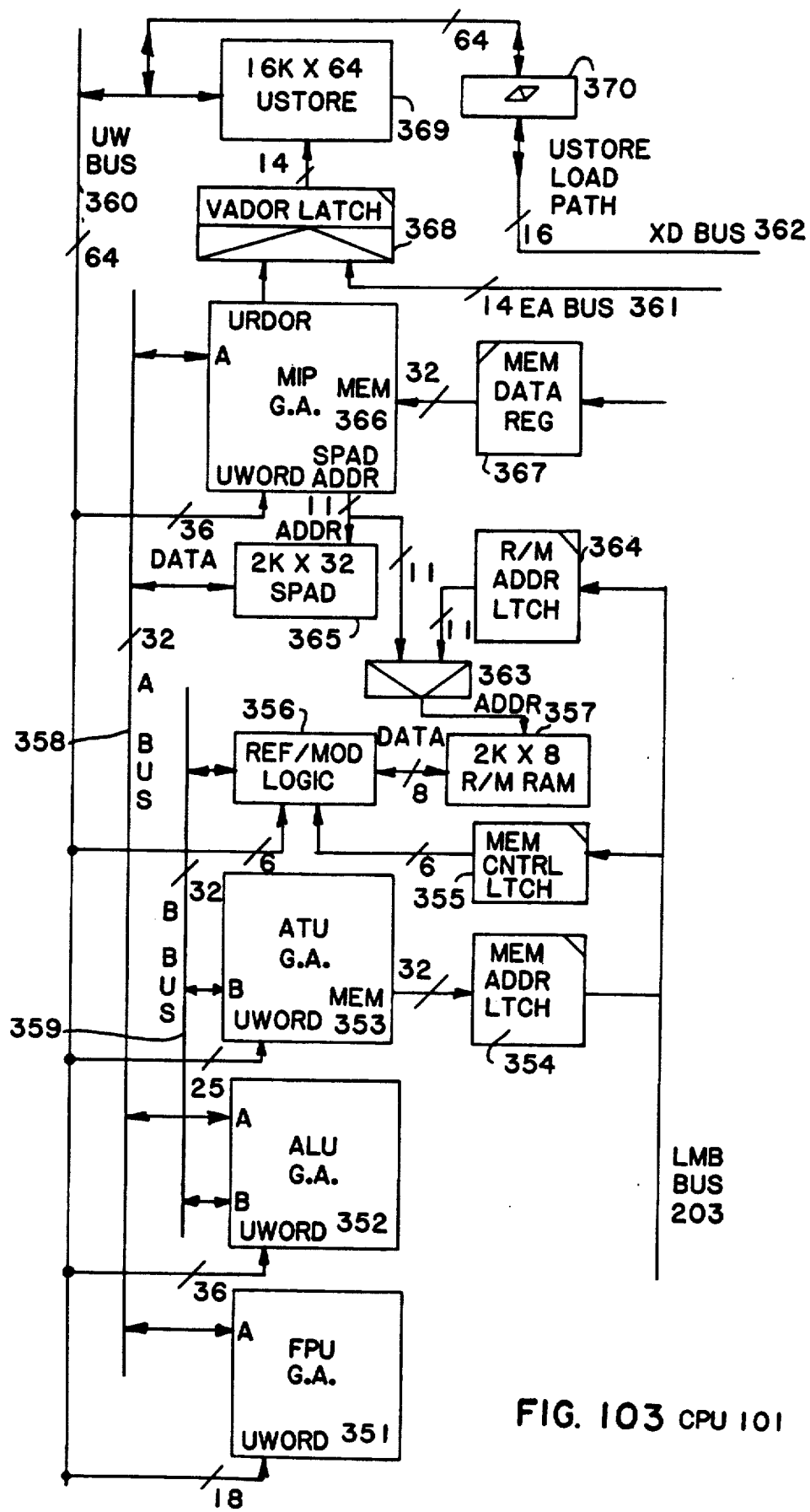
FIG. 103 CPU 101

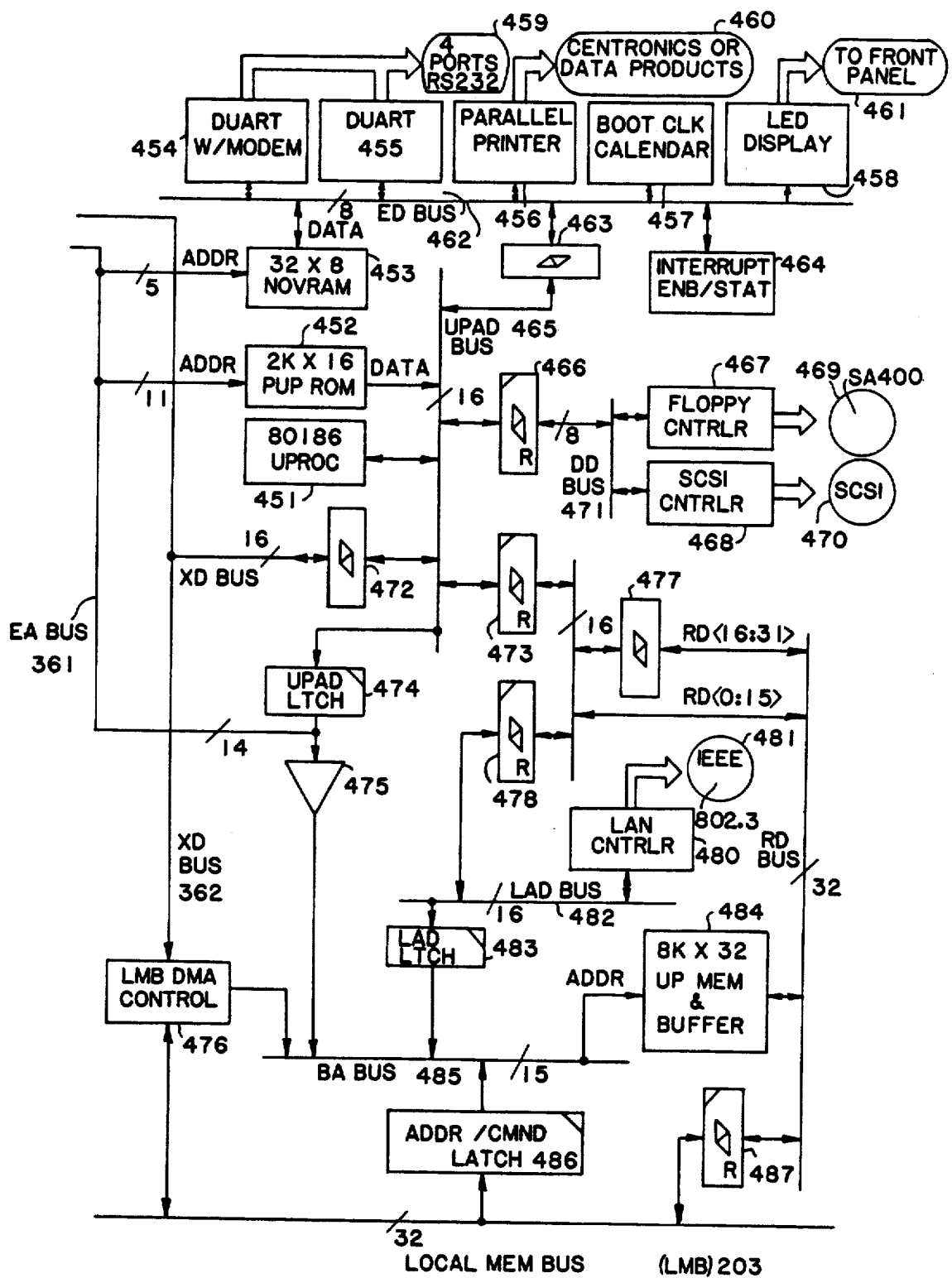
FIG. 104 IOC 202

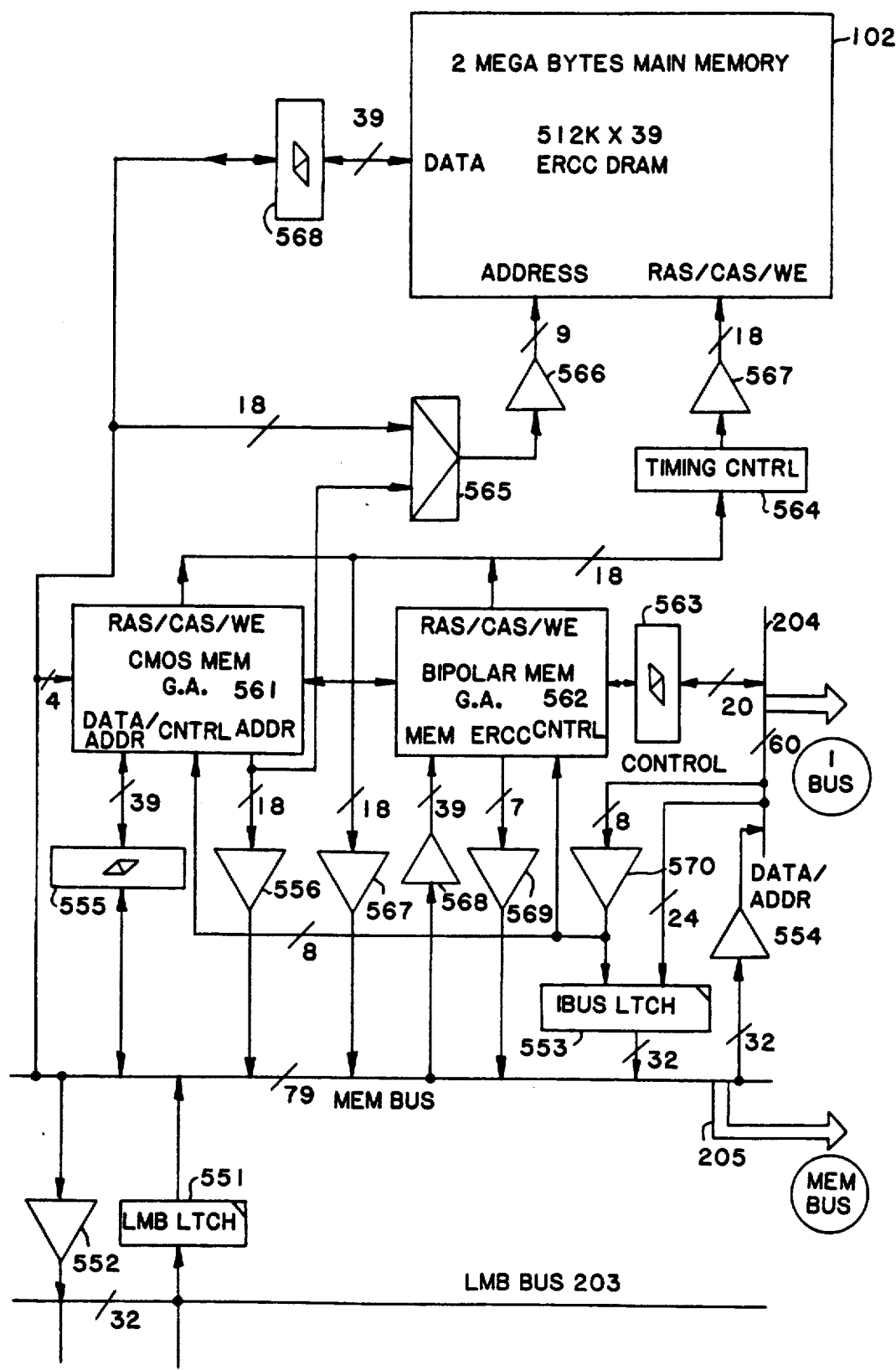
FIG. 105  MCU 201

FIG. 203  Justified 16-bit transfers
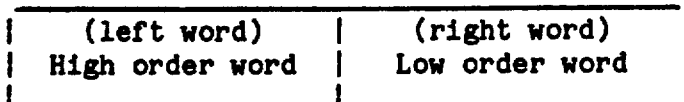
FIG. 204  Unjustified 16-bit transfers
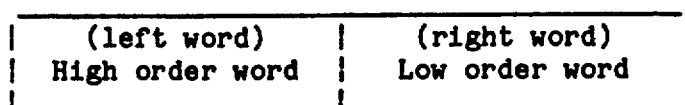

FIG. 205   Justified 8-bit transfers
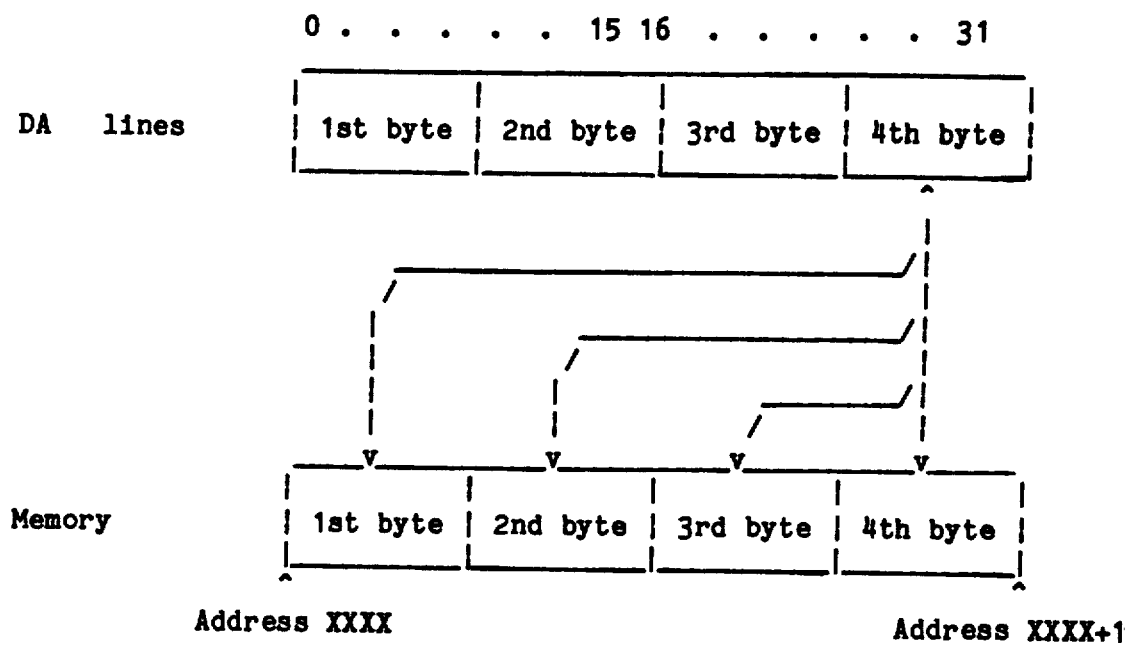
FIG. 206   Unjustified 8-bit transfers
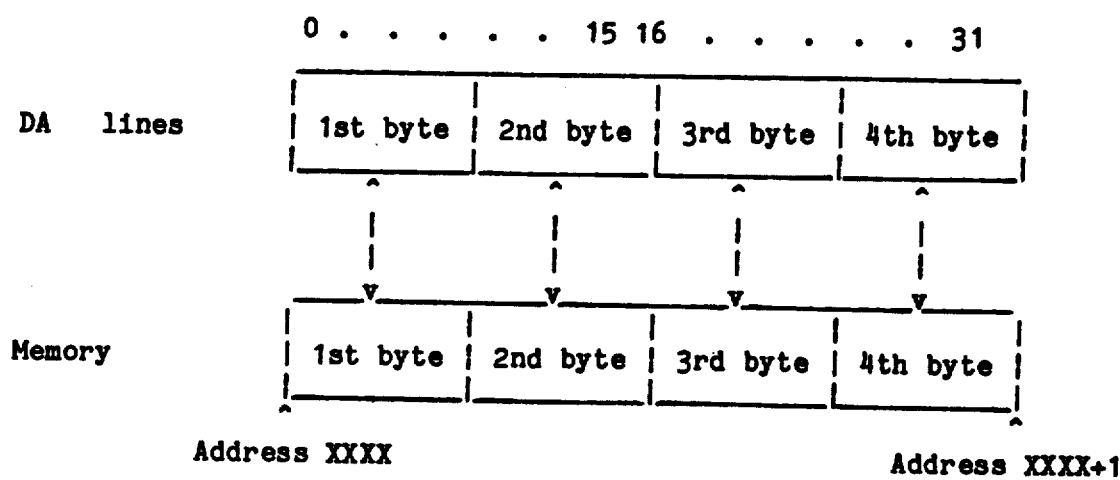

Logical organization of memory

Data Format

```
+------------------+------------------+------------------+------------------+
| Base Memory      | Board Class      | Board Type       | Board Subtype    |
|    1 bit         |    4 bits        |    5 bits        |    6 bits        |
|    DA16          |   DA<17-20>      |   DA<21-25>      |   DA<26-31>      |
+------------------+------------------+------------------+------------------+
```

Base Memory:
  1 = may be configured as part of base memory
  0 = should not be configured as part of base memory Board Classes:
  CPU
  Memory
  Video
  Communications
  Mass Storage
  Some combination of above Board Types:
  OPUS CPU
  Graphics processor Storage Formats:

```
                        0.............................31
                        .---------------------------------.
Double Word Format:     |          double word            |
                        '---------------------------------'
                        0.............15 16.............31
                        .----------------+----------------.
Single Word Format:     |    word 0      |    word 1      |
                        '----------------+----------------'
                        0......7 8.....15 16....23 24....31
                        .-------+--------+--------+--------.
Byte Format:            | Byte 0 | Byte 1 | Byte 2 | Byte 3 |
                        '-------+--------+--------+--------'
```

COMMAND ENCODINGS

| COMMAND TYPE | | ACTION | ENCODING (DA0-3..DA31) |
|---|---|---|---|
| Data Transfer Commands | 8-bit Data | write to byte 0 from byte 0 (unjustified) | 0000....0 |
| | | write to byte 2 from byte 2 (unjustified) | 0000....1 |
| | | write to byte 0 from byte 3 (justified) | 0001....0 |
| | | write to byte 2 from byte 3 (justified) | 0001....1 |
| | | read from byte 0 to byte 3 (justified) | 0101....0 |
| | | read from byte 2 to byte 3 (justified) | 0101....1 |
| | | write to byte 1 from byte 1 (unjustified) | 1000....0 |
| | | write to byte 3 from byte 3 (both) | 100x....1 |
| | | write to byte 1 from byte 3 (justified) | 1001....0 |
| | 16-bit Data | write to word 0 from word 1 (justified) | 0011....0 |
| | | write to word 1 from word 1 (both) | 0x11....1 |
| | | write to word 0 from word 0 (unjustified) | 0111....0 |
| | | read from word 0 to word 1 (justified) | 1101....0 |
| | | read from word 1 to word 1 (both) | 1101....1 |
| | 32-bit Data | write even double word | 1011....0 |
| | | write odd double word | 1011....1 |
| | | read even double word | 1111....0 |
| | | read odd double word | 1111....1 |
| | Blocks | read block | 0100....0 |
| | | write block | 0110....0 |
| Special Space Accesses | | read special | 1100....x |
| | | write special | 0010....x |

(x=don't care)

FIG. 224

Bus Clock

```
+-------+----------------------------------------+-------+-------+
| Time  | Description                            | min   | max   |
+-------+----------------------------------------+-------+-------+
| T00   | Clock period                           | 76    | 84    |
| T01   | Clock low time                         | 30    | 54    |
| T02   | Clock high time                        | 30    | 54    |
+-------+----------------------------------------+-------+-------+
```

Bus Request Lines

```
+-------+----------------------------------------+-------+-------+
| Time  | Description                            | min   | max   |
+-------+----------------------------------------+-------+-------+
| T03   | ^BREQ<0-15> low setup time             | 18    |       |
| T04   | ^BREQ<0-15> low hold time              | 5     |       |
| T05   | ^BREQ<0-15> high setup time            | 25    |       |
| T06   | ^BREQ<0-15> high hold time             | 5     |       |
+-------+----------------------------------------+-------+-------+
```

Address Valid - Master Wait

| Time | Description | min | max |
|------|-------------|-----|-----|
| T07  | ^AV/^MW low setup time | 20 | |
| T08  | ^AV/^MW low hold time | 5 | |
| T09  | ^AV/^MW high setup time | 40 | |
| T10  | ^AV/^MW high hold time | 5 | |

Bus Busy

| Time | Description | min | max |
|------|-------------|-----|-----|
| T11  | ^BBSY low setup time | 20 | |
| T12  | ^BBSY low hold time | 5 | |
| T13  | ^BBSY high setup time | 40 | |
| T14  | ^BBSY high hold time | 5 | |

Data - Address

| Time | Description | min | max |
|------|-------------|-----|-----|
| T15 | ^DA<0-31> address setup time | 21 | |
| T16 | ^DA<0-31> address hold time | 5 | |
| T17 | ^DA<0-31> data setup time | 40 | |
| T18 | ^DA<0-31> data hold time | 5 | |

Bus Parity

| Time | Description | min | max |
|------|-------------|-----|-----|
| T19 | ^PDA<0-3> address setup time | 21 | |
| T20 | ^PDA<0-3> address hold time | 5 | |
| T21 | ^PDA<0-3> data setup time | 40 | |
| T22 | ^PDA<0-3> data hold time | 5 | |

Encacheable

| Time | Description | min | max |
|------|-------------|-----|-----|
| T29  | ^CACHE setup time | 40 | |
| T30  | ^CACHE hold time  | 5  | |

Arbitration Reset

| Time | Description | min | max |
|------|-------------|-----|-----|
| T31  | ^ARBRST low setup time | 40 | |
| T32  | ^ARBRST how hold time  | 5  | |

FIG. 301  Data transfers as bytes, words or a double word:
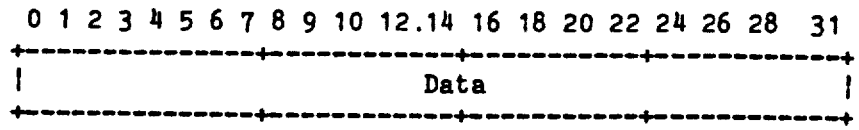
Addresses are transferred with the command as follows:
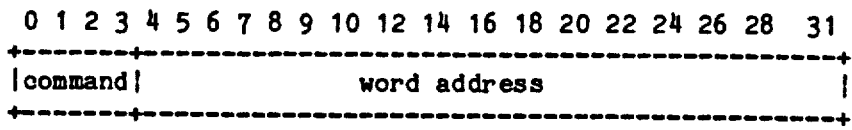
32-BIT MEMORY STORAGE FORMATS    FIG. 302
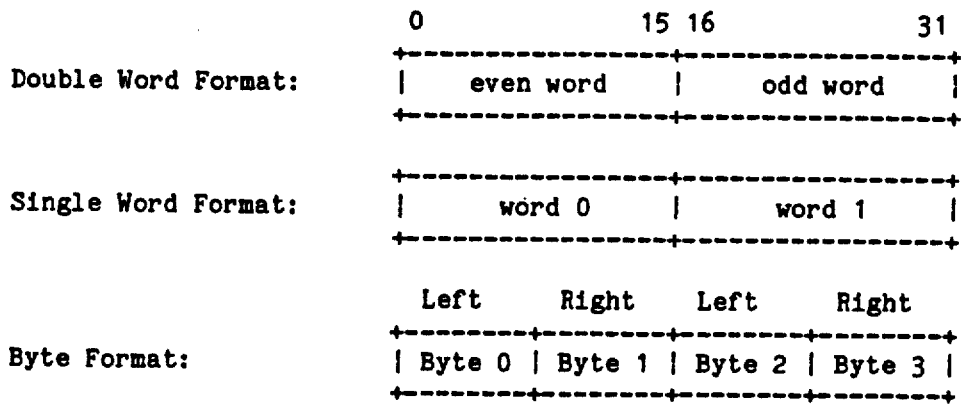
BUS JUSTIFIED FORMATS:    FIG. 303
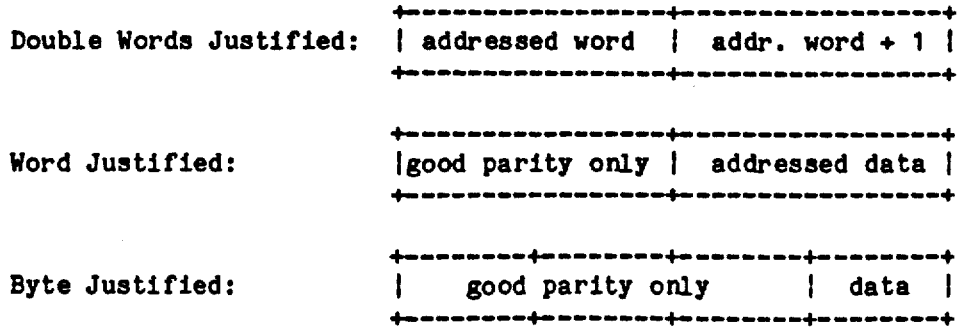

Simple write, no waits, no errors; to an odd bank

Simple read, with mem_wait, no errors; to an odd bank

Simple read, no waits, single bit error; to an even bank

Read-modify-write, no waits, no errors; to an even bank multiple read, no waits, no errors; to an even then an odd bank multiple write, no waits, no errors; to an even then an odd bank

FIG. 409
refresh, no waits, single bit error; to an even bank
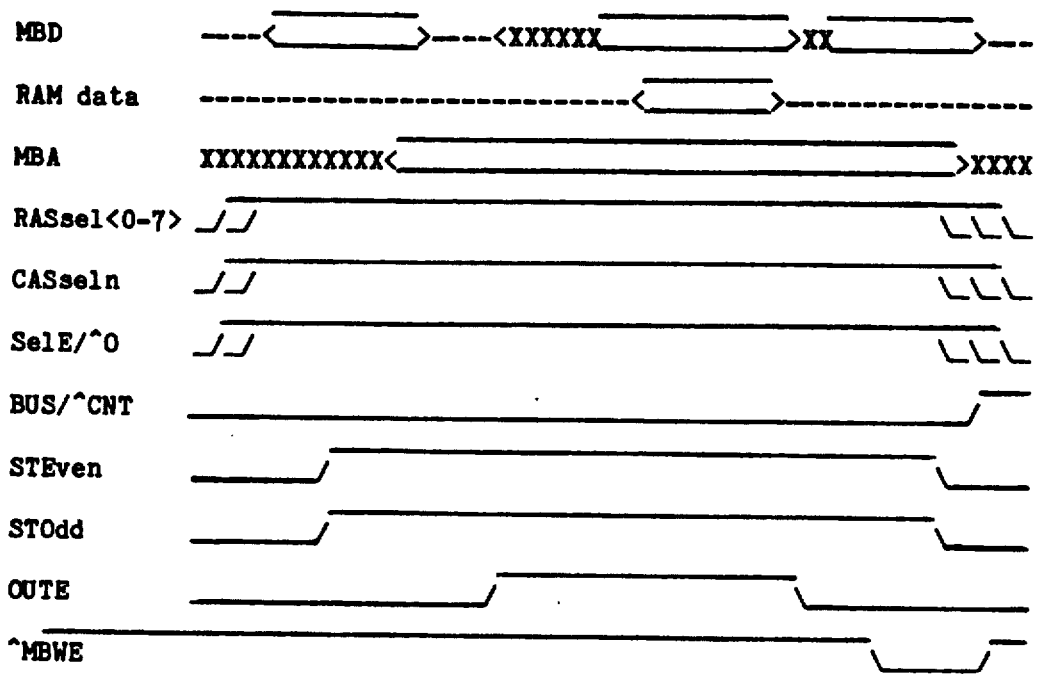
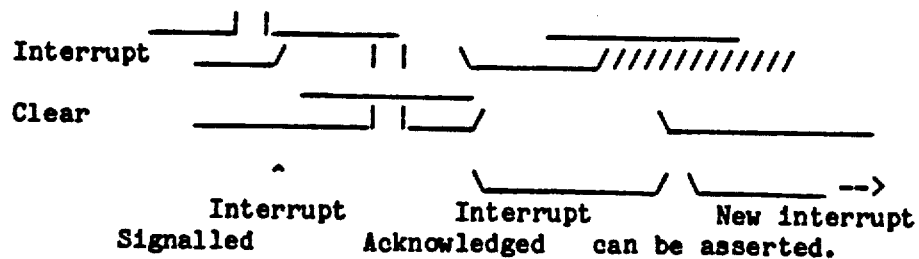
FIG. 410

Interrupt NOT acknowledged.    Interrupt Acknowleged.

Bus Clock:

| Time | Description | Min | Max |
|------|-------------|-----|-----|
| T0   | Clock Period | 76 | 84 |

Bank select setup and hold:

| Time | Description | Min | Max |
|------|-------------|-----|-----|
| T1 | Bank Select Setup | 10ns | |
| T2 | Bank Select Hold times | 10ns | |

FIG. 414

Address Setup and hold times.

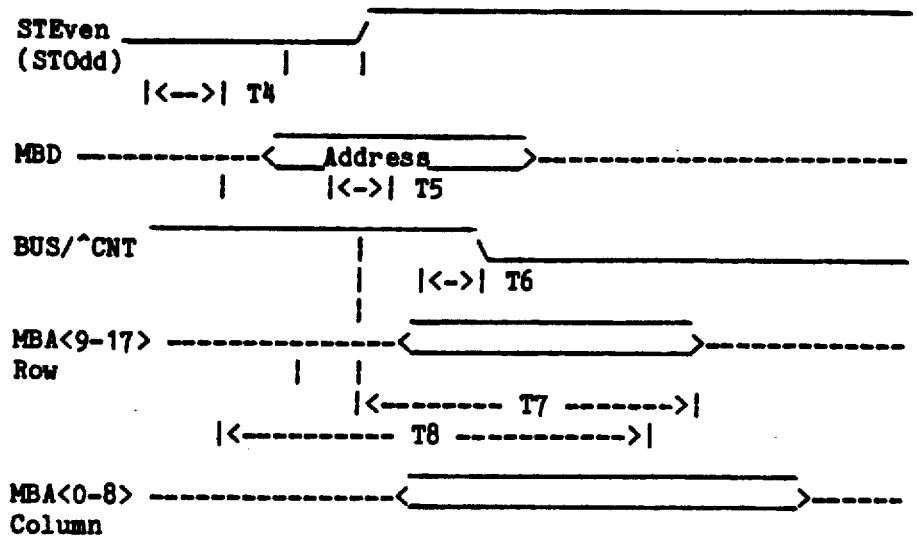

| Time | Description | Min | Max |
|---|---|---|---|
| T4 | Address Setup time before STx | 15ns | |
| T5 | Address hold on MBD after BUS/^CNT | | |
| T6 | Address Setup on MBA | | 20ns |
| T7 | Row address Hold time after STx | | 55ns |
| T8 | Column address Hold time after STx | | 105ns |

FIG. 415

Memory Access Requirements: ( leaving ^MemWait unasserted ).

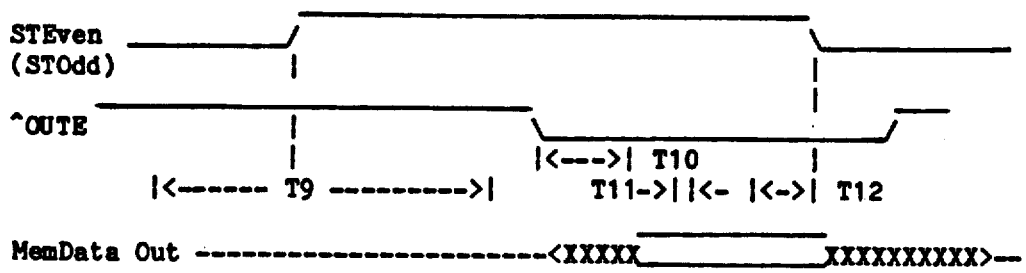

| Time | Description | Min | Max |
|---|---|---|---|
| T9 | Memory Access time from STx | | 143ns |
| T10 | Tri-State Enable Time. | | 10ns |
| T11 | Data Hold Time | 0ns | |
| T12 | Tri-State Disable Time | | 15ns |

Write Data Setup and hold:

| Time | Description | Min | Max |
|---|---|---|---|
| T13 | ^MBWE Delay from STx | 160ns | |
| T14 | ^MBWE pulse width | | 55ns |
| T15 | Data Setup for write | 5ns | |
| T16 | Data Hold for write | | 50ns |

^MemWait signal requirements:

| Time | Description | Min | Max |
|---|---|---|---|
| T17 | Delay from STx to ^MBWAIT | | 100ns |

| Time | Description | Min | Max |
|---|---|---|---|
| T18 | ^MBWAIT setup before ^MBCLK | 20ns | |
| T19 | ^MBWAIT hold after ^MBCLK | 10ns | |

^ERCCDis times:

| Time | Description | Min | Max |
|------|-------------|-----|-----|
| T20  | ERCC asserted after STx | | 100ns |

Non-maskable interrupt timing:

| Time | Description | Min | Max |
|------|-------------|-----|-----|
| T21  | CNMI to interrupt de-assert | 0ns | 80ns |
| T22  | CNMI pulse width | 160ns | |
| T23  | ^CNMI hold time. | 0ns | |

A single GDP embodiment

FIG. 507

GDP I/O pins: MBUS_

| GDP # | 0 | 1 | 2 | 3 | 4 | 5 | 6 | 7 | ... | 26 | 27 | 28 | 29 | 30 | 31 |
|---|---|---|---|---|---|---|---|---|---|---|---|---|---|---|---|
| | actual M bus lines connected to the pins: | | | | | | | | | | | | | | |
| 0 | 0 | 1 | 2 | 3 | 4 | 5 | 6 | 7 | ... | 26 | 27 | 28 | 29 | 30 | 31 |
| 1 | 30 | 31 | 0 | 1 | 2 | 3 | 4 | 5 | ... | 24 | 25 | 26 | 27 | 28 | 29 |
| 2 | 28 | 29 | 30 | 31 | 0 | 1 | 2 | 3 | ... | 22 | 23 | 24 | 25 | 26 | 27 |
| 3 | 26 | 27 | 28 | 29 | 30 | 31 | 0 | 1 | ... | 20 | 21 | 22 | 23 | 24 | 25 |
| . | | | | | . | | | | | | | . | | | |
| . | | | | | | | | | | | | | | | |
| 15 | 2 | 3 | 4 | 5 | 6 | 7 | 8 | 9 | ... | 28 | 29 | 30 | 31 | 0 | 1 |

Skew of Mbus lines to GDP's.

FIG. 508

```
+--------------------------------------------------------------+
| o    o    o    o    o    o    o    o    o    o    o    o    o    o  |
| 40   39   38   37   36   35   34   33   32   31   30   29   28   27 |
|                                                              |
| o    o    o    o    o    o    o    o    o    o    o    o    o    o  |
| 41   86   85   84   83   82   81   80   79   78   77   76   75   26 |
|                                                              |
| o    o    o    o    o    o    o    o    o    o    o    o    o    o  |
| 42   87  124  123  122  121  120  119  118  117  116  115   74   25 |
|                                                              |
| o    o    o    o                             o    o    o    o  |
| 43   88  125  135                           134  114   73   24 |
|                                                              |
| o    o    o                                  o    o    o  |
| 44   89  126                                113   72   23 |
|                                                              |
| o    o    o                                  o    o    o  |
| 45   90  127                                112   71   22 |
|                                                              |
| o    o    o           G R A P H I C S        o    o    o  |
| 46   91  128                                111   70   21 |
|                         D A T A                              |
| o    o    o                                  o    o    o  |
| 47   92  129        P R O C E S S O R       110   69   20 |
|                                                              |
| o    o    o              3 1 4               o    o    o  |
| 48   93  130                                109   68   19 |
|                                                              |
| o    o    o           ( top view )           o    o    o  |
| 49   94  131                                108   67   18 |
|                                                              |
| o    o    o    o                             o    o    o    o  |
| 50   95  132 index                          133  107   66   17 |
|                                                              |
| o    o    o    o    o    o    o    o    o    o    o    o    o    o  |
| 51   96   97   98   99  100  101  102  103  104  105  106   65   16 |
|                                                              |
| o    o    o    o    o    o    o    o    o    o    o    o    o    o  |
| 52   53   54   55   56   57   58   59   60   61   62   63   64   15 |
|                                                              |
| o    o    o    o    o    o    o    o    o    o    o    o    o    o  |
| 1    2    3    4    5    6    7    8    9   10   11   12   13   14 |
+--------------------------------------------------------------+
```

GDP Pin Layout

| PIN # | I/O | NAME | PIN # | I/O | NAME | PIN # | I/O | NAME |
|---|---|---|---|---|---|---|---|---|
| 1 | I/O | MB0 | 51 | I | qmd3 | 101 | --- | VSS |
| 2 | I/O | MB2 | 52 | I/O | MB1 | 102 | --- | VDD |
| 3 | I/O | MB4 | 53 | I/O | MB3 | 103 | I/O | MB20 |
| 4 | I/O | MB6 | 54 | I/O | MB5 | 104 | I/O | MB21 |
| 5 | I/O | MB8 | 55 | I/O | MB7 | 105 | I | ~QFS |
| 6 | I/O | MB12 | 56 | I/O | MB9 | 106 | I | ~QBS |
| 7 | I/O | MB14 | 57 | I/O | MB13 | 107 | I | QR0 |
| 8 | I/O | MB16 | 58 | I/O | MB15 | 108 | I | QR1 |
| 9 | I/O | MB18 | 59 | I/O | MB17 | 109 | I | ~QA0 |
| 10 | I/O | MB22 | 60 | I/O | MB19 | 110 | --- | VSS |
| 11 | I/O | MB24 | 61 | I/O | MB23 | 111 | --- | VDD |
| 12 | I/O | MB26 | 62 | I/O | MB25 | 112 | --- | - |
| 13 | I/O | MB28 | 63 | I/O | MB27 | 113 | O | VO31 |
| 14 | I/O | MB30 | 64 | I/O | MB29 | 114 | O | VO30 |
| 15 | I/O | MB31 | 65 | I | ~QA4 | 115 | I | VI21 |
| 16 | I | QID0 | 66 | I | ~QA3 | 116 | I | VI20 |
| 17 | I | QID1 | 67 | I | ~QA2 | 117 | I | VI30 |
| 18 | I | QID2 | 68 | I | ~QA1 | 118 | I | VI31 |
| 19 | I | QID3 | 69 | I | VI29 | 119 | --- | VSS |
| 20 | O | VO29 | 70 | I | VI28 | 120 | --- | VDD |
| 21 | O | VO28 | 71 | I | VI27 | 121 | I | VI0 |
| 22 | O | VO27 | 72 | I | VI26 | 122 | I | VI1 |
| 23 | O | VO26 | 73 | I | VI25 | 123 | I | VI10 |
| 24 | O | VO25 | 74 | I | VI24 | 124 | I | VI9 |
| 25 | O | VO24 | 75 | I | VI23 | 125 | O | VO1 |
| 26 | O | VO23 | 76 | I | VI22 | 126 | O | VO0 |
| 27 | O | VO22 | 77 | I | VI19 | 127 | --- | - |
| 28 | O | VO21 | 78 | I | VI18 | 128 | --- | VSS |
| 29 | O | VO20 | 79 | I | VI17 | 129 | --- | VDD |
| 30 | O | VO19 | 80 | I | VI16 | 130 | I | QBP0 |
| 31 | O | VO18 | 81 | I | VI15 | 131 | I | QBP1 |
| 32 | O | VO17 | 82 | I | VI14 | 132 | I | QBP2 |
| 33 | O | VO16 | 83 | I | VI13 | 133 | --- | - |
| 34 | O | VO15 | 84 | I | VI12 | 134 | --- | - |
| 35 | O | VO14 | 85 | I | VI11 | 135 | --- | - |
| 36 | O | VO13 | 86 | I | VI8 | | | |
| 37 | O | VO12 | 87 | I | VI7 | | | |
| 38 | O | VO11 | 88 | I | VI6 | | | |
| 39 | O | VO10 | 89 | I | VI5 | | | |
| 40 | O | VO9 | 90 | I | VI4 | | | |
| 41 | O | VO8 | 91 | I | VI3 | | | |
| 42 | O | VO7 | 92 | I | VI2 | | | |
| 43 | O | VO6 | 93 | I | ~QRS | | | |
| 44 | O | VO5 | 94 | I | ~QCS | | | |
| 45 | O | VO4 | 95 | I | ~QP0 | | | |
| 46 | O | VO3 | 96 | I | ~QP1 | | | |
| 47 | O | VO2 | 97 | I | QLE | | | |
| 48 | I | QMD0 | 98 | I | ~QOE | | | |
| 49 | I | QMD1 | 99 | I/O | MB10 | | | |
| 50 | I | QMD2 | 100 | I/O | MB11 | | | |

NOTE: All 'O' & 'I/O' pins are tristatable.

GDP PIN ASSIGNMENTS

```
              0              15 16                  31
        Mbus  | xxxx xxxx  xxx xxx | xxx xxx  xxx xxx |

Single GDP:
        GDP 0 | 1111 1111  1111 1111 | 1111 1111  1111 1111 |

Dual GDP's:
        GDP 1 | 11zz 11zz  11zz 11zz | 11zz 11zz  11zz 11zz |
        GDP 0 | zz11 zz11  zz11 zz11 | zz11 zz11  zz11 zz11 |

Four GDP's:
        GDP 3 | 11zz zzzz  11zz zzzz | 11zz zzzz  11zz zzzz |
        GDP 2 | zz11 zzzz  zz11 zzzz | zz11 zzzz  zz11 zzzz |
        GDP 1 | zzzz 11zz  zzzz 11zz | zzzz 11zz  zzzz 11zz |
        GDP 0 | zzzz zz11  zzzz zz11 | zzzz zz11  zzzz zz11 |

Eight GDP's:
        GDP 7 | 11zz zzzz  zzzz zzzz | 11zz zzzz  zzzz zzzz |
        GDP 6 | zz11 zzzz  zzzz zzzz | zz11 zzzz  zzzz zzzz |
        GDP 5 | zzzz 11zz  zzzz zzzz | zzzz 11zz  zzzz zzzz |
        GDP 4 | zzzz zz11  zzzz zzzz | zzzz zz11  zzzz zzzz |
        GDP 3 | zzzz zzzz  11zz zzzz | zzzz zzzz  11zz zzzz |
        GDP 2 | zzzz zzzz  zz11 zzzz | zzzz zzzz  zz11 zzzz |
        GDP 1 | zzzz zzzz  zzzz 11zz | zzzz zzzz  zzzz 11zz |
        GDP 0 | zzzz zzzz  zzzz zz11 | zzzz zzzz  zzzz zz11 |
```

GDP control of Mbus lines.

FIG. 511

```
M bus   Video   bit
data    data    selected
---------------------------
  0       0     FUNC0 - Mbus 28
  0       1     FUNC1 - Mbus 29
  1       0     FUNC2 - Mbus 30
  1       1     FUNC3 - Mbus 31

Mbus28 - 31  |   logical function
-------------|---------------------
   0000      |        0
   0001      |    M and V
   0010      |    M and ~V
   0011      |        M
   0100      |    ~M and V
   0101      |        V
   0110      |    M xor V
   0111      |    M or V
   1000      |    M nor V
   1001      |    M xnor V
   1010      |       ~V
   1011      |    M or ~V
   1100      |       ~M
   1101      |    ~M or V
   1110      |    M nand V
   1111      |        1
```

Sample Functions (NOTE: M = bit from M Bus, V = corresponding bit from Video memory)

| QMD0-3 | Name | function description |
|---|---|---|
| | PIXEL OPERATIONS: | |
| 0000 | Internal rmw | Video to Video r/m/w with DATA register |
| 0001 | " mask | Load MASK for Internal rmw |
| 0010 | " data | Load DATA register for Internal rmw |
| 0011 | " char | Mbus to Video Character drawing |
| 0100 | External rmw | Mbus to Video r/m/w |
| 0101 | " mask | Load mask for External rmw |
| 0110 | Host read | Video to host (pixel data) |
| 0111 | Register load | Load the FORE,BACK,or FUNC register as indicated |
| | PLANE OPERATIONS: | |
| 1000 | Internal rmw | Video to Video r/m/w with DATA register |
| 1001 | " mask | Load MASK for Internal rmw |
| 1010 | " data | Load DATA register for Internal rmw |
| 1011 | " char | Mbus to Video Character drawing |
| 1100 | External rmw | Mbus to Video r/m/w |
| 1101 | " mask | Load mask for External rmw |
| 1110 | Host read | Video to host (plane data) |
| 1111 | Register load | Load the FORE,or BACK register as indicated |

REG0,1 select which register is to be loaded:

| MODE | REG0 | REG1 | REGISTER |
|---|---|---|---|
| 7 | 0 | X | FUNC |
| 7 | 1 | 0 | BACK |
| 7 | 1 | 1 | FORE |
| F | 1 | 0 | BACK |
| F | 1 | 1 | FORE |

FIG. 512

```
PLANE CONTROLLED  |  GDP ID  |  ~QP0  |  ~QP1
------------------+----------+--------+--------
        0         |    0     |  xxx   |   1
        1         |    0     |   1    |  xxx
        2         |    1     |  xxx   |   1
        3         |    1     |   1    |  xxx
        4         |    2     |  xxx   |   1
        5         |    2     |   1    |  xxx
        .         |    .     |   .    |   .
        .         |    .     |   .    |   .
        .         |    .     |   .    |   .

where xxx = controlled by plane enable reg.
```

FIG. 514

~PL0    0 = plane enabled
~PL1    1 = plane disabled

```
            | GDP 0    GDP 1    GDP 2    GDP 3    GDP 4           GDP 0
            | plane    plane    plane    plane    plane    ...    plane
PLANE enabled|  0 1     0 1      0 1      0 1      0 1             0 1
------------+-----------------------------------------------------------
            |
            |========= PLANE MODE =================
            |
     0      |  0 1     1 1      1 1      1 1      1 1             1 1
     1      |  1 0     1 1      1 1      1 1      1 1             1 1
     2      |  1 1     0 1      1 1      1 1      1 1             1 1
     3      |  1 1     1 0      1 1      1 1      1 1             1 1
     4      |  1 1     1 1      0 1      1 1      1 1             1 1
     5      |  1 1     1 1      1 0      1 1      1 1     . . .   1 1
     6      |  1 1     1 1      1 1      0 1      1 1             1 1
     7      |  1 1     1 1      1 1      1 0      1 1             1 1
     8      |  1 1     1 1      1 1      1 1      0 1             1 1
     9      |  1 1     1 1      1 1      1 1      1 0             1 1
     .      |
     .      |                            .
     .      |                            .
    30      |  1 1     1 1      1 1      1 1      1 1             0 1
    31      |  1 1     1 1      1 1      1 1      1 1     . . .   1 0
            |
            |========= PLANE MODE =================
            |
    ALL     |  0 0     0 0      0 0      0 0      0 0             0 0
 ALL but 3  |  0 0     0 1      0 0      0 0      0 0             0 0
ALL but 2,3,6| 0 0     1 1      0 0      1 0      0 0             0 0
```

Decoding the PLANE ENABLE register.

FIG. 513

```
+----------------------------------------------------------------+
| READ  DATA (MASK need not be set):                             |
|                                                                |
|                    MODE | plane    FUNC      FORE   BACK       |
|                         |  0 1    0 1 2 3    0 1    0 1        |
|                    +----+----+----------------------------+    |
|                    | 6  | 0 0    X X X X    X X    X X  |     |
|                    +----+----+----------------------------+    |
|                                                                |
|          0                     15 16                      31   |
|     M   +----------------------------+----------------------+  |
|     BUS | pix0  pix1  pix2  pix3     | pix4  pix5  pix6  pix7| |
|     DATA+----------------------------+----------------------+  |
|                                                                |
|          0                     15 16                      31   |
|    MASK +----------------------------+----------------------+  |
|    REG  | XXXX  XXXX  XXXX  XXXX     | XXXX  XXXX  XXXX  XXXX| |
|    GDP 0+----------------------------+----------------------+  |
|                                                                |
| NOTE: X = don't care                                           |
+----------------------------------------------------------------+
```

EXTernal Read (4 bits/pixel, 8 pixels:32 bits)

FIG. 515

```
+--------------------------------------------------------------+
| SET MASK:                                                    |
|                                                              |
|                       MODE | plane   FUNC     FORE   BACK    |
|                            | 0 1    0 1 2 3   0 1    0 1     |
|                       +----+-----------------------------+   |
|                       | 5  | 0 0    X X X X   X X    X X|    |
|                       +----+-----------------------------+   |
|                                                              |
|           0                      15 16                  31   |
|       M  +----------------------------+-------------------+  |
|       BUS| 0000 0000 0000 0000        | 0000 0000 0111 1111| |
|       DATA+---------------------------+-------------------+  |
|                                                              |
|           0                      15 16                  31   |
|      MASK+----------------------------+-------------------+  |
|      REG | 0000 1100 1100 1100        | 1100 1100 1100 1100| |
|      GDP 1+---------------------------+-------------------+  |
|                                                              |
|      MASK+----------------------------+-------------------+  |
|      REG | 0000 0011 0011 0011        | 0011 0011 0011 0011| |
|      GDP 0+---------------------------+-------------------+  |
|                                                              |
| WRITE DATA:                                                  |
|                       MODE | plane   FUNC     FORE   BACK    |
|                            | 0 1    0 1 2 3   0 1    0 1     |
|                       +----+-----------------------------+   |
|                       | 4  | 0 0    0 0 1 1   X X    X X|    |
|                       +----+-----------------------------+   |
|                                                              |
|           0   3 4                15 16                  31   |
|       M  +-----+--------------------+--------------------+   |
|       BUS| XXXX| DATA   TO   BE     |  W R I T T E N     |   |
|       DATA+----+--------------------+--------------------+   |
|                                                              |
| NOTE: X = don't care                                         |
+--------------------------------------------------------------+
```

EXTernal Write (4 bits/pixel, 7 pixels)

FIG. 516

```
+------------------------------------------------------------------+
|                                                                  |
| PLANE READ (MASK need not be set):                               |
|                                                                  |
|                      MODE | plane    FUNC     FORE  BACK         |
|                           | 0 1     0 1 2 3   0 1   0 1          |
|                      +----+----------------------------+         |
|                      | E  | 1 0     X X X X   X X  X X |         |
|                      +----+----------------------------+         |
|                                                                  |
|           0                       15 16                    31    |
|      M   +-------------------------+--------------------------+  |
|      BUS |   V A L I D    P L A|N E       D A T A            |  |
|      DATA+-------------------------+--------------------------+  |
|                                                                  |
|           0                       15 16                    31    |
|      MASK+-------------------------+--------------------------+  |
|      REG | XXXX  XXXX  XXXX  XXXX  | XXXX  XXXX  XXXX  XXXX  |  |
|          +-------------------------+--------------------------+  |
|                                                                  |
|                                                                  |
| NOTE: X = don't care                                             |
+------------------------------------------------------------------+

EXTernal PLANE Read (X bits/pixel,32 bits,1 bit/pixel)
```

FIG. 517

```
+-------------------------------------------------------------------+
| SET MASK:                                                         |
|                         MODE | plane    FUNC     FORE   BACK      |
|                              | 0 1     0 1 2 3   0 1    0 1       |
|                              +-------------------------------+    |
|              GDP   1    | D  | X X     X X X X   X X    X X |    |
|                              +-------------------------------+    |
|                                                                   |
|                              +-------------------------------+    |
|              GDP   0    | D  | X X     X X X X   X X    X X |    |
|                              +-------------------------------+    |
|                                                                   |
|              0                        15 16                  31   |
|         M   +-----------------------------+---------------------+ |
|         BUS | 0000  0000  1111  1111      | 1111  1111  1111  1111|
|         DATA+-----------------------------+---------------------+ |
|                                                                   |
|         MASK+-----------------------------+---------------------+ |
|         REG | 0000  0000  1111  1111      | 1111  1111  1111  1111|
|         GDP 0+----------------------------+---------------------+ |
|                                                                   |
|         MASK+-----------------------------+---------------------+ |
|         REG | 0000  0000  1111  1111      | 1111  1111  1111  1111|
|         GDP 1+----------------------------+---------------------+ |
|                                                                   |
| WRITE DATA:                                                       |
|                         MODE | plane    FUNC     FORE   BACK      |
|                              | 0 1     0 1 2 3   0 1    0 1       |
|                              +-------------------------------+    |
|              GDP   1    | C  | 1 0     0 0 1 1   X X    X X |    |
|                              +-------------------------------+    |
|                                                                   |
|                              +-------------------------------+    |
|              GDP   0    | C  | 1 1     0 0 1 1   X X    X X |    |
|                              +-------------------------------+    |
|                                                                   |
|              0          7 8        15 16                     31   |
|         M   +-----------+-----------+---------------------------+ |
|         BUS | XXXX XXXX |   DATA    |   TO  BE  WRITTEN         | |
|         DATA+-----------+-----------+---------------------------+ |
+-------------------------------------------------------------------+

EXTernal PLANE Write ( 24 pixels, plane 1)
```

```
READ  DATA (MASK need not be set):

MODE | plane   FUNC     FORE   BACK
                         | 0 1    0 1 2 3   0 1    0 1
                    +----+------+---------+------+-----+
                    | 2  | X X  | X X X X | X X  | X X |
                    +----+------+---------+------+-----+

0                          15 16                          31
DATA   +------------------------------+------------------------------+
REG    | p0 p1 p0 p1 ....             |  .... p1 p0 p1 p0 p1         |
       +------------------------------+------------------------------+

0                          15 16                          31
MASK   +------------------------------+------------------------------+
REG    | XXXX  XXXX  XXXX  XXXX       | XXXX  XXXX  XXXX  XXXX       |
GDP 0  +------------------------------+------------------------------+

NOTE: X = don't care
```

INTernal Read (16 pixels)

FIG. 521

```
READ  DATA (MASK need not be set):

MODE | plane   FUNC     FORE   BACK
                         | 0 1    0 1 2 3   0 1    0 1
                    +----+------+---------+------+-----+
                    | A  | 1 0  | X X X X | X X  | X X |
                    +----+------+---------+------+-----+

0                          15 16                          31
DATA   +------------------------------+------------------------------+
REG    |            plane             |            data              |
       +------------------------------+------------------------------+

0                          15 16                          31
MASK   +------------------------------+------------------------------+
REG    | XXXX  XXXX  XXXX  XXXX       | XXXX  XXXX  XXXX  XXXX       |
GDP 0  +------------------------------+------------------------------+

NOTE: X = don't care
```

INTernal PLANE Read (32 bits)

```
+--------------------------------------------------------------+
| SET MASK:                                                    |
|                                                              |
|                 MODE | plane    FUNC     FORE   BACK         |
|                      |  0 1    0 1 2 3   0 1    0 1          |
|                 +----+------+-----------+------+------+      |
|                 |  1 |  X X | X X X X   | X X  | X X  |      |
|                 +----+------+-----------+------+------+      |
|                                                              |
|             0                       15 16                 31 |
|       M  +---------------------------+----------------------+|
|       BUS|  0000  0000  0000  0000   |  0011  1111  1111  1111|
|       DATA+--------------------------+----------------------+|
|                                                              |
|       MASK +-------------------------+----------------------+|
|       REG  | 0000  1111  1111  1111  | 1111  1111  1111  1111|
|            +-------------------------+----------------------+|
|                                                              |
| WRITE DATA:                                                  |
|                                                              |
|                 MODE | plane    FUNC     FORE   BACK         |
|                      |  0 1    0 1 2 3   0 1    0 1          |
|                 +----+------+-----------+------+------+      |
|                 |  0 |  0 0 |  0 0 1 1  | X X  | X X  |      |
|                 +----+------+-----------+------+------+      |
|                                                              |
|             0                        15 16                31 |
|       DATA +--------------------------+----------------------+|
|       REG  |    plane 0   data        |    plane 1 data      ||
|            +--------------------------+----------------------+|
|                                                              |
+--------------------------------------------------------------+

INTernal Write (14 pixels)
```

FIG. 520

```
+----------------------------------------------------------------+
| SET MASK:                                                      |
|                       MODE | plane    FUNC      FORE  BACK     |
|                            | 0 1      0 1 2 3   0 1   0 1      |
|                       +----+----+------------+------+-----+    |
|                       | 9  | X X  X X X X    X X    X X  |    |
|                       +----+----+------------+------+-----+    |
|                                                                |
|         0                         15 16                    31  |
|    M   +----------------------------+--------------------------+
|   BUS  | 0000 0000 0000 0000        | 0011 1111 1111 1111      |
|   DATA +----------------------------+--------------------------+
|                                                                |
|         0                         15 16                    31  |
|   MASK +----------------------------+--------------------------+
|    REG | 0000 0000 0000 0000        | 0011 1111 1111 1111      |
|        +----------------------------+--------------------------+
|                                                                |
| WRITE DATA:                                                    |
|                       MODE | plane    FUNC      FORE  BACK     |
|                            | 0 1      0 1 2 3   0 1   0 1      |
|                       +----+----+------------+------+-----+    |
|                       | 8  | 1 0  X X X X    X X    X X  |    |
|                       +----+----+------------+------+-----+    |
|                                                                |
|         0                         15 16                    31  |
|   DATA +----------------------------+--------------------------+
|   REG  |        plane               |           data           |
|        +----------------------------+--------------------------+
+----------------------------------------------------------------+

INTernal PLANE Write (14 bits)
```

FIG. 522

```
+--------------------------------------------------------------------+
| SET MASK:                                                          |
|                     MODE | plane    FUNC    FORE  BACK             |
|                          |  0 1    0 1 2 3   0 1   0 1             |
|                     +----+------+---------+-----+-----+            |
|                     |  1 | X X  | X X X X | X X | X X |            |
|                     +----+------+---------+-----+-----+            |
|                                                                    |
|            0                     15 16                      31     |
|         M  +---------------------+---------------------------+     |
|        BUS | 0000 0000 0000 0000 | 0000 0011 1111 1111       |     |
|        DATA+---------------------+---------------------------+     |
|                                                                    |
|            0                     15 16                      31     |
|        MASK+---------------------+---------------------------+     |
|         REG| 0000 0011 1111 1111 | 0000 0011 1111 1111       |     |
|            +---------------------+---------------------------+     |
|                                                                    |
| WRITE DATA:                                                        |
|                     MODE | plane    FUNC    FORE  BACK             |
|                          |  0 1    0 1 2 3   0 1   0 1             |
|                     +----+------+---------+-----+-----+            |
|                     |  3 | 0 0  | X X X X | X X | X X |            |
|                     +----+------+---------+-----+-----+            |
|                                                                    |
|            0                     15 16                      31     |
|         M  +---------------------+---------------------------+     |
|        bus | 0000 0000 0000 0000 | 0000 00   F O N T         |     |
|        DATA+---------------------+---------------------------+     |
|                                                                    |
| NOTE: X = don't care                                               |
+--------------------------------------------------------------------+
```

Character Write (10 pixel FONT, more than 1 bit/pix)

FIG. 523

```
+----------------------------------------------------------------+
| SET MASK:                                                      |
|                                                                |
|                         MODE | plane    FUNC     FORE   BACK   |
|                              | 0 1     0 1 2 3   0 1    0 1    |
|                         +----+----+------------+------+------+ |
|                         | 9  | 1 0 | X X X X   | X X  | X X  | |
|                         +----+----+------------+------+------+ |
|                                                                |
|            0                     15 16                    31  |
|        M  +----------------------------+----------------------+|
|        BUS| 0000  0000  0000  0000     | 0000  0011  1111 1111||
|        DATA+---------------------------+----------------------+|
|                                                                |
|            0                     15 16                    31  |
|       MASK+----------------------------+----------------------+|
|        REG| 0000  0000  0000  0000     | 0000  0011  1111 1111||
|           +----------------------------+----------------------+|
|                                                                |
| WRITE DATA:                                                    |
|                                                                |
|                         MODE | plane    FUNC     FORE   BACK   |
|                              | 0 1     0 1 2 3   0 1    0 1    |
|                         +----+----+------------+------+------+ |
|                         | B  | 1 0 | X X X X   | X X  | X X  | |
|                         +----+----+------------+------+------+ |
|                                                                |
|            0                     15 16                    31  |
|        M  +----------------------------+----------------------+|
|        bus| XXXX  XXXX  XXXX  XXXX     | XXXX  XX   F O N T  ||
|        DATA+---------------------------+----------------------+|
|                                                                |
+----------------------------------------------------------------+
```

Character Draw in a One Bit/Pixel System

FIG. 524

```
+----------------------------------------------------------------+
| SET MASK:                                                      |
|                                                                |
|                     MODE | plane    FUNC      FORE   BACK      |
|                          | 0 1     0 1 2 3    0 1    0 1       |
|                     +------+-----------------------------+     |
|                     |  5   | X X   X X X X    X X   X X  |     |
|                     +------+-----------------------------+     |
|                                                                |
|            0                    15 16                      31  |
|      M    +---------------------------+-------------------+    |
|     BUS   | XXXX  XXXX  XXXX  XXXX    | 0000 0011 1111 1111|   |
|     DATA  +---------------------------+-------------------+    |
|                                                                |
|            0                    15 16                      31  |
|    MASK   +---------------------------+-------------------+    |
|    REG    | 0000  0011  1111  1111    | 0000 0011 1111 1111|   |
|           +---------------------------+-------------------+    |
|                                                                |
| WRITE DATA:                                                    |
|                                                                |
|                     MODE | plane    FUNC      FORE   BACK      |
|                          | 0 1     0 1 2 3    0 1    0 1       |
|                     +------+-----------------------------+     |
|                     |  6   | 0 0   0 1 1 0    X X   X X  |     |
|                     +------+-----------------------------+     |
|                                                                |
|            0                    15 16                      31  |
|      M    +---------------------------+-------------------+    |
|     bus   | 0000  0000  0000  0000    | 0000 00   F O N T |    |
|     DATA  +---------------------------+-------------------+    |
|                                                                |
+----------------------------------------------------------------+
```

Character XOR    (10 pixel FONT)

FIG. 525

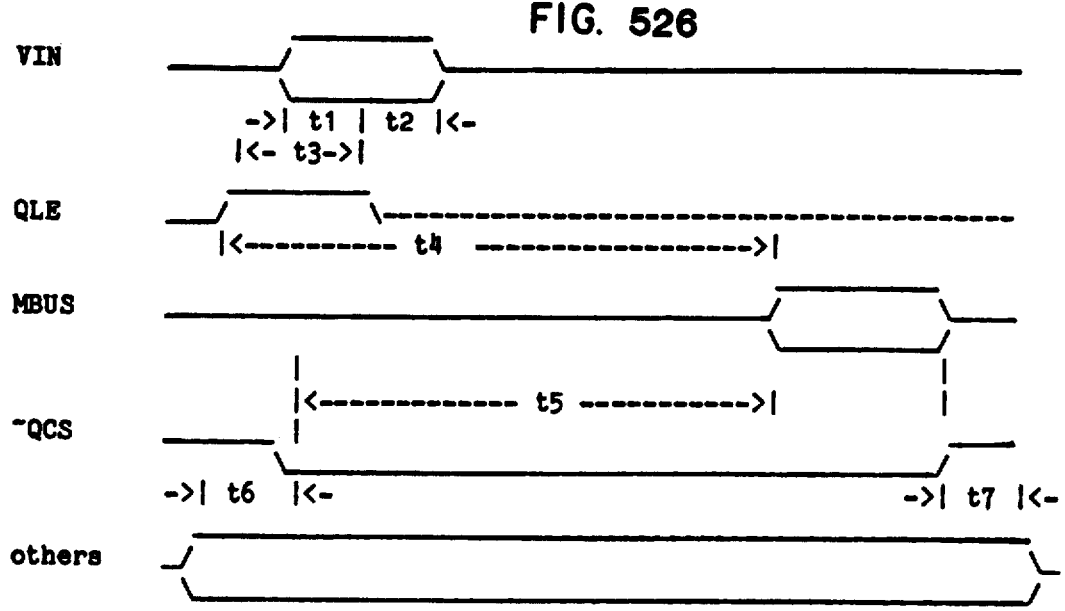
Timing of HOST READ (data from Video rams to the Mbus):
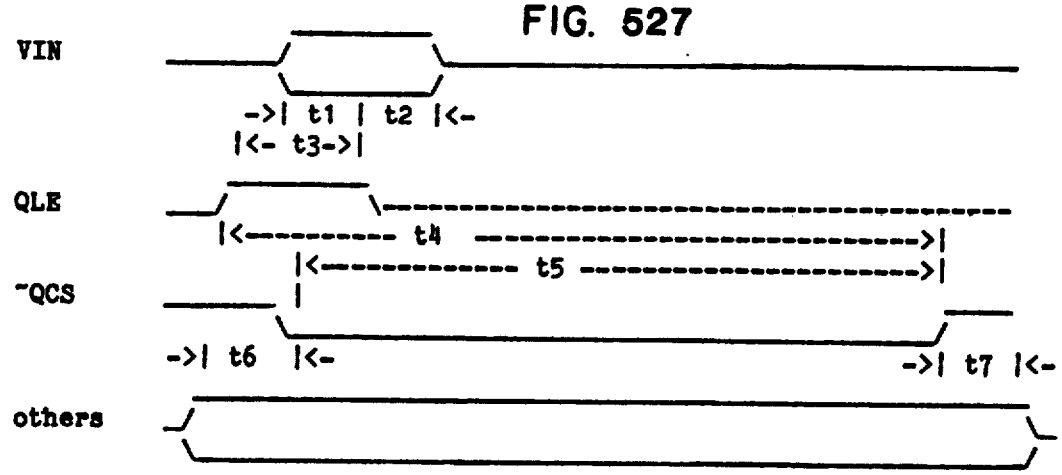
Timing of LOAD DREG (data from VRAMs to the DREG)

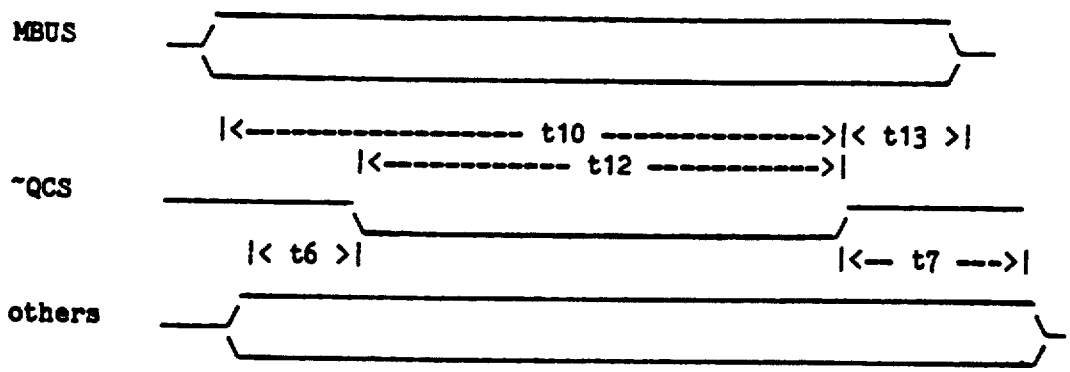
Timing of FUNCTION REGISTER LOAD:
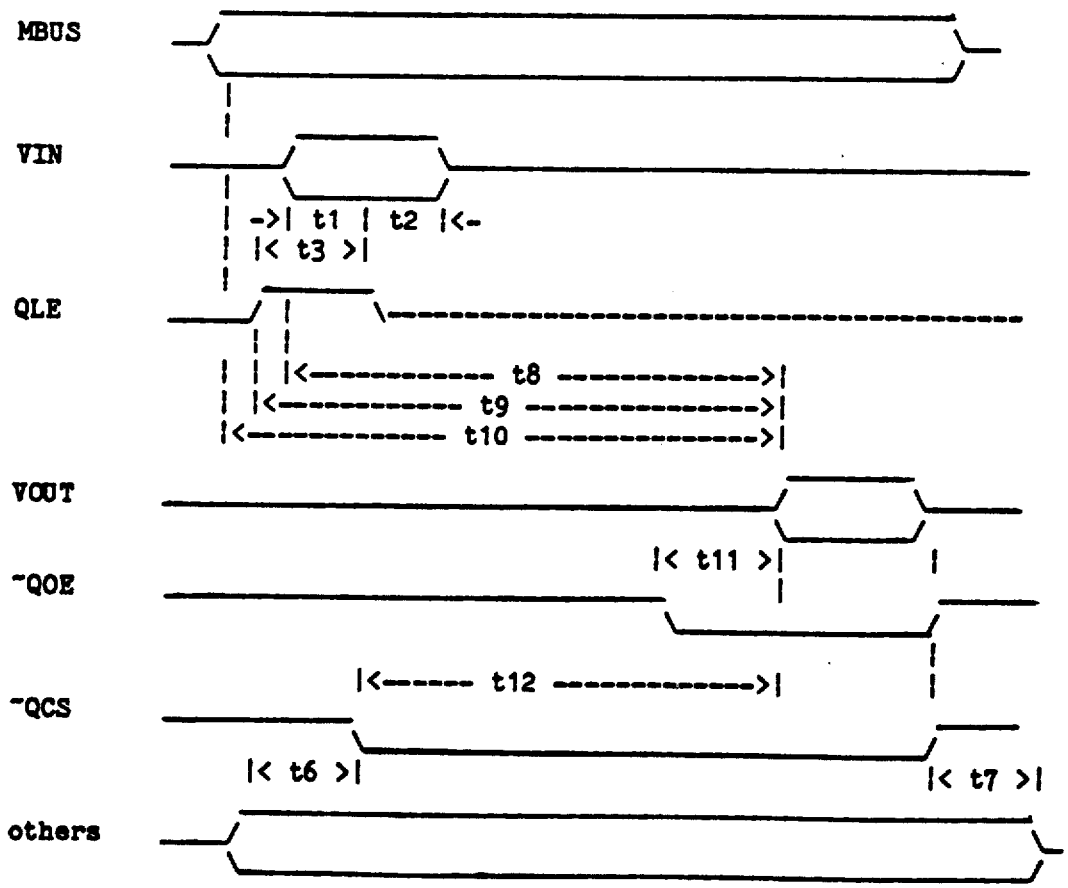
Timing of WRITE (data from MBUS,VIDEO to VIDEO):

Timing of RESET

Timing of FOREGROUND/BACKGROUND REGISTER LOAD:

| SCAN LINE | MEMORY COLUMN | CHIP 0 (00) | CHIP 1 (01) | CHIP 2 (02) | CHIP 3 (03) | ... | CHIP 62 (3E) | CHIP 63 (3F) |
|---|---|---|---|---|---|---|---|---|
| 0 | 0 (00) .... 63 (3F) | | | | SEE FIGURE 533B | • • • | | |
| 1 | 64 (40) .... 127 (7F) | • • • | • • • | • • • | | • • • | • • • | • • • |
| 2 | 128 (80) .... 191 (BF) | • • • | • • • | • • • | | • • • | • • • | • • • |
| • • • | • • • | | | | | • • • | | |
| 1023 (3FF) | 32704 (7FC0) .... 32767 (7FFF) | • • • | • • • | • • • | | • • • | • • • | • • • |

{ CAS 0 (CHIP 0, CHIP 1) } { CAS 1 (CHIP 2, CHIP 3) } { CAS 31 (CHIP 62, CHIP 63) }

FIG. 533A

```
                    <---------- 32 VIDEO RAMS ---------->
 ~QA4 - 0     0                    15 | 16                    31

00     | 0111  1111  1111  1111 | 1111  1111  1111  1111 |
    01     | 0101  1111  1111  1111 | 1111  1111  1111  1111 |
    02     | 0101  0111  1111  1111 | 1111  1111  1111  1111 |
    03     | 0101  0101  1111  1111 | 1111  1111  1111  1111 |

04     | 0101  0101  0111  1111 | 1111  1111  1111  1111 |
    05     | 0101  0101  0101  1111 | 1111  1111  1111  1111 |
    06     | 0101  0101  0101  0111 | 1111  1111  1111  1111 |
    07     | 0101  0101  0101  0101 | 1111  1111  1111  1111 |

08     | 0101  0101  0101  0101 | 0111  1111  1111  1111 |
    09     | 0101  0101  0101  0101 | 0101  1111  1111  1111 |
    0A     | 0101  0101  0101  0101 | 0101  0111  1111  1111 |
    0B     | 0101  0101  0101  0101 | 0101  0101  1111  1111 |

0C     | 0101  0101  0101  0101 | 0101  0101  0111  1111 |
    0D     | 0101  0101  0101  0101 | 0101  0101  0101  1111 |
    0E     | 0101  0101  0101  0101 | 0101  0101  0101  0111 |
    0F     | 0101  0101  0101  0101 | 0101  0101  0101  0101 |

10     | 0001  0101  0101  0101 | 0101  0101  0101  0101 |
    11     | 0000  0101  0101  0101 | 0101  0101  0101  0101 |
    12     | 0000  0001  0101  0101 | 0101  0101  0101  0101 |
    13     | 0000  0000  0101  0101 | 0101  0101  0101  0101 |

14     | 0000  0000  0001  0101 | 0101  0101  0101  0101 |
    15     | 0000  0000  0000  0101 | 0101  0101  0101  0101 |
    16     | 0000  0000  0000  0001 | 0101  0101  0101  0101 |
    17     | 0000  0000  0000  0000 | 0101  0101  0101  0101 |

18     | 0000  0000  0000  0000 | 0001  0101  0101  0101 |
    19     | 0000  0000  0000  0000 | 0000  0101  0101  0101 |
    1A     | 0000  0000  0000  0000 | 0000  0001  0101  0101 |
    1B     | 0000  0000  0000  0000 | 0000  0000  0101  0101 |

1C     | 0000  0000  0000  0000 | 0000  0000  0001  0101 |
    1D     | 0000  0000  0000  0000 | 0000  0000  0000  0101 |
    1E     | 0000  0000  0000  0000 | 0000  0000  0000  0001 |
    1F     | 0000  0000  0000  0000 | 0000  0000  0000  0000 |
```

Column Address Strobe (CAS) Phases

FIG. 534

LAR bit mapping to M-bus Address Lines

OTHER space decoding

Foreground register

Background register

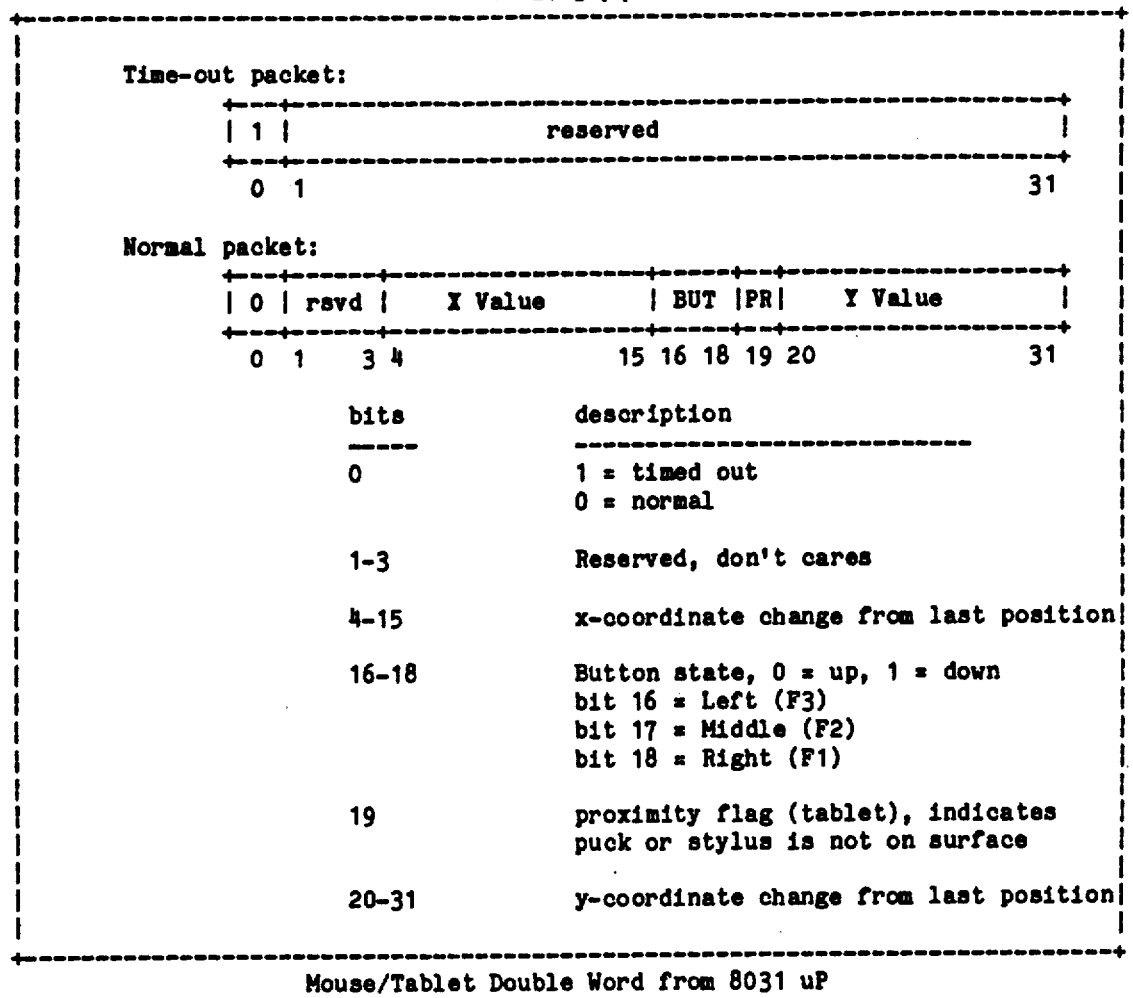
Mouse/Tablet Double Word from 8031 uP
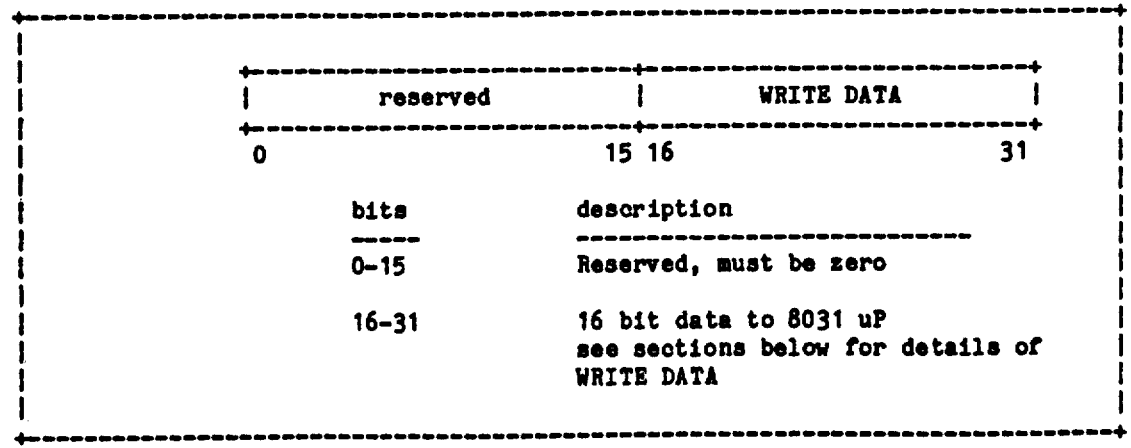
Host Write COM DATA Register

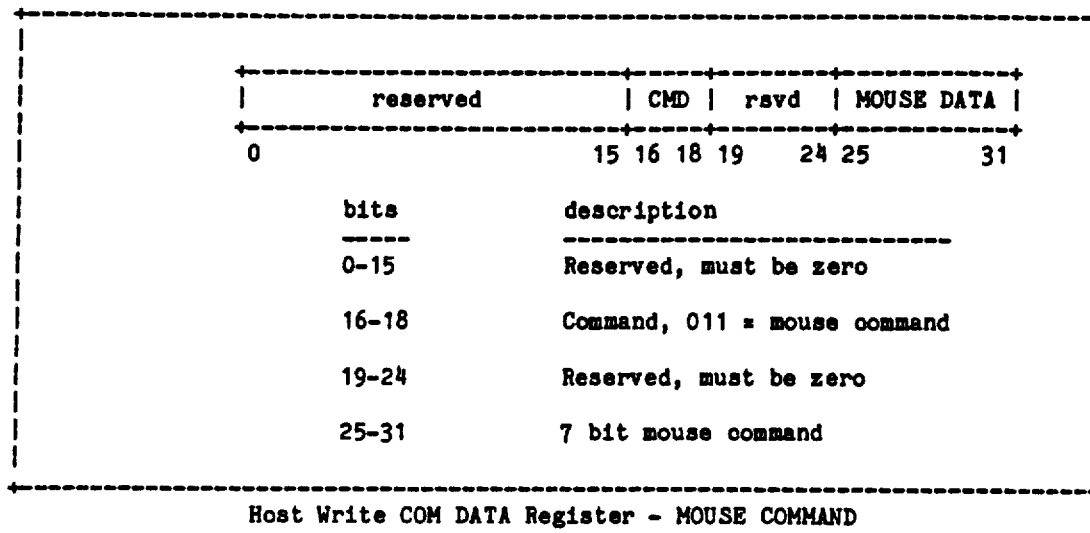
Host Write COM DATA Register - MOUSE COMMAND
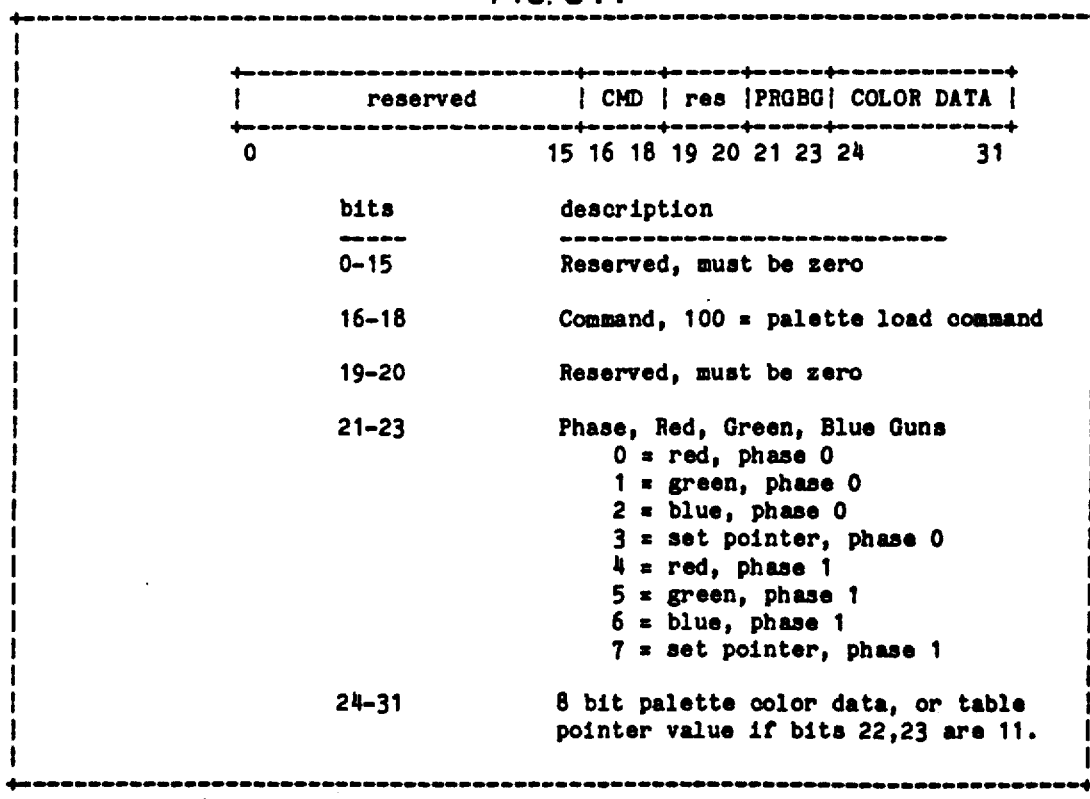
Host Write COM DATA Register - PALETTE LOAD COMMAND

```
+---------------------------------------+---------+--+-----------------+
|            reserved                   |  CMD |**|    reserved      |
+---------------------------------------+---------+--+-----------------+
0                                     15 16    18 19 20              31
```

| bits | description |
|------|-------------|
| 0-15 | Reserved, must be zero |
| 16-18 | Command, 101 = Manufacturing test mode |
| 19 | additional commmand decode bit<br>0 = jump to area past code prom<br>1 = send back status bytes |
| 20-31 | Reserved, must be zero |

STATUS BYTES RETURNED IN COMM DATA REGISTER:

```
+----------------------------------+------+----------------------+---+
|          reserved                |DEVICE|     reserved         |STF|
+----------------------------------+------+----------------------+---+
0                                 21   22 23 24                 30  31
```

| | | |
|------|--------|---|
| 0-21 | reserved, must be zero | |
| 22,23 | DEVICE | 00 = nothing<br>01 = tablet<br>10 = mouse<br>11 = undefined |
| 24-30 | reserved, must be zero | |
| 31 | powerup self test condition<br>0 = self test pass<br>1 = self test failed | |

Manufacturing Test Mode

```
+------------------------------------------------------------+
|          +-----------------+---+---+---+---+-----+---+     |
|  reserved            |STF|^VB|RTA| DV | rsvd |KBI|         |
|          +-----------------+---+---+---+---+-----+---+     |
| 0                           23  24  25  26  27  28  30 31  |
```

| bits | description |
|------|-------------|
| 0-23 | Reserved, don't cares when read |
| 24 | Self test failed, 0 = passed<br>1 = failed<br>Indicates that the 8031 self test has passed.<br>    verifying: the DAC palette ram<br>         and the palette storage ram |
| 25 | ^VBLANK, 0 = vertical blanking<br>1 = NOT vertical blanking<br>Indicates that vertical blanking is asserted, cleared when vertical blanking deasserts.<br>    Note: the NMI generated by the assertion of this bit is only cleared when this register is written and not by the deassertion of ^VBLANK. |
| 26 | Ready for Data, 0 = NOT ready<br>1 = ready<br>Indicates that the COM DATA register is empty and the host may write to the COM DATA register. |
| 27 | Data valid, 0 = NOT valid<br>1 = valid<br>Indicates that the COM data register contains valid data for the host to read. The 8031 uP sets this when it writes to the COM DATA register. Cleared when the COM DATA register is read by the host. |
| 28-30 | Reserved, zero when read |
| 31 | Keyboard NMI, 0 = NOT keyboard NMI<br>1 = keyboard NMI<br>Indicates that the keyboard has placed data in the KEYBOARD register. Cleared when the LED register is written by the host. |

— COM STATUS register

KEYBOARD register

LED Register

```
+------------------------------------------------------------------+
| 0    3 4    7 8 9   12 13  14 15  16  17  18  19 20        30 31 |
+------+------+---+------+----+---+---+---+---+------+-----------+-+
| CMND | BASE |res|BD SEL| rsvd |X/Y|S/D|NA | TYPE |  COORDINATE | 0|
+------+------+---+------+----+---+---+---+---+------+-----------+-+
``` bits         description 0-3        Command for M-bus controller 4-7        Base address - Global or Local 8          Reserved, must be zero 9-11       Board select, VCU 206 only selects on 111 (RAS #7)

12         0 = primary board
            1 = secondary board 13-14     Reserved, must be zero 15         0 = X register
            1 = Y register 16         0 = source register
            1 = destination register 17         0 = do memory access in bits 18,19
            1 = do not perform access 18-19     Type of memory access:

0 = external access
            1 = internal access
            2 = reserved
            3 = character plot 20-30     Coordinate (X or Y), valid ranges are X = 0-1280, Y = 0-1023

31         Must be zero

NORMAL Space Decoding

FIG. 554

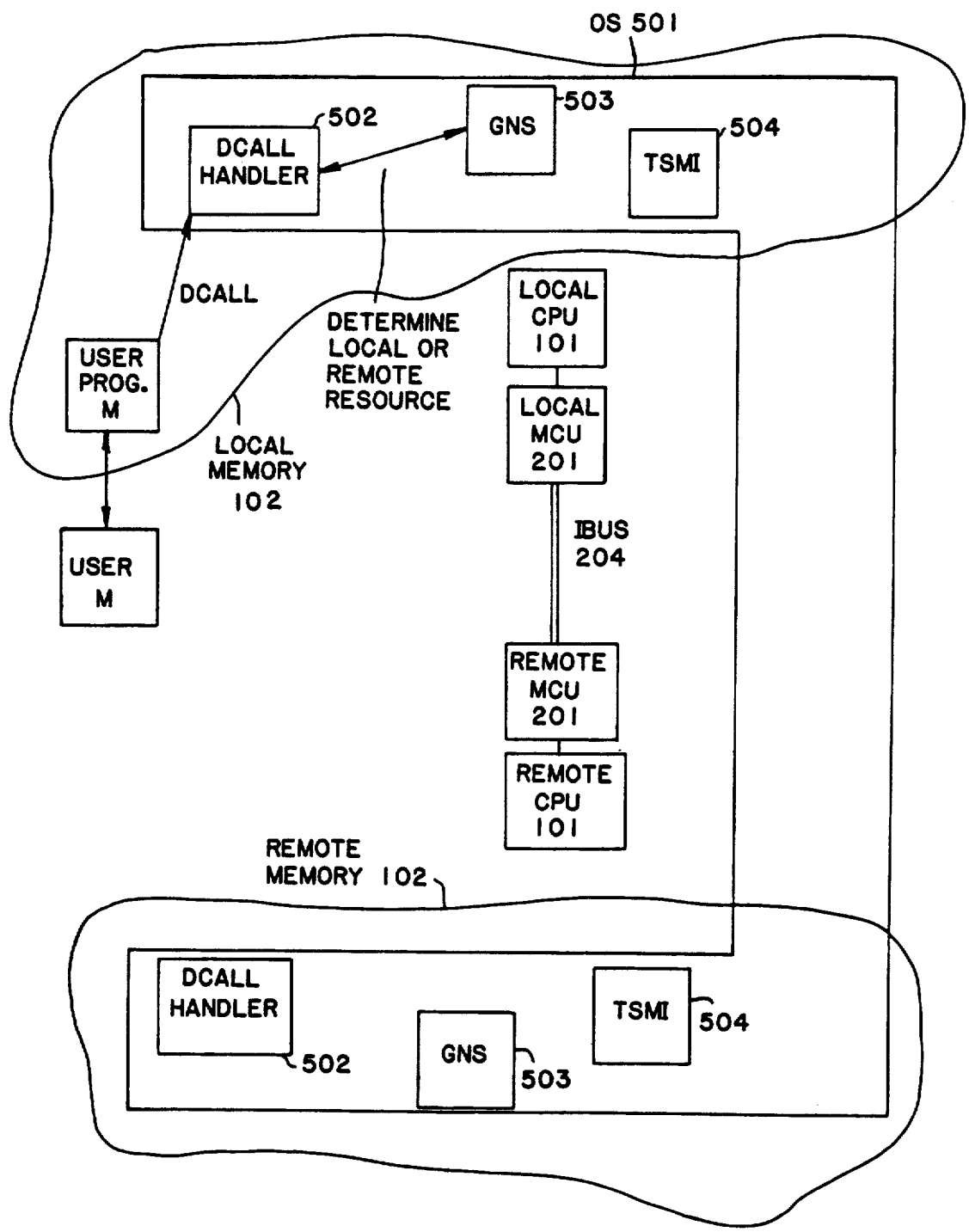

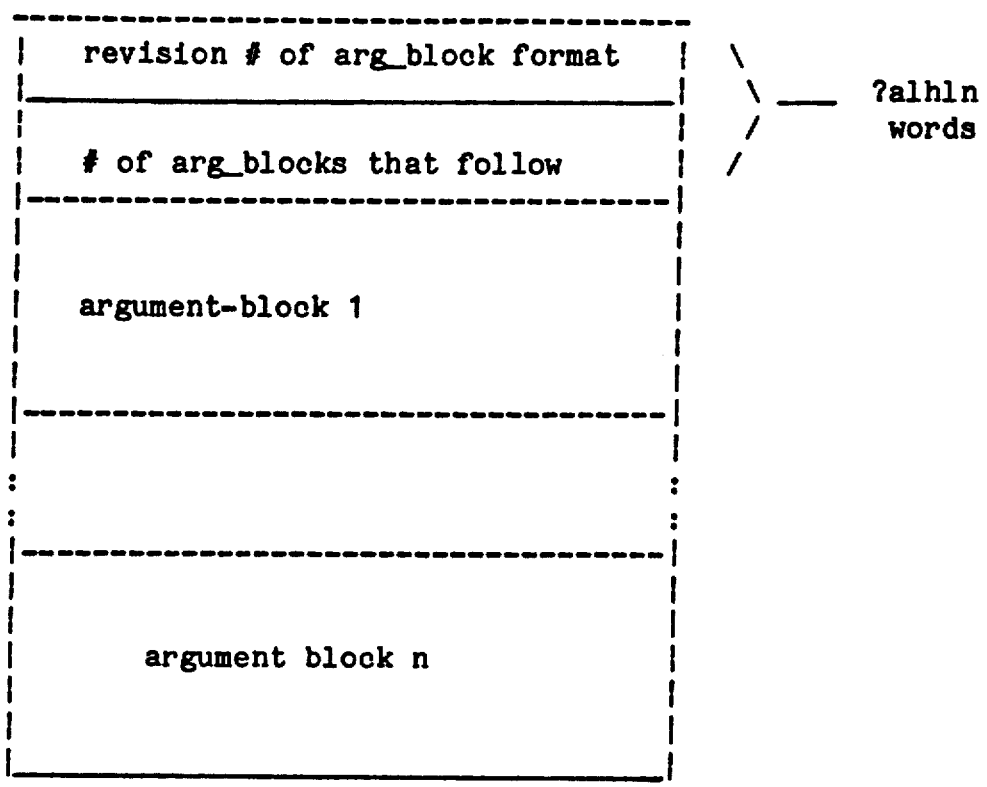
Contents of the ARG BLOCK PTR
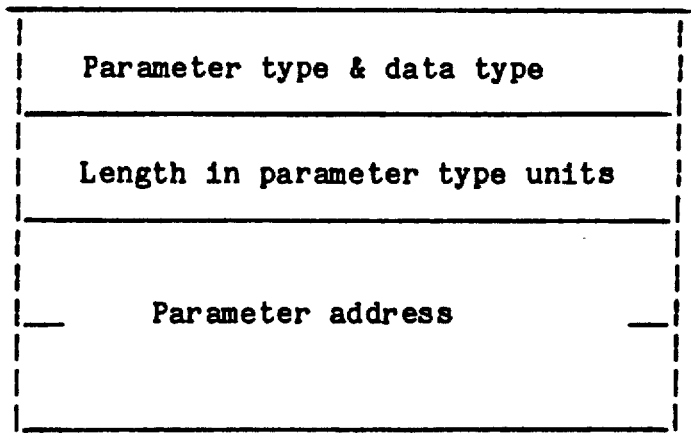
Form of each argument block
FIG. 604

Data_length
= X = Total User Data

CONTENTION REVOLUTION IN A DIGITAL COMPUTER SYSTEM

This application is a division of application Ser. No. 798,665, filed on Nov. 15, 1985, now U.S. Pat. No. 4,920,483.

| A Distributed Data Processing System | |
|---|---|
| Summary of Contents: | |
| 1. | Background of the Invention |
| 1.1 | Field of the Invention |
| 1.2 | Description of the Prior Art |
| 1.3 | Summary of the Invention |
| 1.4 | Brief Description of the Drawings |
| 1.5 | Overview of Detailed Description |
| 2. | Detailed Description of MCU 201 and IBus 204 |
| 2.1 | Overview |
| 2.2 | Addressing |
| 2.3 | Arbitration |
| 2.4 | Operation |
| 2.5 | Commands |
| 2.6 | Electrical Characteristics |
| 3. | Detailed Description of LMB 203 |
| 3.1 | Overview |
| 3.2 | Signals |
| 3.3 | Commands |
| 3.4 | Bus Operation |
| 3.5 | Electrical Characteristics |
| 4. | Detailed Description of MBus 205 |
| 4.1 | Overview |
| 4.2 | Operation |
| 4.3 | Electrical Characteristics |
| 5. | Detailed Description of VCU 206 |
| 5.1 | Overview |
| 5.2 | Functional Description |
| 5.3 | Graphics Data PRocessor 314 |
| 5.4 | Detailed Operation |
| 5.5 | VEU 207 |
| 5.6 | Programming Description |
| 6. | Detailed Description of the Operating System |
| 6.1 | Overview |
| 6.2 | Functional Overview |
| 6.3 | Global Naming |
| 6.4 | Deflection Call Interfaces |
| 6.5 | Global Name Service Interface |
| 6.6 | Deflection Call Service Details |
| 6.7 | Transport Service Management Interface |
| 7. | Claims |
| Table of Contents: | |
| 1. | Background of the Invention |
| 1.1 | Field of the Invention |
| 1.2 | Description of the Prior Art |
| 1.3 | Summary of the Invention |
| 1.4 | Brief Description of the Drawings |
| 1.5 | Overview of Detailed Description |
| 1.5.1 | Prior Art |
| 1.5.2 | Overview of the Present Invention |
| 1.5.3 | Overview of the Preferred Embodiment |
| 2. | Detailed Description of MCU 201 and IBus 204 |
| 2.1 | SECTIONAL OVERVIEW |
| 2.1.1 | Purpose |
| 2.1.2 | Signals |
| 2.1.2.1 | Signal Groups |
| 2.1.2.2 | Data/address Signals |
| 2.1.2.3 | Bus Arbitration Signals |
| 2.1.2.4 | Utility Signals |
| 2.1.2.5 | Signal States |
| 2.1.3 | Address/Data |
| 2.1.3.1 | Normal Address Space |
| 2.1.3.2 | Special Space |
| 2.1.3.3 | Data Transmission |
| 2.1.4 | Bus Arbitration |
| 2.1.5 | I-BUS Operation |
| 2.1.5.1 | Node Register Requirements |
| 2.1.5.2 | Power-up |
| 2.1.5.3 | Normal Operation |
| 2.1.5.4 | Power-down/Powerfail |
| 2.1.6 | Commands |
| 2.1.6.1 | Data Transfer Commands |
| 2.1.6.2 | Special Space Accesses |
| 2.2 | ADDRESSING |
| 2.2.1 | Memory Organization |
| 2.2.2 | Memory Assignment |
| 2.2.3 | Special Space |
| 2.2.4 | MV Compatibility |
| 2.3 | ARBITRATION |
| 2.3.1 | Goals |
| 2.3.2 | Arbitration Bus Structure |
| 2.3.3 | Initiation of an Arbitration Cycle |
| 2.3.4 | Priority |
| 2.3.4.1 | Priority Assignment |
| 2.3.4.2 | Changing Priority Order |
| 2.3.5 | Arbitration Logic |
| 2.3.6 | Arbitration Reset |
| 2.3.6.1 | Reset at Power-up |
| 2.3.6.2 | Arbitration Error |
| 2.4 | OPERATION |
| 2.4.1 | Hardware Requirements |
| 2.4.1.1 | Memory |
| 2.4.1.2 | Registers |
| 2.4.1.3 | Address Space |
| 2.4.1.4 | Miscellaneous |
| 2.4.2 | Special Node Designations |
| 2.4.2.1 | Clock Generator |
| 2.4.2.2 | System Configurator |
| 2.4.3 | Power-up State Flow |
| 2.4.4 | Operation Phases |
| 2.4.4.1 | Arbitration Phase |
| 2.4.4.2 | Address Phase |
| 2.4.4.3 | Data Phase |
| 2.4.4.4 | Transaction Validation Phase |
| 2.4.5 | Normal Operation |
| 2.4.5.1 | Single Transfers |
| 2.4.5.2 | Block Transfers |
| 2.4.5.3 | Bus Locking |
| 2.4.6 | Bus Parity Errors |
| 2.5 | COMMANDS |
| 2.5.1 | Command Summary |
| 2.5.2 | Data Transfer Commands |
| 2.5.2.1 | 8-bit Transfers |
| 2.5.2.2 | 16-bit Transfers |
| 2.5.2.3 | 32-bit Transfers |
| 2.5.2.4 | Block Transfers |
| 2.5.3 | Special Space Accesses |
| 2.5.4 | Command Errors |
| 2.6 | |
| 2.7 | ELECTRICAL CHARACTERISTICS |
| 2.7.1 | Signal States |
| 2.7.2 | Signal Types |
| 2.7.3 | Maximum Loading |
| 2.7.4 | Timing |
| 3. | Detailed Description of LMB 203 |
| 3.1 | FUNCTIONAL OVERVIEW |
| 3.1.1 | Architectural Considerations |
| 3.2 | LMB SIGNALS |
| 3.2.1 | Signal Descriptions |
| 3.3 | COMMANDS |
| 3.3.1 | Word/Double Word Formats |
| 3.3.2 | Command Encodings |
| 3.4 | BUS OPERATION |
| 3.4.1 | General Rules |
| 3.4.2 | Page and Node Boundaries |
| 3.4.3 | Detailed Descriptions (and Timing Diagrams) |
| 3.4.3.1 | Reads |
| 3.4.3.2 | Writes |
| 3.4.3.3 | Locked Operations |
| 3.4.3.4 | Aborted Memory Operations |
| 3.4.3.5 | Block Operations |
| 3.4.3.6 | Interrupt Operations |
| 3.4.3.7 | Error Operations |
| 3.5 | ELECTRICAL CHARACTERISTICS |
| 3.5.1 | Timings |
| 3.5.2 | Loading |
| 3.5.3 | Termination |
| 4. | Detailed Description of MBus 205 |
| 4.1 | OVERVIEW |
| 4.1.2 | Configuration |
| 4.2 | OPERATION |
| 4.2.1 | Definitions |
| 4.2.2 | Signals |

-continued

| A Distributed Data Processing System | | |
|---|---|---|
| 4.2.2.1 | Signal Groups | |
| 4.2.2.2 | Data | |
| 4.2.2.3 | Addresses | |
| 4.2.2.4 | Control Signals | |
| 4.2.2.5 | Interrupt Support | |
| 4.2.3 | Addressing | |
| 4.2.4 | Control Functions | |
| 4.2.4.1 | Basic Read | |
| 4.2.4.2 | Double Read | |
| 4.2.4.3 | Simple Write | |
| 4.2.4.4 | Double Write | |
| 4.2.4.5 | Read-Modify-Write | |
| 4.2.4.6 | Double Read-Modify-Write | |
| 4.2.4.7 | Refresh/Sniff | |
| 4.2.4.8 | ERCC Disable | |
| 4.2.5 | Timing | |
| 4.2.6 | Dynamic RAM Cycle Initialization | |
| 4.2.7 | Interrupt Service | |
| 4.3 | ELECTRICAL CHARACTERISTICS | |
| 4.3.1 | Signal States | |
| 4.3.2 | Signal Types | |
| 4.3.3 | Signal Loading | |
| 4.3.4 | Termination and Pull-ups | |
| 4.3.5 | Timing | |
| 4.3.5.1 | Bus Clock | |
| 4.3.5.2 | Bank Select Setup and Hold | |
| 4.3.5.3 | Address Setup and Hold | |
| 4.3.5.4 | Memory Access | |
| 4.3.5.5 | Write Data Setup and Hold | |
| 4.3.5.6 | MEMWAIT Signal Requirements | |
| 4.3.5.7 | ERCCDIS | |
| 4.3.5.8 | Non-Maskable Interrupts | |
| 5. | Detailed Description of VCU 206 | |
| 5.1 | OVERVIEW | |
| 5.2 | FUNCTIONAL DESCRIPTION | |
| 5.2.1 | Hardware Overview | |
| 5.2.1.1 | Pixel Mode Overview | |
| 5.2.1.2 | Plane Mode Overview | |
| 5.2.2 | Programming Overview | |
| 5.2.2.1 | General | |
| 5.2.2.2 | NORMAL space/OTHER space | |
| 5.2.2.3 | Restrictions | |
| 5.2.2.4 | Access types | |
| 5.2.2.5 | Keyboard and mouse | |
| 5.3 | GRAPHICS DATA PROCESSOR 314 | |
| 5.3.1 | Functional Description | |
| 5.3.1.1 | Hardware Overview | |
| 5.3.1.2 | Control Overview | |
| 5.3.1.3 | Detailed Controls | |
| 5.3.2 | Detailed Functional Description | |
| 5.3.2.1 | EXTernal Accesses | |
| 5.3.2.2 | EXTernal PLANE Access | |
| 5.3.2.3 | INTernal Accesses | |
| 5.3.2.4 | Character Accesses | |
| 5.3.2.5 | Using the LALU | |
| 5.3.3 | Timing Diagrams | |
| 5.4 | VCU 206 DETAILED OPERATION | |
| 5.4.1 | Video RAMs | |
| 5.4.2 | Video Output Stage | |
| 5.4.3 | M-Bus Interface | |
| 5.4.4 | Basic Timing | |
| 5.4.4.1 | Video Timing | |
| 5.4.5 | Video Palette | |
| 5.4.6 | Refresh | |
| 5.4.7 | Keyboard | |
| 5.4.8 | Mouse | |
| 5.4.9 | COM DATA/COM STATUS Registers | |
| 5.4.10 | DC/DC Converter | |
| 5.5 | VEU 207 | |
| 5.5.1 | Converting from 8 to 24 bits/pixel | |
| 5.6 | PROGRAMMING DESCRIPTION | |
| 5.6.1 | Board Selection/LAR | |
| 5.6.2 | OTHER Space Accesses | |
| 5.6.2.1 | LALU Register | |
| 5.6.2.2 | PLANE ENABLE Register | |
| 5.6.2.3 | FOREGROUND Register | |
| 5.6.2.4 | BACKGROUND Register | |
| 5.6.2.5 | COM DATA Register | |
| 5.6.2.6 | COM STATUS Register | |
| 5.6.2.7 | Keyboard/LED Register | |
| 5.6.2.8 | PIXEL ENABLE Register | |

-continued

| A Distributed Data Processing System | | |
|---|---|---|
| 5.6.3 | NORMAL Space Accesses | |
| 5.6.3.1 | Host Accesses | |
| 5.6.3.2 | Internal Accesses | |
| 5.6.3.3 | Character Drawing | |
| 5.6.3.4 | X and Y, SOURCE and DEST Registers | |
| 5.6.4 | READ/WRITE Pixel | |
| 5.6.5 | READ/WRITE Block | |
| 5.6.6 | Interrupts | |
| 6. | Detailed Description of the Operating System | |
| 6.1 | OVERVIEW | |
| 6.2 | FUNCTIONAL OVERVIEW | |
| 6.2.1 | Distribution Services | |
| 6.2.2 | Global Name Service | |
| 6.2.3 | Deflection Call Service | |
| 6.3 | GLOBAL NAMING | |
| 6.3.1 | Goals | |
| 6.3.2 | Name Format | |
| 6.3.3 | Logical Allocation Units | |
| 6.3.4 | Registered Names | |
| 6.3.5 | Communities | |
| 6.3.6 | Application of Global Naming | |
| 6.3.6.1 | File System | |
| 6.3.6.2 | Peripherals, Queues, and Global Ports | |
| 6.3.6.3 | Processes | |
| 6.4 | DEFLECTION CALL SERVICE | |
| 6.4.1 | Goals | |
| 6.4.2 | Identifying and Locating Resources | |
| 6.4.3 | Invoking the DCS | |
| 6.4.4 | The Deflection Call | |
| 6.4.5 | Parameter Passing and Packaging Data | |
| 6.4.5.1 | Generic Parameter List Convention | |
| 6.4.5.2 | Specific Parameter Passing Convention | |
| 6.5 | GLOBAL NAME SERVICE INTERFACE | |
| 6.5.1 | Goals | |
| 6.5.2 | Name Service Database | |
| 6.5.3 | Deflection Service Support Routines | |
| 6.5.3.1 | Return Transport Address | |
| 6.5.3.2 | Return Function Address | |
| 6.5.4 | Name Translation Routines | |
| 6.5.4.1 | Lookup by Name | |
| 6.5.4.2 | Lookup by UID | |
| 6.5.4.3 | List of Global Names for Community | |
| 6.5.5 | LAU Manipulation Routines | |
| 6.5.5.1 | Enter LAU into Name Service | |
| 6.5.5.2 | Register LAU or ::PER Entry | |
| 6.5.5.3 | Deregister LAU or ::PER Entry | |
| 6.5.5.4 | Remove LAU from Name Service | |
| 6.5.6 | Object Manager Support Routines | |
| 6.5.6.1 | Enter Function Codes | |
| 6.5.6.2 | Duplicate LAU's Function List | |
| 6.5.6.3 | Remove One or More Function Codes | |
| 6.6 | DEFLECTION CALL SERVICE DETAILS | |
| 6.6.1 | Invoking-Side Operation | |
| 6.6.2 | Serving-Side Operation | |
| 6.6.3 | General | |
| 6.7 | TRANSPORT SERVICE MANAGEMENT INTERFACE DETAILS | |
| 6.7.1 | Functional Description | |
| 6.7.1.1 | Overview | |
| 6.7.1.2 | Messages | |
| 6.7.1.3 | Ports | |
| 6.7.1.4 | Services | |
| 6.7.2 | Design Considerations | |
| 6.7.2.1 | Tasking Structure and Control Flow | |
| 6.7.2.2 | Buffer Management and Data Flow | |
| 6.7.3 | Primitives | |
| 6.7.3.1 | Create Port | |
| 6.7.3.2 | Delete Port | |
| 6.7.3.3 | Transaction | |
| 6.7.3.4 | Receive | |
| 6.7.3.5 | Abort | |
| 6.7.3.6 | Broadcast | |
| 6.7.3.7 | Datagram | |
| 6.7.3.8 | Send | |
| 6.7.3.9 | Reply | |
| 6.7.3.10 | Free | |
| 6.7.3.11 | Errors | |
| 6.7.4 | Comprehensive Examples | |
| 7. | Claims | |
| ABSTRACT | | |
| APPENDIX A | Instruction Summary By Opcode | |

-continued

| A Distributed Data Processing System | |
|---|---|
| APPENDIX B | Programming the 8031 MicroProcessor |

BACKGROUND OF THE INVENTION

1.1 Field of the Invention

This invention relates to digital computers, and particularly to digital computers adapted for use in a distributed data processing system comprising and sharing load among a plurality of individual digital computers.

1.2 Description of the Prior Art

Digital computers in general are well known in the prior art. Digital computers have been employed in "distributed computing networks" in which a plurality of computers are interconnected and are programmed to cooperate on an overall data processing task involving a related body of data and a related body of tasks to be performed thereon, with some computers doing some of the processing and then passing results or status information to other of the computers which perform other of the processing.

Using traditional general purpose computers in distributed computing networks has required that each computer perform a portion of the networking functions (intercommunication, coordination, priority arbitration, etc.) in addition to its direct data processing work. With such traditional computers, it has generally been necessary to interconnect them by means of their input/output buses so that each views the others as I/O devices and is thus responsible for detailed control over all transmissions to and from them.

1.3 Summary of the Invention

The computers of the present invention overcome the overhead-prone drawbacks of the prior art by providing an architecture in which additional intelligence is provided at junction points of the computer network, this intelligence being sufficient to perform the networking overhead functions. A bus is provided for data transfers between each computer's CPU and an intelligent I/O controller; another bus is provided for memory transfers; another bus is provided for interconnecting the computers; an intelligent bus controller is provided to transfer from any to any of the the three buses. Flow of data and status information around the network is thus expedited, and the CPU of each computer is freed to devote its attention to direct data processing tasks. An intelligent controller is provided ahead of the video RAMs to free the CPU of detailed bitmap manipulation in support of graphic displays.

It is thus a general object of the present invention to provide improved digital computers.

It is a particular object of the present invention to provide digital computers that may be interconnected to form a highly efficient distributed computing system.

Additional objects and advantages will be apparent to one skilled in the art, after referring to the description of the preferred embodiment and the appended drawings.

1.4 Brief Description of the Drawings

For clarity, the figure numbers are based on the number of the section referring to the figure. For example, figures first referred to in Section 1 are numbered in the "100" series, figures first referred to in Section 2 in the "200" series, and so on.

FIG. Nos. 1-100 are not used.

FIG. 102 is a block diagram of the computer of the present invention employed in a distributed computer network.

FIG. 103 is a block diagram of CPU 101,

FIG. 104 is a block diagram of IOC 202,

FIG. 105 is a block diagram of MCU 201,

FIG. Nos. 106 through 200 are not used.

Figure 201:
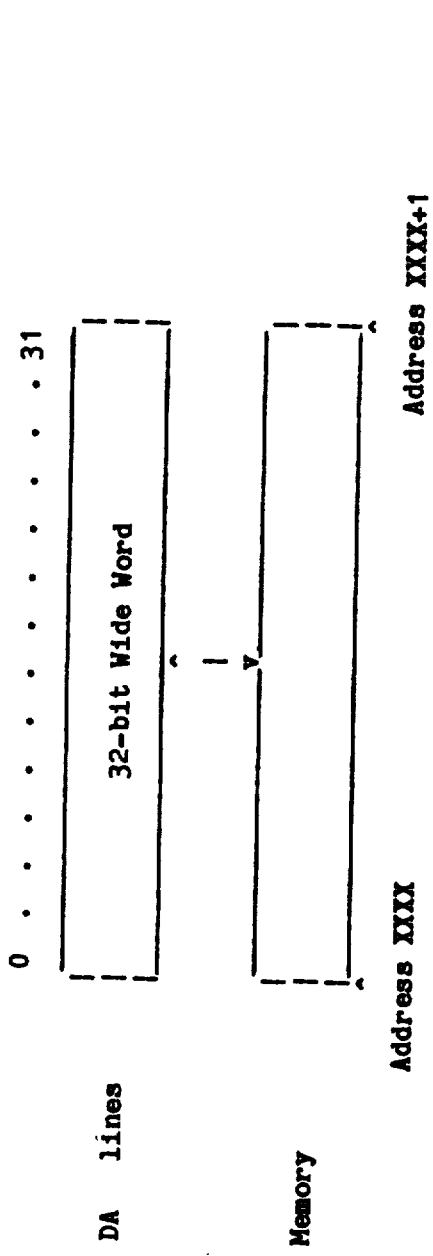

FIGS. 201 through 235 pertain to MCU 201 and I-Bus 204:

FIG. 201 depicts the flow of an even double-word 32 bit transfer.

Figure 202:
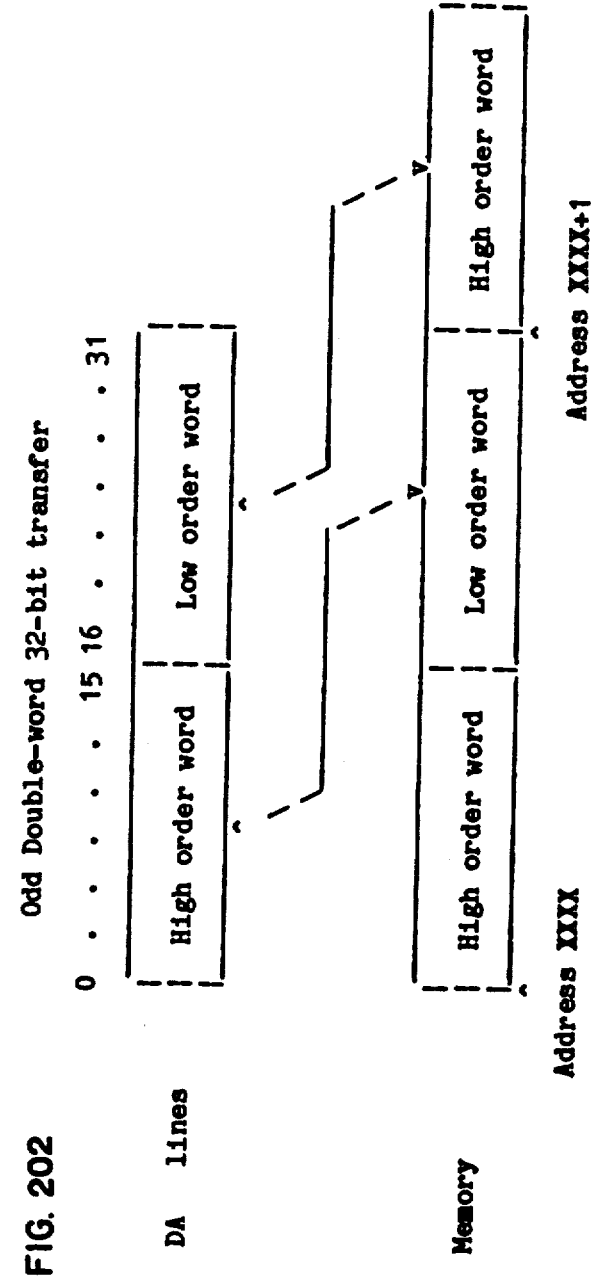

FIG. 202 depicts the flow of an odd double-word 32 bit transfer.

FIG. 203 depicts the flow of justified 16-bit transfers.

FIG. 204 depicts the flow the unjustified 16-bit transfers.

FIG. 205 depicts the flow of justified 8-bit transfers,

FIG. 206 depicts the flow of unjustified 8-bit transfers.

Figure 207:
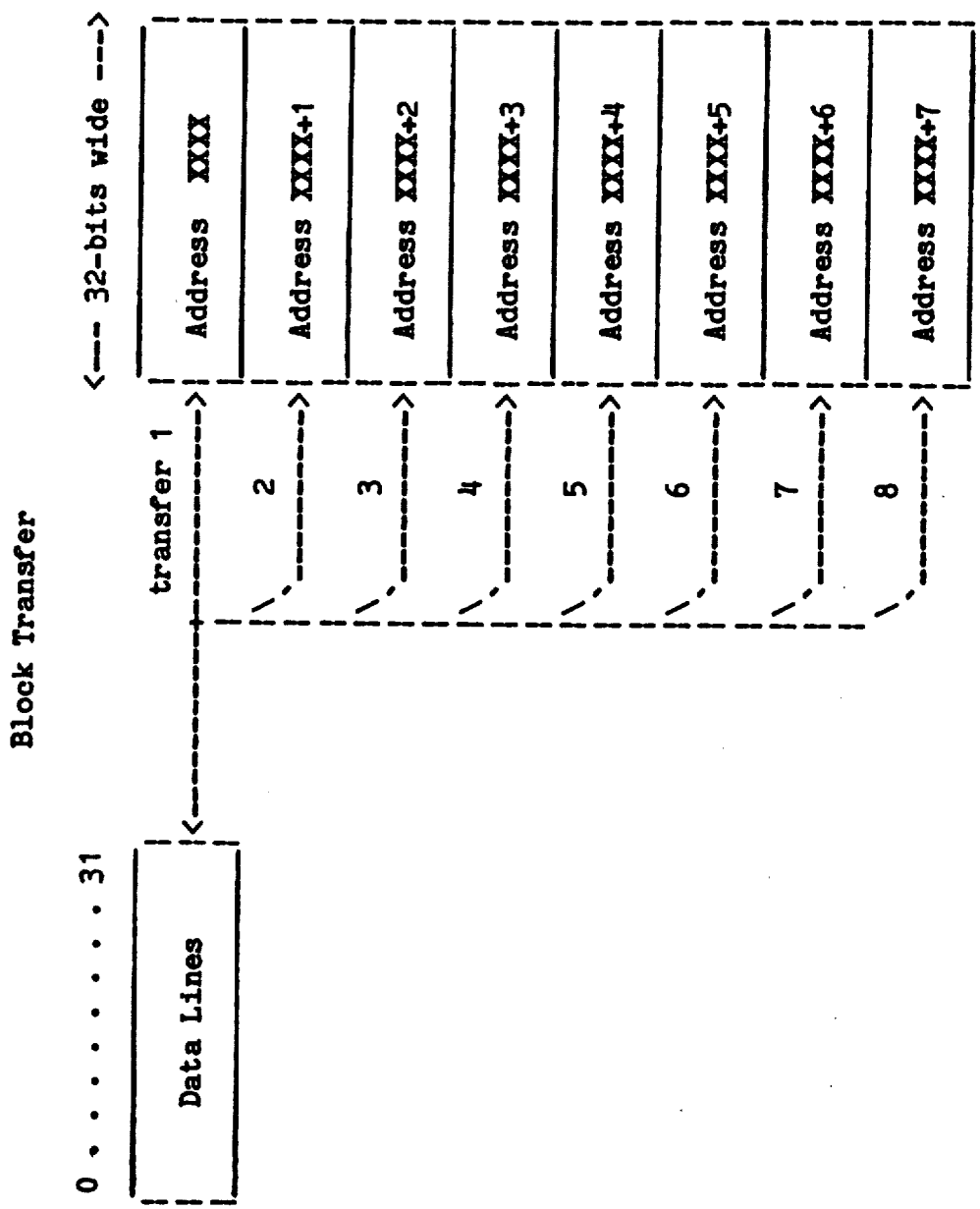

FIG. 207 depicts the flow of a block transfer.

Figure 208:
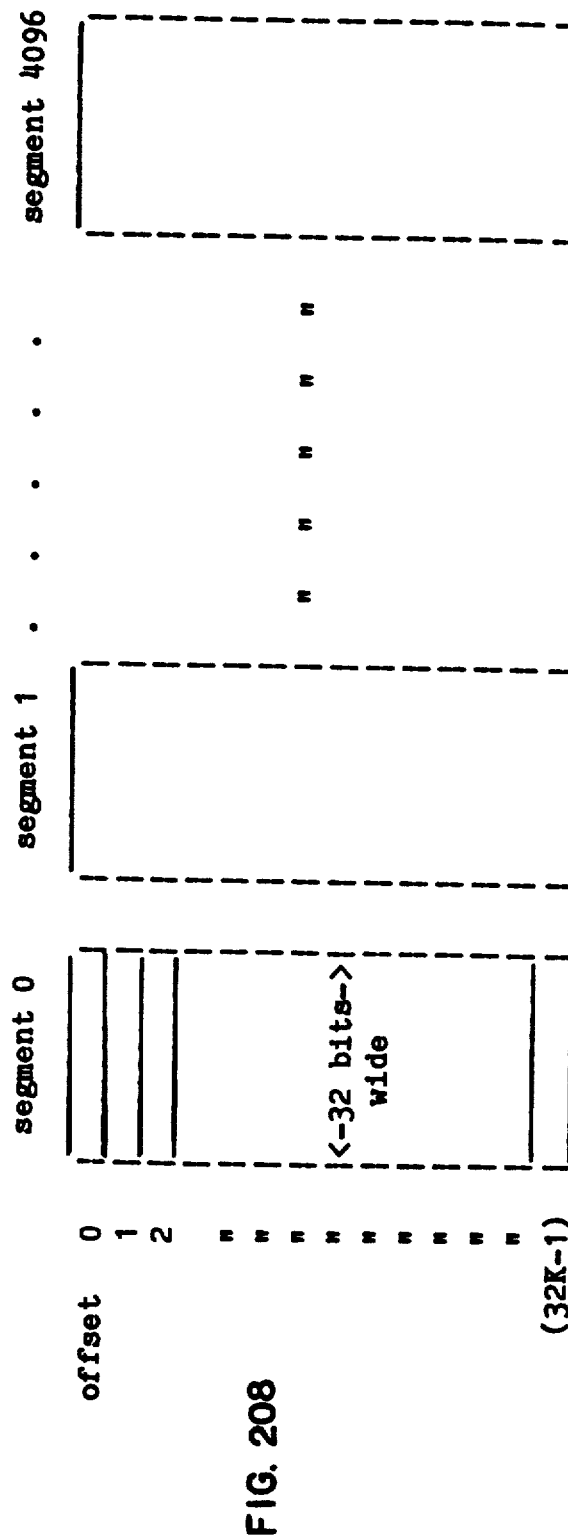

FIG. 208 shows the logical organization of global memory.

Figure 209:
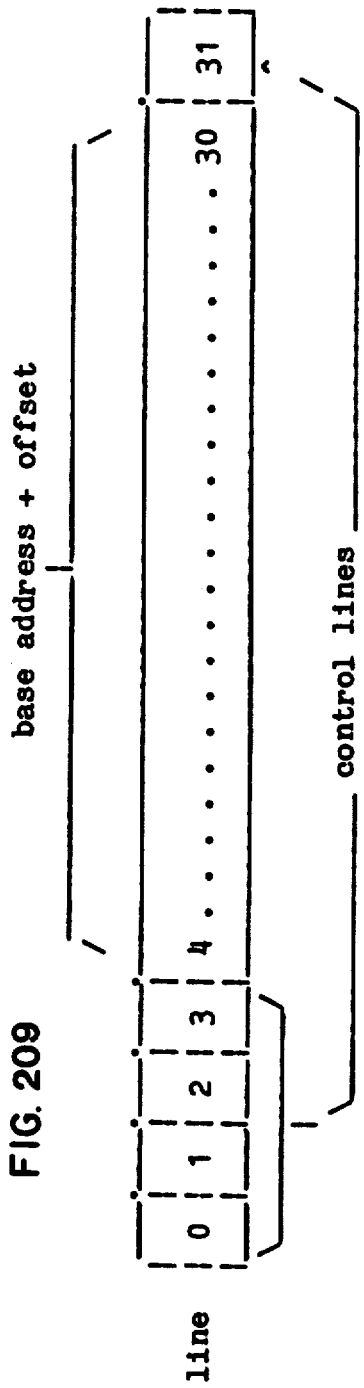

FIG. 209 shows the makeup of a control word.

Figure 210:
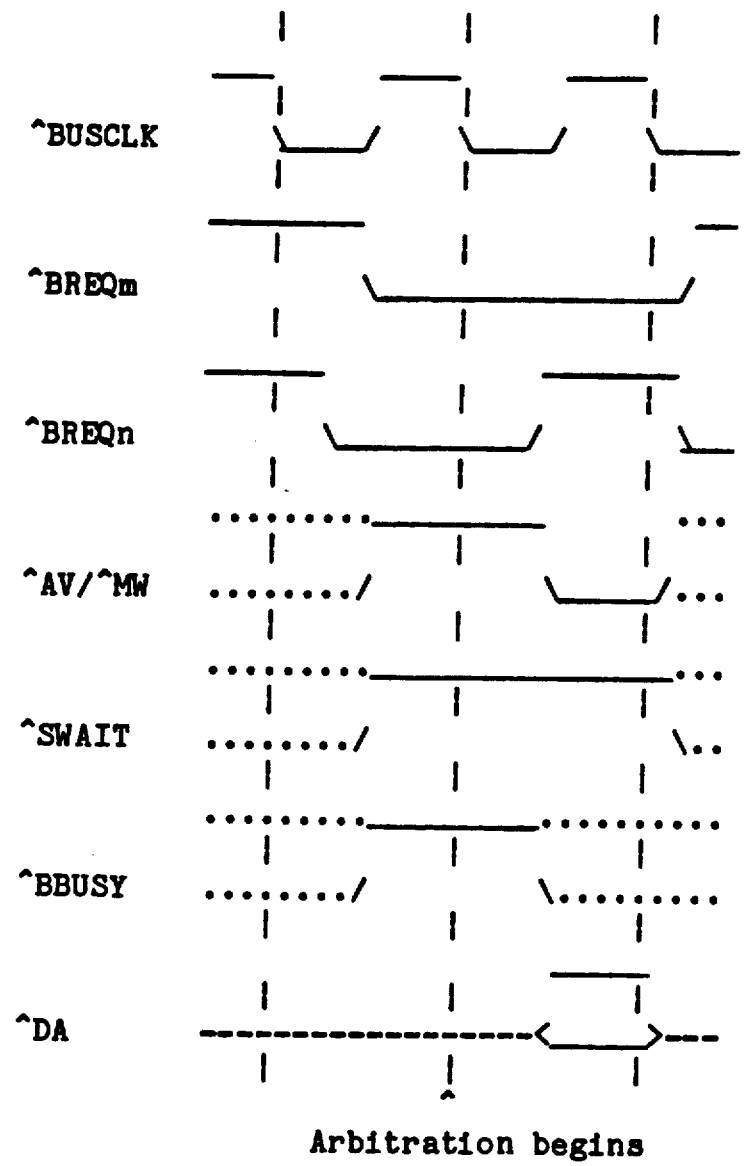

FIG. 210 is an overview of bus arbitration timing.

FIGS. 211a-211e schematically depict the bus arbitration priority scheme.

Figure 212:
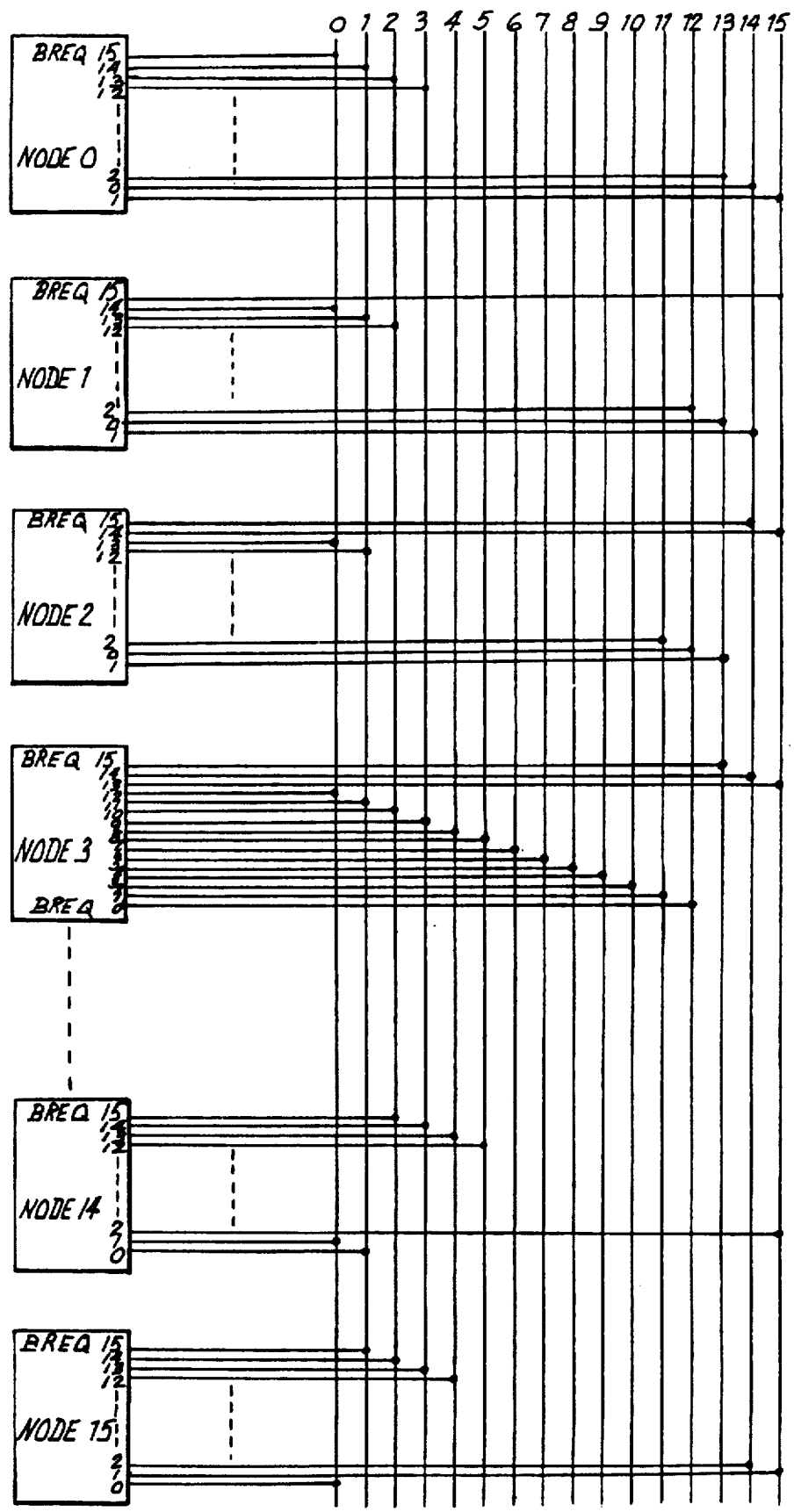

FIG. 212 is a schematic diagram of the bus arbitration priority wiring.

Figure 213:
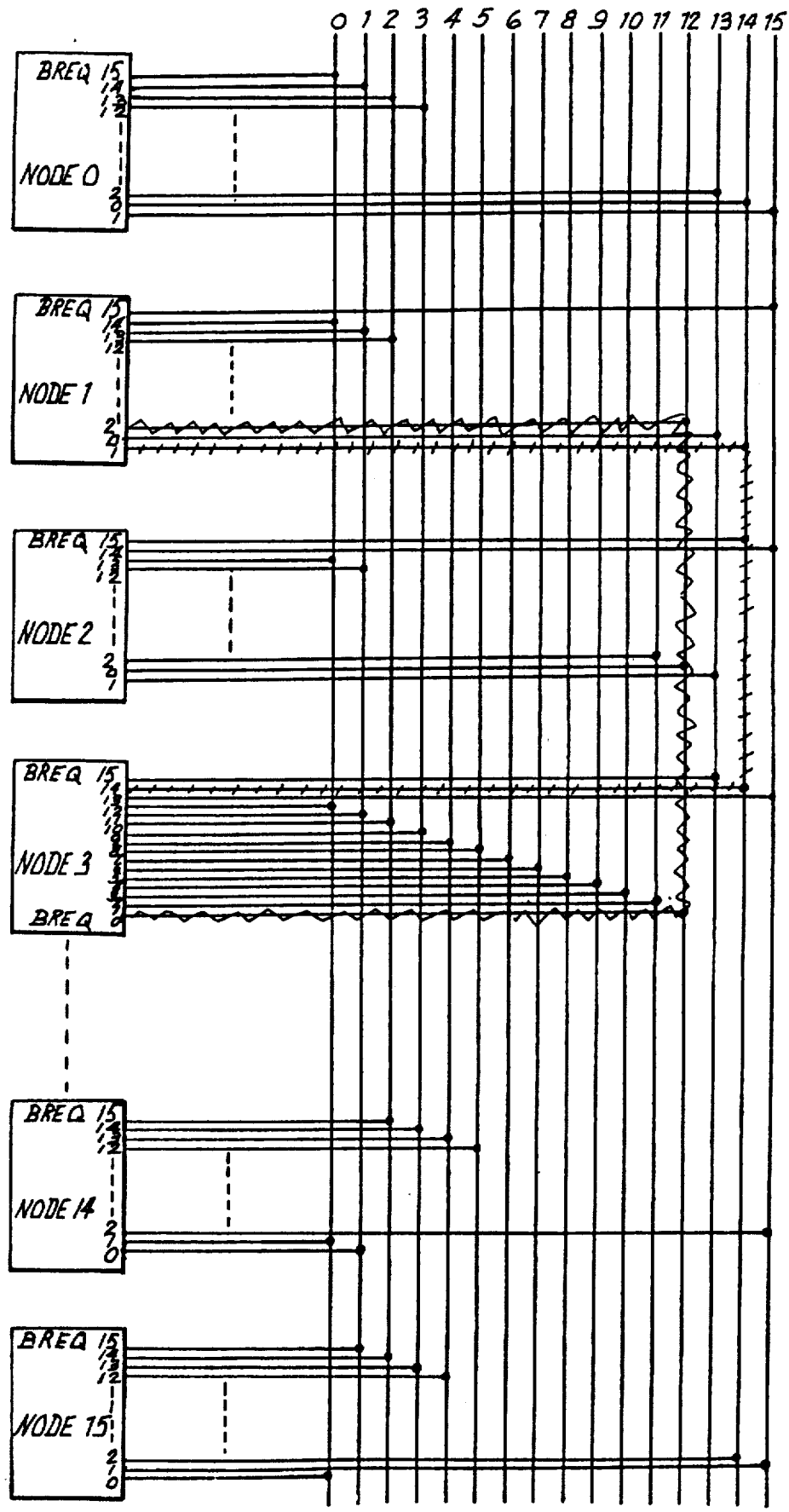

FIG. 213 depicts an example of bus priority arbitration.

Figure 214:
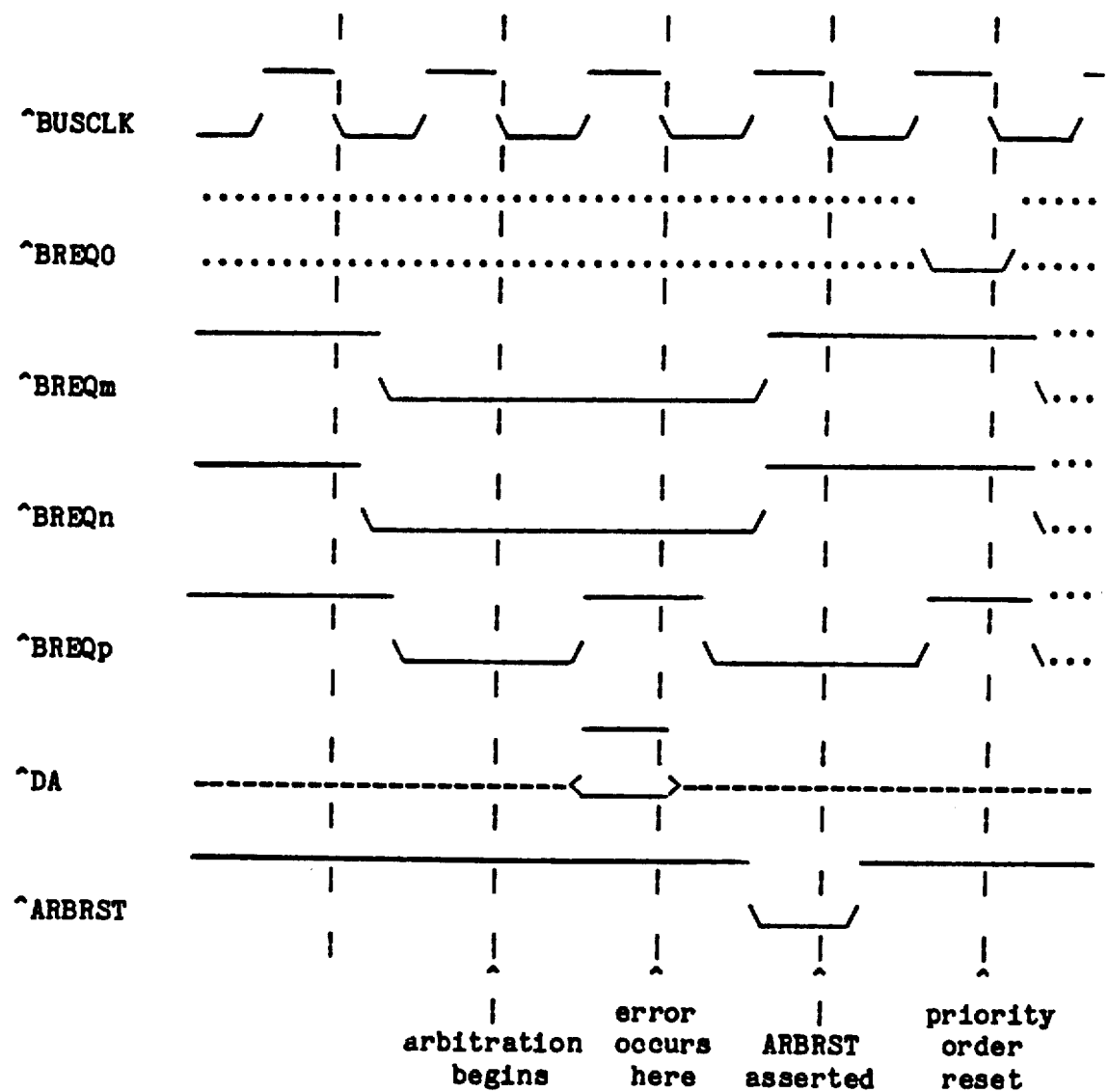

FIG. 214 is a timing diagram of bus priority arbitration.

Figures 215, 216:
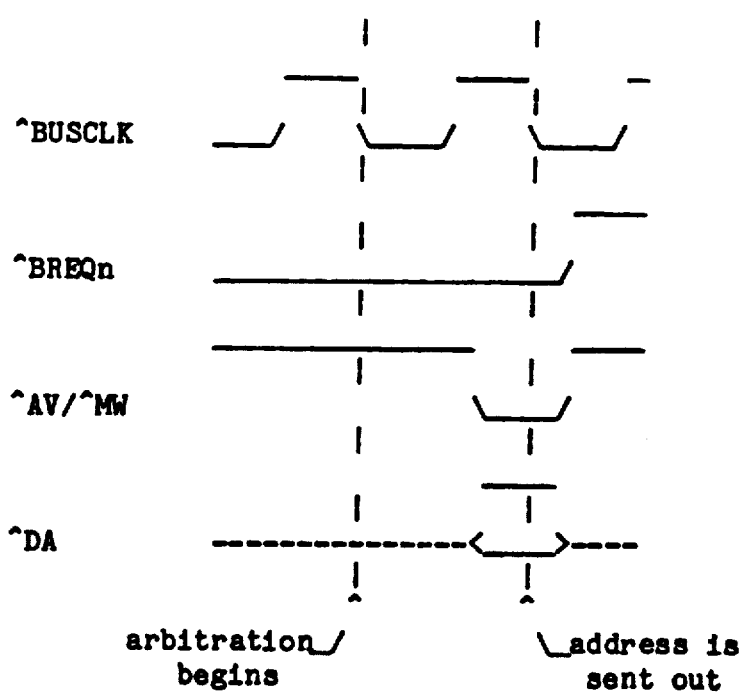

FIG. 215 depicts a data format.

FIGS. 216 through 223 are timing charts pertaining to bus arbitration and bus data transmission.

FIG. 224 is a table of command encodings.

Figure 225:
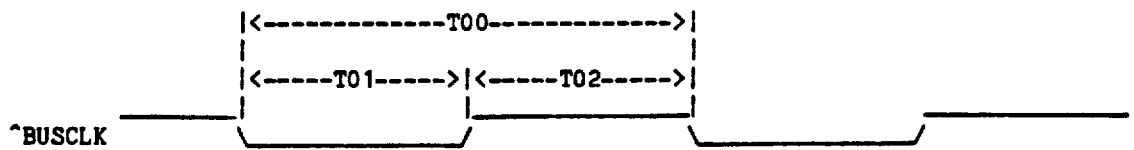
Figure 226:
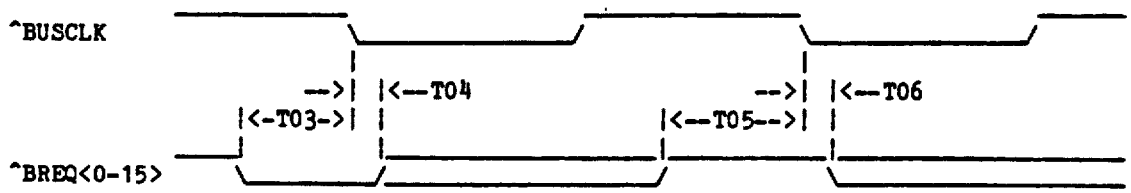
Figure 227:
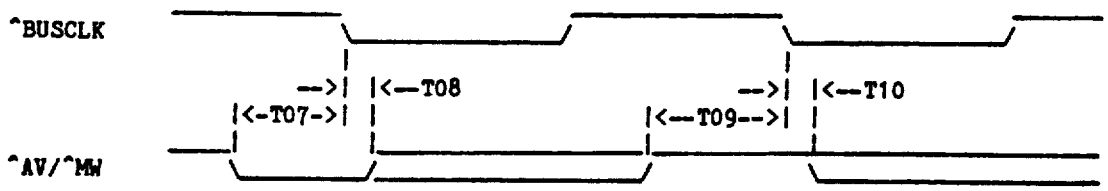
Figure 228:
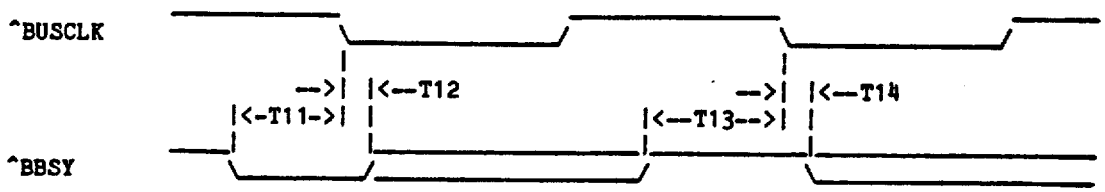
Figure 229:
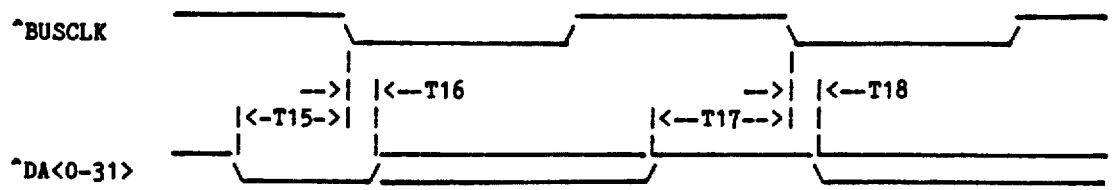
Figure 230:
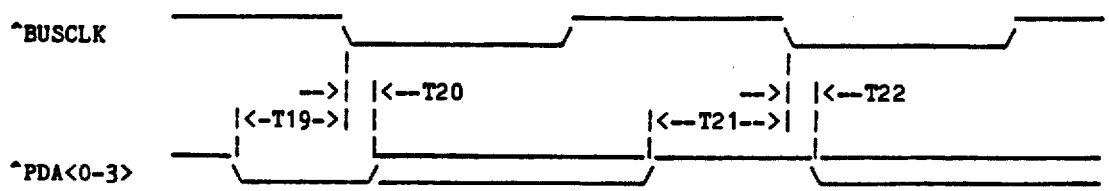
Figure 231:
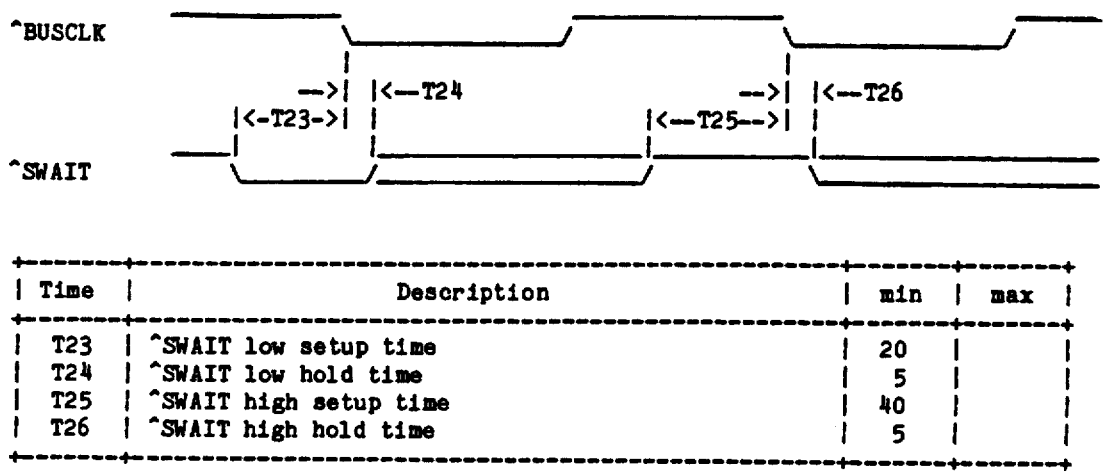
Figure 232:
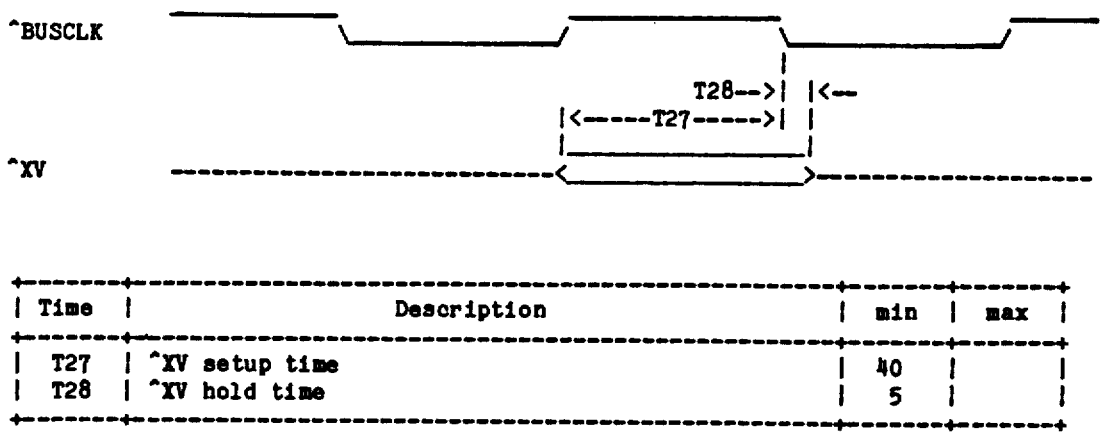
Figure 233:
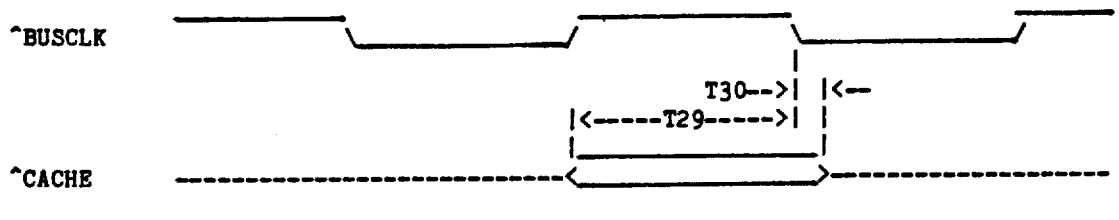
Figure 234:
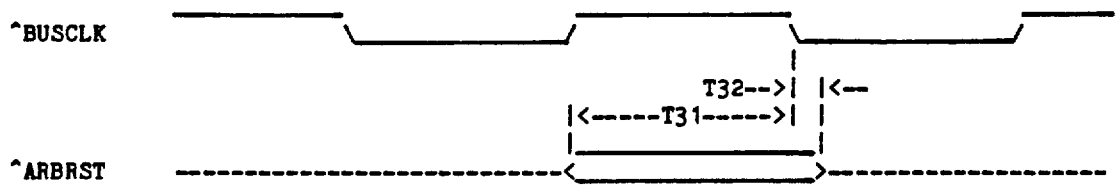

FIG. 225 illustrates the timing of the Bus Clock signal,

FIGS. 226 through 234 illustrate the timing of various bus control signals in relation to the Bus Clock signal.

Figure 235:
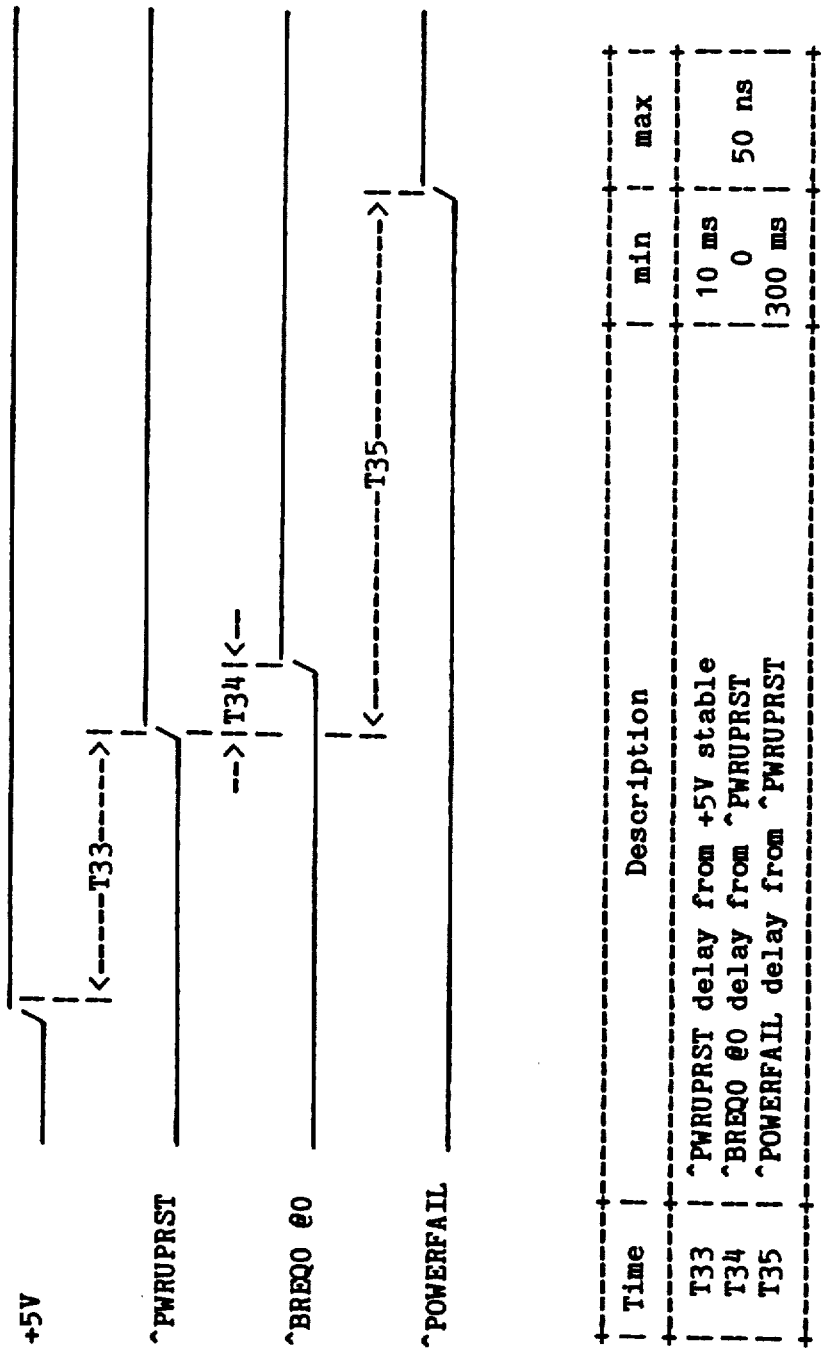

FIG. 235 shows the timing of various control signals relative to the power-up condition.

FIG. Nos. 236 through 300 are not used.

FIGS. 301 through 315 pertain to the IOC 202 and LMB bus 203:

FIG. 301 depicts data and address transmission formats.

FIG. 302 depicts 32-bit memory storage formats.

FIG. 303 depicts justified bus transmission formats.

FIGS. 304 through 315 are detailed timing charts of various examples of bus transmissions.

FIG. Nos. 316 through 400 are not used.

Figure 401:
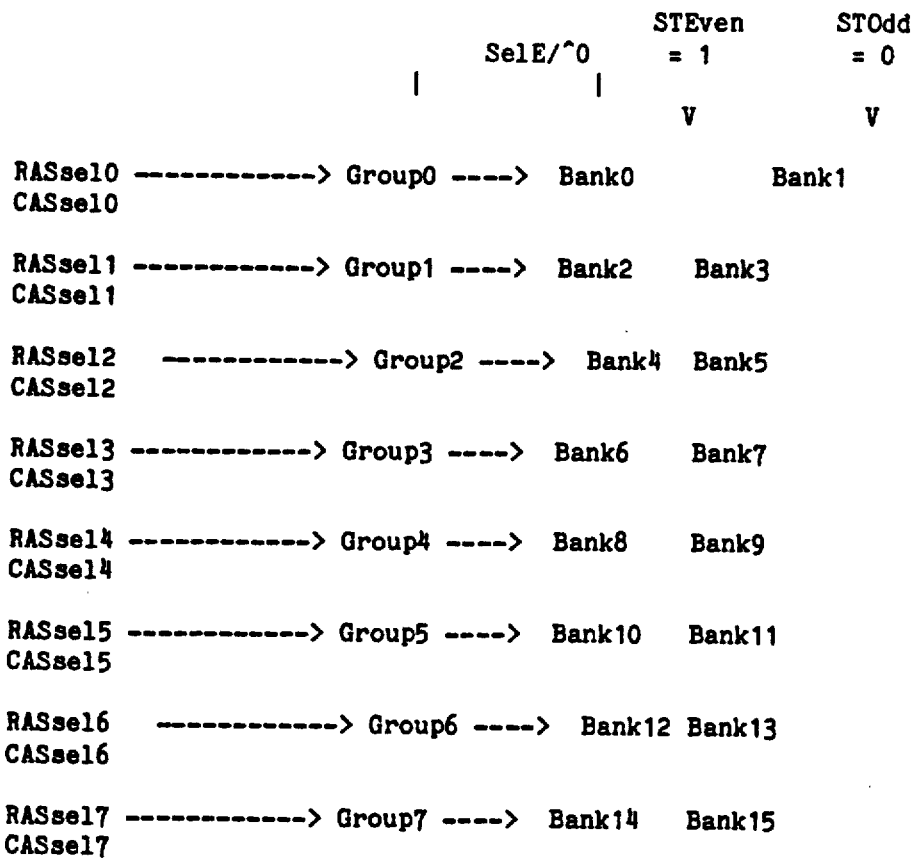
Figure 402:
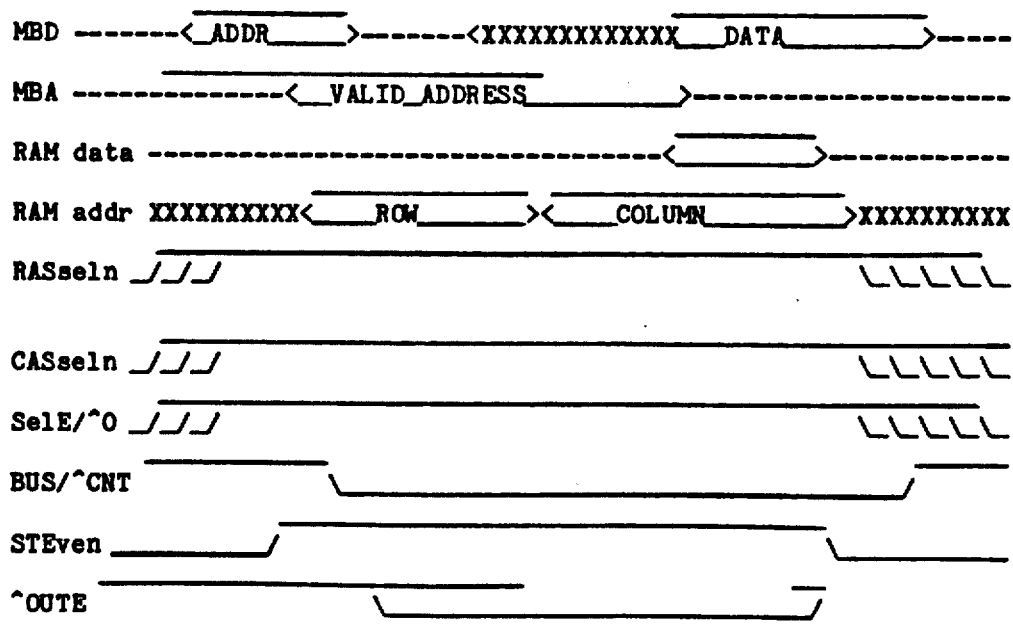
Figure 403:
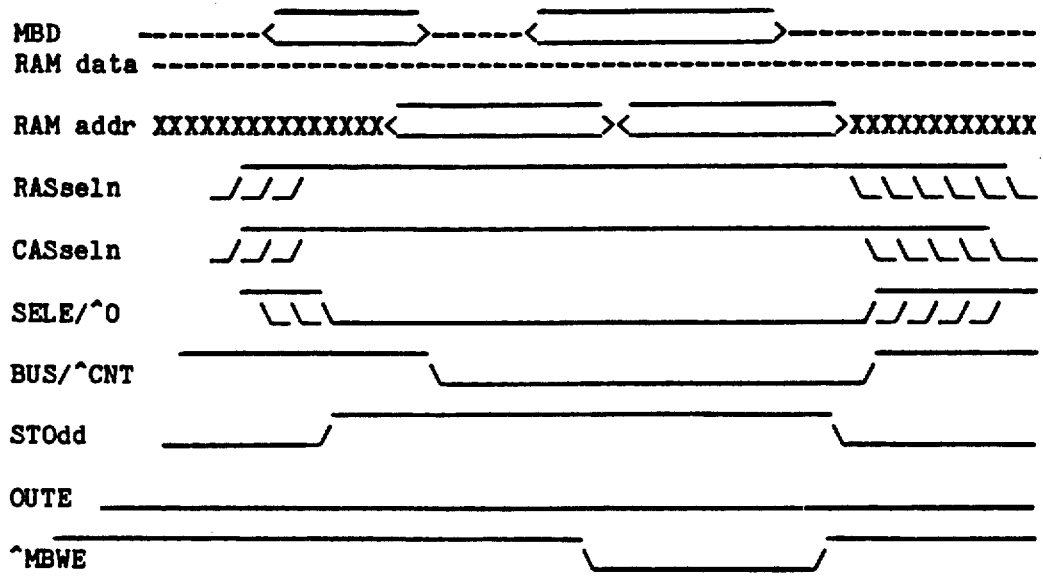
Figure 404:
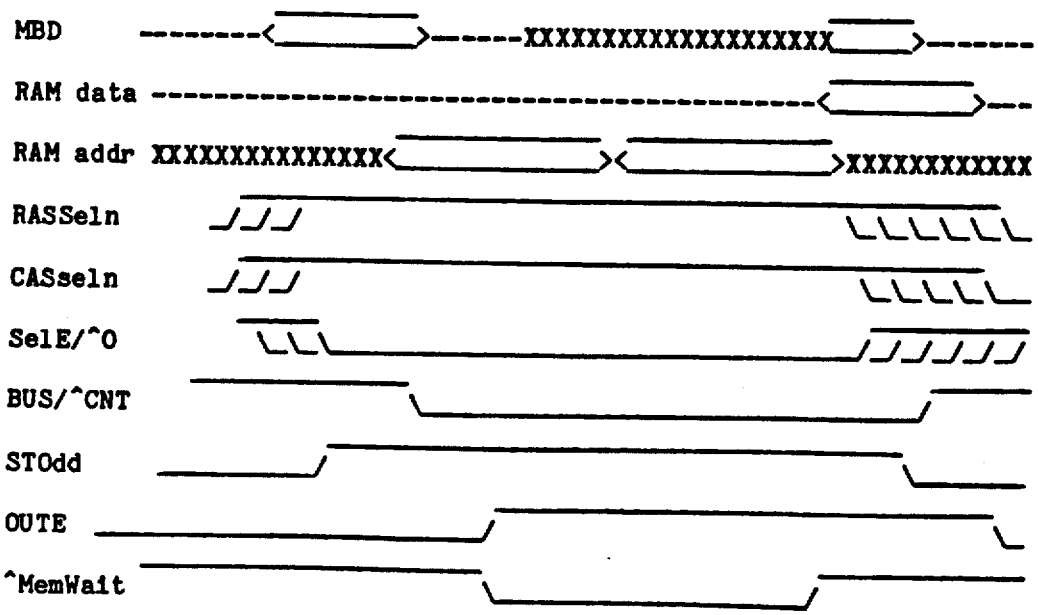
Figure 405:
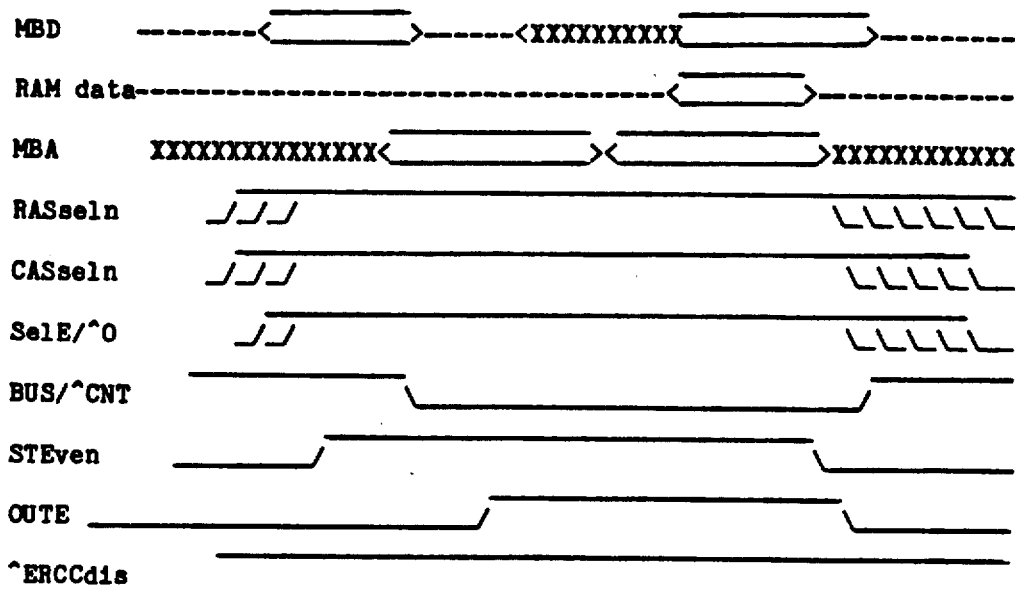
Figure 406:
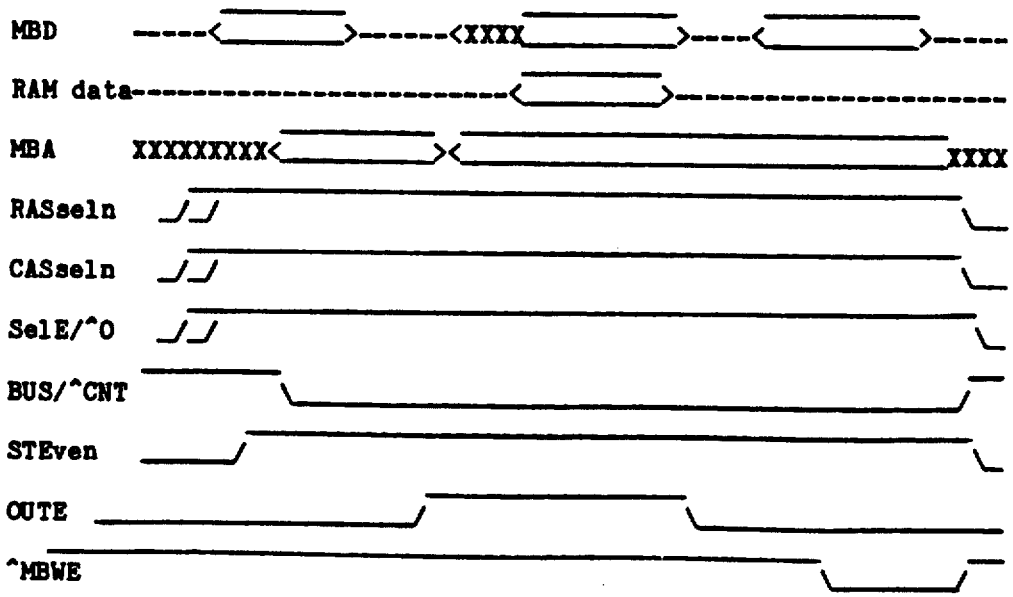
Figure 407:
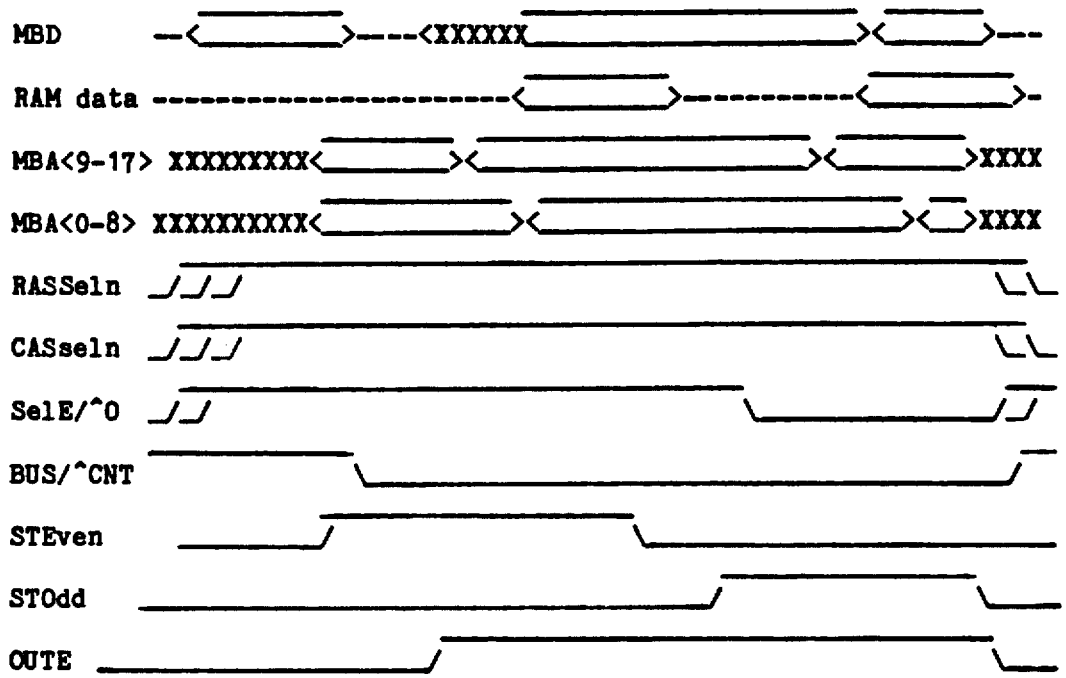
Figure 408:
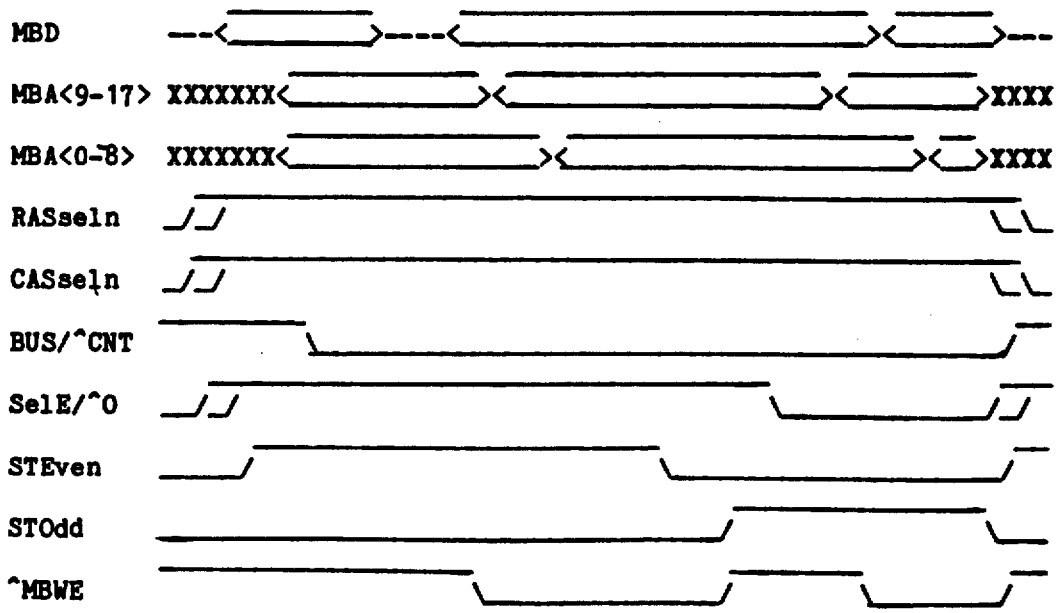
Figure 411:
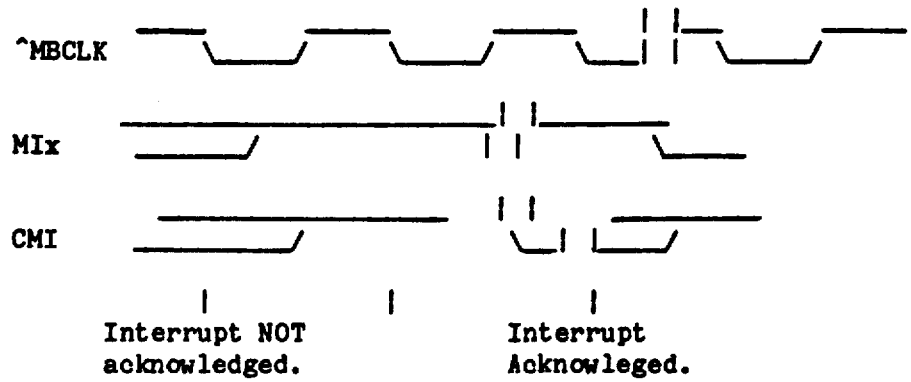
Figure 412:
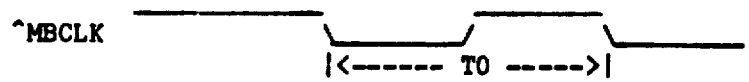
Figure 413:
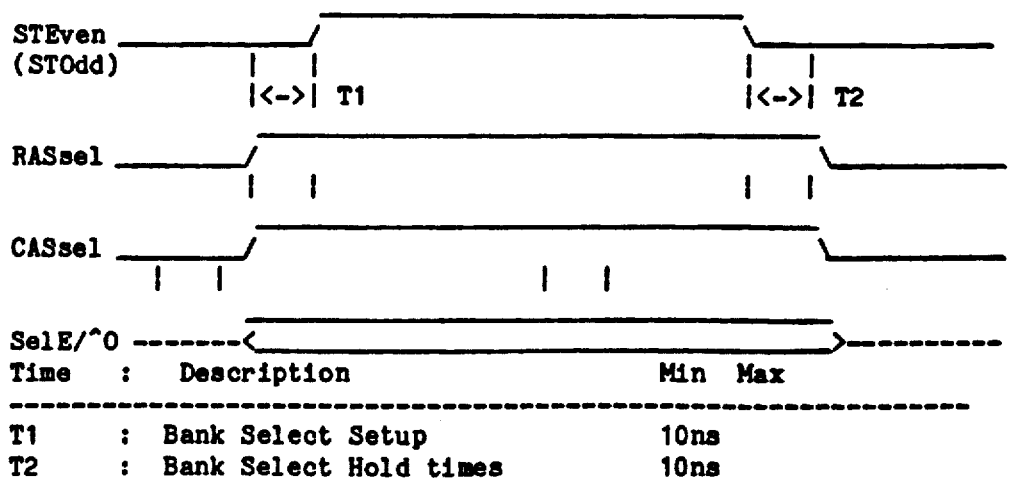
Figure 416:
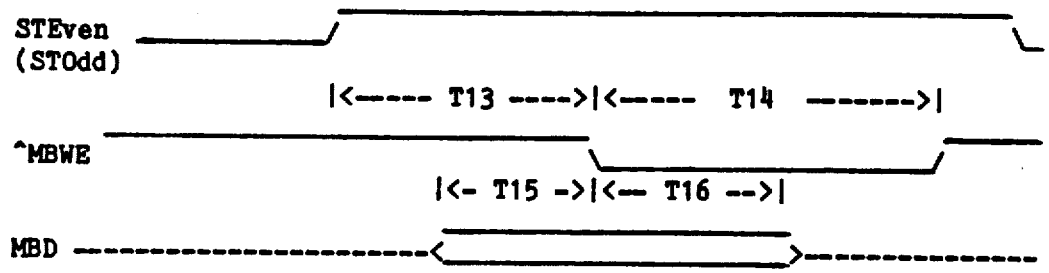
Figure 417:
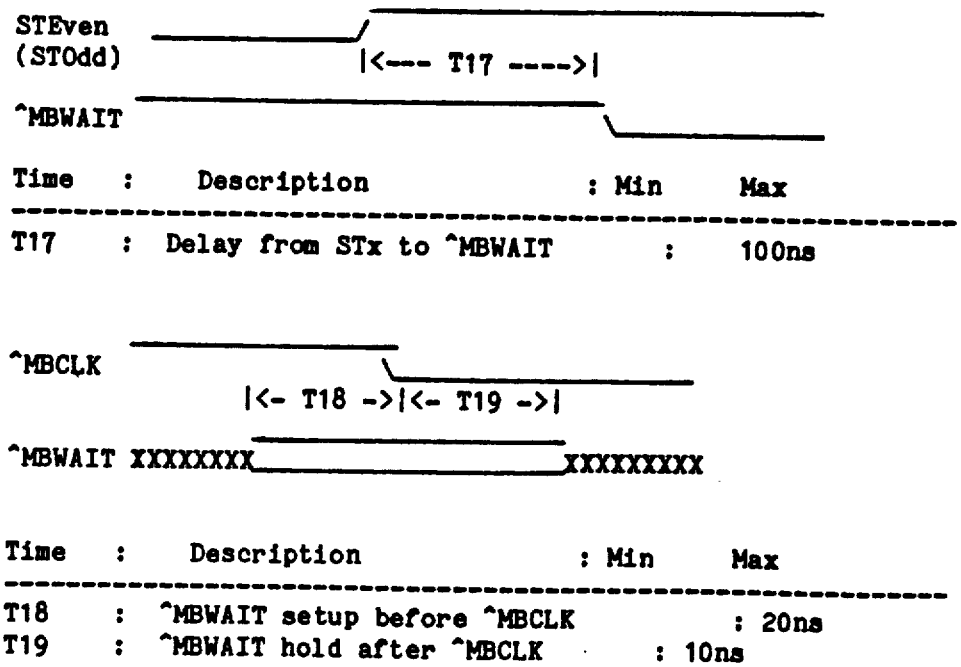
Figure 418:
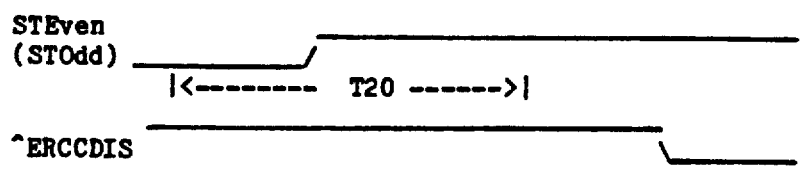
Figure 419:
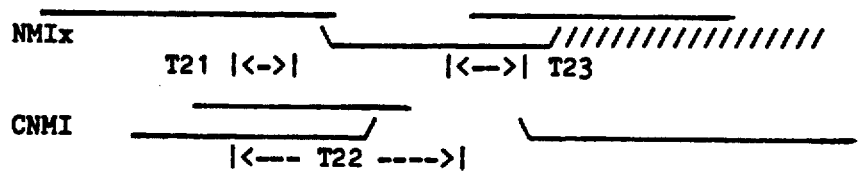

FIGS. 401 through 419 pertain to MBus 205:

FIG. 401 depicts the addressing breakdown of Memory 102.

FIGS. 402 through 419 are detailed timing charts pertaining to Mbus 102.

FIG. Nos. 420 through 500 are not used.

Figure 501:
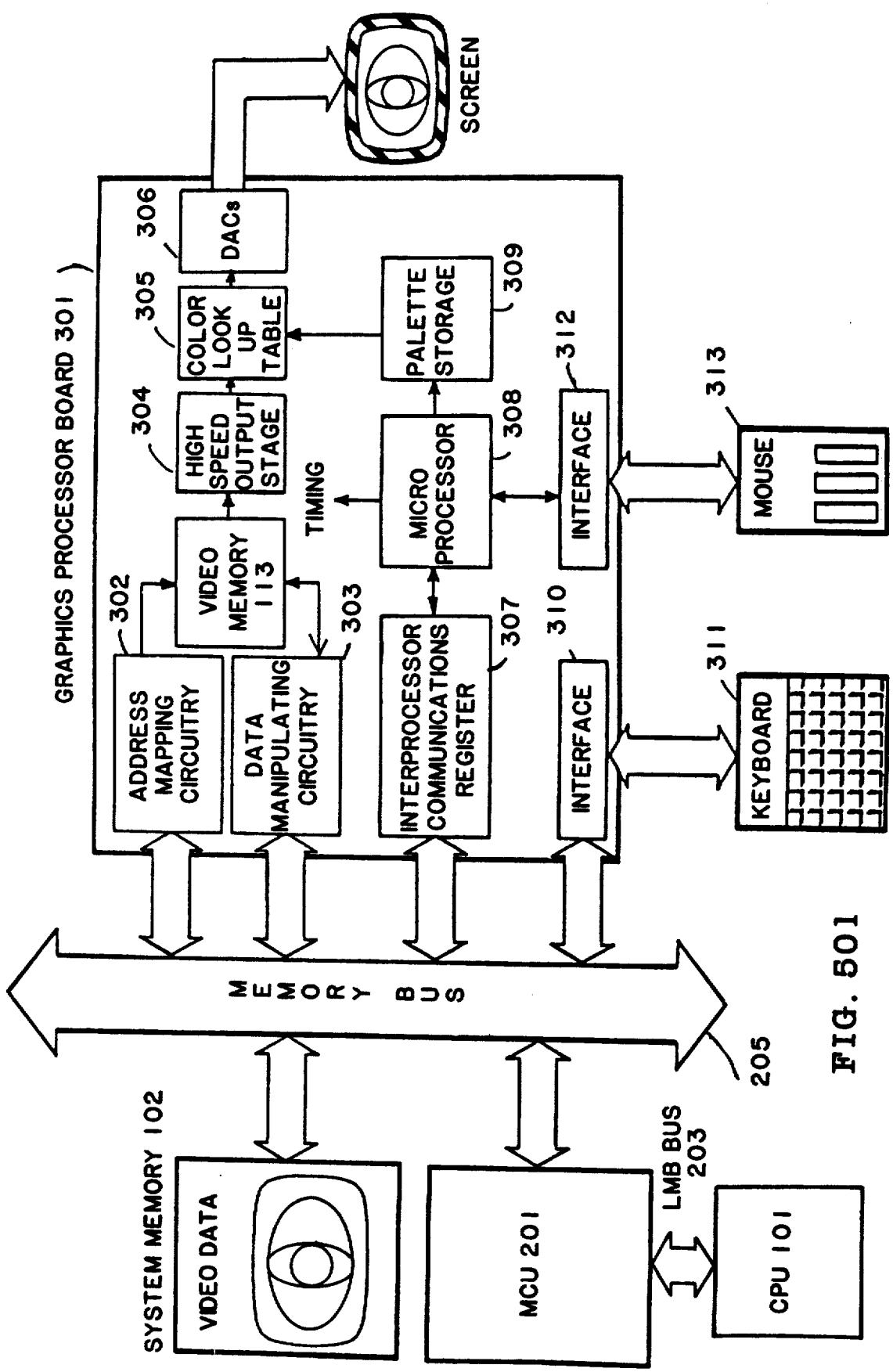
Figure 557:
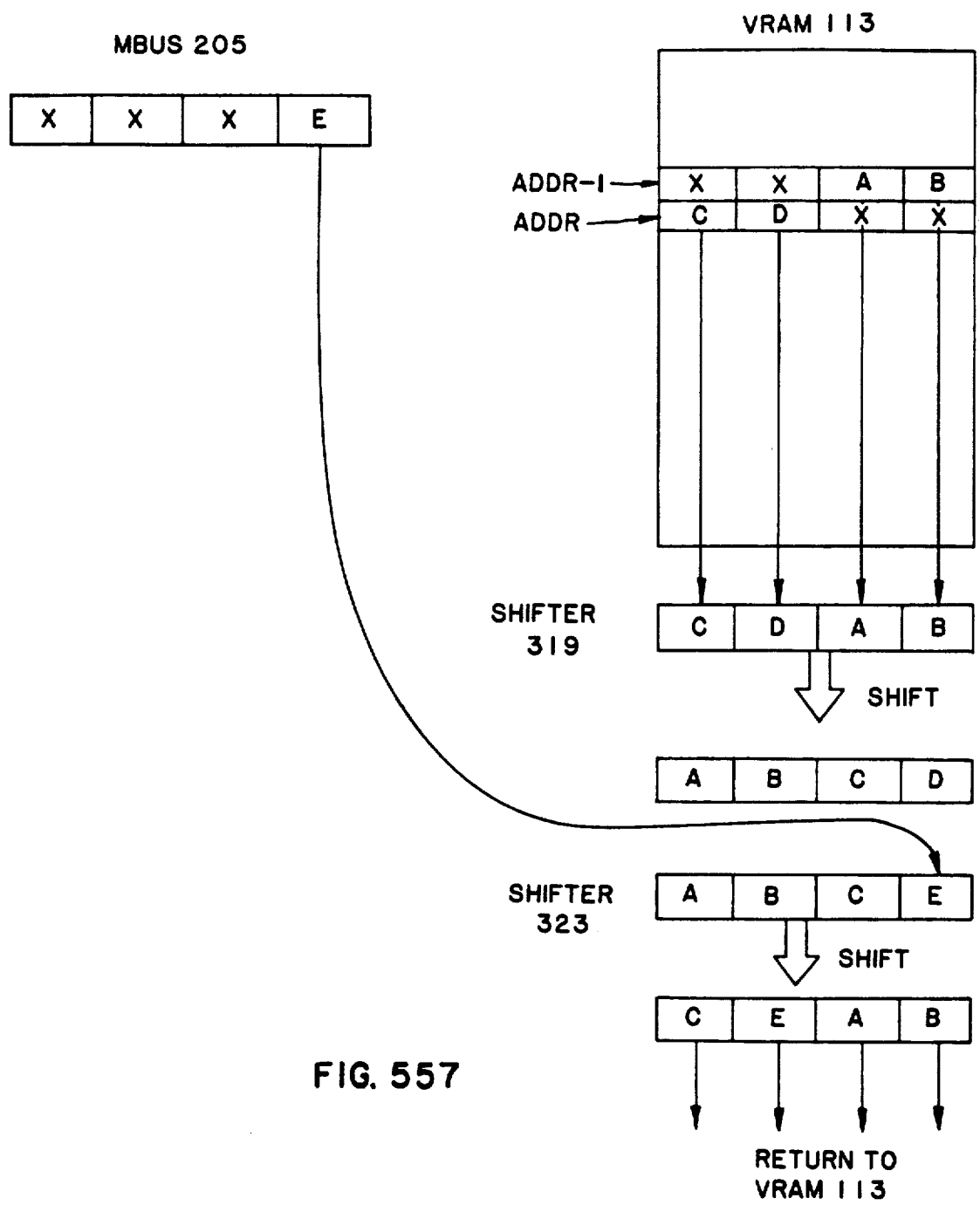

FIGS. 501 through 557 pertain to Video Control Unit 206:

FIG. 501 is a functional overview.

Figure 502:
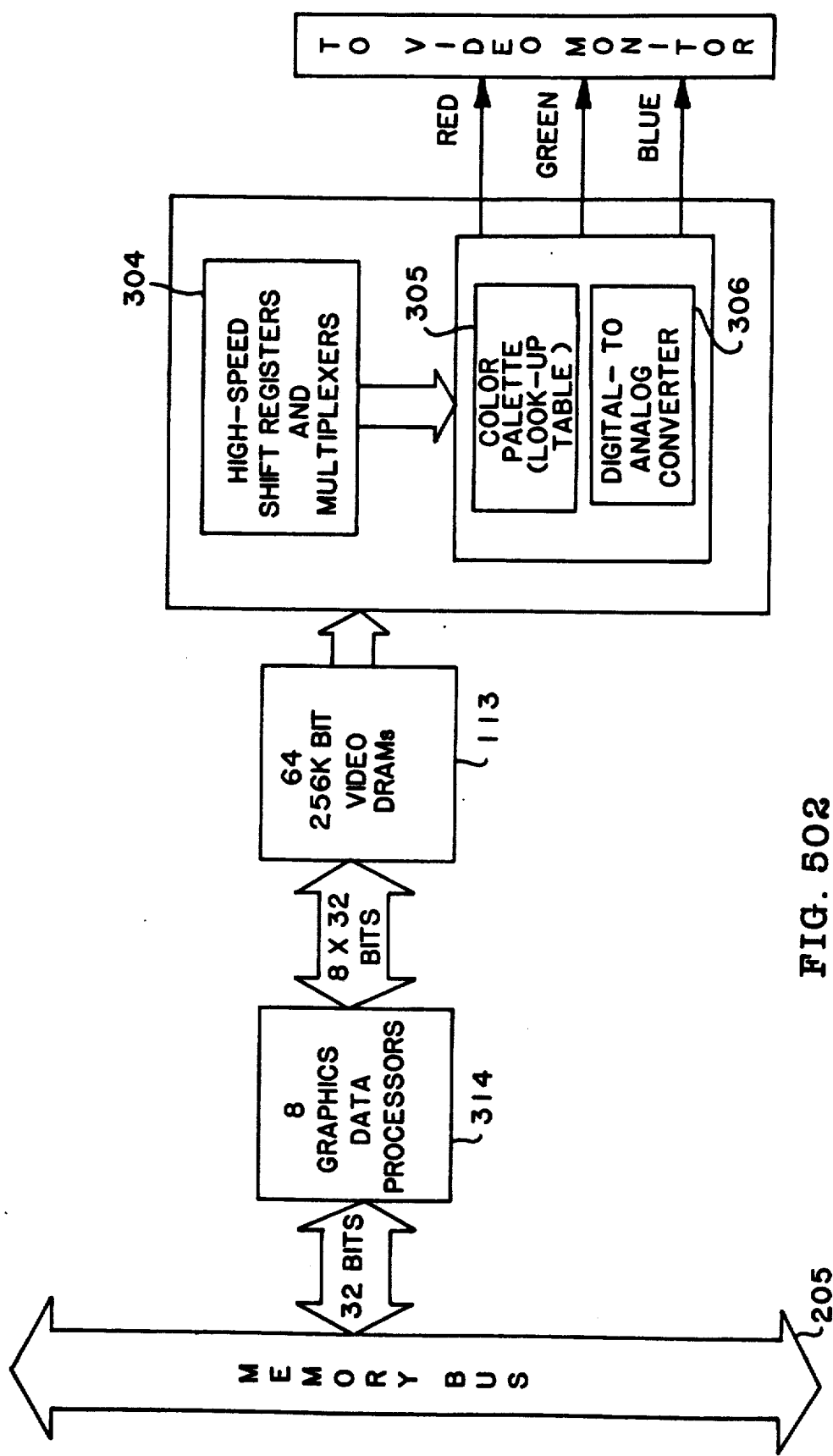

FIG. 502 depicts pixel data flow.

Figures 1, 503:
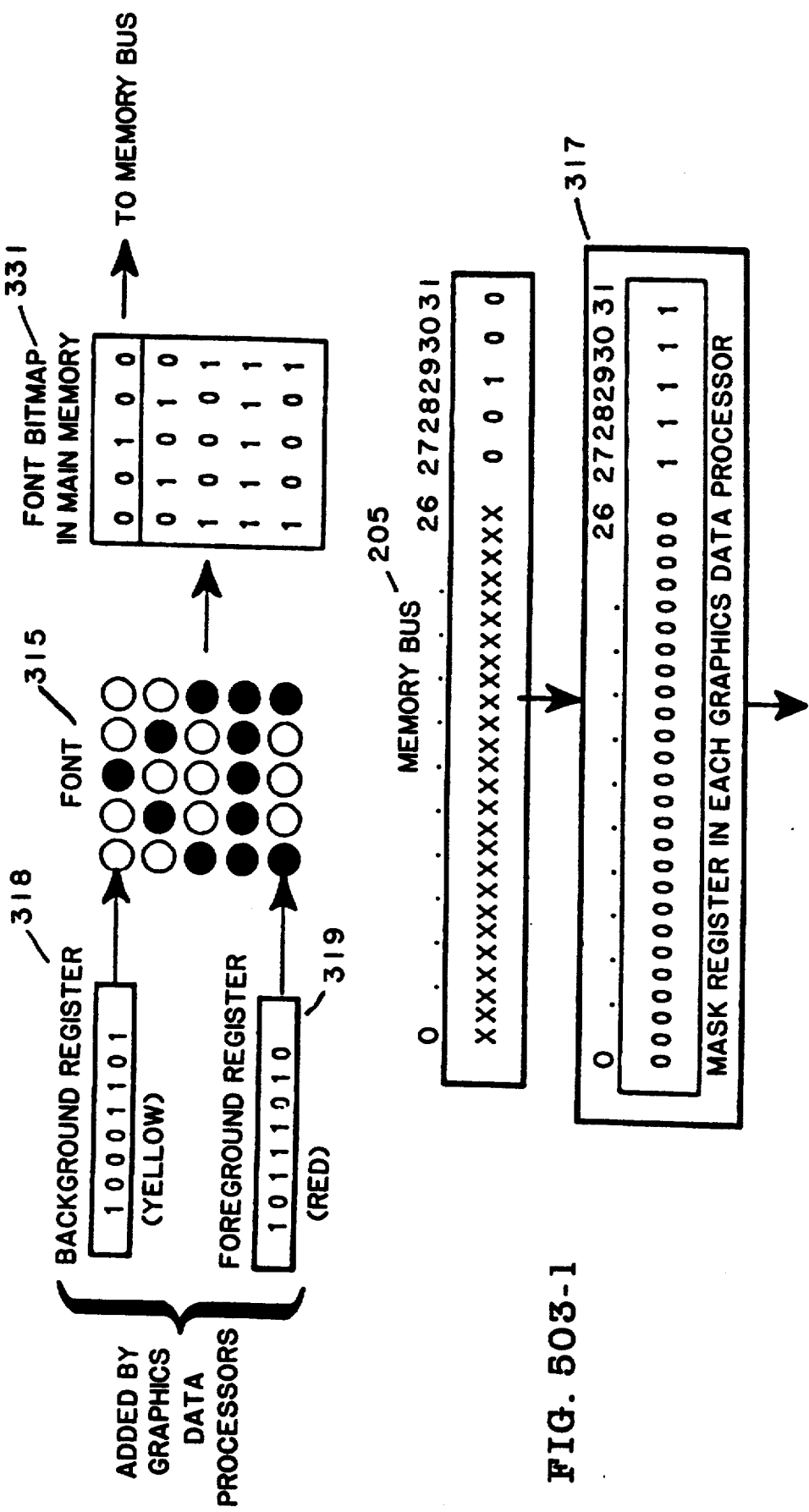
Figures 2, 503:
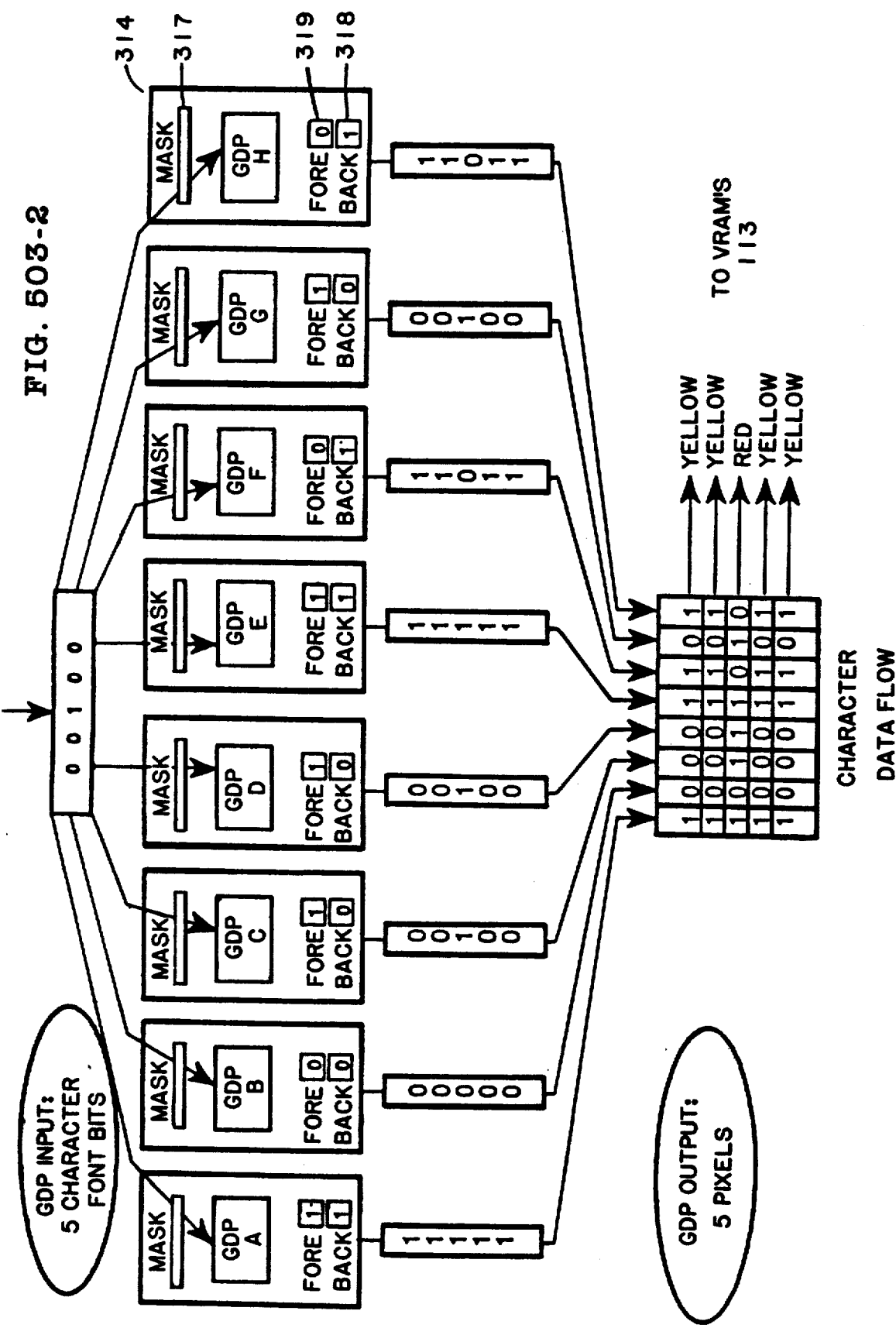

FIG. 503 depicts character data flow.

Figure 504:
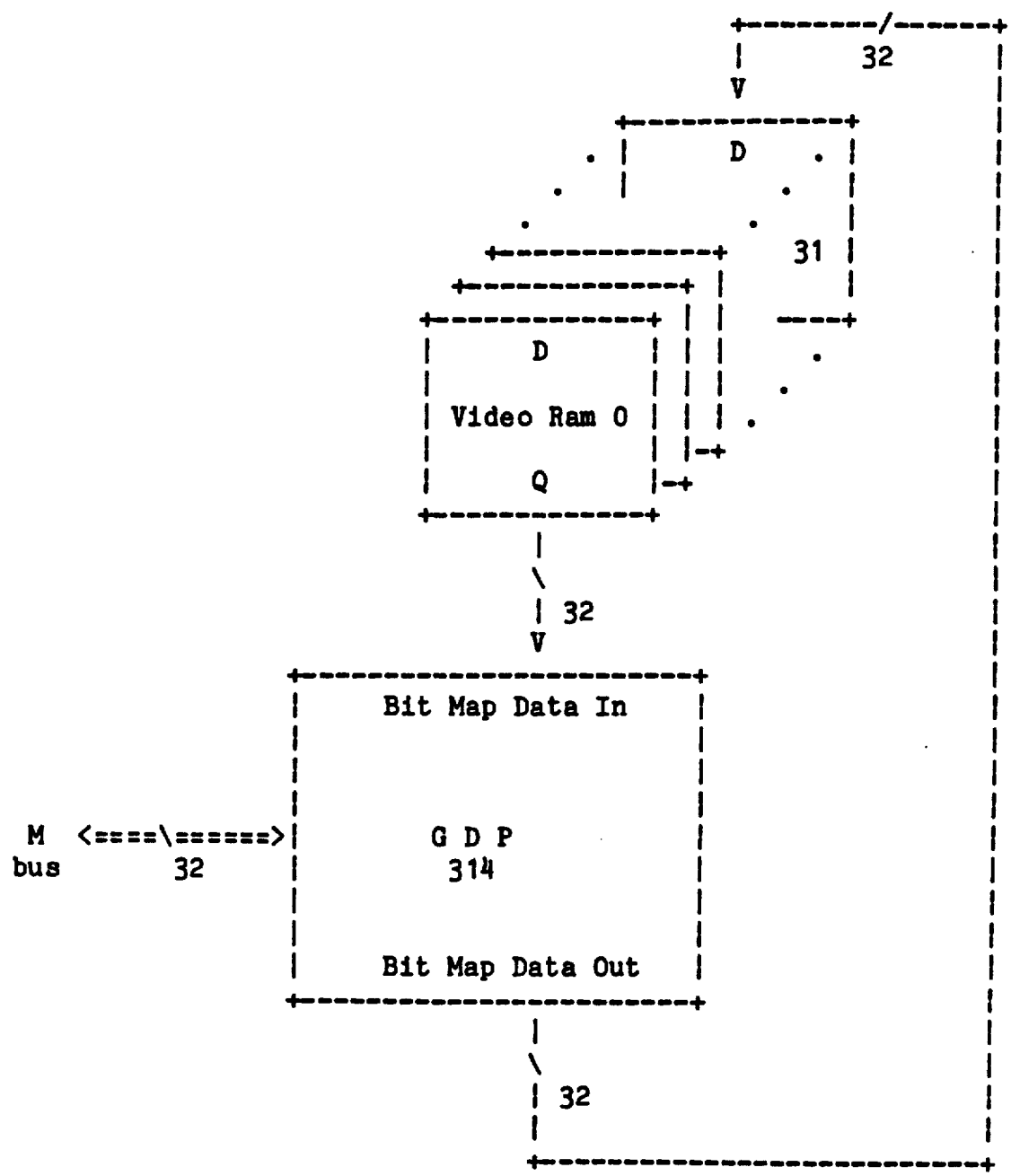

FIG. 504 depicts an embodiment utilizing a single Graphics Data Processor.

Figure 505:
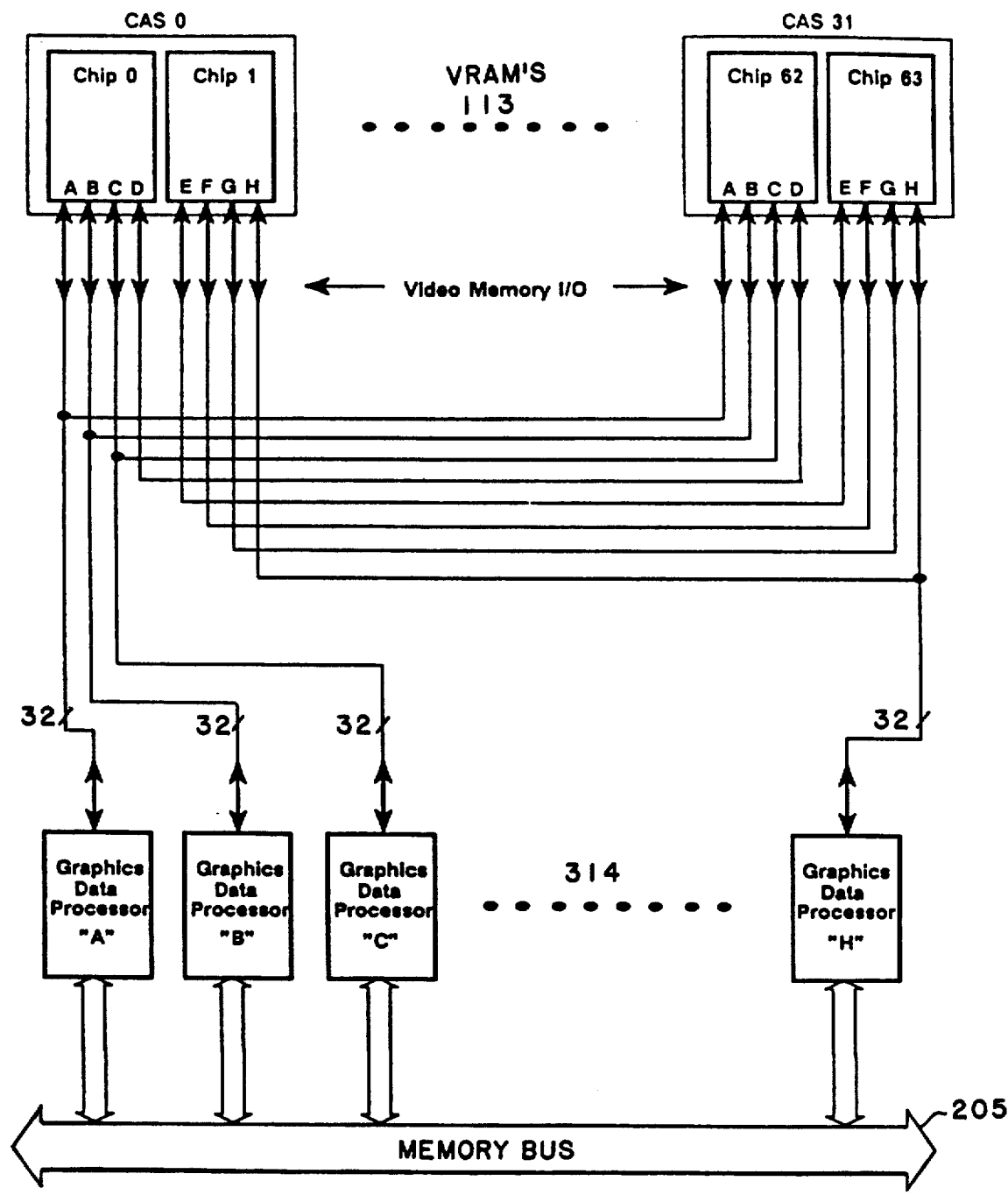

FIG. 505 illustrates the connections of multiple Graphics Data Processors.

Figure 506:
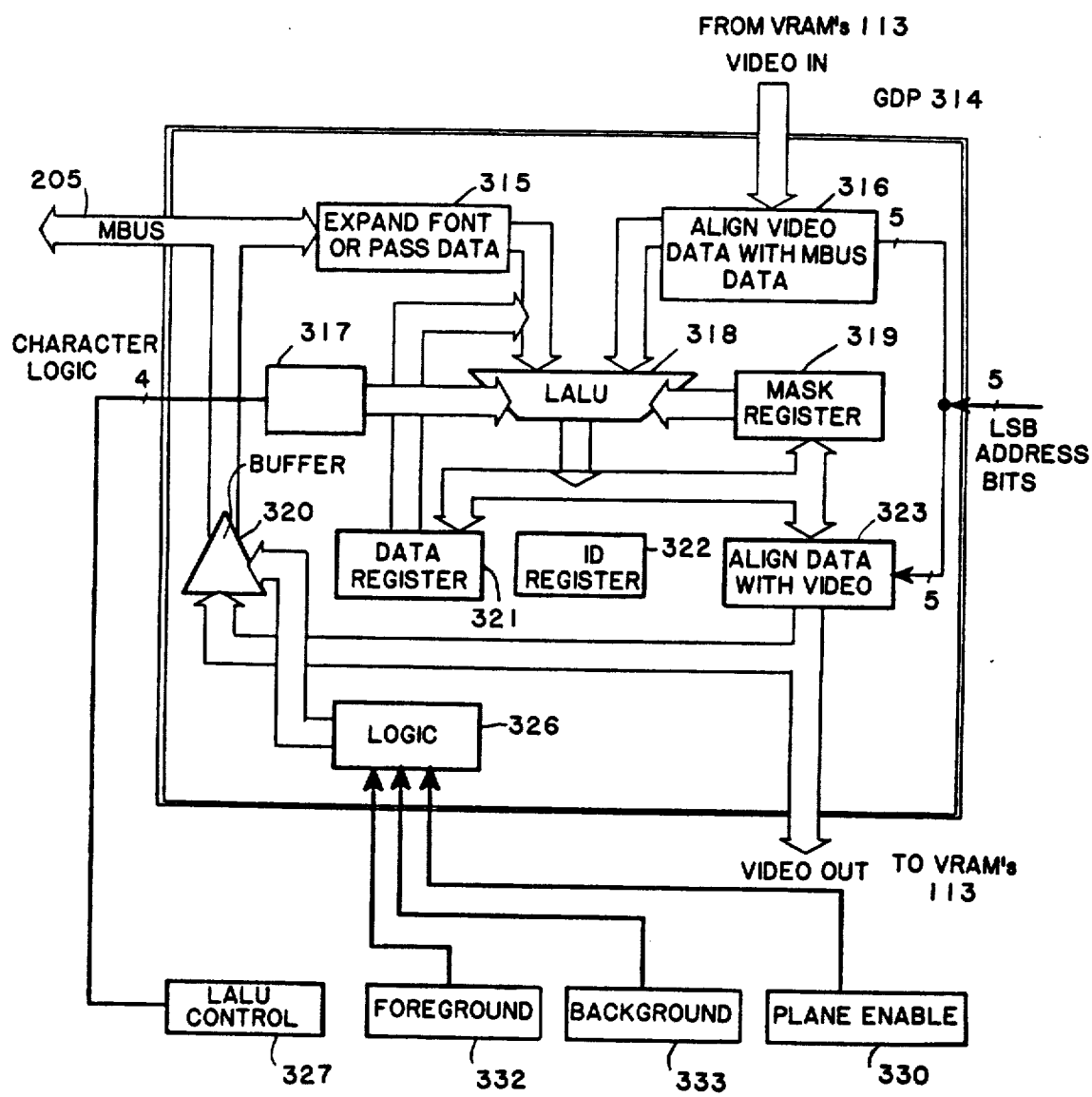

FIG. 506 illustrates the internals of a Graphics Data Processor.

FIG. 507 shows the skewing of MBus lines to Graphics Data Processors.

FIG. 508 illustrates the pin layout of a Graphics Data Processor gate array.

FIG. 509 lists the signals assigned to the pins of Graphics Data Processor gate array.

FIG. 510 illustrates Graphics Data Processor control of MBus lines.

FIG. 511 lists the Boolean functions that may be performed in the Graphics Data Processor.

FIG. 512 lists the functions that may be performed in the Graphics Data Processor.

FIG. 513 illustrates decoding of the Plane Enable Register of the Graphics Data Processor.

FIG. 514 references the Plane Enable Register to planes controlled.

FIGS. 515 through 525 illustrate various functions:
FIG. 515 EXTernal Read
FIG. 516 EXTernal Write
FIG. 517 EXTernal PLANE Read
FIG. 518 EXTernal PLANE Write
FIG. 519 INTernal Read
FIG. 520 INTernal Write
FIG. 521 INTernal PLANE Read
FIG. 522 INTernal PLANE Write
FIG. 523 Character Write
FIG. 524 Character Write (1 bit/pixel)
FIG. 525 Character XOR FIGS. 526 through 531 are timing charts for the Video COntrol Unit.

Figure 532:
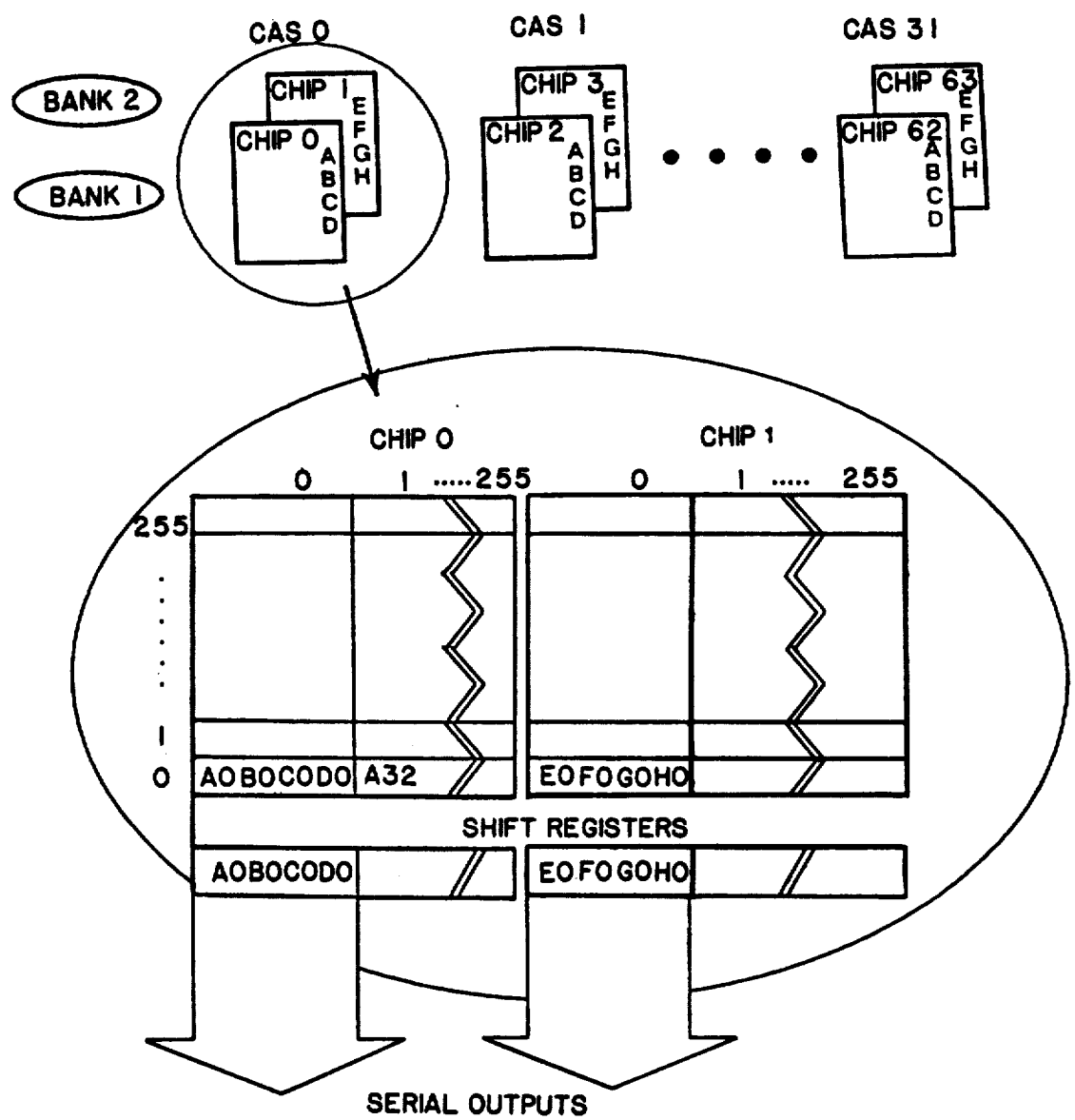

FIG. 532 is an overview of video memory configuration.

FIGS. 533A, 533B, 533C, and 533D illustrate Screen Address to Memory Address mapping.

FIG. 534 illustrates CAS phases in Video Memory.

Figure 535:
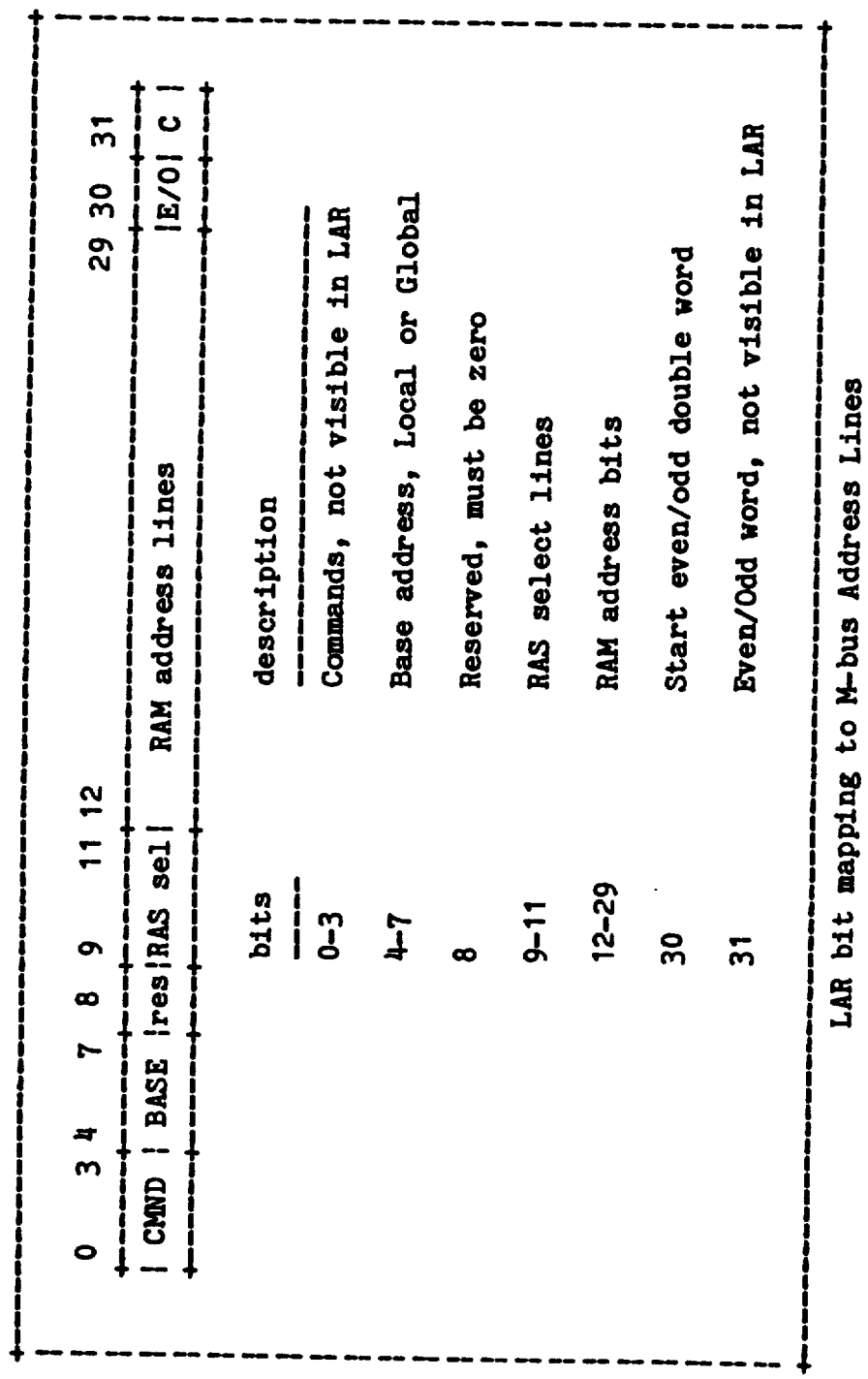
Figure 555:
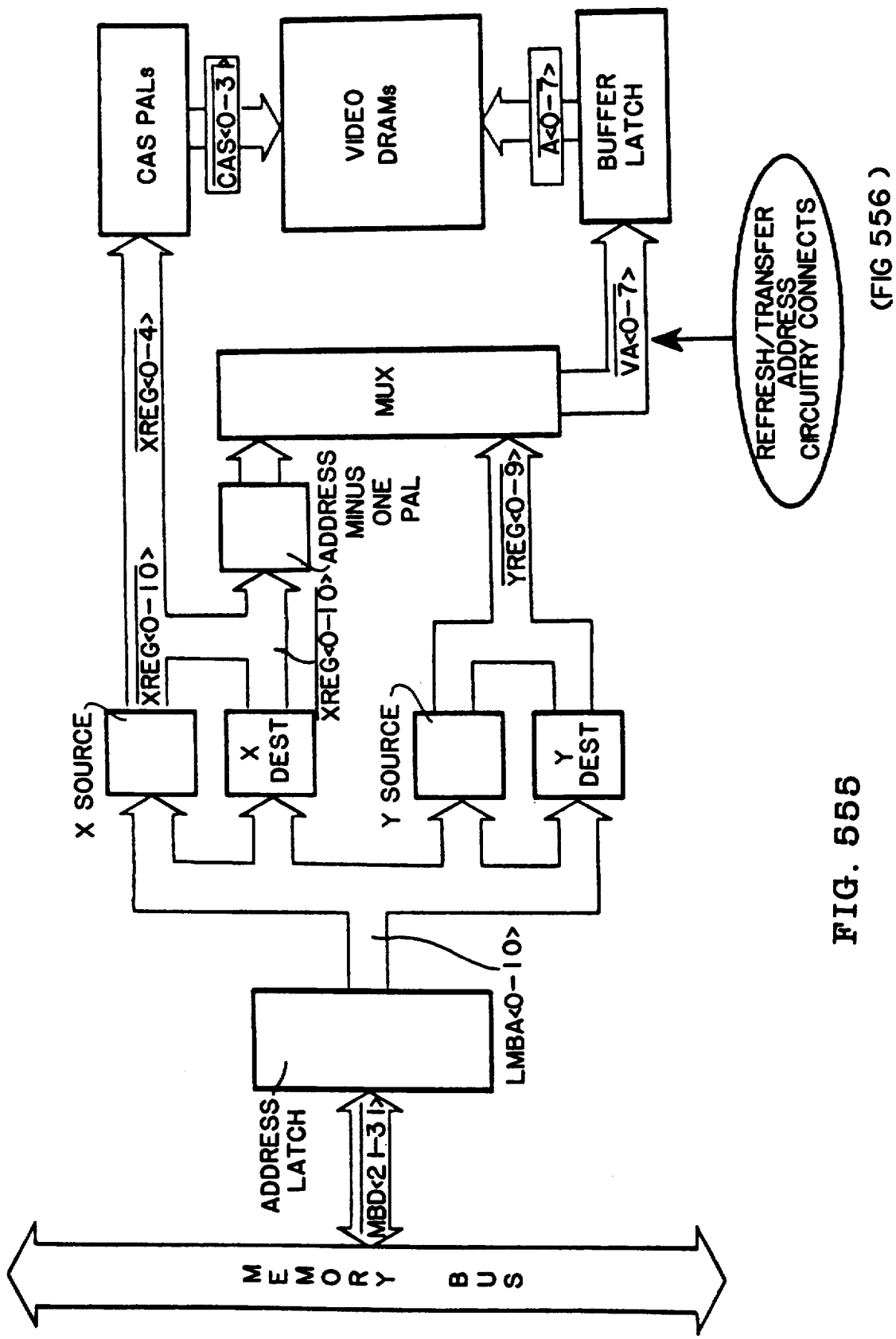
Figure 556:
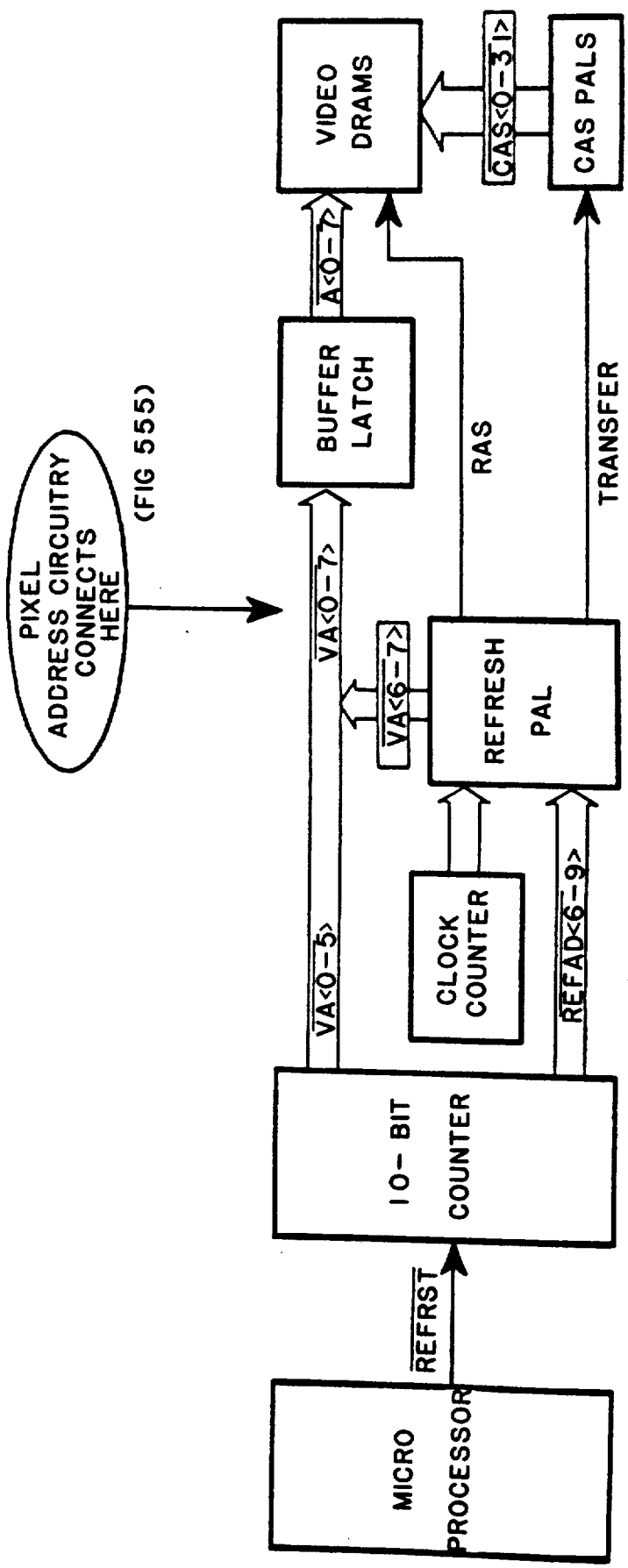

FIGS. 535 to 554 illustrate the decoding of various functions:
FIG. 535 LAR to MBus address mapping
FIG. 536 "OTHER space" decoding
FIG. 537 LALU Register
FIG. 538 PLANE ENABLE Register
FIG. 539 Foreground Register
FIG. 540 Background Register
FIG. 541 Mouse/Tablet Double Word
FIG. 542 Host Write COM DATA Register
FIG. 543 MOUSE COMMAND
FIG. 544 PALETTE LOAD COMMAND
FIG. 545 NMI ENABLE/DISABLE
FIG. 546 BLINK ENABLE/DISABLE
FIG. 547 Mouse double click delay
FIG. 548 Echo Mode
FIG. 549 Manufacturing Test Mode
FIG. 550 COM STATUS Register
FIG. 551 KEYBOARD Register
FIG. 552 LED Register
FIG. 553 PIXEL ENABLE Register
FIG. 554 "NORMAL spoace" decoding
FIG. 555 depicts the Pixel Address Path.
FIG. 556 depicts the Refresh/Transfer Address Path.
FIG. 557 illustrates data alignment.
FIGS. 558 through 600 are not used.

Figure 601:
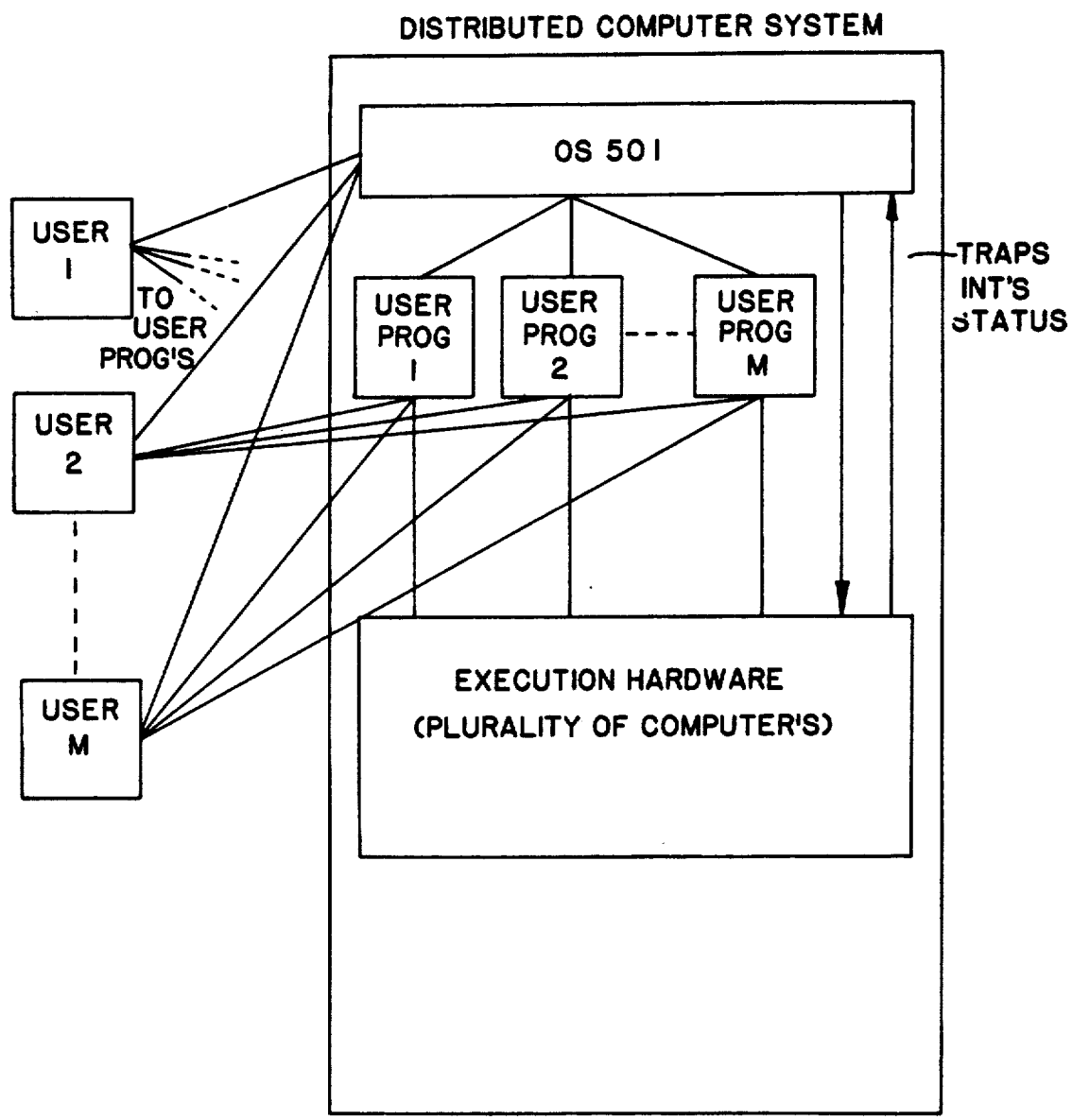

FIGS. 601 through 617 pertain to Operating System 501:

FIG. 601 depicts the operating environment.

Figure 602B:
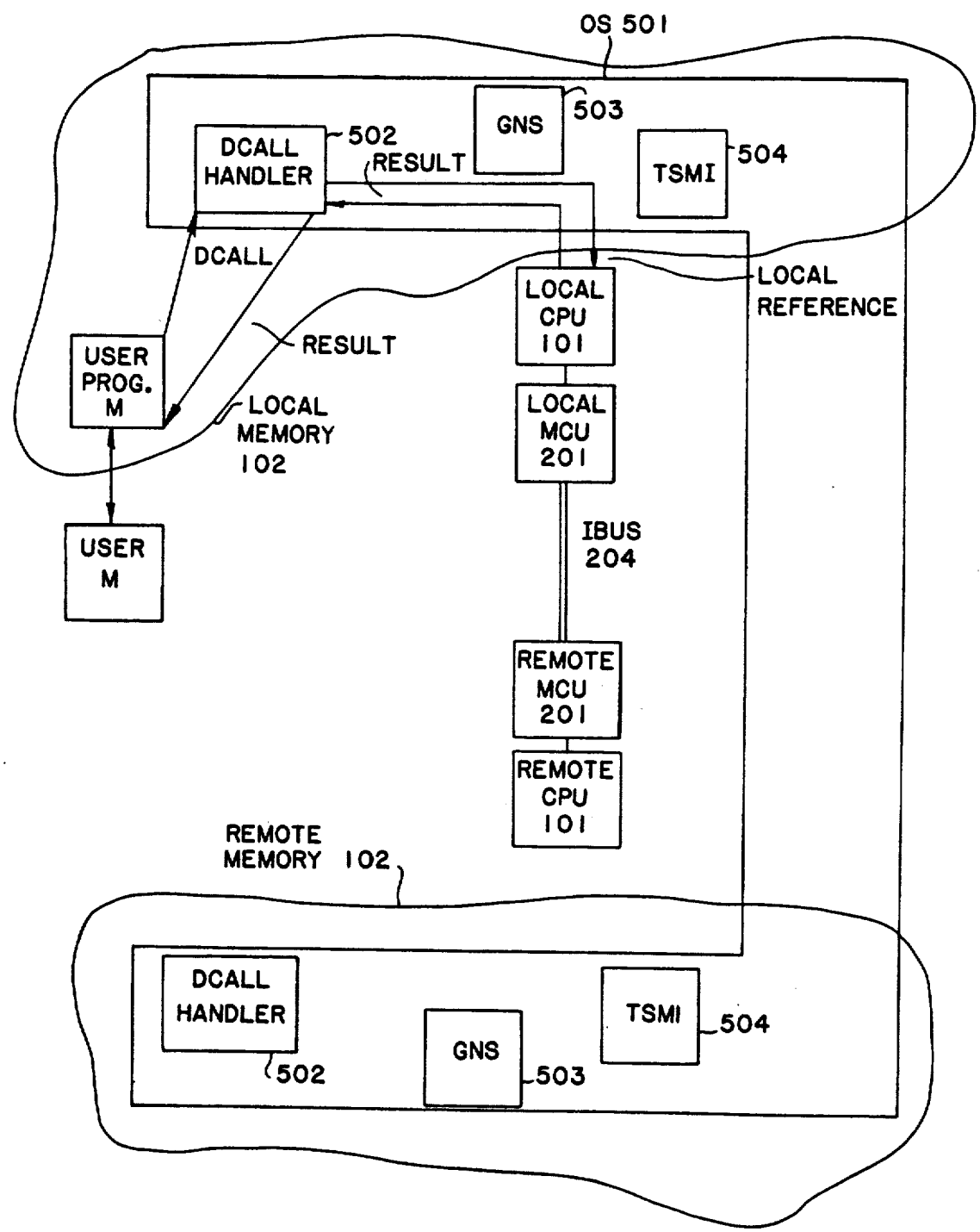
Figure 602C:
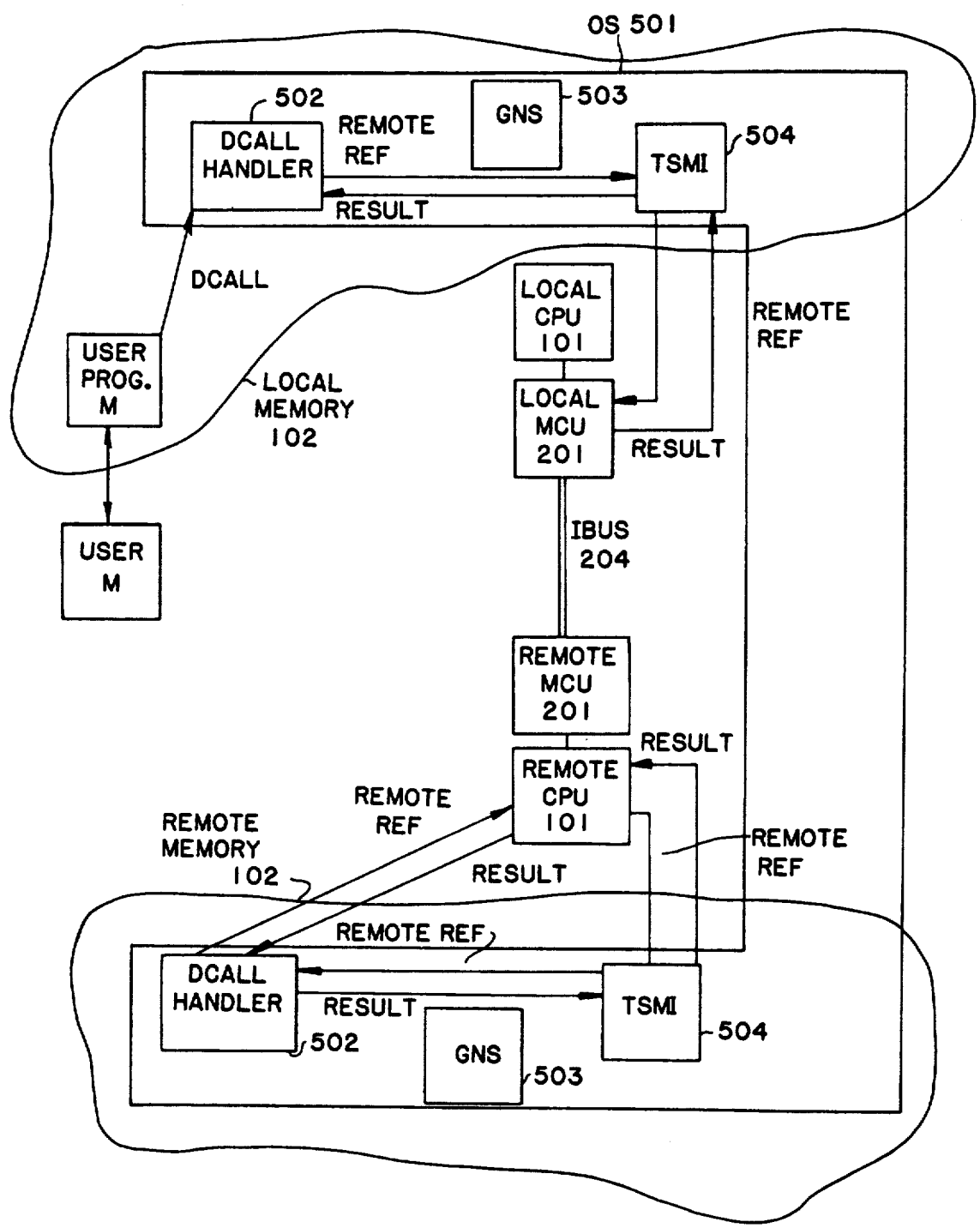

FIGS. 602A, 602B, and 602C expand on the operating environment.

Figure 603:
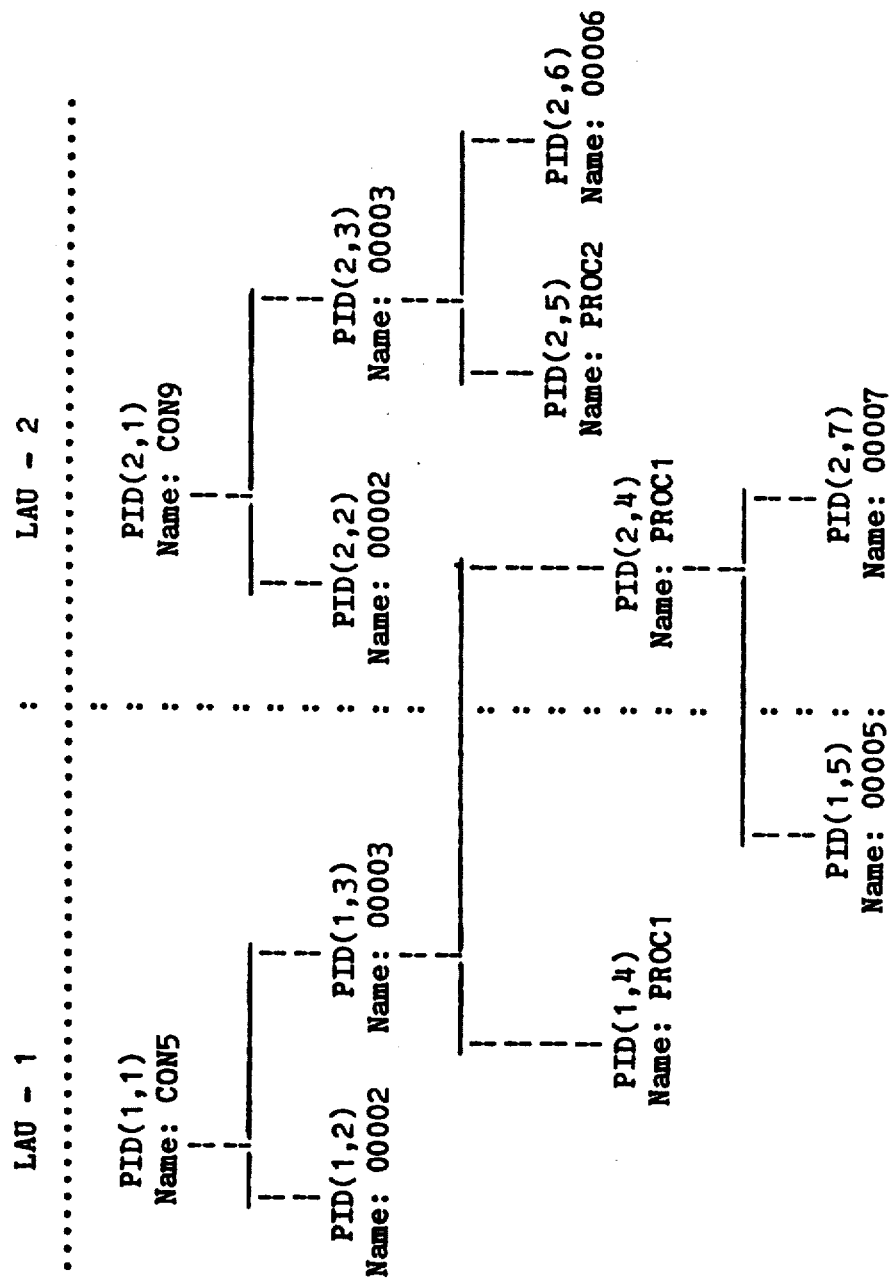
Figure 605:
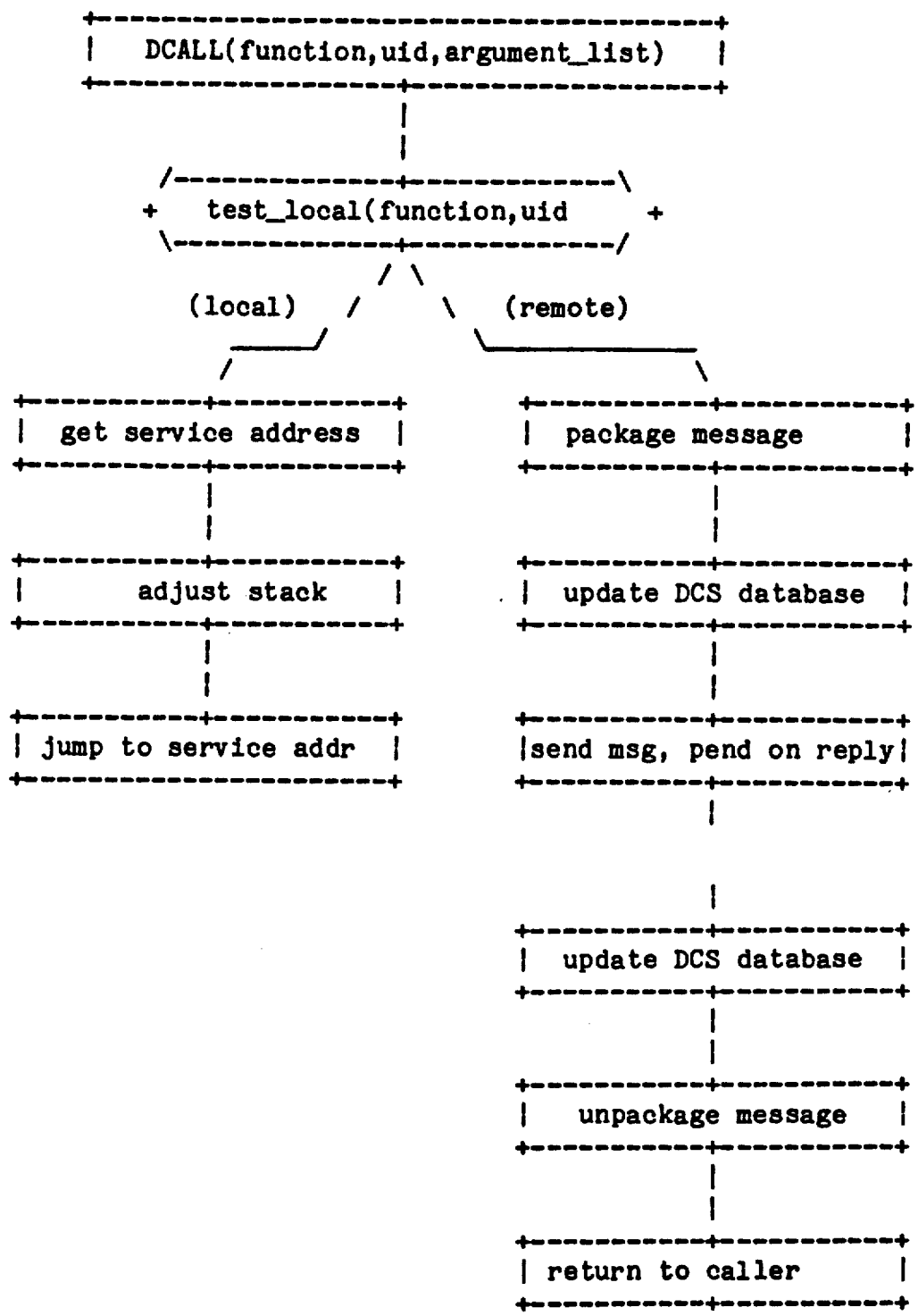
Figure 606:
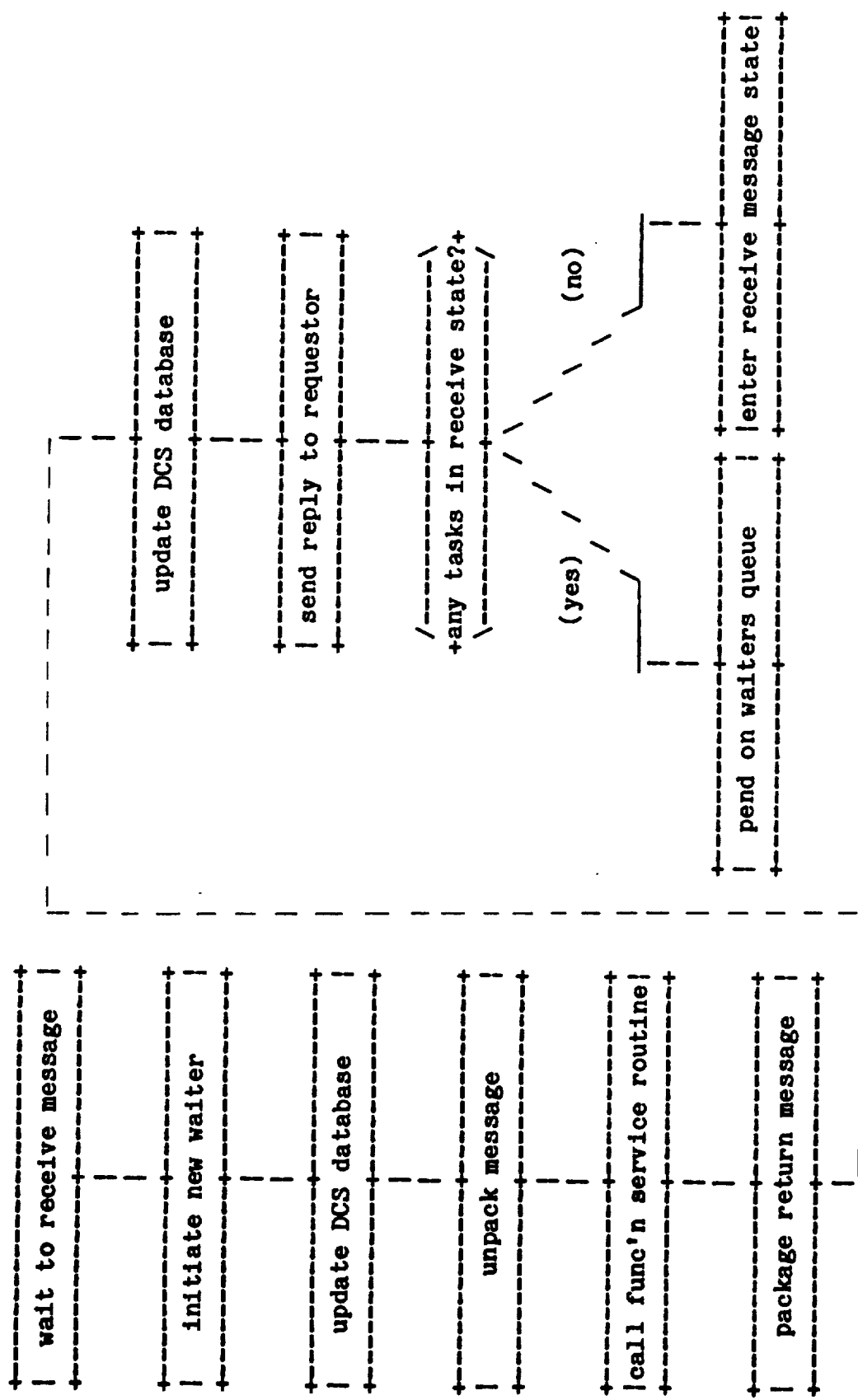
Figure 607:
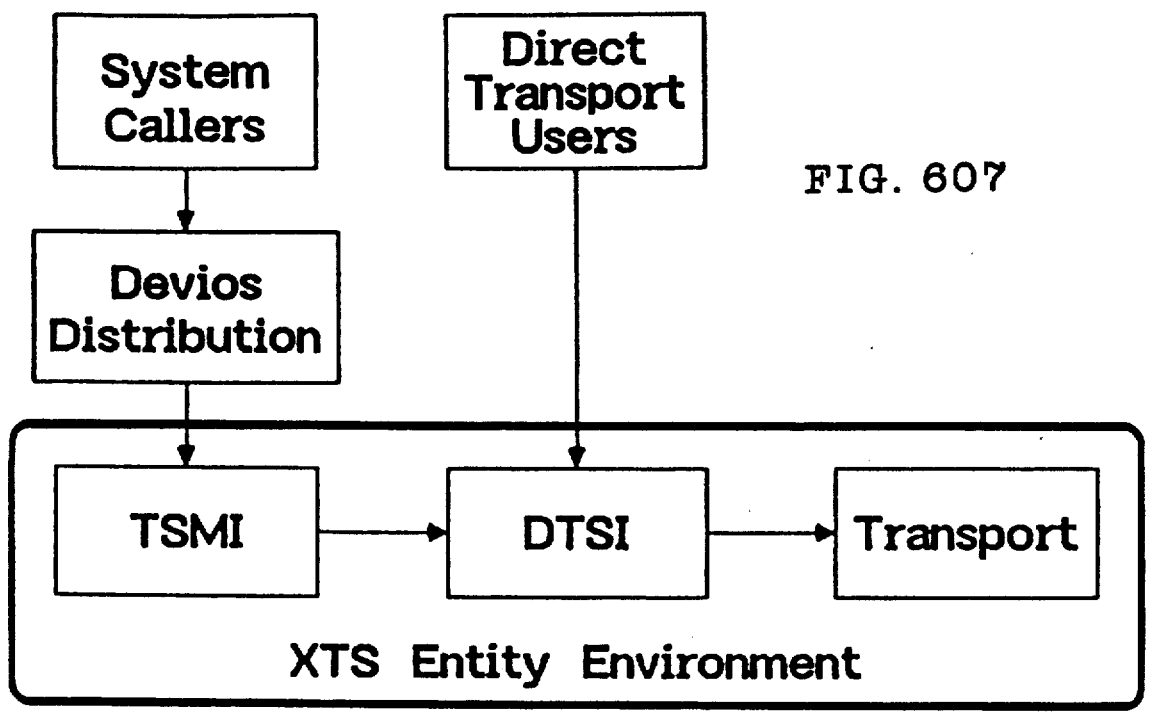
Figure 608:
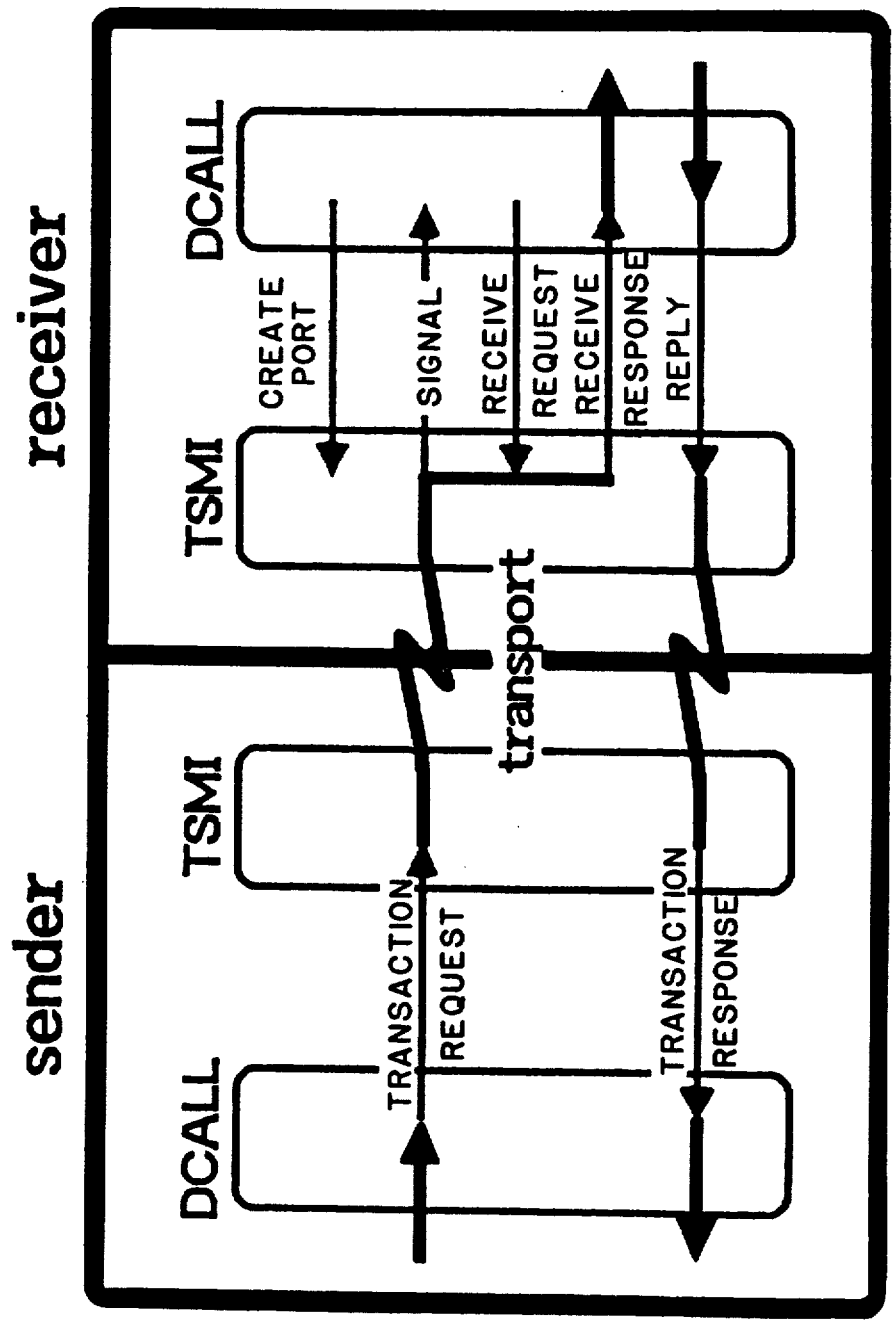
Figure 609:
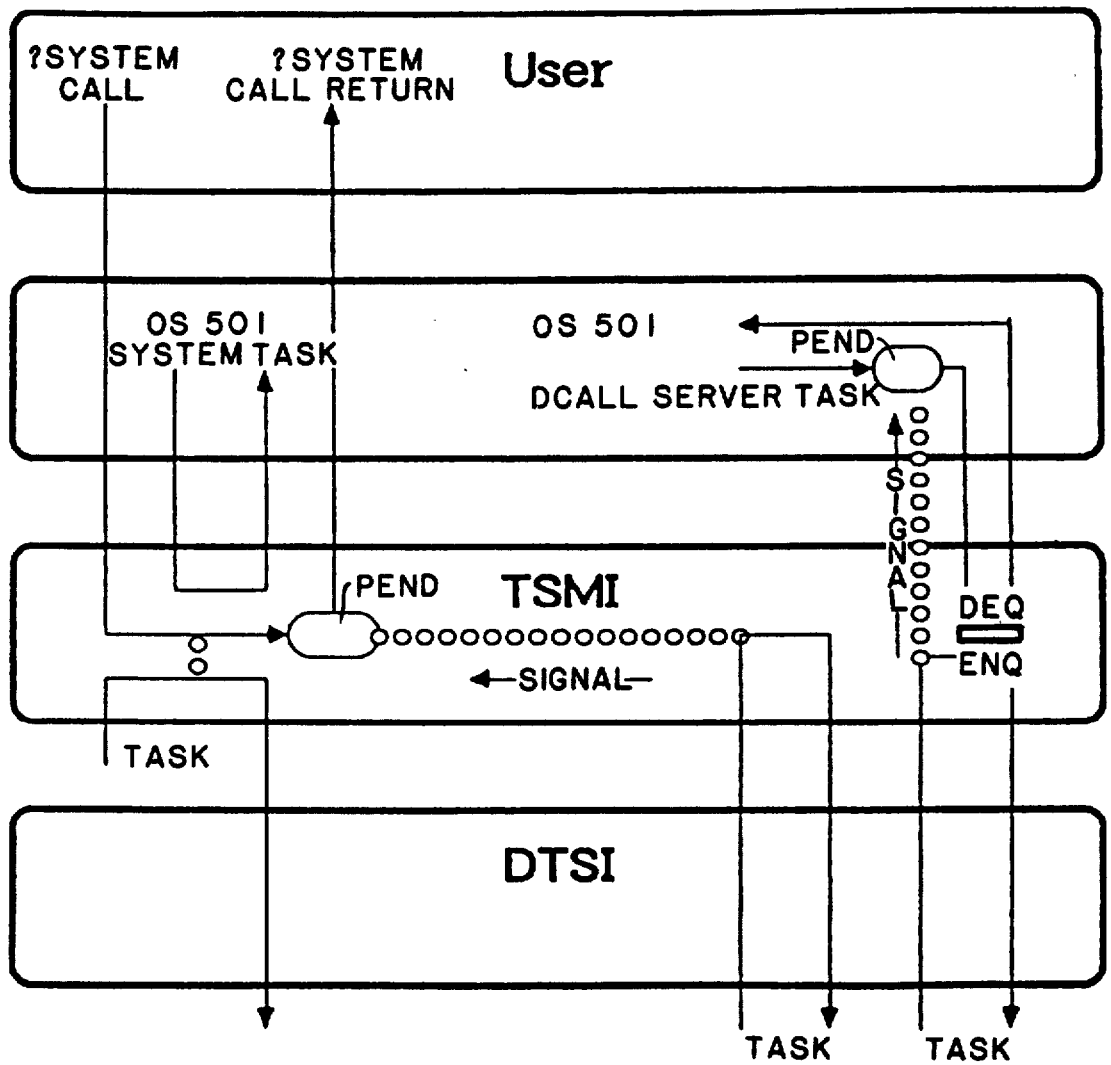
Figure 610:
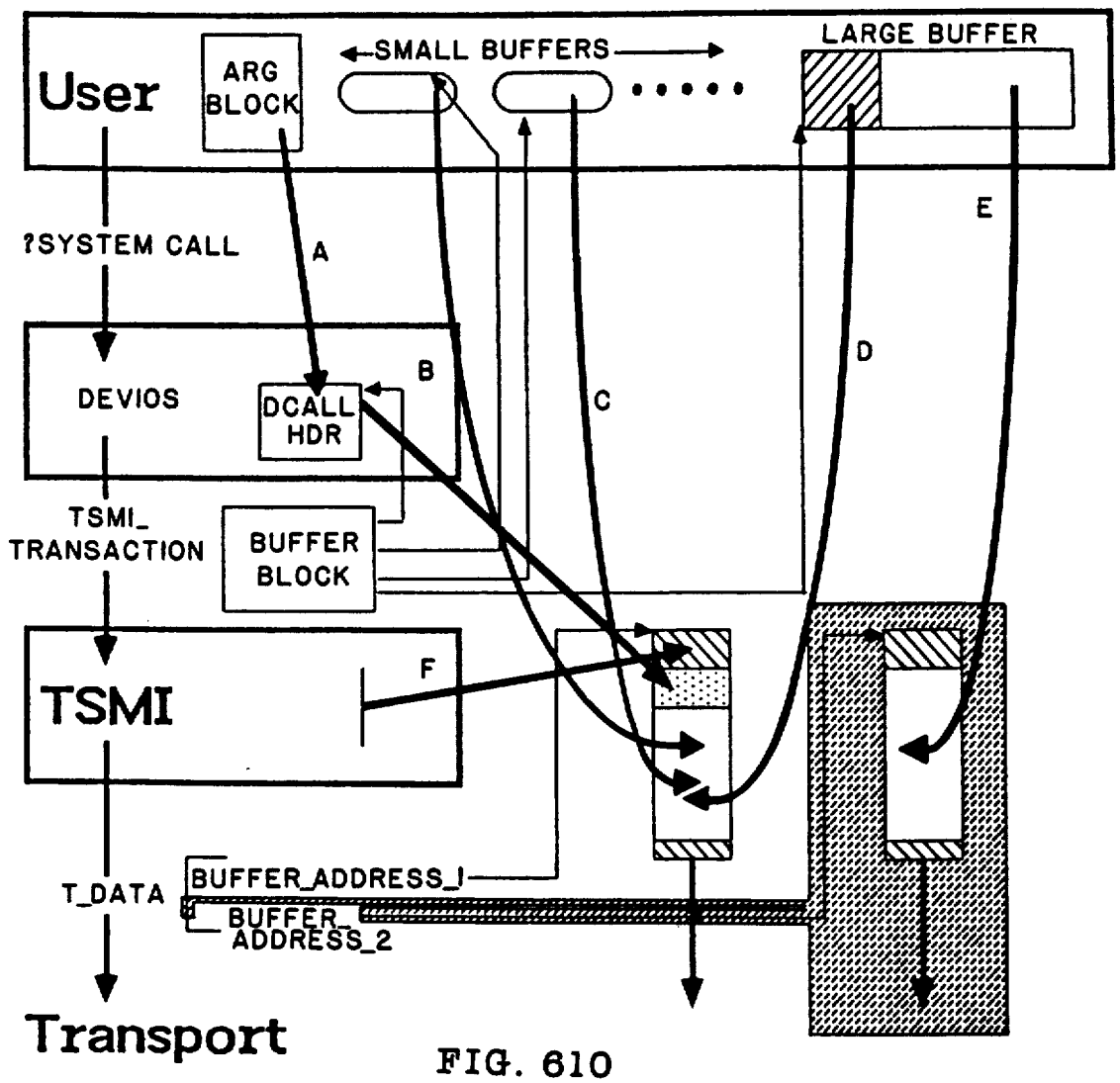
Figure 611:
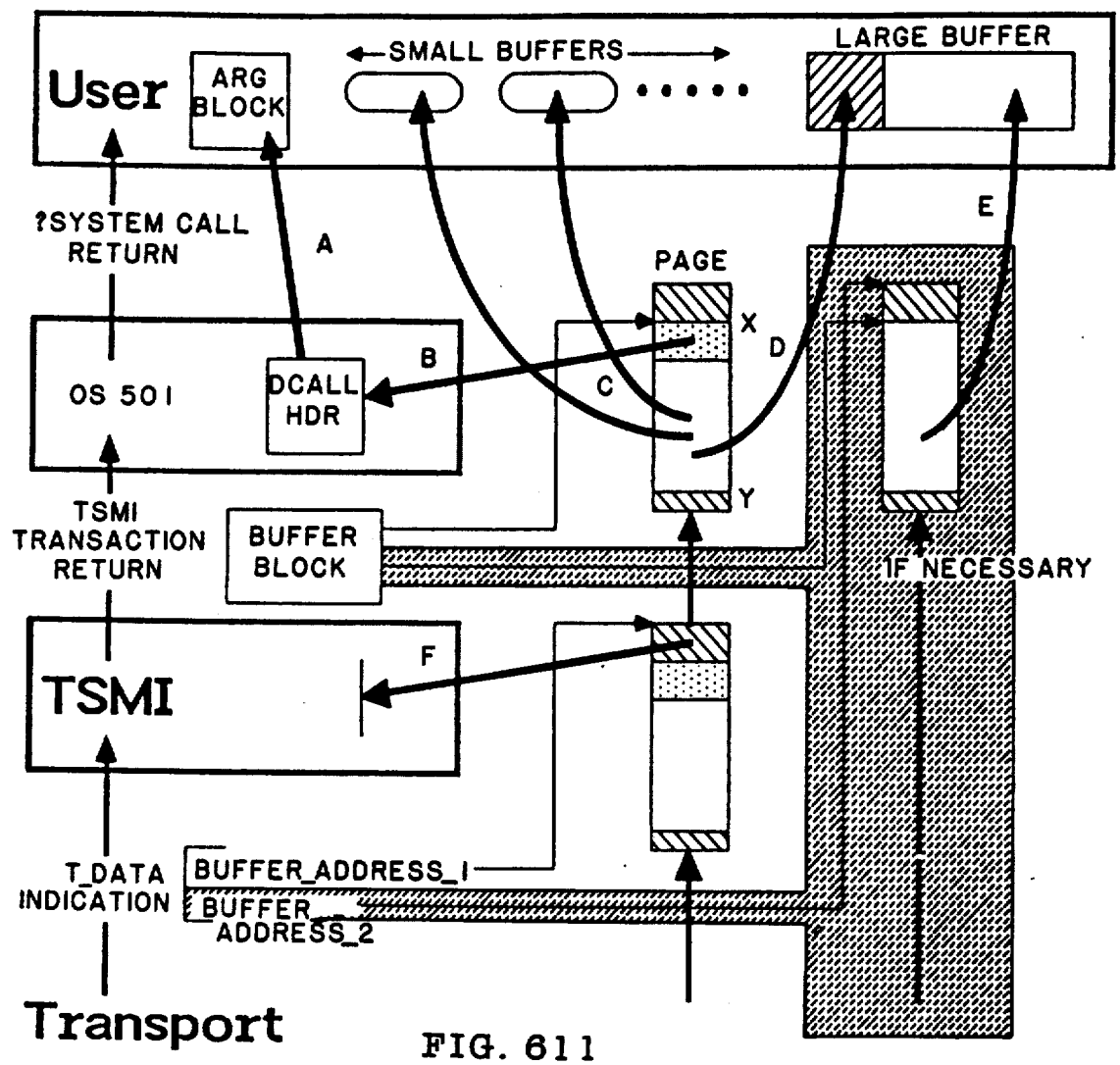
Figures 1, 612:
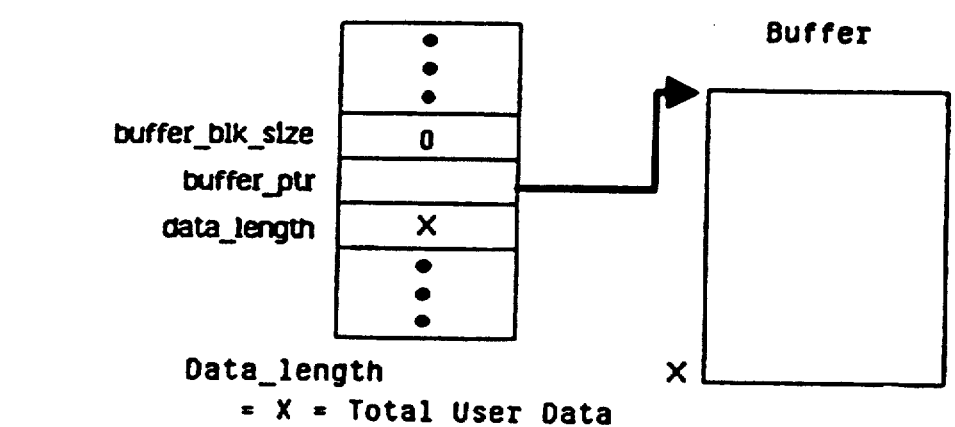
Figures 2, 612:
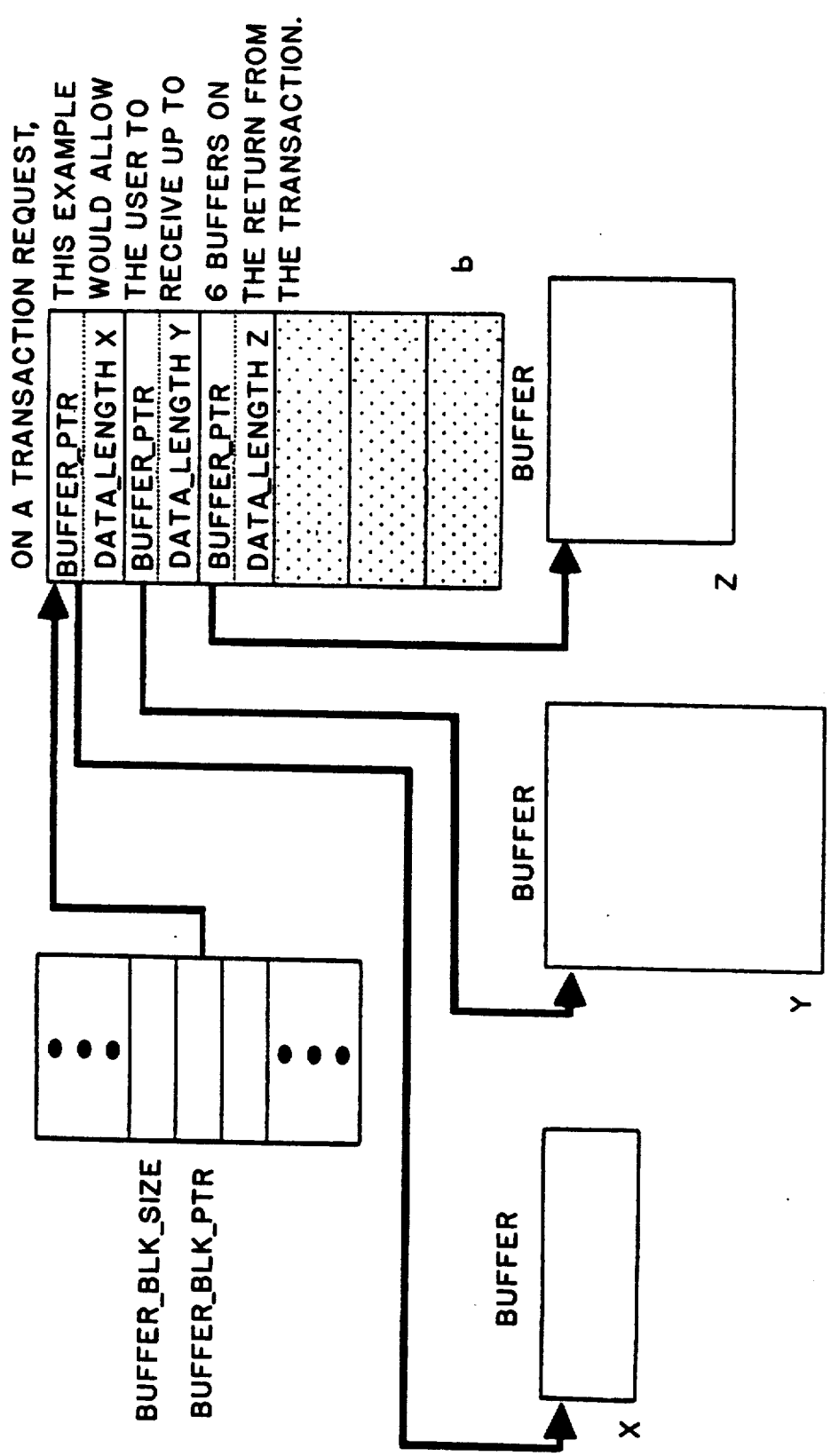
Figure 613:
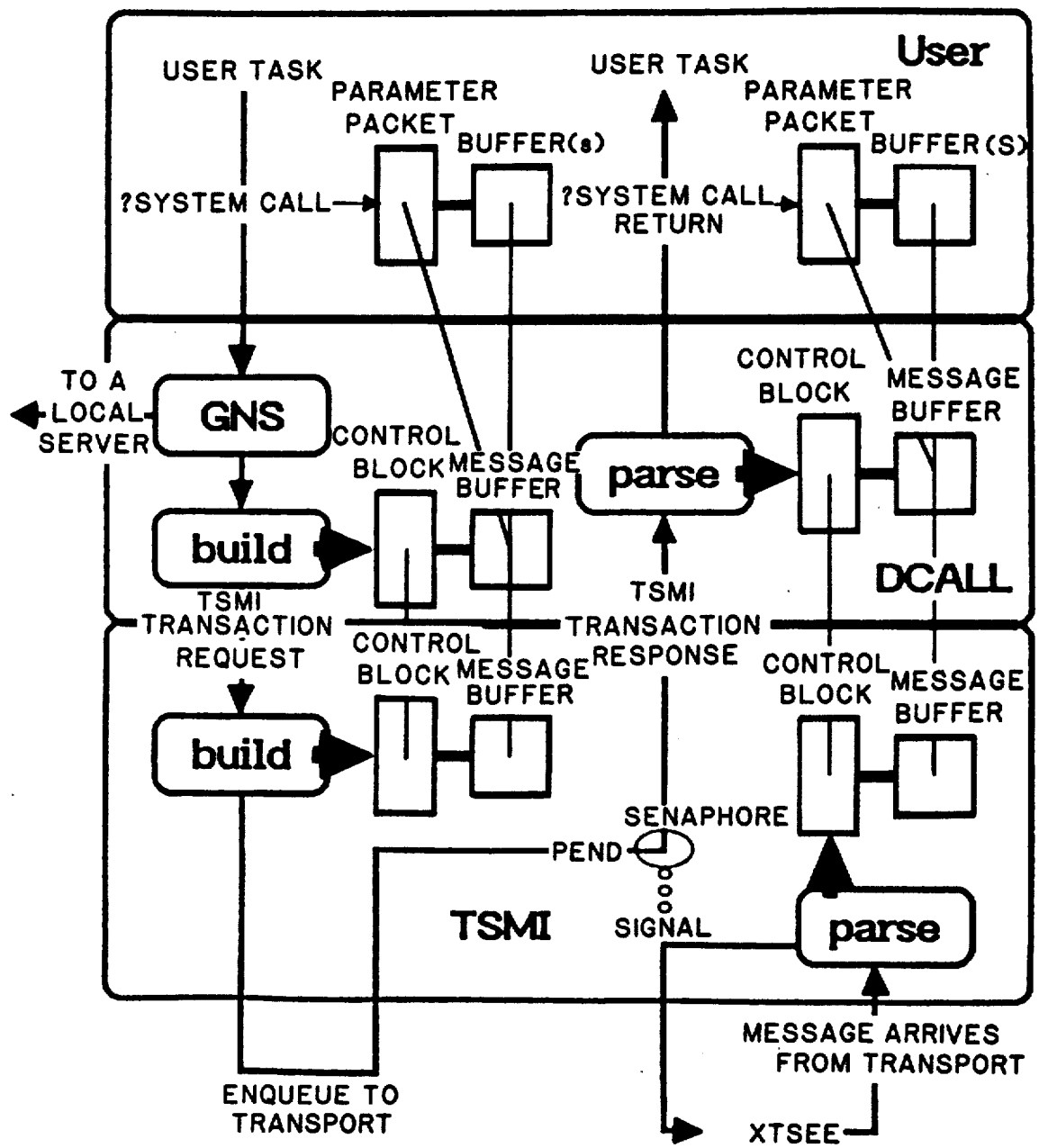
Figure 614:
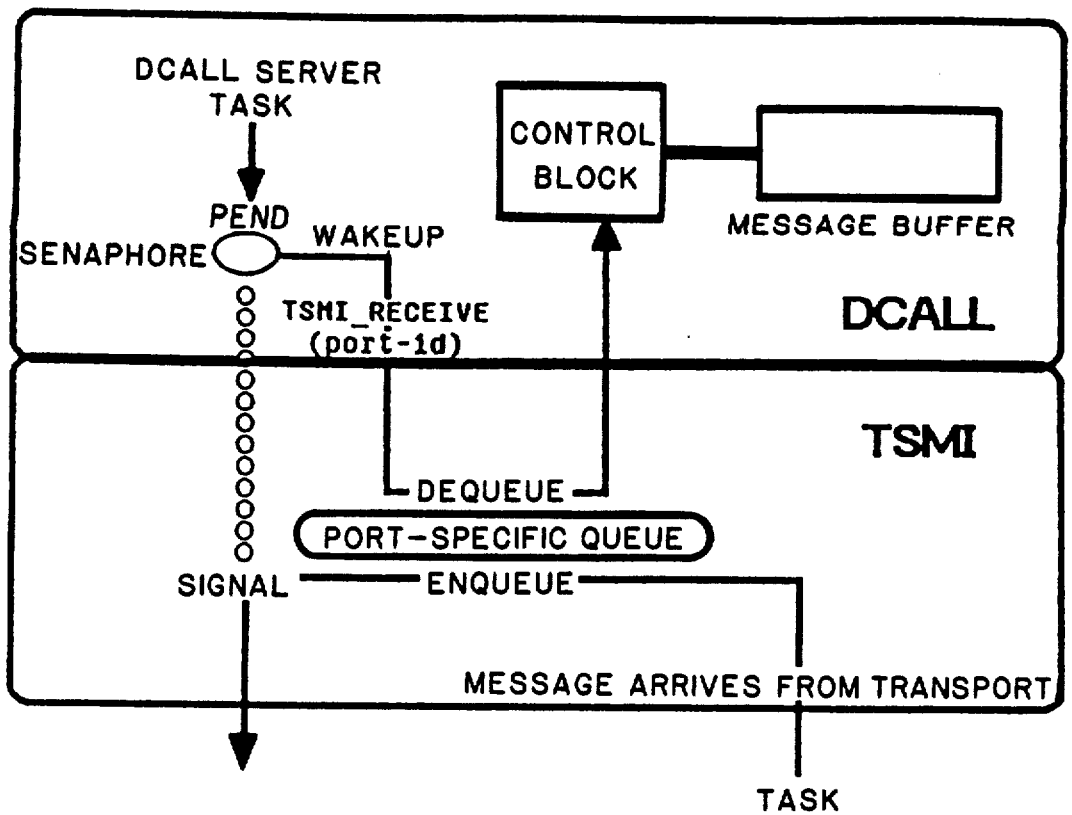
Figure 615:
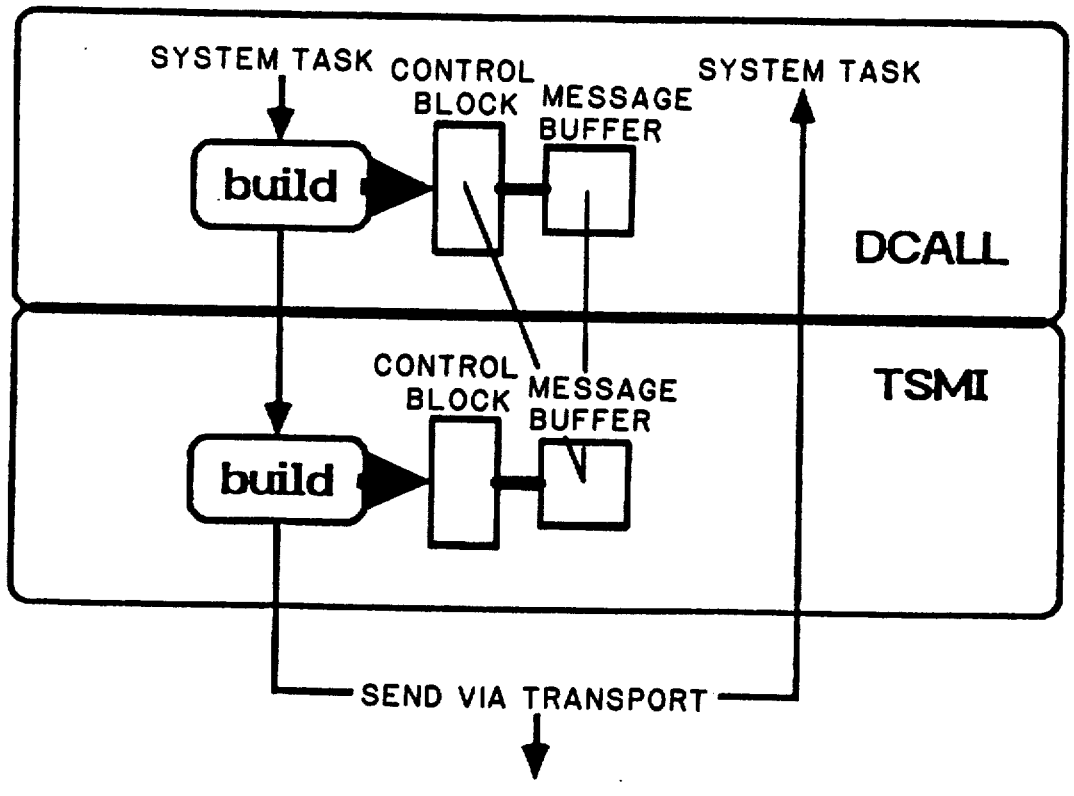
Figure 616:
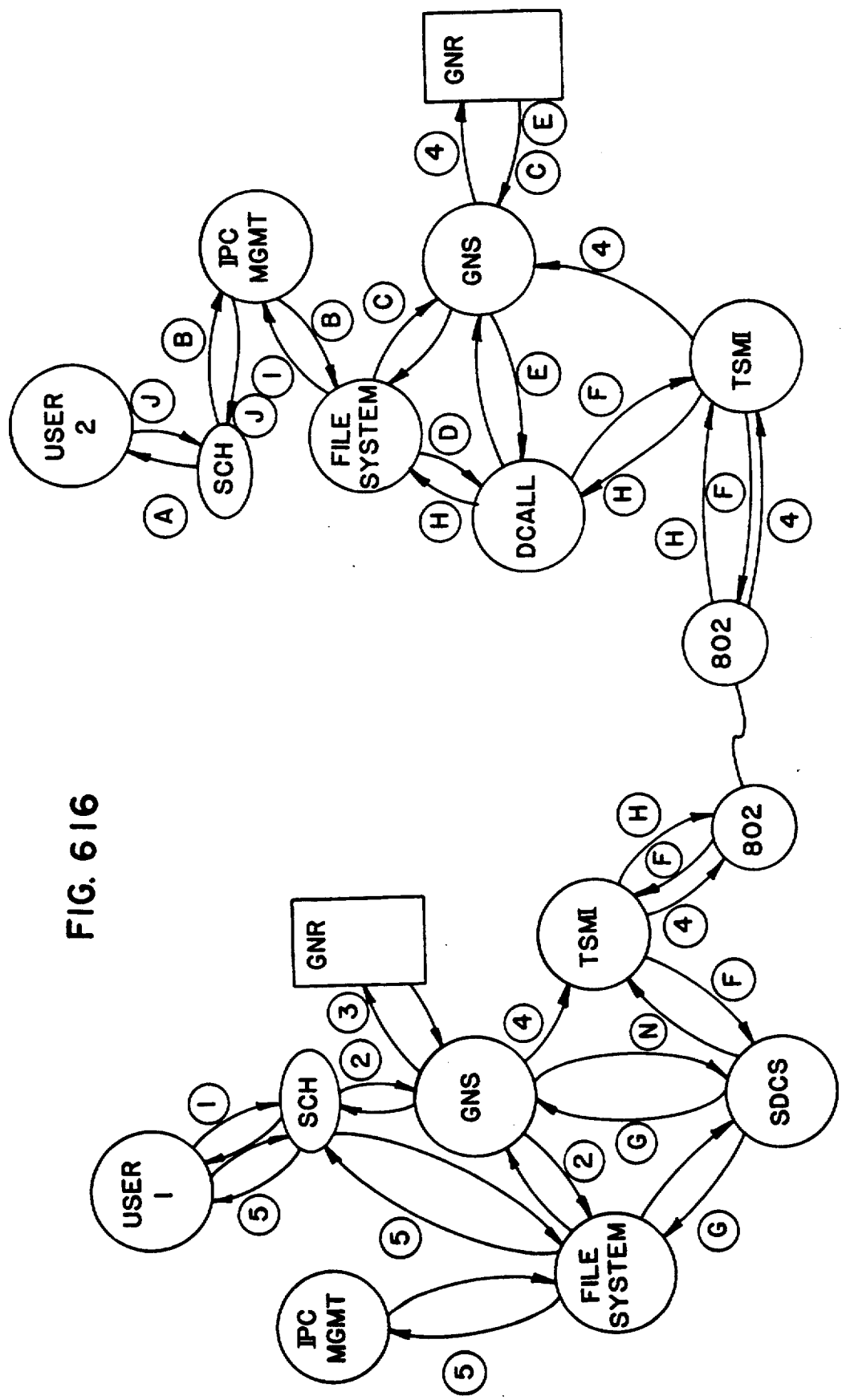
Figure 617:
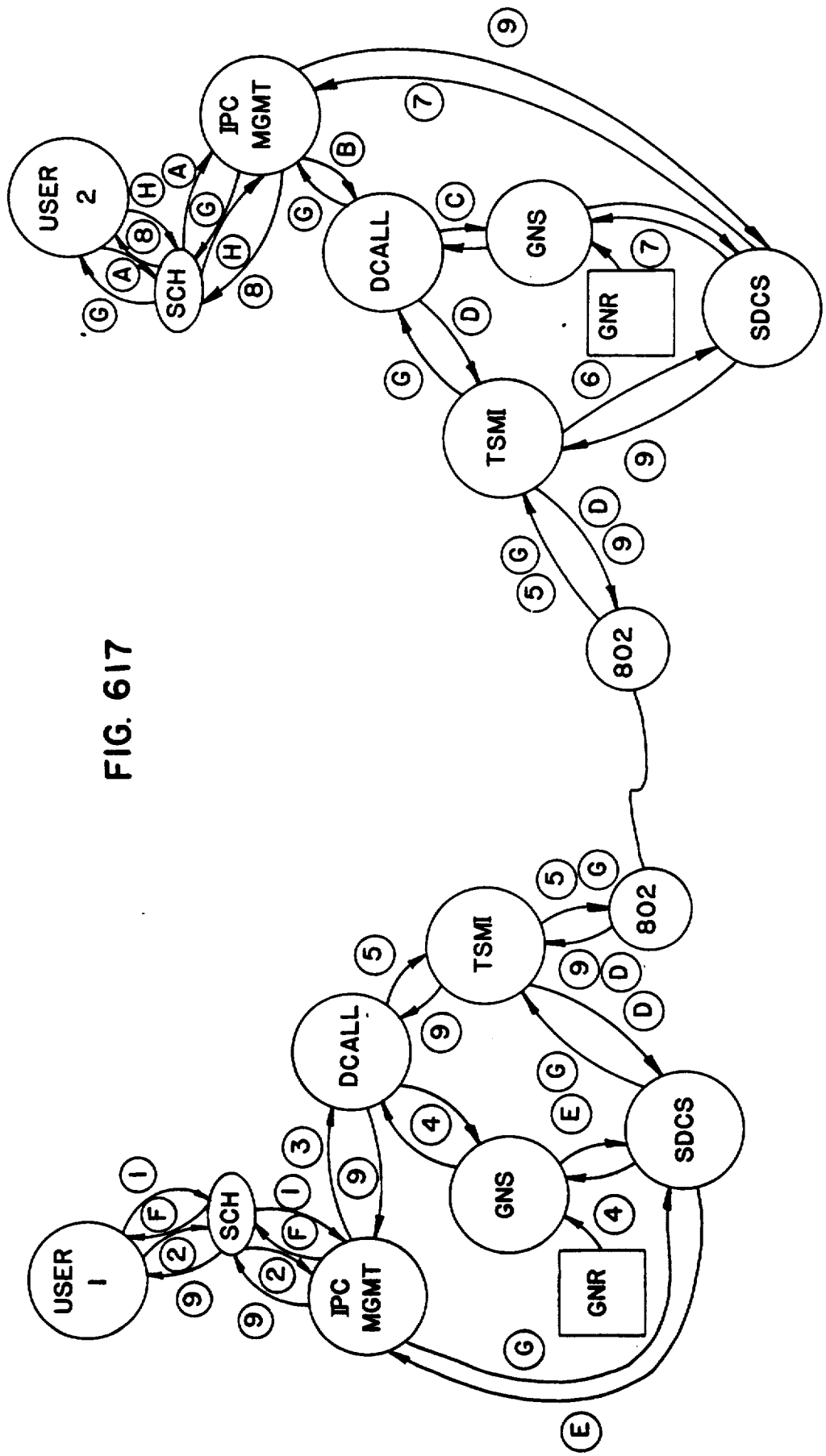

FIG. 603 depicts the tree-structuring of processes.
FIG. 604 depicts the form of the Argument Block
FIG. 605 illustrates a Deflection Call Sequence
FIG. 606 illustrates a call receiving sequence.
FIG. 607 depicts the Entity Environment.
FIG. 608 is an overview of the Transaction Service.
FIG. 609 shows the structure of the Transport Service Task.
FIG. 610 shows outgoing data flow.
FIG. 611 shows incoming data flow.
FIG. 612 illustrates the form of message buffers.
FIG. 613 shows the flow involved in a transaction.
FIG. 614 illustrates a Receive Flow.
FIG. 615 illustrates a Send/Reply Flow.
FIGS. 616 and 617 are state diagrams for examples of typical use of Operating System 501.

1.5 Overview of Detailed Description 1.5.1 Prior Art

Figure 101:
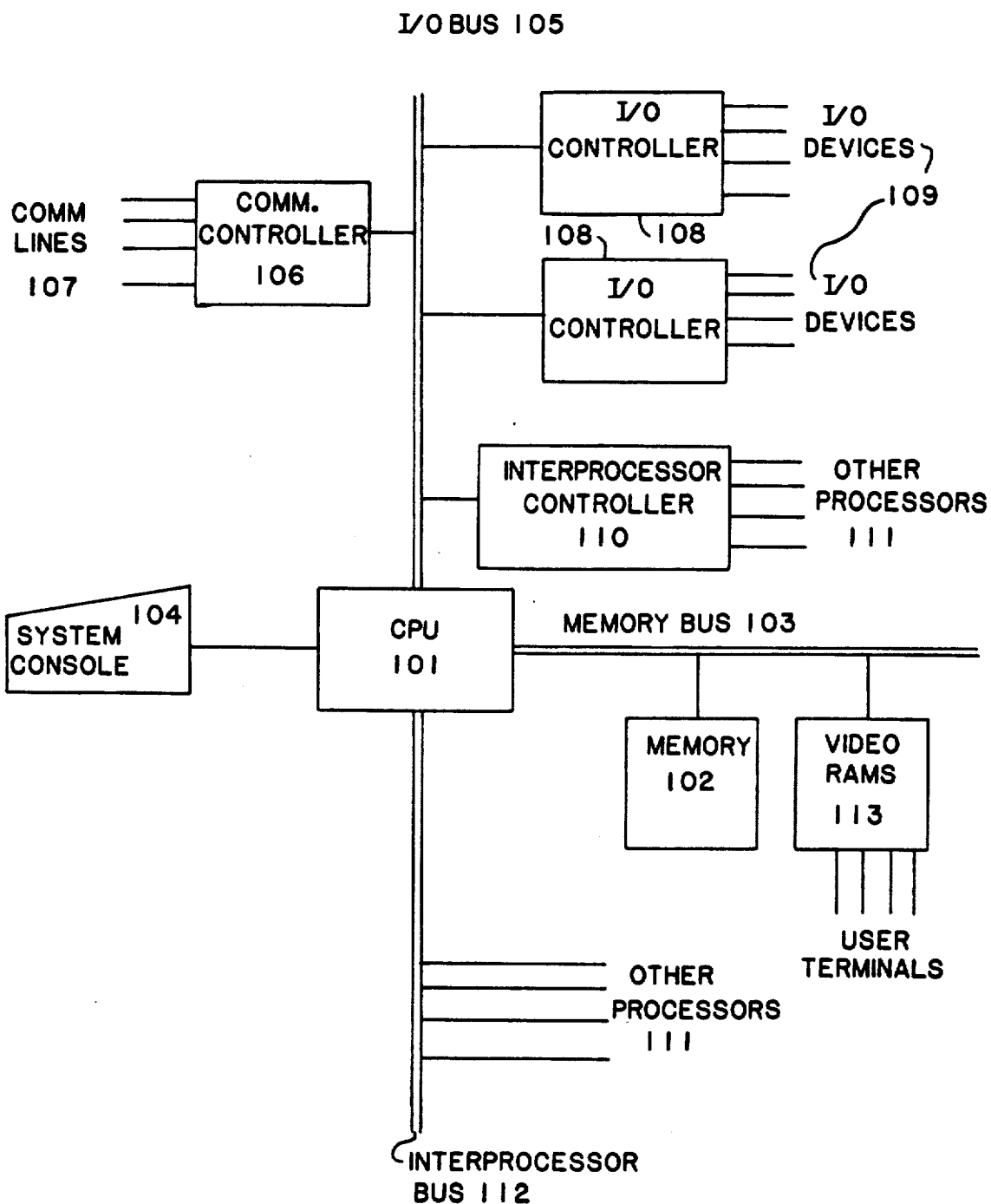
FIG. 101 (prior art) is a block diagram of a typical prior art general purpose computer employed in a distributed computer network.

Referring to FIG. 101, which is a block diagram of a typical prior-art computer employed in a distributed computer network, Central Processing Unit (CPU) 101 is the basic seat of intelligence in the computer and, as is indicated by its being depicted at the hub of all the other elements, is called upon to control all information transfers between those other elements.

CPU 101 is connected to memory 102 by memory bus 103, and must control all transfers over memory bus 103. System console 104 connects directly into CPU 101, which must control all transfers to system console 104. CPU 101 is connected to the external world by I/O bus 105, which connects to I/O controllers 108, through which transfers may be made to I/O devices 109; communications controller 106, through which transfers may be made to communication lines 107; and intercomputer controller 110, through which transfers may be made to other computers 111 comprising the distributed computer network. The controllers 106, 108, and 110 may be provided with some limited intelligence to control low-level details of transfers effected through them, but CPU 101 must provide all high-level control, setting up the controllers and overseeing returns of status information from them.

Alternatively, intercomputer bus 112 may be provided to interface with other computers 111; this may relieve some of the load on I/O bus 105, but does nothing to eliminate the problem of overhead on CPU 101.

Video RAMs 113 may be provided to contain "bit maps" of screen information for user terminals. CPU 101 provides bit map data and stores it in the RAMs in a form in which it may be displayed on user terminals.

1.5.2 Overview of the present invention

Referring to FIG. 102, an overview block diagram of computers of the present invention employed in a distributed computing network, it is seen that CPU 101 is no longer configured at the hub of all the other elements. Over Local Memory Bus (LMB) 203, CPU 101 can communicate with integrated I/O controller (IOC) 202, and memory control and I-Bus interface (MCU) 201, both of which contain sufficient intelligence to oversee their respective functions without close supervision by CPU 101. MCU 201 can establish connection between LMB Bus 203, IBus 204, and MBus 205, passing data from any one to any of the other two.

Communication between computers of the present invention configured as a distributed system, is effected by memory references. All memory locations within the distributed system are accessible to any CPU— a CPU may read from a write to a memory location associated with another CPU on the distributed system with the same facility with which it may access any of the memory locations associated with itself. All memory access requests from a CPU 201 are passed over LMB bus 203 to MCU 201, which determines from the memory address whether the desired location is associated with the local computer (the computer containing the CPU and MCU) or one of the other computers comprising the network. If the former, MCU 201 accesses the local memory 102 (or video RAM 113, as appropriate) over memory bus 205 performing the requested read or write and obtaining data from CPU 101 over LMB bus 203 (if a write) or passing data to CPU 101 over LMB bus 203 (if a read). If the latter, MCU 201 passes the request over I-Bus 204 whence the MCU 201's of all other computers on the system examine the memory address; the computer having that address within its local memory performs the memory access, the data being passed over I-Bus 204 between the MCU 201 of the computer having the memory address and the MCU 201 of the requesting computer. This feature (referring briefly to FIG. 101) eliminates the prior-art need to have an intercomputer bus (112) connected to and overseen by the CPU.

An arbitration scheme is provided to ensure that no computer can monopolize the I-Bus and that no computer can be deprived of the use of the I-Bus. This scheme is based on a rotating priority, wherein the computer that has just used the bus is given lowest priority and must wait till other requesting computers have used the bus before it can use the bus again.

Integrated I/O controller (IOC) 202 contains a microprocessor and is provided to relieve CPU 101 of detail-level oversight of data transfers between the computer and I/O devices 109, and communication lines 107. System Console 104 is grouped with other user terminals, and is does not occupy the special role it had in prior-art machines.

LMB bus 203 is provided so that communication between CPU 101, IOC 202, and MCU 201 can take place without contention from any of the memory devices 102 or 113. References to memory 102 or VRAMs 113 are "passed through" MCU 201 from LMB Bus 203 to M-Bus 205. References to memory locations of another computer of the distributed computer network are "passed through" MCU 201 to I-Bus 204.

Video Control Unit (VCU) 206 is provided ahead of the video RAMs 113 to relieve CPU 101 of much of the detailed work of modifying bitmaps for controlling displays on user terminals.

Video Expansion Unit (VEU) 207 may optionally be provided to expand the pixel size from 8 to 24 bits. VEU 207 includes additional VRAM chips, but does not result in the creation of more VRAM locations— it merely expands the size of the existing locations.

An operating system (not shown on FIG. 102, to be discussed in detail in Section 6) is provided to facilitate user access to the features provided.

In summary, the computer of the present invention is well suited to distributed processing applications, from two standpoints: one, MCU 201's ability to resolve memory requests and honor them regardless of whether the desired memory location exists in the requesting computer or some other computer of a network facilitates interconnection and load sharing by a group of several computers; and two, organization within each computer offloads functions traditionally performed by the CPU and distributes them to other areas of the computer (IOC 202 to control I/O devices, MCU 201 to handle the details of memory accesses and intercomputer communication, VCU 206 to manipulate video bitmaps).

1.5.3 Overview of the Preferred Embodiment

In the present embodiment, each computer is a 32-bit computer and is embodied on a single 15"×15" printed circuit board. Each board contains its own LMB Bus 203 which does not leave the board. Each board has a connection to I-Bus 204. Each board has a Memory Bus 205 which may leave the board and connect to optional expansion memory and video memory boards; up to 2 MBytes of memory may be accommodated on the computer board and are connected to Memory Bus 205; additional memory and video memory boards may be connected to the computer board's Memory Bus 205 to expand each computer's memory capacity.

Up to sixteen such computers (each with associated memory and video memory boards) may be accommodated in a single cabinet, the cabinet including a "backplane" comprising sockets into which all the boards are plugged, and permanent wiring interconnecting the sockets. I-Bus 204 is made up of backplane wiring and interconnects all the computers plugged into the cabinet to form a distributed computer network.

The sixteen computers may share a total memory space of 512 MBytes. As described above, any of the computers may access any location of the 512 MBytes, which may thus be regarded as a "global address space".

FIGS. 103, 104, and 105 together comprise a block diagram of one computer board, with CPU 101 depicted on FIG. 103, IOC 202 depicted on FIG. 104, and MCU 201 depicted on FIG. 105.

Referring to FIG. 103, the CPU portion (CPU 101) is a 32 bit computer which executes microinstructions at a 160 ns major cycle speed. It is controlled by a 64 bit microinstruction and uses pipelining techniques for enhanced performance. All data paths, registers and standard accumulators are 32 bits wide, while the FPU registers and functional units are a full 64 bits wide.

CPU 101 uses two internal non-architectural buses, A BUS 358 and B BUS 359. These buses connect the four major subsections of the computer: MIP (Microsequencer) 366; ATU (Address Translation Unit) 353; ALU (Arithmetic and Logic Unit) 352; and FPU (Floating Point Unit) 351. The B BUS is mainly used for transferring logical addresses from the ALU to the ATU after address calculations have been made. The B Bus also provides a path to the hardware Referenced and Modified Bit logic 356. The A BUS is primarily used to move data from memory 102 (obtained over LMB bus 203, to be discussed below) through the MIP 366 to the ALU 352. The A BUS is additionally used for loading and storing the Floating Point Accumulators (FPACs) residing in FPU 351.

The CPU communicates with other sections of the board via the LMB Bus 203, XD bus 362, and EA Bus 361. All memory requests are directed through LMB 203 to MCU 201 where the request is either granted locally (if the memory locations are in the local space), or are redirected to the global memory bus (an I-Bus request). A "Read Bus" and "Write Bus" mode is provided on the LMB which allows the CPU and the IOC to communicate without any memory response or interference. The I-Bus type request provides the path to attached computers and intelligent I/O servers.

The XD and EA buses allow IOC 202 to initialize CPU 101 by diagnosing, loading and verifying CPU Microcode Control Store 369. These are non-architectural buses; that is, they support internal, underlying functions and do not directly bear upon the execution of any user-invoked functions. The XD is a bi-directional data path which multiplexes its 16 bits onto and off of the 64 bit uWord bus. The EA path is the address path for the Control Store 369 RAMs.

CPU Block Diagram Summary

ALU-

ALU 352 is a full 32 bit ALU including 13 GP registers, a shift register and a self incrementing PC. Most operations are completed in a 160 ns cycle with the remainder of operations requiring 240 ns. It is implemented in a 135 pin PGA package.

MIP

Microinstruction Processor (MIP) 366 is a 15-bit pipelined microsequencer along with an instruction prefetch unit (enqueues, cracks and dispatches on macro instructions), the MV Architectural Clock, the Real Time Clock (RTC), and a memory data unit which accepts data from the local memory bus. The MIP contains selftest logic and provides a test-OK pin which is checked on power-up. It is implemented in a 179 pin PGA package.

ATU-

Address Translation Unit (ATU) 353 contains address translation and memory address logic (including address protection support) in addition to a 16 entry ATU cache.

FPU-

Floating Point Unit (FPU) 351 is a 64 bit floating point computer chip including the 4 Floating Point Accumulators (FPACs), a full double precision data adder with rounding, truncation, prescaling, exponent and normalization support. This chip fits into a small 64 pin PGA package.

uStore (Microstore) 369- a 16K × 64 bit RAM control store, including a parity bit which is loaded 16 bits at a time. It comprises 70 ns 8K × 8 SRAMs.

Clock Generationa multiphased clock based on 80 ns basic system clock which generates a 160 ns microcycle. A microprogrammable stretch to 240 ns is used for longer operations.

Scratchpad 365 a 2K × 32 RAM area used for microcode temporary and constant storage area. It comprises 45 ns 2K × 8 SRAMs.

Local Mem Bus Control (latches 354, 355, 364)

Interface logic to match the ATU and MIP memory control signals to the LMB protocol. This interface also includes hardware controlled referenced and modified bits which support up to 16 MBytes of local memory without microcode support.

uStore De-mux 370

Logic for loading the control store via the XD Bus.

Memory Portion

The memory portion of the board contains the main memory control unit (MCU 201) and 2 Megabytes of main memory 102 itself. The MCU also provides the control of the MBus and the control for the global I-Bus (to be described below). The MBus is also the connection for bit mapped video screens that are attached to the main memory address space (see section 5). The only communication path between CPU 101 or IOC 202 and MCU 201 is the LMB, described in detail in section 3.

The memory portion is entirely controlled by two gate arrays: CMOS-MEM gate array 561 and Bipolar-MEM gate array 562. Since the formats and protocols on the various buses are contrived to facilitate passing from one to the other, these two gate arrays are basically traffic directors and error checking devices which control all the interactions that take place among the LMB, and I-Bus and the MBus.

The LMB and the I-Bus are the two busses that can initiate memory operations. The LMB initiates all local memory accesses while the I-Bus initiates all accesses of this particular node from other global nodes. The MBus is essentially an internal bus to this memory portion which carries the actual address and data of the local RAM's themselves. This bus is "raw", unaligned, uncorrected data which is stored in the RAMs themselves. This MBus has expansion capability so that up to 16 Mbytes can be addressed by this MCU (the two gate arrays) without adding more control. Thus, the MBus goes off-board so that additional memory can be added either in the form of standard DRAMs or in the form of memory mapped graphics.

To illustrate the flow of a memory access, consider a CPU reference. The reference is initiated by the CPU via the LMB. The MCU (combination of CMOS and Bipolar MEM gate arrays) recognizes the start of the memory operation. It then makes a determination of whether the reference was a local reference—i.e. to this node—or a global reference. Assuming it was local, the MCU generates the proper RAS and CAS (row address and column address) lines to access the required data. (The RAS and CAS lines are part of the MBus, and will be discussed in detail in Section 4.) Either the memory array on the board itself (2 Mbytes) or an external expansion memory on the MBus will respond with the data. The MCU now directs that data back onto the LMB and signals the computer that the data is available. If the data required aligning or correcting, the MCU would have taken the data into the gate arrays themselves, manipulated it as required, and rebroadcast the data back onto the LMB prior to signaling the computer.

Had the reference been global—i.e. not for this node, then the MCU would not have issued the reference on the MBus. Rather, the MCU would have begun arbitrating and re-initiating the reference onto the I-Bus. The responding I-Bus node will return aligned, corrected data back via the I-Bus at which time the MCU will direct the data back onto the LMB, buffering the data as necessary.

Memory Block Diagram Summary

The memory portion of a computer board is designed around MCU 201 which comprises two gate arrays:

CMOS-MEM 561

This Fujitsu CMOS C8000VH series gate array is implemented in a 179 pin PGA package. Its main functions include: Error Detection and correction circuitry (correct all single bit errors and any double bit errors that contain at least one hard bit failure); Refresh and Sniff control; Read-Modify-Write control; data alignment; interrupt and special function control.

Bipolar-MEM 562

This Motorola 2800ALS series gate array is an ECL internal gate array. This primary MCU control chip is necessary for high speed response to memory requests. The major functions of this array is: Address recognition; Data flow direction; Bus arbitration (both i Bus and LMB); initial Address generation; and Error detection (correction is done in the CMOS array).

MBus 205

The Memory Data Bus is the common data path for transmitting data to and from all system memories 102 (including the 2 Megabytes that can be on-board) and VRAMs 113.

LMB 203

The Local Memory Bus is the communication path from the local computer (CPU portion) and from the local I/O portion. This is a specified bus interface which is recognized by the MCU and is described in detail in section 3.

IBus 204

This I-Bus is a global memory bus which connects computer nodes via a common memory space. Section 2 describes this bus in detail.

Main Memory 102

The Main Memory block represents 2 Mbytes of 256K DRAMs organized into 512K × 39 bits. The 32 bit data words and 7 ERCC bits implement a portion of the memory address space. It is two way interleaved to enhance consecutive access performance. Additional off-board memory may be connected to MBus 205; this may additional main memory 102, or VRAMs 113 for storing screen bit maps (see section 5).

Integrated I/O Portion

IOC 202 (FIG. 104) is designed to support the base system I/O devices as well as SCP (system console processor) functions. This subsystem, run by a microprocessor, is the only intelligent part of the board upon power-up. Its SCP functions include: booting the rest of the system (including CPU microcode load); acting as a system console computer during normal run time; and diagnosing the system on failures. The I/O function provides the board with device support for the basic integrated I/O devices. This includes:

an SCSI (small computer standard interface) Bus Host-Adapter Interface 468 an SA400 Floppy Diskette Controller 467 an Ethernet IEEE802.3 LAN Controller 480

Four RS232C Asynch Channels 459 (1 w/modem support)

a parallel Printer Port 460 a battery-backed-up Time-of-Boot Clock/Calendar 457

The Local Memory Bus Interface is the primary communications channel between CPU 101, IOC 202, and MCU 201.

The integrated I/O subsystem is centered around the 80186 microprocessor 451 and its associated 16 bit uPAD (microprocessor Address/Data) Bus 465. The microprocessor controls the power up sequence by holding the CPU portion and Memory portion of the board in Reset state. (This microprocessor is the sole controller of the system RESET signal which resets all IBus nodes as well as this computer node.) Using microprocessor firmware stored in the power up PROMs 452, it does a self-check, verifying enough of this section to read more microprocessor firmware off of a disk into the ucomputer RAM Memory. Any failure to this point will be displayed on the front panel LED 458 which is under control of the 80186.

Once the uP Memory is loaded with a full complement of firmware, a more complete power-up diagnostic is run, including the MIP gate array selftest pin (see CPU section), other CPU testing, memory testing and video display indications. The microprocessor then boots in host microcode from the boot device (Floppy or SCSI Winchester) into the CPU control store using the XD and EA Busses. It then finishes the power up diagnostic testing and starts the CPU.

During normal run time, IOC 202 services devices connected to it. All communication with CPU 101 takes place through buffer 484. CPU 101 forwards requests over LMB 203 using the WRITE BUS function to be explained below, which does not involve MCU 201 or memory 102 but which results in writing into buffer 484. The microprocessor does the interpreting, scheduling and device control of these requests in parallel to normal CPU execution. To aid in this function, the IOC includes a DMA channel 476 directly connected to the LMB for non-host-assisted main memory accesses. In this way, the Integrated I/O subsystem is acting as an independent I/O computer to the host. Data for output are likewise placed by CPU 101 into buffer 484. Input data are placed in buffer 484, from which CPU 101 may read them over LMB 203 using the READ BUS function (explained further below) which does not involve MCU 201 or memory 102. The WRITE BUS and READ BUS functions of LMB 203 eliminate the prior-art need (referring briefly to FIG. 101) to have an I/O bus and a memory bus both connected to and overseen by the CPU.

Integrated I/O Block Diagram Summary 80186 microprocessor 451

All the integrated I/O devices are managed using the Intel 80186 microprocessor. The main purpose of the microprocessor is to field I/O requests, supervise I/O data traffic & provide I/O status on completion of a data transfer. The microprocessor also gives the system power-up & diagnostic intelligence with which to load/verify Control Store RAMs.

The 80186 microprocessor features include: a 16 bit data bus; 2 integrated DMA controllers and interrupt support. It has a 1 Mbyte address space which allows all the I/O controllers to be memory mapped as well as the CPU Control Store. The 80186 will be run at 8 MHz in order to maximize its performance.

Power-up PROM 451 and NOVRAM 453

The integrated I/O portion contains two 2K × 8 PROMs and a non-volatile RAM (32 × 8). The PROMs are used for power-up diagnostics and a Floppy/SCSI loader to complete the power-up procedure. The NOVRAMs (non-volatile RAMs) are used to store configuration information, serial numbers and LAN address information to reduce hardware jumpers and repetitions user input.

uP Memory and Buffer 484

This is a 32 KByte shared memory area. Approximately two thirds of this space is used for 801 code to control the LAN, I/O devices, Host Interface, and SCP functionality. The remainder of the space is used for data buffering to insure high bandwidth burst data movement support.

The RAM consists of four 8K × 8 CMOS static RAMs with access times of 70 ns. The buffer is configured to be a 16K × 16 bit space from the 80186/LAN side and 8K × 32 bit space from the Local Memory interface side.

The buffer memory system will be shared by LAN, Local Memory and 80186 DMA via time slot allocation. Data is packed into the buffer in DG format. (lower addressed bytes are leftmost). A byteswap/wordswap is performed at a set of transceivers between these RAMs & the UPAD bus. This allows the LAN & the 80186 to access the contents of the buffer without having to perform software byteswapping.

LMB DMA Control 476

Communication to the Local Memory Bus (LMB) is controlled by this part of IOC 202. The LMB provides a path both to main memory and to CPU 101.

For communication to main memory, this section provides a direct memory access state machine which does not require 80186 firmware control. A 9-bit DMA Double Word Counter and an address pointer/counter is provided to facilitate the transfer. Each memory access is either a double word (32 bits) read or double word write. By loading the DMA Double Word Counter with a number between 0 and 511, up to 1 page (2Kb) of data can be transferred at one time. This interface will support a transfer rate of 7.6 Mbytes/second.

Integrated I/O to CPU communication is handled by Special Read and Special Write commands on the LMB (RX and WX). (See Section 3.) (Memory residing on the LMB will not respond to RX/WX commands which allow non-memory operations.) The I/O to CPU communication is accomplished by the CPU reading and writing to the uP Memory and Buffer (see above) via RX and WX commands on the LMB. Blocks of data are loaded into or read from that buffer by the CPU which then signals the 80186 via an interrupt line. The 80186 then processes that data block in an appropriate manner (specified by the data block itself), and, in turn, the 80186 will signal the acceptance or completion of that block via a dedicated signal to the CPU which causes a micro level trap (microcode visible but not macrocode visible).

Floppy Disk Controller 467

Support is provided for two 5.25" Floppy Diskette drives. The target drives record data at 96 TPI and have a 737.28 KByte capacity.

The drives will be controlled by the Fujitsu MB8877 Floppy Disk Controller chip, packaged in a 40-pin DIP. The microprocessor initiates all floppy disk operations while the MB8877 chip itself performs DMA transfers between Floppy disk & the Buffer RAM area utilizing one of the microprocessor's DMA ports. The Floppy controller has priority over the SCSI DMA Channel since the SCSI tranfers can be held off indefinitely.

The SMC FDC9229BT Floppy Interface Chip, which performs the functions of write-precompensation, digital data separation & head-load delay is used in conjunction with the MB8877 chip.

SCSI Bus Controller 468

The SCSI Bus Controller provides access to SCSI compatible devices, particularly Winchester type disk drives and magnetic tape drives. The SCSI Bus Interface, acting in a Host-Adapter mode, allows up to 7 SCSI Formatter cards (Controllers, CPU's etc. 0 to be connected together on the SCSI Bus. This bus is 8 bits wide (plus parity) and transfers data at a an Asynchronous rate of 1.5 MBytes/sec. Drivers and receivers are single-ended.

The controller chip is the NCR SCSI Protocol controller. This controller performs DMA transfers between SCSI and the RAM Buffer area by using one of the 80186 DMA channels.

LAN Controller 480

The IEEE 802.3 CSMA/CD Local Area Networking protocol is supported. This communications protocol is rated at 10 MBit per second utilizing coaxial cable. Up to 100 stations may be connected together using a miximum cable length of 500 meters. It is implemented using the Intel 82586 LAN Controller & the SEEQ 8023 Manchester Encoder/Decoder.

The Intel 82586 LAN controller chip fully implements the IEEE 802.3/Ethernet Data Link specification. On-chip control includes DMA memory management and microprocessor hold-off control allowing it to operate as a cocomputer on the UPAD bus and using the same RAM Buffer as the 80186. The SEEQ 8023 Manchester Encoder/Decoder completes the Ethernet interface by connecting directly to the Intel 82586 on one side and to the Ethernet transceiver box on the other side.

Ethernet nodes are identified by a distinct 48-bit address. The high 24 bits are fixed for Data General Corporation at 08001B (HEX). The low 24 bits are set individually with the board's serial number during the manufacturing process. This number is stored in NOVRAMs 453.

DUARTs 454, 455

The integrated I/O portion supports 4 RS232C Asynchronous ports 459 using two Signetics 2681 DUARTs. Each DUART provides programmable features which include: Independent baud rates; Data format selection (bits/char, stop bits and parity selection); duplex selection; and overrun detection.

Of the four ports, one is full-featured, including modem control, a second supports hardware Busy, and the remaining two are simple, requiring software Busy control.

Parallel Printer Port 456

IOC 202 supports an 8-bit parallel printer port. Either Centronics type or Data Products type parallel devices can be connected to this port.

Boot Clock/Calendar 457

The Ricoh RP5C15 Clock/Calendar chip is used to provide the system with the current time & date during the boot procedure. The +2 V at 15 uA required to keep this chip backed up while standard power is not applied must be supplied to the board via a backpanel pin. This will be provided by 2 AA cells found in a user-accessible location. The Time of Day and Date will be accessed once during power up. The time is then kept track of by the host itself. This chip can be read only via the SCP once the system is up, but can be written under host software or SCP control.

Front Panel LED 458

The 80186 directly controls the display of a 7 segment LED located on the front panel 461. The decimal point of the LED is a POWER-OK indicator and will be lit when the 80186 detects POWER-OK as signalled by the power supply. The 80186 firmware directly controls each of the 7 segments of the display which will be used to signal failures detected during the microprocessor's diagnostic procedures.

Operating Systems

Operating System (OS) 501 and the AOS/VS operating system (a prior-art operating system marketed by Data General Corporation) will both run on the system. OS 501, however, is the target system and thus will be designed to take advantage of certain features not currently supported in AOS/VS. The major software features include:

All Bit Mapped Graphic displays
UNICORN interfaces for integrated Printers, Disks and Tapes
Auto-Power-Up with automatic system generation, sizing, configurations and date/time
I-Bus support of attached computers and foreign operating system environments
Extensive Windowing support
LAN based transparent file and computer sharing
Multiple OPUS computer support AOS/VS will require some modification in I/O device handlers. There will, however be a device code 10 and 11 emulator built into the hardware for compatibility. This emulator is neither efficient nor expected to be permanent, but rather, included to help in the transition away from the 10 and 11 dependency.

All standard software languages and higher level program applications will run unmodified.

2. Detailed Description of MCU 201

The I-BUS, or Interface Bus, is a 32-bit interconnection system for processors and memory. The I-BUS allows nodes (such as processors and memory controllers) on different P.C. cards to talk to each other.

Physically, the I-BUS is a set of wires connecting two or more P.C. boards in a single chassis. The nodes talk to each other (that is, send or receive data) over these wires. Each node has its own MCU 201, which forms the interface to the I-BUS. This interface takes the data and data requests from the node and translates them into the proper protocol to send on the I-BUS. The protocol determines what can be sent, when and where it can be sent, who can send it, and how it can be sent.

This protocol is what makes the I-BUS conceptually unique from any other data bus or set of jumper cables. It is intended to achieve the following:

One common backpanel system for all processors
Transfer capability for 8 bits, 16 bits, 32 bits, and 256 (8×32) bits
Pipelining of priority arbitration
Equality in bus access for all nodes
Able to support up to 16 nodes
High transfer rate
Multiprocessor and attached processor support
Fault detection
Simple to reconfigure
Designed to work as extended memory bus in MV architectural environment

2.1 Sectional Overview

Definitions

To aid in understanding the following information, a list of common terms and their definitions is given below.

Node
An entity connected to the bus that drives and/or monitors signals on the bus lines.

Backpanel
A p.c. board that runs parallel to the back of the card cage. It contains the interconnections between the individual cards as well as the sockets into which the edge connectors on the cards are inserted.

Slot
A location on the backpanel into which a p.c. card is inserted. A node can occupy more than one slot, but each slot can belong to only one node.

Arbitration
Using a priority system to determine which node will be allowed to use the bus next when two or more nodes request the bus at the same time.

Master
The node that has gained control of the bus.

Slave
The node responding to a command from a Master.

Requester
A node that is requesting use of the bus.

Transaction
One complete operation on the I-BUS, usually involving transmission of data from one node to another.

Phase
Several phases comprise a transaction. Each phase represents a specific event during the transaction, such as an Arbitration Phase.

Period
One full cycle of the bus clock signal.

Interface
The physical part of a node that is directly attached to the bus and is responsible for sending and receiving bus signals. The interface usually acts as an intermediary between the bus and a local processor or memory, translating local commands into the necessary bus protocol.

2.1.1 Purpose

The primary purpose of the I-BUS is to allow fast communication between individual processor nodes and distributed global memory in a 32-bit system. An explanation of those particular goals stated in the introduction is listed below:

One common backpanel system for all processors:
The one set of interconnections on the backpanel will handle all processors.

Transfer capability for 8 bits, 16 bits, 32 bits, and 256 (8×32) bits:
Bus instructions will be available to transmit data in the previously listed sizes.

Pipelining of priority arbitration:
Determination of which node will get the bus next can be done before completion of the current bus operation.

Equality in bus access for all nodes:
No node can monopolize the bus; No node can be deprived of the bus: Using a dynamic priority system (instead of fixed priority, Every node is guaranteed periodic access to the bus.

Able to support up to 16 nodes:
This is the absolute maximum for a single chassis system. Typical systems will have fewer than 16 nodes.

High transfer rate:
The bus clock frequency is 80 ns. The maximum transfer rate for single transfers is 25 Mbytes/s and for block transfers is 44.4 Mbytes/s.

Multiprocessor support:

The bus protocol supports multiple co-equal independent processing nodes.

Fault detection:

Byte parity will be provided with all data transmission.

Simple to reconfigure:

No jumpers are required in slots that are not filled.

Also special instructions will make it easy to determine upon initialization the properties and capabilities of each node on the bus.

Designed to work as an extended memory bus in prior-art MV architectural environment:

The I-BUS addressing scheme is compatible with the physical addressing mode in MV architecture.

An efficient use of the I-BUS is in a system where each node executes out of its own local memory. If one or more processors requires an I-BUS access for each operation, system performance can be severely degraded. As will be discussed in section 6, the operating system facilitates allocating data to the local memory of the node where the programs accessing that data most frequently are executing.

2.1.2 Signals

2.1.2.1 Signal Groups

Physically, the I-BUS consists of 61 lines. These are divided into three groups: data/address lines, bus arbitration lines, and utility lines. Below is a breakdown of the three groups. (The ^ symbol appearing before a signal name means that the signal is "low-true".)

| Data/Address: | | |
|---|---|---|
| 32 | ^DA<0-31> | data/address lines |
| 4 | ^PDA<0-3> | byte parity of data/address lines |
| 1 | ^AV/ MW | address valid/Master wait |
| 1 | ^SWAIT | Slave wait |
| 1 | ^XV | transaction valid |
| Bus Arbitration: | | |
| 16 | ^BREQ<0-15> | bus request lines |
| 1 | ^BBSY | bus busy |
| Utility: | | |
| 1 | ^ARBRST | arbitration reset |
| 1 | ^BUSCLK | bus clock |
| 1 | ^CACHE | encache |
| 1 | ^PWRFAIL | power fail |
| 1 | ^PWRUPRST | power up reset |
| total 61 | | |

2.1.2.2 Data/Address signals

There are 39 signal lines in the data/address group. They are as follows:

DA<0-31>-Data/Address

These are used for the actual transmission of the address and data.

PDA<0-3>-Parity

These contain the byte parity generated during data and address transmission.

AV/MW-Address Valid/Master Wait

This is used by the Master to tell the Slave that an address is present on the Data/Address lines.

SWAIT-Slave Wait

This is used by the Slave to tell the Master that it is not ready for the next transmission of data yet.

XV-Transaction Valid

The Slave uses this to let the Master know that no error has been encountered in the processing of the current request. Errors can include: bus parity error, illegal request, or multiple bit errors in memory.

2.1.2.3 Bus Arbitration Signals

There are 17 lines in the Bus Arbitration group. They are as follows:

BREQ<0-15>-Bus Request

These are used to request the bus and to determine who will be granted access to the bus next.

BBSY-Bus Busy

This is used to indicate that a node is currently using the bus. It is driven by a Master.

2.1.2.4 Utility Signals

There are five utility signals on the I-BUS. They are as follows:

ARBRST-Arbitration reset

This causes all nodes to reset their priority to the initial value after startup.

BUSCLK-Bus clock

This signal is generated by only one node and is sent to all nodes. It is used to synchronize and clock all actions on the I-BUS.

CACHE-Encache

This is used to tag data as being encachable for processors with local caches.

PWRFAIL-Power failed

This signal is asserted by the power supply when it is determined that a power loss has occurred that is sufficient to affect the bus.

PWRUPRST-Power up reset

This is provided by the power supply to inform the node that the system has just powered up.

2.1.2.5 Signal States

All signals on the I-BUS use "low-true" implementation. That is, a signal is considered activated, asserted, or representing a "logic 1" when there is a voltage present corresponding to a low TTL voltage level. A signal is considered released, de-asserted, or representing a "logic 0" when there is a voltage present corresponding to high TTL voltage level. When referring to the actual electrical content of the signal line, the ^ symbol will appear before the signal name indicating its low-true status. When describing the logical contents of the signal line (1's and 0's) the ^ will not appear with the signal name.

2.1.3 Address/Data

2.1.3.1 Normal Address Space

As will be described in section 2.5, "Commands", command encodings are provided to access "normal space", and "special space". All system memory is part of normal space.

The I-BUS operates in an addressing mode corresponding to that of the physical addressing mode of 32-bit prior-art "ECLIPSE" systems manufactured by Data General Corporation. Physical addresses generated by ECLIPSE address translators correspond to the addresses that appear on the I-BUS.

The I-BUS has a limit of 512M bytes of normal addressing range. This is typically organized in double word format; that is, each memory location can be thought of as being 32 bits wide (two 16-bit words). Individual bytes and single words can be accessed as well as double words and blocks of 8 double words.

The 512M bytes of addressing range is divided into 4096 segments of 128K bytes each. Each node on the I-BUS will be assigned one or more of these segments for its own address range. If a node has less than 128K bytes of physical memory available, it will be assigned more than it actually needs. In that case, it will be up to the requesting node to know the correct range.

Assignment is done by a single designated Master node called a System Configurator Node. Assignment is done after a node has powered up and performed all necessary local initializations. The initial memory assignment usually remains with a node unless there is a power failure or a system reset.

It is not necessary that all 4096 segments get assigned somewhere. However, Master nodes must take responsibility for generating valid destination addresses.

All addresses are accompanied by parity bits. The data/address lines are divided into 4 groups of 8 lines with each group having its own corresponding parity line. Parity lines generate odd parity for both address and data transmission.

2.1.3.2 Special Space

While system memory is, as described immediately above, addressed as normal space, the primary reason for special space is to allow access to things such as processor registers, PROM, or static RAMs by assigning addresses to them. Special Space access will be handled through special commands. Data can only be read or written to Special Space in 32-bit even double-word format.

Each node's special space is addressed by a combination of the node ID number and a 23-bit offset. Thus, each node has 8M (32-bit wide) Special Space addresses available, regardless of how much normal memory space addressing range has been assigned to it.

The upper 16 locations of each node's special space are reserved for certain interface registers used during I-BUS operation.

2.1.3.3 Data transmission

Data can be sent across the bus 8 bits, 16 bits, or 32 bits at a time. For 8 or 16 bits, the contents of the remaining data lines will be undefined. The four parity lines generate odd byte-parity for data transmission in the same manner as for address transmission. For 8 and 16-bit transmission, correct parity will be generated for all 4 bytes.

Each data transmission can take as long as needed. One control line is used to hold up the bus until the sender can place the entire data on the bus. Another control line is used by the receiver to hold up the bus until it is ready to receive the data.

2.1.4 Bus Arbitration

Priority arbitration follows these rules:

(1) When two or more nodes wish to use the bus at the same time, the node with the highest priority is granted access first. If only one node is requesting the bus, it is granted access regardless of its current priority.

(2) The last node to access the bus becomes the lowest priority node. The node following it becomes the highest priority node.

(3) Priorities are assigned from highest to lowest with the same progression order as that of the slot numbers (0,1,2 . . . 15). Slot 0 always follows slot 15 on wraparounds (e.g. 5,6..15,0,1..4).

(4) Each access can consist of one of the following:
A single 8, 16, Or 32-bit transfer
A single block (8×32) transfer
A bus locking operation (such as a combination read-write)

Below is an example of a sequence of requests and the resulting arbitrations.

| Node(s) requesting | Current priority | Node granted access |
| --- | --- | --- |
| idle | 6,7 . . . 15,0,1 . . . 5 | — |
| 3 | 6,7 . . . 15,0,1 . . . 5 | 3 |
| 3,5,6 | 4,5 . . . 15,0,1 . . . 3 | 5 |
| 3,6 | 6,7 . . . 15,0,1 . . . 5 | 6 |
| 3 | 7,8 . . . 15,0,1 . . . 6 | 3 |
| idle | 4,5 . . . 15,0,1 . . . 3 | — |
| 0,1 | 4,5 . . . 15,0,1 . . . 3 | 0 |
| 1 | 1,2 . . . 15,0 | 1 |
| 1 | 2,3 . . . 15,0,1 | 1 |
| idle | 2,3 . . . 15,0,1 | — |

Immediately after initialization, the node in slot 0 will be the lowest priority node. It is not necessary to have all slots filled in order to arbitrate properly. Any unused slots will be ignored during priority arbitration.

Priorites do not change when the bus is idle.

2.1.5 I-BUS Operation 2.1.5.1 Node Register Requirements

Each of the nodes on the I-BUS are required to have several registers available for access by other nodes on the bus. These registers are used to store I-BUS specific information. The registers are assigned address locations in special space. They are then accessed through normal special space commands. Since most of these registers are less than 32 bits wide, they are returned in the low order DA lines with the upper lines ignored.

Many of these are control registers and not true memory locations. Some have restrictions on global access and some perform special functions when written to. These special characteristics are summarized in the following register descriptions:

Memory Base Register (Location 7FFFFD)

This contains a 12-bit number that corresponds to the starting segment of addressing range for that node. This is read/write accessible to any Master.

ID register (Location 7FFFFF)

This contains a 16-bit code for the type of board that the node represents, for example: processor, memory, etc. This is read accessable to any Master (writes are undefined).

Node Number Register (Location 7FFFFC)

This contains the 4-bit node number assigned to the interface when it powered up. All special commands are addressed to a node by its node number. This is read accessible by any Master (writes are undefined).

Memory Size register (Location 7FFFFE)

A 12-bit register containing the local memory size in 128K-byte blocks. This is read/write accessable to any Master.

Interrupt register (Location 7FFFF8)

A 16-bit register for interrupt requests from other nodes. Each bit can represent an interrupt request from a node with the corresponding slot ID. This is read/write accessable to any Master. Writing a "1" to any bit will set that bit, whereas writing a "0" will have no effect.

Mask-out register (Location 7FFFF7)

A 16-bit register for bits to mask out those of the Interrupt register. This is read/write accessable to any Master.

Status register (Location 7FFFF9)

A 16-bit register containing status bits for things such as initialization, hardware resets, and errors in transmission or commands. This is read/write accessable to any node. Writing a "1" to a bit will clear that bit, whereas writing a "0" will have no effect.

Data Latch (Not accessible in Special Space)

A 32-bit register containing the last 32-bit doubleword written to that node. This is read accessable to the local node only. It is written to implicityly on every memory write to that node.

Interface Status register (Location 7FFFFB)

A 1-bit register indicating whether or not the interface is fully functional. This is read/write accessable to the local node only.

Loopback Control Register (Location 7FFFF6)

Any write to this 1-bit register will initiate the Loopback diagnostic sequence. This is used for testing the data path of the node. The next command to that node will use the data latch, that is, any data stored or read will be to or from this register. The node's data latching and address decoding circuitry can be tested without disturbing any internal memory locations. This is read/write accessible to any Master, however any command will reset the sequence, so there is no point in reading the status of the loopback control register.

Global Access Enabled Register (Location 7FFFFA)

This 1-bit register controls a node's access to remote memory locations through the I-BUS. If this register contains 0, the node is prevented from making any memory references on the I-BUS. If this register contains 1, the node is allowed to make memory references. This register does not prevent special space accesses. This register is read/write accessible to any Master.

2.1.5.2 Power-up

The power supply determines when the individual nodes may begin bus initialization. A single node, determined by system configuration, begins sending the bus clock. Bus clock frequency is set at 80 ns. When the bus clock appears on the line, each node undergoes a self-test. If the self-test is complete, the node can place itself on-line.

At this point, the system configurator node will begin issuing commands to the other nodes in the system. The system configurator node will run a diagnostic test to make sure that all nodes are operational. It then determines the memory requirements of each node and assigns the appropriate address range. It will also issue an arbitration reset the initializes the priorities of all the nodes (giving itself the lowest priority).

The system configurator node does not necessarily have to generate the bus clock signal.

2.1.5.3 Normal Operation

Bus operation is divided into four phases. They are as follows:

Arbitration phase

Each node inspects the arbitration lines. The node granted access will proceed through the other three phases. This can overlap with the previous Data phase.

Address phase

The address for the data (source or destination) is sent to the appropriate node.

Data phase

The receiving node waits until the sender announces the presence of data on the bus.

Transaction validation phase

The receiving node sends a signal to the sender acknowledging correct completion of the transaction.

Once initialization and memory assignment are complete, the I-BUS becomes idle until requested. In idle state, the only signal active is the bus clock.

Normal operation begins with one or more nodes requesting to use the bus. This initiates the bus arbitration phase, during which the highest priority node is granted access. Bus operation then proceeds to the address phase. After the address has been placed on the bus, each node inspects it to see if the address is within its own assigned address range. Following the address phase comes the data phase. This can be as long as necessary to get the data on the bus and latched into the receiving node. Once this occurs, transaction validation begins. If everything has gone correctly, a transaction valid signal is sent and the bus operation is complete. If no other node has requested the bus, the bus returns to idle state.

The bus arbitration phase, address phase, and transaction validation phase must be accomplished in one bus clock period each. The data phase can take as many clock periods as necessary.

Three sequences of events occur in typical operation of the I-BUS: single transfers, block transfers, and bus locking operations. A single transfer involves sending one byte, word, or double-word from one node to another. A block transfer involves sending a block of 8 double words to/from a node from/to consecutive locations in another node. A bus locking operation consists of holding the bus to complete more than one transaction without using additional arbitration.

A single transfer starts with an arbitration phase followed by an address phase, data phase, and finally, a validation phase. A block transfer has the same arbitration phase and address phase but has a much longer data phase during which data is sent out 8 times, once for each 32-bit portion of the block transfer. Only one transaction validation accompanies the entire block transfer. Thus, no attempt is made to point out which of the 8 double words contained the error.

A bus locking operation also locks the Slave processor out of its local memory to prevent memory contention. The memory is not released until the transaction is completed. Only the node addressed at the start of the operation will be locked out. It is therefore important to restrict all transactions to the same node during a bus locking operation.

The transaction validation phase only indicates that an error has occurred in the preceeding transaction. It does not indicate the nature or location of the error.

2.1.5.4 Power Down/Powerfail

The power supply provides to the bus a signal called PWRFAIL. When this signal is asserted (low), it indicates that the A.C. power has been interrupted for a significant period of time. The handling of this signal is strictly up to the individual nodes and configurations.

2.1.6 Commands 2.1.6.1 Data Transfer Commands

The data transfer commands have been designed to support both processors that require justified data and processors that require unjustified data. "Justifying" means that the data always comes from or ends up in the low order bits of the DA lines. For example, a processor requiring justified 8-bit data would expect to see the data in bits 24–31 of the DA lines, regardless of which byte of a memory location was the source or destination. A processor requiring an unjustified 8-bit data would expect the byte to maintain the same position (relative to the other three bytes) as in the 32-bit memory location.

For 32-bit transactions, there is no difference between justified and unjustified. However, there are two options. Data can be transferred in even double-word format or in odd double-word format. In even double-word format, the contents of an entire 32-bit memory location are transferred to or from the bus (see FIG. 201). In odd double-word format, each memory location is effectively shifted by 16 bits (see FIG. 202). The low order bits of the address specified become the high order bits, and the high order bits of the next address become the low order bits. The other words of each memory location remain unchanged.

For 16-bit transactions, there is a difference between justified and unjustified data. For justified data, each half of a memory location must be transferred to and from the low order half of the DA lines (see FIG. 203). Only half of each memory location will be affected; the other half will remain unchanged. The high order half of the DA lines will be undefined for these instructions; however, byte parity will be maintained for all bytes.

For unjustified data, each half of a memory location must be transferred to and from the corresponding half of the DA lines (see FIG. 204). Again, only half of the memory location will be affected, the other half of the DA lines will be undefined, and byte parity will be maintained for all bytes for each transaction.

For justified 8-bit transactions, data from each of the four bytes of a memory location must be transferred to and from the low order byte of the data bus (see FIG. 205). The remaining three bytes of the memory location are unchanged. The three unused bytes on the DA lines are undefined but byte parity is maintained for all bytes.

For unjustified 8-bit transactions, each byte must be transferred to and from the corresponding byte of the memory location (see FIG. 206). The other three bytes of the memory location are unchanged. The unused bytes on the DA lines are undefined but all must maintain correct byte parity.

Block transfers can also be accomplished. These have some restrictions. Block transfers move eight 32-bit double words to or from eight consecutive memory locations starting with the location sent during the address phase. Only one address is sent out. The receiving node is then responsible for incrementing the address internally. All transfers are 32-bit double-word aligned. All eight memory locations must be addressed to the same node. (See FIG. 207).

2.1.6.2 Special Space Accesses

Special commands are provided to allow nodes to access things other than normal memory space. These have the same data format as even double-word transfers. Each location in special space is addressed by a combination of 4-bit node number and 23-bit node offset. The Special Space commands are as follows:

Read Special Space

The contents of the special space location of the node specified are placed on the bus.

Write Special Space

The value on the bus is loaded into the appropriate special space location of the specified node.

2.2 Addressing 2.2.1 Memory Organization

The physical addresses sent out on the I-BUS Data-/address lines have an addressing range of 128M double words (512M bytes). This space is (logically) organized and assigned in segments of 32K double words each. Thus there is a total of 4096 (32K double-word) segments available in normal addressable physical memory space. (See FIG. 208).

2.2.2 Memory Assignment

Each node on the I-BUS must be assigned one or more of these segments. Assignment for all nodes is done during bus initialization, by a single node designated the system configurator node. It is the job of this node to determine the memory sizes and requirements of each node and to assign appropriate amounts of address space. It is usually only done once, but it is possible to change memory assignments at any time.

Assignment is done through the Memory Base register present on each node. This register can be from 1 to 12 bits wide. The value loaded in this register represents the upper bits of the addressing range for that node. The width determines how much memory addressing range will be assigned. If the node has a 1-bit memory base register, it will be assigned half of the available memory addressing range (64M double words). If the node has a 12-bit memory base register, it will be assigned 32K double words of addressing range. This register is accessed by the system configurator through special space. If the node has a memory base register of less than 12 bits, all unused bits will return a value of 0 when read.

Whenever an address is sent out on the I-BUS, each node compares its memory base register contents to the corresponding upper address bits. Only one node will find a match. That node will combine that value with the remaining address bits to point to a specific 32-bit wide memory location. The complete address is sent out during the address phase on DA lines 4–30. The remaining bits 0, 1, 2, 3, and 31 are decoded to determine what action is to be taken. (For further information on instruction decoding, see section 2.5, "Commands".)

Although bit 31 is used to decode instruction types, for memory reference commands it always represents a word pointer within the particular 32-bit memory location. In most cases, it is used directly with the other address bits to form a word address instead of just a double word address. This feature enhances MV compatability by allowing more direct usage of physical addresses generated by MV address translators.

FIG. 209 shows the contents and use of the 32 D/A lines when an address is sent out.

The Memory Base Registe is loaded and examined with special commands found in the "Commands" section (section 2.5). The values loaded into it are subject to the following restrictions:

If multiple 32K-word segments are required for a node, the assignment must be a power of 2 (i.e. 2, 4, 8, 16, 32, etc.). Thus, if a node has 6M bytes of physical memory, it would be assigned 8M bytes of addressing range. The upper 2M bytes would be wasted space.

Any assignment must be done on the corresponding boundary. For example, if you assigned 8M bytes of of addressing range, you could only assign it on an 8M-byte boundary (8, 16, 24, 32, etc.).

No assignments can overlap; no two nodes can have the same segment(s) assigned to each.

The minimum assignment for any node on the I-BUS is 1 (32K double-word) segment.

Other hints and guidelines in assignment of memory space:

Specific nodes are not required to have specific segment numbers. Segments can be assigned in any order as long as they don't violate the previous restrictions.

It is not necessary that all segments be assigned.

It is advisable to assign the addressing range requirements starting with the largest requirements in the lowest addresses followed by consecutively smaller requirements in following addresses.

When a node generates an address outside its assigned range, that node's I-BUS interface will request to use the I-BUS. To prevent memory references across the I-BUS before memory assignment is complete, each node contains a 1-bit Global Access Enabled register. If this register contains a 0, the node cannot make any memory references across the I-BUS. If this register contains a 1, the node is allowed to make I-BUS memory references. Any node can make special space accesses across the I-BUS regardless of the status of this register. The global access enabled register is initially set to 0. When the system configurator node determines that a given node can access the I-BUS, it will set that node's register to 1.

This feature also allows for a node to be taken "off-line" during normal operation of the I-BUS, if it is determined that the node is not functioning properly.

Example of memory assignment

Suppose a system with the following elements:
4 small processor nodes with 4M bytes of local memory each
1 large processor node with 64M bytes of memory
2 graphics controller nodes with 1M bytes of memory each Assignment begins by determining how much space each needs. For this example, each node has a memory size in a power of 2. Each node also requires more than one 32K double-word segment. This means that the assigned addressing range will exactly fit the available physical memory. The large processor node has a memory size that requires 512 segments. The small processor nodes require 32 segments each, and the graphics controller nodes require 8 segments each.

Since the large processor requires 512 segments or ⅛th of the total memory space, there are 8 assignment it can be given. This also means that the large processor will only have a 3-bit wide memory base register (corresponding to the upper three bits of the address). Similarly, the small processors each require 1/128th of the memory space and have 7-bit memory base registers, and the graphics processor requires 1/512th of the memory space and has a 9-bit memory base register.

The large processor node can be assigned the first 512 segments in memory, followed by the smaller processor nodes, and finally, the graphics controller nodes.

| Node | Description | Memory Base Register |
|------|-------------|----------------------|
| 0 | large processor | 000 |
| 1 | small processor | 0010000 |
| 2 | small processor | 0010001 |
| 3 | small processor | 0010010 |
| 4 | small processor | 0010011 |
| 5 | graphics controller | 001010000 |
| 6 | graphics controller | 001010001 |

The system configurator node must know both the physical memory size and the memory base register size to determine both the valid addressing range and the memory assignment for each node. The system configurator node can read the physical memory size directly from the memory size register in special space. In order to determine the memory base register size, it must first write "1's" to all 12 bits of the memory base register. When it then reads that register, "0's" will appear in all unused bits.

2.2.3 Special Space

Each node has 8M addresses for Special Space assignment. Each address can be a 32-bit wide location. Special Space is designed primarily to enable the I-BUS interface to access different types of memory, or registers and memory locations not accessible through normal addressing.

For example, most of the local memory space will probably be in the form of dynamic RAMs (DRAMs), and thus require that each address be broken up into a row and column address. For static RAM, PROM, and processor register addresses, all bits are required at the same time.

It was decided that the vast majority of accesses to Special Space locations will be single 32-bit left-word-aligned transfers. By limiting ourselves to these only, we need just two commands for Special Space; one command for reads and one for writes:

"Read Special Space"—takes the contents of a 32-bit location in Special Space and places it on the D/A lines.

"Write Special Space"—takes the contents of the D/A lines and places it in the specified Special Space location.

For further information, see the "Commands" section (section 2.5).

Since Special Space is accessed by special command, it differs from normal address space in that it is addressed by node number rather than just an address. In addition, it requires the extra 4-bits of command encoding.

The I-BUS enables you to write to any Special Space location. If that location happens to be ROM, it will be up to the Slave to deal with the problem. There are no specific error codes provided for illegal accesses.

The upper 16 locations (7FFFF0-7FFFFF) in each node's special space are reserved for I-BUS interface registers. These registers, some of which have special conditions on reads and writes, are described in the "I-BUS Operation" section (section 2.4)

2.2.4 MV Compatability

The I-BUS is designed to operate in the "MV" series of computers manufactured by Data General Corporation and to be compatible with their 32-bit architectural environment. The physical addresses generated from an MV Address Translator can correspond to the addresses that appear on the I-BUS. However, MV architecture allows for 29 bits of physical addressing range, whereas the I-BUS yields only 28.

2.3 Arbitration

Arbitration is determining which node will be granted control of the bus. A potential Master node first requests to use the bus, then arbitration occurs. Based on the arbitration scheme, the node may or may not be granted access at that time. If the node is not granted access, it must re-submit its request at the next opportunity.

Arbitration implies that more than one node will request the bus at the same time. The system must choose which of the requesters will receive control next. If only one requester is present during an arbitration phase, it will be granted use of the bus.

2.3.1 Goals of I-BUS arbitration

To give uniformly fair access to all nodes in the system. A node should not be allowed to monopolize the system or repeatedly prevent any other node from gaining access to the bus.

Only one node at a time will drive the bus; no simultaneous access.

Arbitration can occur while the bus is being used so that arbitration overhead is minimal.

There should be no jumpers or reconfiguration required to accommodate empty slots in a system.

2.3.2 Arbitration Bus Structure

The following signals are used during bus arbitration:

| | |
|---|---|
| BREQ<0-15> | Bus Request Lines 0-15 |
| AV/MW | Address Valid/Master Wait |
| SWAIT | Slave Wait |
| BBSY | Bus Busy |
| BUSCLK | Bus Clock |

Relationship of the signals to arbitration

Bus Request lines 0-15

A low-true signal on one or more of these lines indicates to all nodes that use of the bus is requested. The numbers of the activated lines are used in determining priority.

Address Valid/Master Wait

This is used to hold the bus for a Master during data transmission. Arbitration cannot start until this is released.

Slave Wait

This is used by a Slave to suspend operations of the bus during data transmission. Arbitration cannot occur until this is released.

Bus Busy

This signal is used during bus operations that require more than one data transfer. It suspends any further arbitration cycles without affecting any data or address transmissions. Arbitration cannot occur until this is released.

Bus Clock

This is used to clock all actions on the bus. One clock period is equal to 80 ns. All clock periods start with the falling edge of the bus clock. All actions on the bus take place with respect to this falling edge.

2.3.3 Initiation of an Arbitration cycle

Arbitration can only occur on a falling clock edge when all of the following are true:

- -AV/ MW is high
- -SWAIT is high
- -BBSY is high
- One or more bus request lines is low Arbitration starts with one or more nodes requesting the bus. A node does this by taking the appropriate bus request line low. This can be done at any time except during the clock period immediately following an arbitration cycle. At the beginning of a clock period, if all the above conditions are fulfilled, arbitration will occur. During this same period, each requesting node will check to see if it is the highest priority requester. If it is not the highest priority, it will take its request line high before the next falling edge of the clock. After that, it may again request use of the bus.

If the node determines that it is the highest priority requester, it keeps its bus request line down until the next clock period (until the address is sent out). It will then release the BREQ line unless it requires another use of the bus.

The clock period following an arbitration cycle is used to send out the address. Only the node granted access should be asserting its BREQ line at this time. If more than one BREQ line is asserted, an arbitration error occurs. Appropriate action must then be taken to prevent damage to the bus by contention between node drivers (see the "Arbitration Error" section).

A sample arbitration cycle is shown in FIG. 210. In this example, there are two nodes requesting the bus (nodes m and n). Node m has the higher priority and both nodes arbitrate correctly.

Note: The node granted access to the bus is always the highest priority requester, but not necessarily the highest priority of all the nodes.

2.3.4 Priority

2.3.4.1 Priority Assignment

Figure 211A:
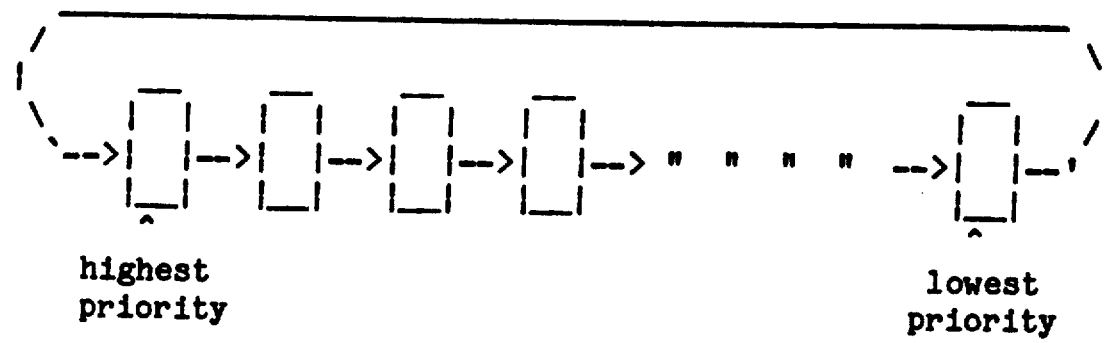

Referring to FIG. 211a, priority order can be thought of as a circular chain with a moving head and 16 links (corresponding to the 16 possible nodes). The chain head has the highest priority and the chain tail has the lowest priority. When the priority changes, the entire chain rotates. Thus, the relationship of one node with respect to another remains constant, yet a node can be at any location in the priority order.

Figure 211B:
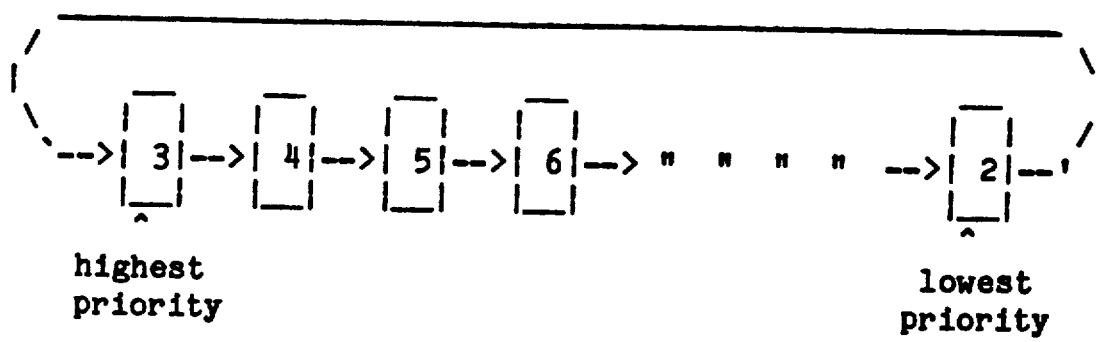

The order in which this (logical) priority chain is scanned corresponds to the order of the node (slot) numbers. Node 15 will follow node 14 which will follow node 13, and so on, down to node 0 which will follow node 15. For example, if node 3 had the highest priority, the chain would look as depicted in FIG. 211b.

Figure 211C:
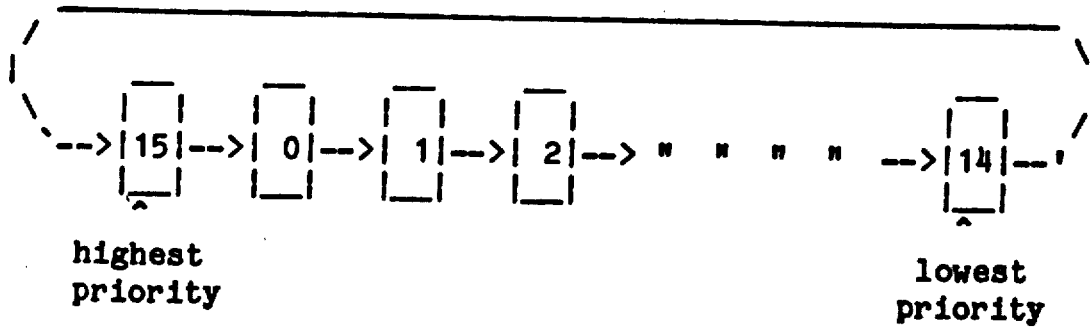

If the priority changes so that node 15 is the highest, the chain would look as depicted in FIG. 211c.

2.3.4.2 Changing Priority Order

Figure 211D:
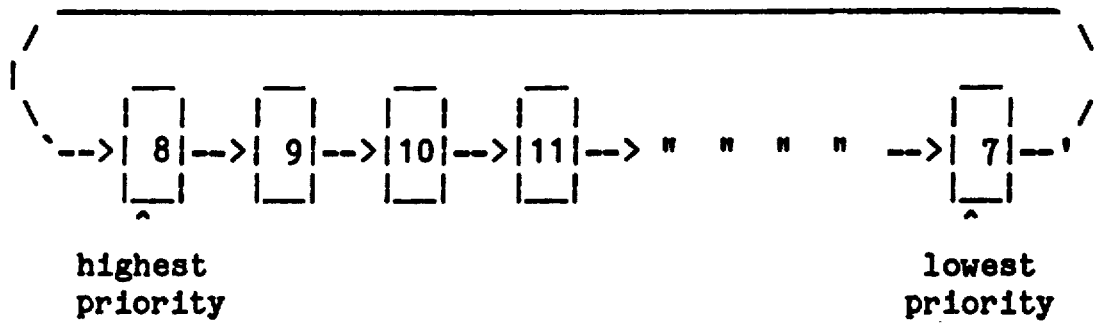

Whenever a node gains control of the bus, it becomes the lowest priority node. Priority changes for all other nodes to maintain ordering. For example, if node 7 used the bus last, the new priority order would look as depicted in FIG. 211d.

Figure 211E:
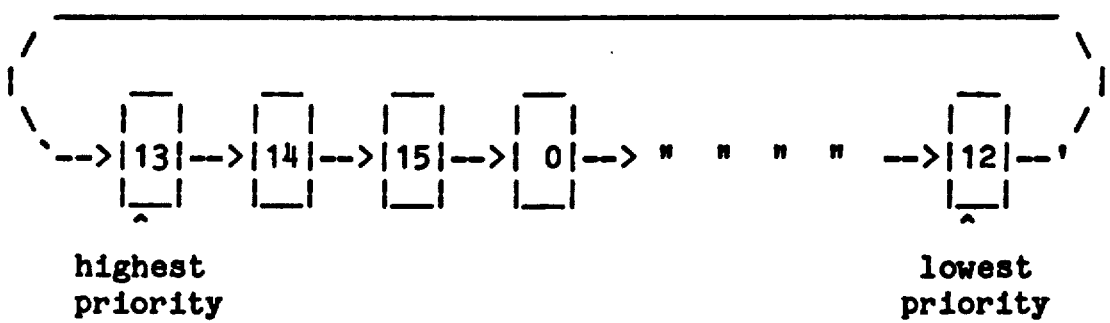

If node 12 then was granted access to the bus, the order would change to that depicted in FIG. 211e.

2.3.5 Arbitration Logic

Arbitration logic is distributed among all potential Master nodes in a system. The logic in each node is responsible only for that node. Its purpose is to tell the node when it has control of the bus. To do this, it needs to know the current status of the bus request lines as well as who accessed the bus last.

The organization of the bus request lines is important because it simplifies arbitration. The bus request lines are connected on the backpanel in a circular manner similar to the priority ordering. This is shown below in tabular form, and is depicted schematically in FIG. 212.

| Node 15 | | Node 14 | | Node 13 | | ... | | Node 1 | | Node 0 |
|---|---|---|---|---|---|---|---|---|---|---|
| -BREQ0 | <-> | -BREQ1 | <-> | -BREQ2 | <-> | ... | <-> | -BREQ14 | <-> | -BREQ15 |
| -BREQ1 | <-> | -BREQ2 | <-> | -BREQ3 | <-> | ... | <-> | -BREQ15 | <-> | -BREQ0 |
| -BREQ2 | <-> | -BREQ3 | <-> | -BREQ4 | <-> | ... | <-> | -BREQ0 | <-> | -BREQ1 |
| -BREQ3 | <-> | -BREQ4 | <-> | -BREQ5 | <-> | ... | <-> | -BREQ1 | <-> | -BREQ2 |
| " | | " | | " | | " | | " | | " |
| -BREQ14 | <-> | -BREQ15 | <-> | -BREQ0 | <-> | ... | <-> | -BREQ12 | <-> | -BREQ13 |
| -BREQ15 | <-> | -BREQ0 | <-> | -BREQ1 | <-> | ... | <-> | -BREQ13 | <-> | -BREQ14 |

Note that for priority arbitration purposes, all nodes are of themselves identical; each node's place in the arbitration scheme is determined by the wiring of the socket into which it is inserted. Missing nodes (empty sockets) simply appear as nodes that never assert their BREQ0 signals, and thus have no effect on priority arbitration.

The arbitration logic within each node consists of a set of 16 equations. These equations compare the current bus request status with the priority order. The current bus request status is taken directly from the 16 bus request (NBREQ) lines. The current priority order is taken from a register in each node in which is stored the state of the bus request lines immediately following the last arbitration (OBREQ<0-15>). Any or all of the current bus request lines can be asserted. Only one of the lines in each node's priority order register (OBREQ<0-15>) will be asserted (corresponding to the current lowest priority node, the last node that was granted use of the bus).

Each of the 16 logic equations represents a possible priority for that node (ex. highest, second highest, third highest, . . . lowest). For each position, the logic checks to see if any higher priority nodes are also requesting. If not, the node gets the bus.

The current bus request status lines are shown as NBREQ<0-15>. The current priority order values (information on which node last had control of the bus) are stored in OBREQ<0-15>. Due to the interconnection of the bus request lines, each node sees itself on BREQ0: that is, if the node is requesting the bus, it will see NBREQ0 asserted; if the node used the bus last, it will see OBREQ0 asserted.

The first equation is as follows ("=1" means "gets the bus"):

$$OBREQ15 * NBREQ0 = 1 \quad (* = \text{Boolean AND}) \tag{1}$$

It states that if the node on BREQ15 used the bus last, the current node (BREQ0) is granted access.

The second equation looks like this:

$$OBREQ14 * \overline{NBREQ15} * NBREQ0 = 1 \tag{2}$$

It states that if the node on BREQ14 used the bus last AND the node on BREQ15 is not requesting, the current node (BREQ0) is granted access.

The other equations are as follows:

$$OBREQ13 * \overline{NBREQ14} * \overline{NBREQ15} * NBREQ0 = 1 \tag{3}$$

$$OBREQ12 * \overline{NBREQ13} * \overline{NBREQ14} * \overline{NBREQ15} * NBREQ0 = 1 \tag{4}$$

$$OBREQ11 * \overline{NBREQ12} * \overline{NBREQ13} * \overline{NBREQ14} * \overline{NBREQ15} * NBREQ0 = 1 \tag{5}$$

$$OBREQ10 * \overline{NBREQ11} * \overline{NBREQ12} * \overline{NBREQ13} * \overline{NBREQ14} * \overline{NBREQ15} * NBREQ0 = 1 \tag{6}$$

$$OBREQ9 * \overline{NBREQ10} * \overline{NBREQ11} * \overline{NBREQ12} * \overline{NBREQ13} * \overline{NBREQ14} * \overline{NBREQ15} * NBREQ0 = 1 \tag{7}$$

$$OBREQ8 * \overline{NBREQ9} * \overline{NBREQ10} * \overline{NBREQ11} * \overline{NBREQ12} * \overline{NBREQ13} * \overline{NBREQ14} * \overline{NBREQ15} * NBREQ0 = 1 \tag{8}$$

$$OBREQ7 * \overline{NBREQ8} * \overline{NBREQ9} * \overline{NBREQ10} * \overline{NBREQ11} * \overline{NBREQ12} * \overline{NBREQ13} * \overline{NBREQ14} * \overline{NBREQ15} * NBREQ0 = 1 \tag{9}$$

$$OBREQ6 * \overline{NBREQ7} * \overline{NBREQ8} * \overline{NBREQ9} * \overline{NBREQ10} * \overline{NBREQ11} * \overline{NBREQ12} * \overline{NBREQ13} * \overline{NBREQ14} * \overline{NBREQ15} * NBREQ0 = 1 \tag{10}$$

$$OBREQ5 * \overline{NBREQ6} * \overline{NBREQ7} * \overline{NBREQ8} * \overline{NBREQ9} * \overline{NBREQ10} * \overline{NBREQ11} * \overline{NBREQ12} * \overline{NBREQ13} * \overline{NBREQ14} * \overline{NBREQ15} * NBREQ0 = 1 \tag{11}$$

$$OBREQ4 * \overline{NBREQ5} * \overline{NBREQ6} * \overline{NBREQ7} * \overline{NBREQ8} * \overline{NBREQ9} * \overline{NBREQ10} * \overline{NBREQ11} * \overline{NBREQ12} * \overline{NBREQ13} * \overline{NBREQ14} * \overline{NBREQ15} * NBREQ0 = 1 \tag{12}$$

$$OBREQ3 * \overline{NBREQ4} * \overline{NBREQ5} * \overline{NBREQ6} * \overline{NBREQ7} * \overline{NBREQ8} * \overline{NBREQ9} * \overline{NBREQ10} * \overline{NBREQ11} * \overline{NBREQ12} * \overline{NBREQ13} * \overline{NBREQ14} * \overline{NBREQ15} * NBREQ0 = 1 \tag{13}$$

$$OBREQ2 * \overline{NBREQ3} * \overline{NBREQ4} * \overline{NBREQ5} * \overline{NBREQ6} * \overline{NBREQ7} * \overline{NBREQ8} * \overline{NBREQ9} * \overline{NBREQ10} * \overline{NBREQ11} * \overline{NBREQ12} * \overline{NBREQ13} * \overline{NBREQ14} * \overline{NBREQ15} * NBREQ0 = 1 \tag{14}$$

$$OBREQ1 * \overline{NBREQ2} * \overline{NBREQ3} * \overline{NBREQ4} * \overline{NBREQ5} * \overline{NBREQ6} * \overline{NBREQ7} * \overline{NBREQ8} * \overline{NBREQ9} * \overline{NBREQ10} * \overline{NBREQ11} * \overline{NBREQ12} * \overline{NBREQ13} * \overline{NBREQ14} * \overline{NBREQ15} * NBREQ0 = 1 \tag{15}$$

$$OBREQ0 * \overline{NBREQ1} * \overline{NBREQ2} * \overline{NBREQ3} * \overline{NBREQ4} * \overline{NBREQ5} * \overline{NBREQ6} * \overline{NBREQ7} * \overline{NBREQ8} * \overline{NBREQ9} * \overline{NBREQ10} * \overline{NBREQ11} * \overline{NBREQ12} * \overline{NBREQ13} * \overline{NBREQ14} * \overline{NBREQ15} * NBREQ0 = 1 \tag{16}$$

Each node uses the same set of equations.

An example is shown in FIG. 213. The example supposes that node 1 and node 3 both request the bus simultaneously.

It will first be supposed that node 0 had used the bus last, and therefore has lowest priority. This would mean that node 1 has OBREQ15 set (because BREQ0 of node 0 connects to BREQ15 of node 1), and that node 3 has OBREQ13 set (because BREQ0 of node 0 connects BREQ13 of node 3).

Node 1 signals that it wants the bus by asserting its BREQ0 line, denoted by the cross-hatching on FIG. 213; the signal is applied (inter alia) to the BREQ14 terminal of node 3;

Node 3 signals that it wants the bus by asserting its BREQ0 line, denoted by the "sawtooth" overlay on FIG. 213; the signal is applied (inter alia) to the BREQ2 terminal of node 1.

In node 3, none of the 16 equations above are satisfied. Particular attention is called to equation 3, which appears to be a candidate for satisfaction at this time because OBREQ13 is true in node 3. However, equation 3 is not satisfied because BREQ14 is true in node 3. Node 3 is thus not awarded use of the bus at this time.

In node 1, equation (1) (above) is seen to be satisfied. Thus node 1 in this case is awarded use of the bus.

Again supposing that nodes 1 and 3 request the bus simultaneously, we now suppose that node 2 has used the bus last. This would result in setting OBREQ1 in node 1 (because BREQ0 of node 2 connects to BREQ1 of node 1) and OBREQ15 in node 3 (because BREQ0 of node 2 connects BREQ15 of node 3).

Node 1 again asserts its BREQ0 line, meaning that node 3 again sees BREQ14.

Node 3 again asserts its BREQ0 line, meaning that node 1 again sees BREQ2.

In node 1, none of the 16 equations above is satisfied at this time. Attention is called to equation (15), which looks likely because OBREQ1 is set; however, NBREQ2 is also true which disqualified equation (15). Thus, node 1 is not awarded the bus. In node 3, equation (1) is seen to be satisfied. Thus node 3 is awarded use of the bus.

2.3.6 Arbitration Reset 2.3.6.1 Reset at Power Up

At power up (PWRUPRST is asserted), BREQ0 at slot 0 will be asserted by the power supply. This will allow each node to determine its slot ID, and node 0 will be the lowest priority node during the next bus arbitration.

2.3.6.2 Arbitration Error

Two cases of arbitration error can occur: multiple nodes attempt to take control of the bus, or no nodes take control of the bus. Both cases are detected at the start of the address phase. At this time, the requester that thinks it has the highest priority will be asserting its bus request line. One and only one bus request line should be asserted. If multiple lines are asserted, or if no lines are asserted, an arbitration error has occurred. Any node that detects this should activate ARBRST and resynchronization will occur.

All potential Master nodes are required to check to see that at least one node has taken control of the bus. Only a current Master (one who thinks it has control of the bus) is required to check for multiple nodes attempting to control the bus.

The node with the clock generator is responsible for resetting the bus priority chains in the case of an arbitration error. When ARBRST is asserted, this node must also assert its BREQ0 line so that all nodes can reset their chains by registering the bus request lines. Hence the node with the clock generator will be the lowest priority node after every arbitration reset.

Arbitration error and reset are shown in FIG. 214. In this example, nodes m, n, and p all request use of the bus. Nodes m and n each think they have gained control of the bus, thus causing an arbitration error.

Note that there can be contention on the DA lines during the address phase, since arbitration reset does not occur until after the address is sent out.

All nodes that detect an arbitration error are required to set the Arbitration Error flag in their own status registers before the start of the next transaction. This flag indicates only that an error has occurred. It does not indicate what type of error occurred or which node was "at fault". This flag can be read or cleared by other masters with the special commands RSTAT and CSTAT. For further information, see the "Commands" section (section 2.5).

2.4 I-BUS Operation 2.4.1 Hardware Requirements

Each node on the I-BUS must satisfy certain hardware requirements.

2.4.1.1 Memory

There is no set amount of local memory required for an I-BUS node. Local memory to a processor is accessible to the local processor and any global Master during normal operation. During local initialization, however, local memory is accessible only to the local processor.

2.4.1.2 Registers

Each node on the I-BUS must have a set of hardware registers for control of various functions such as initialization, addressing, and diagnostics. Most of these registers have addresses in special space and are accessible to other nodes through the commands "Read Special Space" and "Write Special Space". The function and organization of the registers are described below:

Node Number Register

This register is used by the node to determine when a special command is addressed to it. The 4-bit register is loaded during the power-up sequence with a value based on the physical slot of the node's interface. The Node Number register is located in bits 28-31 of special space address 7FFFFC. It can be read by any Master through the "Read Special Space" command. Attempts to write to this location after it has been initially loaded will produce undefined results.

Memory Base Register

This register defines the upper bits of the starting address of the memory range assignment for that node. That is, a comparison is done between the upper bits of each address on the I-BUS and this register. If they match, the address is within that node. Thus, the first address in a given nodes memory space would be that number in the upper bits followed by all "0's". This register is 12 bits wide, however, if a node has greater than 128K bytes of memory, it will use less than 12 bits for comparison. In that case, only the bits used will be in the actual base register. Any remaining bits will hardware wired to "0". The Memory Base register is located in bits 20-31 of special space address 7FFFFD.

On power up, the entire Memory Base Register is initialized to "0's" until it is re-assigned by a system configurator node.

ID Register

The ID register contains information as to what board it is (processor, memory, ...) (see FIG. 215). The ID register is located in bits 16-31 of special space address 7FFFFF. This location can be read by any Master, however, it is hardware configured on power-up and any attempt to write to it will produce undefined results.

Memory Size Register

The Memory Size Register tells how much local memory is contained by this node. It is a 12-bit register located in bits 20-31 of special space location 7FFFFE.

Memory Size

Number of 128K-byte blocks minus one

Typical memory sizes: (other sizes possible)

| DA<20-31> | Memory Size (bytes) |
|---|---|
| 000000000000 | 128K |
| 000000000001 | 256K |
| 000000000011 | 512K |
| 000000000111 | 1.0M |
| 000000001111 | 2.0M |
| 000000011111 | 4.0M |
| 000000101111 | 6.0M |
| 000000111111 | 8.0M |
| 000111111111 | 64.0M |
| 111111111111 | 512.0M (entire address space) |

Interrupt Register

Each node that can receive interrupt requests must have a 16-bit register with bits that can be set individually according to the node number of the Master requesting the interrupt. The Interrupt register is located in bits 16-31 in special space location 7FFFF8. A Master requesting an interrupt must write to the interrupt register location of the requested node. The Master must send a "1" in the bit corresponding to its own node number and "0's" in all remaining bits. Writing a "1" will set the corresponding bit and writing a "0" will be ignored. It is the responsibility of each node to clear its own interrupt request register locally; no interrupt requests can be cleared over the I-BUS.

| Node Number of requester | | values sent on DA 16-31 | | Bit set in Interrupt Register |
|---|---|---|---|---|
| 0000 | => | 1000000000000000 | => | bit 0 |
| 0001 | | 0100000000000000 | | bit 1 |
| 0010 | | 0010000000000000 | | bit 2 |
| 0011 | | 0001000000000000 | | bit 3 |
| 0100 | | 0000100000000000 | | bit 4 |
| 0101 | | 0000010000000000 | | bit 5 |
| 0110 | | 0000001000000000 | | bit 6 |
| 0111 | | 0000000100000000 | | bit 7 |
| 1000 | | 0000000010000000 | | bit 8 |
| 1001 | | 0000000001000000 | | bit 9 |
| 1010 | | 0000000000100000 | | bit 10 |
| 1011 | | 0000000000010000 | | bit 11 |
| 1100 | | 0000000000001000 | | bit 12 |
| 1101 | | 0000000000000100 | | bit 13 |
| 1110 | | 0000000000000010 | | bit 14 |
| 1111 | | 0000000000000001 | | bit 15 |

Mask Out Register

Each node that can receive interrupt requests must have a 16-bit Mask Out Register for masking interrupt bits. Note that MSKO is performed locally on the node receiving the interrupt request. The Mask Out Register is not a priority interrupt mask register any more.

The Mask Out register is located in bits 16-31 of special space address 7FFFF7. This register has global write capability therefore if a Master wishes to set or clear a bit over the I-BUS, it must perform a read-modify-write operation to ensure that the status of the other bits remains unchanged.

Global Access Enabled Register

This 1-bit register controls a node's memory accesses on the I-BUS. Upon power-up, this register is initialized to 0. The node cannot make any memory accesses on the I-BUS until this register is set to a "1". This does not prevent a node from accessing special space. The Global Access Enabled register is located in bit 31 of special space address 7FFFFA.

Status Register

Each node on the I-BUS must contain one 16-bit Status Register. Several bits in the Status Register are defined for all nodes while others are node specific. One of the defined bits tells whether the local processor has finished local initialization. Another bit allows a global Master to issue a hardware node clear to the local processor. Parity, arbitration and invalid command errors are also reported in the Status Register. This register is located in bits 16-31 of special space address 7FFFF9. Only bits 24-31 are write accessible on the I-BUS, and for all writes, a "1" will clear the corresponding bit whereas a "0" will not affect the bit's status.

| Reads: | |
|---|---|
| DA16 | Node Ready - signifies that the node has completed all of its local initialization and is ready to be placed on the I-BUS. |
| DA<17-23> | Board specific status bits |
| DA24 | Reserved |
| DA<25-28> | Board specific error status bits |
| DA29 | Bus parity error |
| DA30 | Bus arbitration error |
| DA31 | Invalid command error |
| Writes: | |
| DA24 | Clear Node Hardware |
| DA<25-28> | Clear Board specific error status bits |

-continued

| DA29 | Clear Bus parity error bit |
|---|---|
| DA30 | Clear Bus arbitration error bit |
| DA31 | Clear Invalid command error bit |

Data Latch

Each node on the I-BUS must contain one 32-bit Data Latch register. It is used by the diagnostic LOOPBACK command for testing the data path. It will always contain the last wide word of the last memory access from that node. It is not affected by any special space accesses. This register has no corresponding address in special space.

Interface Status Register

Each node on the I-BUS must contain a 1-bit Interface Status Register. This bit when high indicates that the I-BUS interface logic has passed all internal self-tests. When asserted, it indicates that the interface is not functional. This bit is not accessible directly. Each node is required to report the state of this bit on the XV line during the time ARBRST is asserted. If this bit is set, XV should be asserted when ARBRST is present. Each potential SYSTEM CONFIGURATOR NODE must implement a mechanism by which it can cause ARBRST to be asserted under software control and receive the combined Interface Status of the system from XV. If XV is asserted, the System Configurator will know that at least one of the nodes is not functional. The Interface Status register is located in bit 31 of special space address 7FFFFB. Since only the local hardware can determine the interface status, this register is not write accessible to any Master. Any attempt to write to this special space location will produce undefined results.

Loopback Control Register

When written to, this 1-bit register initiates the loopback diagnostic sequence during which all memory accesses are disabled and all data comes directly from (or goes to) the Data Latch. The command immediately following a write to Loopback will reset the Loopback Control register and end the loopback sequence. Thus, each loopback is good for only one data transfer command. The Loopback Control register is located in bit 31 of special space location 7FFFF6.

2.4.1.3 Address Space

A processor does not occupy any address space. Only the local memory it has occupies some address space. Some registers that it has may occupy some of Special Space.

After global initialization, all local memory will be accessible on the I-BUS.

2.4.1.4 Miscellaneous

A board may occupy a slot and not connect to the I-BUS.

2.4.2 Special Node Designations

Certain nodes are required to perform special functions that affect all nodes in the system. These nodes do not have to be in any particular slot.

2.4.2.1 Clock Generator

All nodes derive their time bases from ˜BUSCLK. There must be one and only one clock generator in the system which generates ˜BUSCLK. It is the responsibility of the clock generator node to drive its ˜BREQ0 line low during arbitration reset.

The period of BUSCLK is fixed at 80 ns.

The clock subsystem uses the following signals:

| | |
|---|---|
| BUSCLK | bus clock |
| ARBRST | arbitration reset |
| BREQ<0-15> | bus request line 0 to 15 |

2.4.2.2 System Configurator

The System Configurator node is responsible for assigning the appropriate amounts of addressing range to each node in a system. It also has the responsibility for performing initial bus diagnostics tests.

The protocol for determining the System Configurator node must be a software protocol, such as reading the ID Registers to determine which nodes are potential System Configurator nodes and each determining the true System Configurator node based on some pre-defined SLOTID-based priority. Reading a node's ID Register is a special command.

Potential System Configurator nodes designed after the original implementation must conform to the old standard.

2.4.3 Power-up State Flow

The following sequence of events describes the procedure required on the I-BUS to prepare all nodes for normal operation.

Node Identification

Each node will have a unique ID number that is derived from the bus request lines during power up. The node identifiers are as follows:

| | Node ID | Bus Request line asserted during power-up |
|---|---|---|
| NODE 0 | 0000 | BREQ0 |
| NODE 1 | 0001 | BREQ1 |
| NODE 2 | 0010 | BREQ2 |
| NODE 3 | 0011 | BREQ3 |
| NODE 4 | 0100 | BREQ4 |
| NODE 5 | 0101 | BREQ5 |
| NODE 6 | 0110 | BREQ6 |
| NODE 7 | 0111 | BREQ7 |
| NODE 8 | 1000 | BREQ8 |
| NODE 9 | 1001 | BREQ9 |
| NODE 10 | 1010 | BREQ10 |
| NODE 11 | 1011 | BREQ11 |
| NODE 12 | 1100 | BREQ12 |
| NODE 13 | 1101 | BREQ13 |
| NODE 14 | 1110 | BREQ14 |
| NODE 15 | 1111 | BREQ15 |

At power up, when PWRUPRST is asserted, the power supply will assert BREQ0 at slot 0. Due to the connection of the bus request lines (see 3.5), BREQ1 at slot 1 will also be asserted, . . . . Hence, each node will be able to generate its unique ID from the bus request lines. Special commands that are passed between nodes use the node ID number as the destination address.

Power-up (PWRUPRST asserted)

When the power is turned on, the power supply keeps PWRUPRST asserted until at least 10 msec after all DC voltages are stable.

All nodes read in the bus request lines and decode their Slot IDs.

All nodes perform hardware reset at this point. All components are cleared to their reset state.

Bus Clock Generation

BUSCLK will be stable on the bus when PWRUPRST is released.

Self Test

Once BUSCLK is on the bus, all nodes will use BUSCLK for their self test. Thus for some time after PWRUPRST is released, nodes will trickle onto the bus.

This test will check out 100% of the internals of the node, except for the I/O drivers, which are disabled during the self test. These will remain disabled until (unless) the node successfully passes its self test.

Since nodes in the process of self test are not on the bus, no system sizing can occur until enough time has elapsed to guarantee completion of self test.

Initialization Limits

Each node will set its own memory base register to 0. Each node's global access enabled register should also contain a 0. This will allow each node to use its own local memory without having to make I-BUS references, and prevent non-local references from going out across the bus. The local processor can determine its own local memory size and load that value in its memory size register for use by the system configurator node.

Software issued ARBRST

Software ARBRST is now issued so that the Interface Status Registers of all the nodes in the system can be checked. If any node's interface hardware fails its internal diagnostics, it will be reported here.

At this point, each node that successfully completes all previous steps should set the Node Ready bit in its Interface Status Register.

System Configurator Node Determination

The System Configurator node must now be determined. This must be done with special commands only since no global addresses may be used yet.

A substantial delay may have to be added before any node should issue special commands to any other node to insure that all working nodes are present on the bus. To do this, the System Configurator node must check the Node Ready flag of each node's Status Register.

System Sizing by System Configurator Node

The System Configurator node must size the system and define the Base Memory register value for each node. To do this, the system configurator needs to know the size of each memory base register. It can determine this by writing all "1's" to it then reading the results. Any unused bits always return "0's". Memory base register assignment is not part of I-BUS protocol and will be left up to individual system configurators.

Bus Diagnostic Test

The System Configurator node performs bus test using diagnostic commands, since any bad node can crash the bus.

Guarantees that all bus signals are operational.

Guarantees that all node interconnects are operational.

Since the Interface Status Registers have been checked, this verifies that the bus is operational and that no node has a fault that could crash the bus.

Operating System Start

Once the memory assignment is complete and all diagnostics are passed, the system configurator can enable global access for all nodes by setting each node's global access enabled register to 1. The Operating System then must communicate to all potential Masters the address space of each node in the system. For example, attached processors need to know the address locations of each system resource such as RAM, Video, etc. Local address space limits are provided by each node through the memory size register. Locating and assigning specific resources will be left up to the operating system.

2.4.4 Operation Phases

Normal operation is divided into four phases: arbitration, address, data, and transaction validation. A complete transaction comprises all four.

2.4.4.1 Arbitration Phase

An arbitration phase is required to start each transaction on the I-BUS. This decides which node will receive control of the bus.

2.4.4.2 Address Phase

Immediately following the arbitration phase is the address phase. During the address phase, the address is sent out across the bus. The entire address must be stable on the DA lines during the falling edge of BUSCLK immediately following the arbitration phase. The AV/MW signal must also be asserted by the Master at this time. The address phase can take only 1 clock cycle to complete. An example of an address phase is shown in FIG. 216.

During bus locking operations, an address phase occurs without a preceeding arbitration phase. For further information, see the "Bus Locking" section.

2.4.4.3 Data Phase

Immediately following the address phase is the data phase. Data is placed on the DA lines by the sending node. If the sender does not have the data ready, it must have asserted its wait line (AV/MW or SWAIT) before the falling edge of BUSCLK of the data phase. By asserting its wait line, the sender can hold the bus any number of clock cycles until it can prepare the appropriate data for transmission. On the first falling clock edge after the sender releases its wait line, the receiver must take the data from the bus. If the receiver is not ready to take the data, it must have asserted its wait line before that clock transition. Data on the bus must remain there as long as the receiver asserts its wait line.

Figure 217:
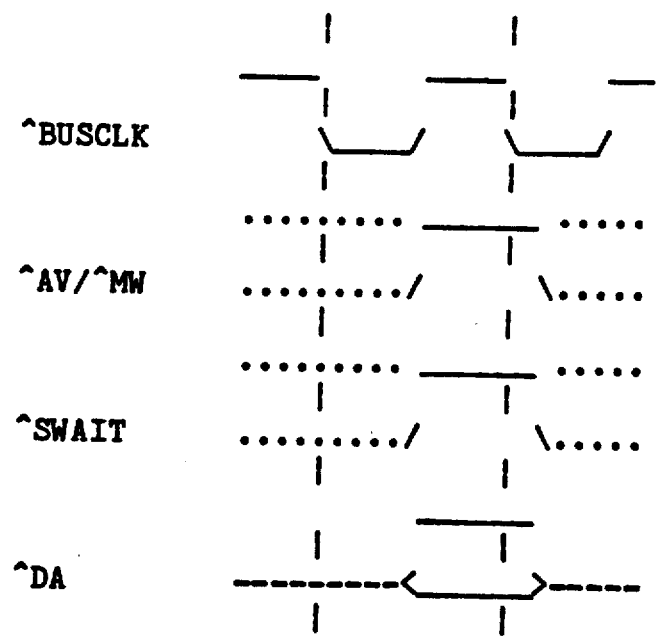

An example of a data phase is shown in FIG. 217.

2.4.4.4 Transaction Validation Phase

The last phase in each transaction is the transaction validation phase. This must always occur on the first falling clock edge after the data has been received. If the transaction has completed successfully, the Slave will assert the XV line at this time. If something has gone wrong with the transaction, the slave will not assert the XV line. Causes for unsuccessful transactions are: address or data parity errors detected by the slave, improper command used, or multiple-bit errors in memory.

Transaction validation can overlap the arbitration or address phase of the next transaction.

Figure 218:
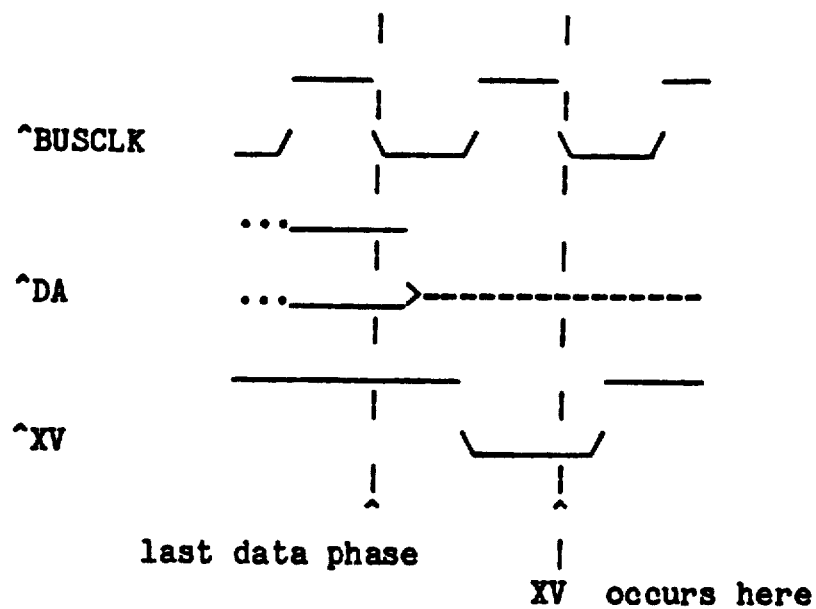

An example of a transaction validation phase is shown in FIG. 218.

2.4.5 Normal Operation

Three sequences of the previous phases occur during normal operation. These are single transfers, block transfers, and bus locking operations. Any of these memory reference operations locks out the referenced node's processor until the operation is complete.

2.4.5.1 Single Transfers

Figure 219:
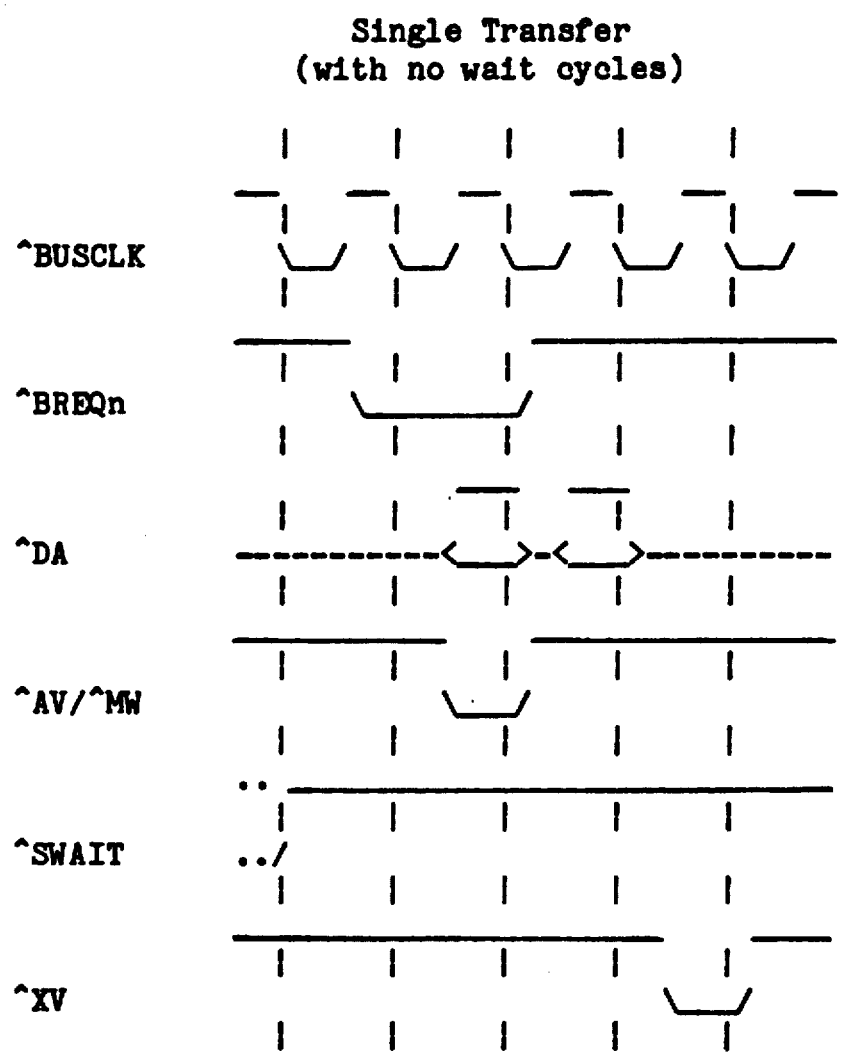
Figure 220:
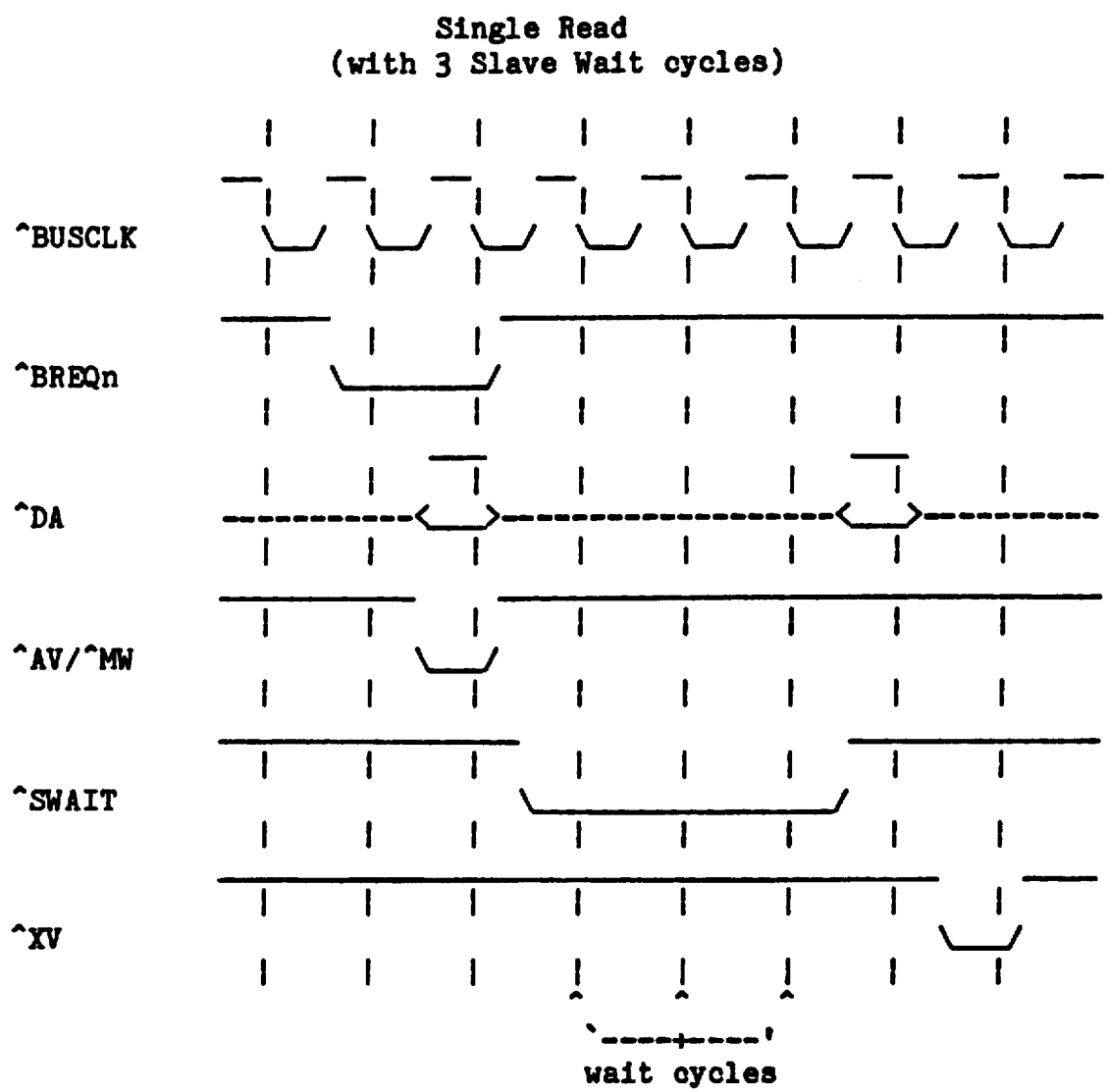

A single transfer is a read or write of one memory location. The data involved can be 8 bits, 16 bits, or 32 bits wide. A single transfer consists of an arbitration phase, an address phase, a data phase, and a transaction validation phase. The sequence of events for a single transfer is shown in FIG. 219, which depicts a "minimum case" transfer; no wait lines were used. For this, both the sender and the receiver must be ready to move the data. If, during a read operation, the sender (Slave) cannot produce the data in one cycle, it would have to use its wait line as illustrated in FIG. 220.

Figure 221:
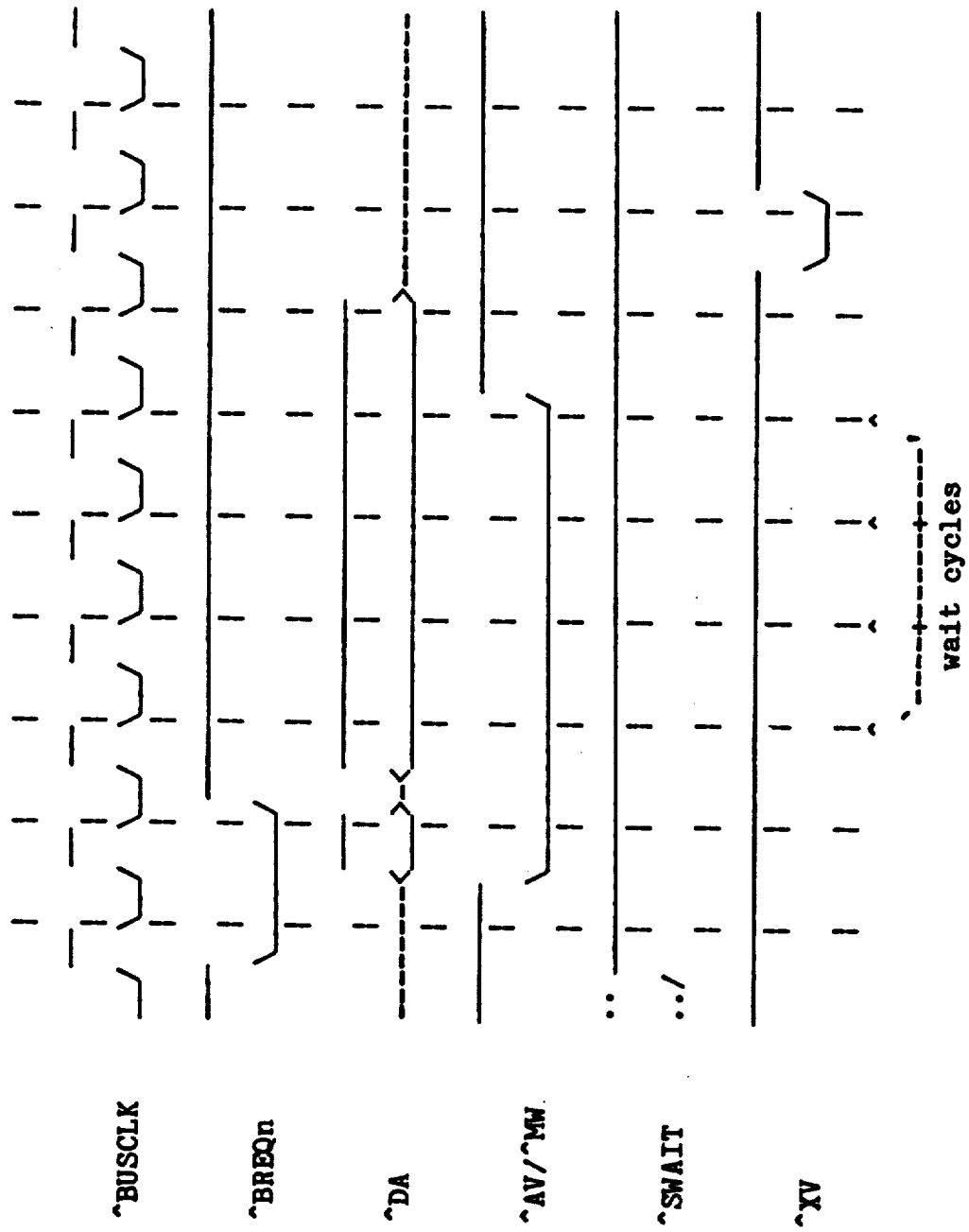

If, during a read operation, the receiver (Master) cannot accept the data in one cycle, it would have to use its wait line as shown in FIG. 221.

2.4.5.2 Block Transfers

Figure 222:
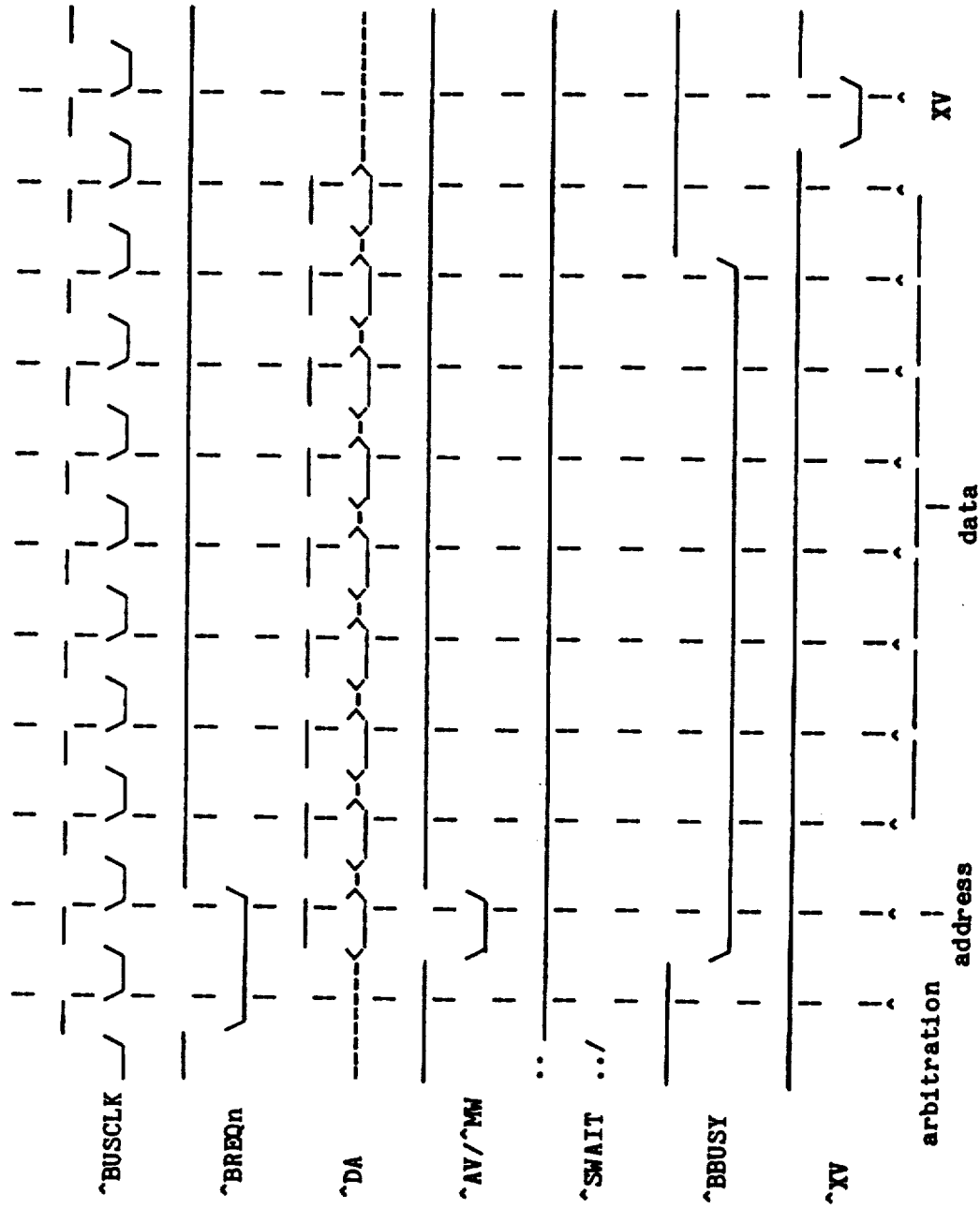

A block transfer is a read or write of 8 consecutive locations in memory. The data involved are all 32 bits wide and aligned on address boundaries. Each block transfer consists of an Arbitration cycle, an address cycle, 8 data cycles, and a transaction validation cycle. A block transfer with no wait periods is shown in FIG. 222.

Note that there is only one transaction validation phase. If an error occurs in one or more of the 8 data transmissions, the transaction validation can only indicate that an error has occurred somewhere, but it can't distinguish between the 8 transmissions.

2.4.5.3 Bus Locking

Bus lockign enables a node to retain control of the bus for more than one transaction. If a node knows that it will need uninterrupted transactions (for example a read and write to the same memory location), It must assert BBSY as soon as it gains control of the bus and release it just before the last data phase of the last transaction. As long as BBSY is asserted, no arbitration phases can occur.

Figure 223:
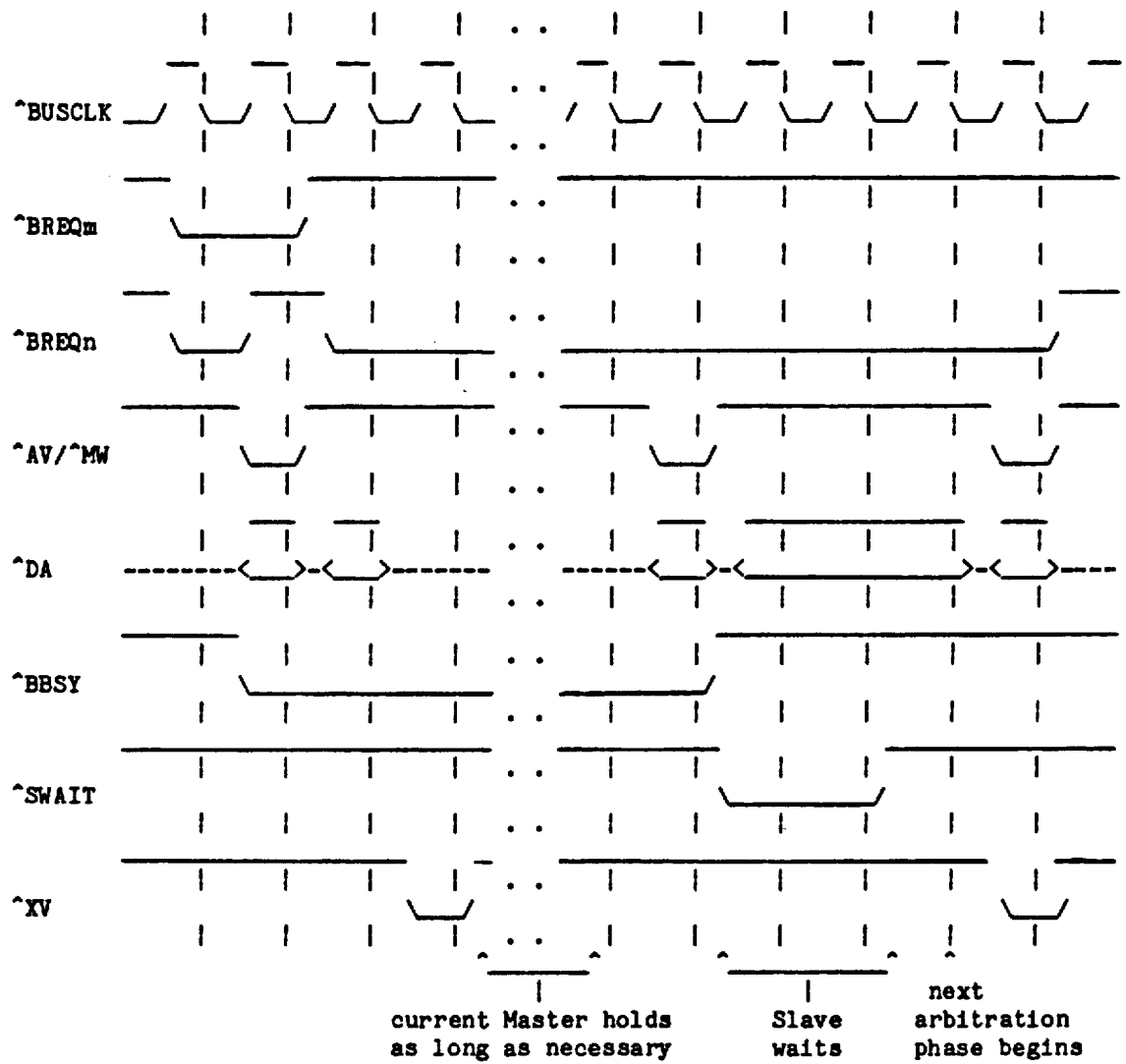

For example, suppose a Master needed to increment a count stored in a remote memory location. The Master could request the bus twice, one to read the count and one to write the count back into the memory location. Instead, it can do both transactions with only one request. When it first receives control of the bus, it asserts BBSY. It completes the first address, data, and transaction validation phases in the normal manner. It now has read the count from the memory location. As long as it maintains BBSY asserted, it can take as long as it needs to increment the count and prepare it to be sent out. Anytime after the first transaction, the Master can send the address back out. If the Master sends the address before it has incremented the count, it must use Master Wait until the data is ready. It can also choose to not send the address until the data is prepared. When the address is ready, the Master asserts AV/MW. In this case, the address is the same for both transactions. If the Master does not need the bus further, it can release the BBSY line at this time. If no wait signals are asserted, the Master sends the data across and receives the transaction validation. This sequence of events is illustrated in FIG. 223.

Technically, once a Master has gained control of the bus, it can retain control for as long as it wants by merely keeping BBSY low. Since this can defeat arbitration goals, it is recommended that bus locking operations be limited to quick double operations such as the previously described Read-Write.

Since any bus locking operation also locks the Slave's processor from its local memory, it is necessary to restrict bus locking operations to a single node. Thus, the node addressed when you first lock the bus must be the same node for all other transfers until you release the bus. This is the only bus locking restriction.

2.4.6 Bus Parity Errors

Each node must monitor the parity of all incoming data and addresses. If one or more parity errors is found, the node must set the Bus Parity Error flag in its status register special space location before the beginning of the next transaction (in addition to releasing the XV line). This flag can then be read and cleared by any Master.

2.5 COMMANDS

2.5.1 Command Summary

Functionally, there are two types of operations that can be performed: data transfer commands and special space accesses. Data transfer commands deal specifically with memory references, transferring data 8, 16, 32, or 256 bits per command directly to or from the specified memory location(s). Special space accesses address a particular node rather than a memory location. They are used to initialize and retrieve status from a node's interface registers and to access other types of memory by assigning special space addresses to them. Special space accesses only transfer data 32 bits at a time.

The command encodings use 5 bits to determine the operation to be performed. These bits are bits 0, 1, 2, 3, and 31 which are sent out during the address phase. The type of operations performed is summarized in FIG. 224. All writes are from the D/A lines to memory locations.

2.5.2 Data Transfer Commands

2.5.2.1 8-bit Transfers

In all 8-bit transfers, the unused 24 source bits are undefined and the unused 24 destination bits are unchanged.

Flow diagrams for the various possibilities of 8-bit transfers are given in Appendix A.

2.5.2.2 16-bit Transfers

In all 16-bit transfers, the unaffected 16 source bits are undefined while the unaffected 16 destination bits are unchanged.

Flow diagrams for the various possibilities of 16-bit transfers are given in Appendix A.

2.5.2.3 32-bit Transfers

Flow diagrams for 32-bit transfers are given in Appendix A.

2.5.2.4 Block Transfers

Flow diagrams for block transfers are given in Appendix A.

2.5.3 Special Space Accesses

Special commands are provided to control the operation of the I-BUS interface logic, and to check their status. They are encoded in the address of the reference. In addition, the destination slot ID is also specified in the address.

| Read Special Space | | |
|---|---|---|
| Command | Data Size | Description |
| RSP | 32 bits | "Read Special Space" will read from the Special Space location specified by the address to DA lines 0-31. |

The following is sent out during the address phase:

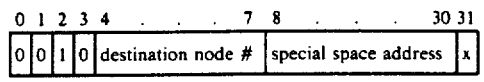

The following is the result during the data phase:

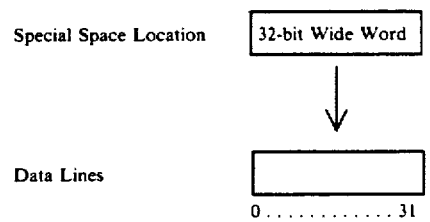

Write Special Space

| Command | Data Size | Description |
|---|---|---|
| WSP | 32 bits | "Write Special Space" will write the contents of DA lines 0-31 to the Special Space location specified by the address. |

The following is sent out during the address phase:

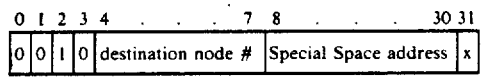

The following is the result during the data phase:

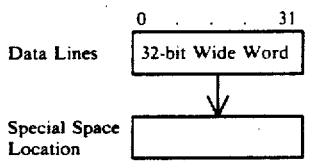

The upper 16 addresses (7FFFF0-7FFFFF) in ech nodes special space are reserved for certain required interface registers. These are summarized in the following table.

Each register address begins with all "1's" in bits 8-26. Bits 27-30 and their contents are shown below.

| bits 27-30 | register | width | global access | special conditions |
|---|---|---|---|---|
| 0000 | reserved | | | |
| 0001 | reserved | | | |
| 0010 | reserved | | | |
| 0011 | reserved | | | |
| 0100 | reserved | | | |
| 0101 | reserved | | | |
| 0110 | Loopback Control | 1 | R/W | |
| 0111 | Mask Out | 16 | R/W | |
| 1000 | Interrupt | 16 | R/W | writes; 1 = set 0 = ignored |
| 1001 | Status | 16 | R/W | writes: 1 = clear 0 = ignored |
| 1010 | Global Access Enabled | 1 | R/W | |
| 1011 | Interface Status | 1 | R | |

-continued

| bits 27-30 | register | width | global access | special conditions |
|---|---|---|---|---|
| 1100 | Node Number | 4 | R | |
| 1101 | Memory Base | 12 | R/W | |
| 1110 | Memory Size | 12 | R/W | |
| 1111 | ID | 16 | R | |

2.5.4 Invalid Command Errors

Issuing any combination of control and address bits that is not currently defined constitutes an invalid command error. These include any command encodings not listed in the command summary in FIG. 224.

If a Slave determines that it has received an invalid command, it will release the XV line during the transaction validation phase and will activate (low) the Invalid Command Error flag in its status register. This flag can be read or cleared by any Master through the special space access commands. The error flag remains set until specifically cleared by a Master.

2.7 ELECTRICAL CHARACTERISTICS

2.7.1 Signal States

A signal may be in one of two levels or in transition between these levels. The term "high" refers to a high TTL voltage level (> = +2.0 V). The term "low" refers to a low TTL voltage level (< = +0.8 V). A signal is in transition when its voltage level is changing between +0.8 V and +2.0 V. A "rising edge" refers to a transition from a low level to a high level. A "falling edge" refers to a transition from a high level to a low level. All signals are terminated on the backpanel such that all undriven signals "float" to the high level.

2.7.2 Signal Types

The following signals are as specified at the bus interface:

| | | |
|---|---|---|
| XV | I/O | Open collector |
| -AV/ MW | I/O | Open collector |
| -SWAIT | I/O | Open collector |
| -DA<0-31> | I/O | Open collector |
| -PDA<0-3> | I/O | Open collector |
| -BBSY | I/O | Open collector |
| -BREQ0 | O | Open collector |
| -BREQ<1-15> | I | Input |
| -ARBRST | I/O | Open collector |
| -BUSCLK | I/O | Open collector |
| -CACHE | I/O | Open collector |
| -PWRUPRST | I | Input |

2.7.3 Maximum Loading

Each node shall add no more than 15 pF of capacitance to any signal line. Each node shall place no more than 1 TTL load on any signal line.

2.7.4 Timing

FIGS. 225 through 234 depict the timing constraints that certain signals must have in relation to 'BUSCLK; FIG. 235 depicts the timing constraints that certain signals must have in relation to stabilization of the +5 volt power supply.

3. Detailed Description of LMB 203

3.1 Functional Overview

The Local Memory Bus (LMB 201) is the bus used by Central Processing Unit (CPU 101) to communicate to all memory and I/O. It is the only architectural bus connected to the CPU. Main Memory, and Local peripherals are nodes on the LMB, while Attached Processors, Remote Peripherals, and other I-Bus nodes are accessible via the LMB through a gateway to the I-Bus.

The Local Memory Bus (LMB) is a 32 bit multiplexed data/address bus which will support multiple requestors. The CPU (central processor unit) is the master of the bus. Other requestors, such as SCI 202 and MCU 201, are allowed, but they must request use of the bus prior to using it via request lines.

The LMB is a 16-bit word addressed bus, with support for byte, double word and even-aligned 16 word block transfers. The address space supported is 28 bits of word address - or 512 Megabytes.

MCU 201 is the one architectural memory node on the LMB which is interfaced to the I-Bus and occupies at least one I-Bus node address space. This is the LMB's only connection to the I-Bus, which handles all I-Bus-LMB traffic. This interface will recognize all reads and writes to the 28 bit address space that occur on the LMB and either respond directly (if the reference is to its local memory) or relay the request to the I-Bus. From the requestor's point of view, all references appear the same except for the access time.

The I-Bus is accessible through the LMB but not vice versa. While LMB accesses may be re-transmitted onto the I-Bus, which facilitates "passing through" references to a memory on another computer, there is no way that an I-Bus command would ever be re-transmitted onto the LMB. The I-Bus node controller on the LMB will field all I-Bus requests. This means that an I-Bus operation can access any location in the local memory space, but it cannot access any other node on the LMB. Local peripherals are not accessible directly by way of a bus transfer, with the exception of memory mapped devices. In that case, those peripherals can be accessed only by reads and writes to the designated architectural memory locations. An I-Bus initiated special read and special write command can be used to access I-Bus nodal information.

The video connection is a bit mapped memory which is part of the architectural memory space. The memory-/I-Bus interface recognizes this space as part of its own local space and responds as if it were standard read/-write memory.

Non-architectural memory elements exist both on IOC 202 and in MCU 201 itself. These elements are accessible by way of Special Read and Special Write commands and will include such things as configuration information, status registers and diagnostic hooks. IOC 201 memory, or other non-memory connections on the LMB will respond to the Read Bus and Write Bus commands which allow non-memory use of the bus.

An interrupt mechanism is provided for slave connections which require service from a master. Uses of the interrupt mechanism include IOC 201 interrupts as an operation completed indicator, I-Bus interrupts, ERCC fault reporting from a memory board and keyboard/mouse interrupts from a video board. Two types of interrupts are supported: maskable and non-maskable. Non-maskable types will not be disabled by system software.

3.1.1 Architectural Considerations
3.1.1.1 Overview

The LMB is designed to operate in a 32-bit architectural environment. The LMB is to be treated as an extended memory bus operating with up to 512 Megabytes of physically addressable memory. The LMB gives access to all 28 bits of address through the local memory board by re-transmitting global I-Bus references as needed. (See MCU 201 description.)

The architecture allows for 29 bits of address; however, the LMB/I-Bus 28 bit limitation aids in implementation of logical and physical addressing logic due to the overlap of the 29th bit (Bit 3) with the ring bits of a logical address. Therefore, the Bit 13 of both the SBR's and the PTE's should always be zero when using an LMB/I-Bus based system.

3.1.1.2 Memory Protection

The LMB/I-Bus system provides a distributed physical memory with various pieces being "owned" by local processors. By definition, however, any node can address any other node's memory since all LMB/I-Bus addresses are part of one, contiguous "global" memory space. Therefore, protection of this physical memory must be a cooperative effort among all the processors in the system.

The CPU is the true bus master which controls the power up of the entire system and loads up all of the memory base registers contained in each of the nodes. As described in connection with MCU 201, this is accomplished by having that processor identify all the nodes that exist, determine their respective sizes and types, then assigning each one a position in the global, contiguous memory space. This is software controlled.

That master could further take on the responsibility of global memory management by giving privileges to the different processors on the system. This does require cooperative processors and processes on each of the nodes.

3.2 LMB Signals:

The signals appearing on the LMB bus are as follows:

| 1 | Bus Clock | ^BCLK | Totem Pole |
|---|---|---|---|
| 32 | Data/Address Lines | ^LMP<0:31> | Open Collector |
| 4 | Byte Parity | ^LBP<0:3> | Open Collector |
| 1 | Bus Busy | ^BUSY | Open Collector |
| 1 | Bus Wait | ^WAIT | Open Collector |
| 1 | Interrupt | ^INTR | Open Collector |
| 1 | Non Maskable Interrupt | ^NMI | Open Collector |
| 2 | Bus Request Signals | ^REQ_IN | Totem Pole |
|   |   | ^REQ_OUT | Totem Pole |
| 1 | Abort Reference | ^ABORT | Open Collector |
| 1 | Bus Error | ^ERROR | Open Collector |
| 1 | Bus/System Reset | ^RESET | Open Collector |
| 46 | Total Pin Count |   |   |

3.2.1 Signal Descriptions

| Signal | Meaning |
|---|---|
| ^BCLK | Bus Clock. This 80ns Clock which synchronizes all memory transfers. Only the active (falling) edge is used. All other signals are referenced to this clock. |
| ^LMB<0:31> | LMB Data and Address Lines. Data, address and commands are transferred on this bus. See FIG. 301 for the transmission format. See Section 3.3 for the formats of data, addresses, commands and Special commands. |
| ^LBP<0:3> | Local Byte Parity Bits are asserted by the driver of the LMB in the cycle following that valid data or address. Each LBP bit represents odd byte parity for each of the four bytes which were driven. This is used for checking the integrity of the bus transfer. The following table describes the meaning of each of these signals: |

| Signal | Meaning |
|---|---|
| ^LBP0 | zero (high) if the sum of LMB<0:7> mod 2 = 1; one (low) if that sum mod 2 = 0 |
| ^LBP1 | zero (high) if the sum of LMB<8:15> mod 2 = 1; one (low) if that sum mod 2 = 0 |
| ^LBP2 | zero (high) if the sum of LMB<16:23> mod 2 = 1; one (low) if that sum mod 2 = 0 |
| ^LBP3 | zero (high) if the sum of LMB<24:31> mod 2 = 1; one (low) if that sum mod 2 = 0 |
| ^WAIT | WAIT is driven by either the driver or the receiver of the LMB. It is a low active, open collector signal. The receiver asserts WAIT when it is not yet ready to receive the data, while the sender asserts WAIT when there is not yet good data on the bus. In the receiver's ease, WAIT is the way of telling the sender that it is not yet ready to receive the next transfer of data. Anytime WAIT is asserted, the current operation is pended by the driver of the bus, no matter who asserted WAIT, and the receiver of the bus must ignore the data on the LMB lines. (Note that the "driver" of the bus switches between requestor and requestee for a read operation.) WAIT can be driven by any node on the LMB which is not prepared to accept or deliver any data transfer. It may be asserted at anytime (given proper set up and hold requirements.) |

> Note that WAIT cannot be asserted in response to an address being driven on the LMB as an attempt to hold that address valid. It must have been asserted at the same time as the address (valid at the same clock edge) to successfully stretch the address phase. Therefore, all nodes are assumed to be able to accept an address (or data) immediately, as long as WAIT was not asserted last cycle.
>
> The Requestor (sender), however, may assert WAIT and BUSY at the same time during the address phase to effectively stretch that phase. In this case, the Requestor is expected to hold BUSY down as long as it is asserting WAIT. Additionally, the Receiver must ignore the address on the bus until WAIT was not asserted. Only then does it know that the address was valid at the last clock edge. The operation will then proceed as usual.

| Signal | Meaning |
|---|---|
| ^BUSY | BUSY is an open collector signal which indicates that the LMB is in use even though WAIT may not be asserted. It is asserted only by the requestor. Generally, it is asserted during the address phase of a memory operation, but may be asserted longer to perform either a lock operation (two or more consecutive memory operations that must be indivisible) or a Block Transfer (see below). It is asserted low, by the requestor of the bus at the same time as the address is driven and held until WAIT was not asserted in the previous cycle. In the case of a lock, BUSY is asserted as before, but held throughout all locked operations. It is released at the end of the address phase of the last memory operation in the locked set. |

> Block Transfers require the use of BUSY to keep other requestors off the bus. In this case, the requestor must assert BUSY in the first address cycle as usual, then holds it until the 7th 32-bit data transfer was valid on the LMB and WAIT was not asserted last cycle. The requestor then releases BUSY and completes the read or write transfer using the WAIT signal as usual.

| | | |
|---|---|---|
| *INTR | INTR | INTR is an open collector signal used to request the service of the CPU for a pending interrupt. INTR can be asserted (low) anytime (with the proper set up and hold restrictions), and will be serviced by the CPU by way of a Read Special (RSP) or Read Bus (RX) command. The CPU will decide which requestor to service first. When the appropriate RSP or RX command is received, the acknowledged node must release INTR. Once INTR is asserted, it must be held until the appropriate RSP command is received. This signal may be ignored by the CPU if all interrupts have been masked out by the operating system. It is expected that the signal will remain asserted until interrupts are re-enabled and the CPU recognized this line by way of a proper RSP or RX command. For an interrupt condition that cannot be ignored, the NMI line should be used (see below). |
| *NMI | | NMI is an open collector signal, asserted low, which behaves identically to the INTR line (above) except that it cannot be masked by system software. NMI has a higher priority than INTR and is used for such things as the operator "BREAK" key and IOC-to-CPU non device related communication. |
| *REQ_IN REQ_OUT | | The REQUEST signals allow access to the LMB. It is a totem pole, active low, daisy chain which connects all requestors except the CPU which is not required to drive REQUEST. REQ_OUT is asserted low either when REQ_IN is asserted (which is the daisy chain relay case) or when the requestor requires a memory transfer. The requestor is granted the bus when REQ_IN, BUSY and WAIT were not asserted and it was asserting REQ_OUT. If BUSY, WAIT or REQ_IN was asserted, the requestor must continue to assert REQ_OUT until all three become not asserted at a clock edge. The requestor than asserts BUSY and begins the bus operation. The priority is determined by the physical interconnect order of the REQUEST lines. A higher priority requestor is asserting the signal if REQ_IN is asserted (low). |
| *ERROR | | This open collector signal is asserted by any of the connections on the LMB to indicate some type of fault. The signal follows the faulty data transfer or the faulty parity transfer by one cycle. The requestor and/or the master (CPU) must sense this signal and take appropriate action. Generally, these are fatal, hard faults such as bus parity error or multiple bit, non-correctible memory failure. Once asserted, the ERROR signal must remain asserted until either the proper RSP command is received or a bus RESET is asserted. Any operation in progress must be, or appear to be, completed. The result of the operation will be undefined. Specifically, WRITES with a byte parity error on the data, for instance, may destroy the addressed location. NOTE: Correctible errors must be corrected on the fly, holding the bus (if necessary) via the WAIT line and must not assert the ERROR signal. At a later time, the node which corrected the error should interrupt to explain the soft failure. |
| *ABORT | | ABORT is an open collector, low active signal asserted by a requestor which wishes to abort its memory operation. It must be asserted for one BUS_CLK cycle during the address phase or the cycle immediately following the address phase. All signals pertaining to this operation must cease by the next clock edge. This applies to both the requestor and the slave node. Note that WAIT does not effect how long this signal lasts. It is, by definition, only one BUS_CLK in duration. If it is asserted during a read operation, the slave will abort its operation and stop driving all bus signals immediately (except, perhaps WAIT, if necessary for state integrity). In the case of writes, the WRITE will not occur, and the operation will be aborted as with reads. If the ABORT signal is asserted at a time other than during or immediately following the address phase, the results are undefined. Particularly, a WRITE operation may be aborted but the state of the memory location (and possibly the word above and/or below it) will be undefined. An ABORT ends the memory operation. Another may start only after WAIT has gone away - just as with any other address phase. ABORT can only be used to abort Read, Write or Block type memory operations. It is not valid on any Read Special, Write Special, Read Bus or Write Bus command. |
| *RESET | | This open collector master RESET signal is used exclusively for globally resetting the system. Pulling down on this signal AT ANY TIME causes a global reset of all state machines in the CPU, Memory, Video Board(s) and I_Bus. (This RESET will cause an I_Bus RESET as well). Normally, it will be used for power up reset, front panel reset and diagnostics, and will be under control of IOC 201. |

3.3 Commands 3.3.1 Word/Double Word Formats 32-bit memory storage formats are depicted in FIG. 302. Bus-justified formats are shown in FIG. 303.

3.3.2 Command Encodings 3.3.2.1 Summary of Encodings (As shown in FIG. 301, commands are transmitted in bit positions 0–3 of the address word.)

| Hex | Command | Mnemonic | Description |
|---|---|---|---|
| Reads: | | | |
| F | 1111 | RDJ | Read Double Word and Justify |
| D | 1101 | RWJ | Read Word and Justify |
| 5 | 0101 | RLBJ | Read Left Byte and Justify |
| 4 | 0100 | RBK | Read Block |
| C | 1100 | RSP | Read Special |
| E | 1110 | RX | Read Bus - No Memory Response |
| Writes: | | | |
| B | 1011 | WDJ | Write Double Word from Justified Data |
| 3 | 0011 | WWJ | Write Word from Justified Data |
| 7 | 0111 | WW | Write Word direct |
| 0 | 0000 | WLB | Write Left Byte from Left Byte |
| 8 | 1000 | WRB | Write Right Byte from Right Byte |
| 1 | 0001 | WLBJ | Write Left Byte from Justified Byte (3) |
| 9 | 1001 | WRBJ | Write Right Byte from Justified Byte (3) |
| 6 | 0110 | WBK | Write Block |
| 2 | 0010 | WSP | Write Special |
| A | 1010 | WX | Write Bus - No Memory Response |

3.3.2.2 Characteristics of encodings (1) For Write Byte and Justified Read Byte operations, bit 0 of the command is a byte pointer. (RWJ and RLBJ for reads and WLB, WRB, WLBJ, WRBJ for writes)

(2) RSP is a RWJ (read single word) with bit 3 cleared.
(3) RX is a RDJ (read double) with bit 3 cleared.
(4) WSP is a WWJ (write single) with bit 3 cleared.
(5) WX is a WDJ (write double) with bit 3 cleared.
(6) Justified Byte, Word and Double Word Reads have bit 1 set.
(7) Justified Byte, Word and Double Word Writes have bit 1 cleared.
(8) Where Possible, Reads and Writes differ by 1 bit as do adjacent word and byte operations.

3.3.2.3 Expansion of above encodings

| Encoding | Bit 31 | result |
|---|---|---|
| F RDJ | 0 | Read Double even |
| F RDJ | 1 | Read Double odd |
| F RDJ | 0 | Read Word 0 to Word 0 |
| D RWJ | 1 | Read Word 1 to Word 1 (Justified) |
| D RWJ | 0 | Read Word 0 to Word 1 (Justified) |
| F RDJ | 0 | Read Byte 0 to Byte 0 |
| F RDJ | 0 | Read Byte 1 to Byte 1 |
| D RWJ | 1 | Read Byte 2 to Byte 2 |
| D RWJ | 1 | Read Byte 3 to Byte 3 (Justified) |
| 5 RLBJ | 0 | Read Byte 0 to Byte 3 (Justified) |
| D RWJ | 0 | Read Byte 1 to Byte 3 (Justified) |
| 5 RLBJ | 1 | Read Byte 2 to Byte 3 (Justified) |
| 4 RBK | (0) | Read Block |
| C RSP | x | Read Special |
| E RX | x | Read Bus (No memory response) |
| B WDJ | 0 | Write Double even |
| B WDJ | 1 | Write Double odd |
| 7 WW | 0 | Write Word 0 from Word 0 |
| 3 WWJ or 7 WW | 1, 1 | Write Word 1 from Word 1 (Justified) |
| 3 WWJ | 0 | Write Word 0 from Word 1 (Justified) |
| 0 WLB | 0 | Write Byte 0 from Byte 0 |
| 8 WRB | 0 | Write Byte 1 from Byte 1 |
| 0 WLB | 1 | Write Byte 2 from Byte 2 |
| 8 WRB or 9 WRBJ | 1, 1 | Write Byte 3 from Byte 3 (Justified) |
| 1 WLBJ | 0 | Write Byte 0 from Byte 3 (Justified) |
| 9 WRBJ | 0 | Write Byte 1 from Byte 3 (Justified) |
| 1 WLBJ | 1 | Write Byte 2 from Byte 3 (Justified) |
| 6 WBK | (0) | Write Block |
| 2 WSP | x | Write Special |
| A WX | x | Write Bus (No memory response) |

3.4 Bus Operation
3.4.1 General Rules
3.4.1.1

Data is valid on the LMB when a bus operation is in progress and WAIT is not asserted. A bus operation is in progress if either BUSY or WAIT was asserted last cycle. Since all signals are only valid on the clock edge, the implication is that when WAIT was not asserted, then the LMB was valid (assuming a bus operation was in progress).

Therefore, all nodes on this bus must be ready to accept a 32 bit data or address word unless BUSY or WAIT is asserted. A node may assert WAIT until it is ready to accept a new transfer, if no BUSY or WAIT was asserted last cycle. For example, a memory with which is completing a read and needs its address latches for a sniff operation. In this case, WAIT is de-asserted in Cycle N signifying good data on the LMB in cycle N+1. WAIT is the re-asserted by the memory in Cycle N+2 which will pend the bus until WAIT is released when it's ready to accept a new address in the next cycle. This, in effect, will stretch the address phase of the next transfer.

3.4.1.2

When a cycle is pended by the WAIT signal, the 32 LMB lines are marked as undefined. Although a node can stretch either phase by asserting WAIT, it CANNOT assume data is valid throughout the stretched phase. The LMB is ONLY valid during the last cycle of that phase, when WAIT gets de-asserted (see 4.1.1)

3.4.1.3

The parity lines (LBPO-3) are always valid in the cycle following the valid (last) cycle of the address or data phase. They are not affected by the WAIT signal except as to how WAIT determines when a valid data or address cycle has occurred.

3.4.1.4

Bits 4–31 must contain a valid physical word address during the address phase of a memory reference.

3.4.1.5

For all Byte writes and reads, the upper 24 bits of the LMB during the data phase are undefined with the requirement that ood parity is maintained.

3.4.1.6

For all Word writes and reads, the upper 16 bits of the LMB during the data phase are undefined with the requirement that good parity is maintained.

3.4.1.7

Each node on the LMB must be able to recognize an address phase in order to check for its address. This is accomplished by starting at RESET and expecting an address phase to begin with BUSY and ˜ WAIT asserted. Data phases always follow address phases except, possibly, in the cases of ABORTs, and RESETs. Either of those conditions should reset the memory state machines so that an address phase is expected next.

ABORTs happen for one BUS_CLK cycle, and therefore must immediately reset state machines to expect an address phase. This address may come as soon as the BUS_CLK edge immediately following the edge in which ABORT was asserted. This would be indicated by BUSY being asserted with no WAIT, as usual.

RESETs may be asserted for many cycles and must keep all nodes in a benign, reset state, i.e. in one which does not drive nor corrupt any of the Bus signals. When RESET does go away, any node is expected to be able to take an address immediately when BUSY becomes asserted, unless WAIT is being driven.

3.4.1.8

The ERROR signal is a special case in which the CPU (or the main processor node) must respond with a read special. When the ERROR signal is asserted by a node, it must keep pertinent information (see the READ SPECIAL command for ERRORs in the appendix) but continue with bus operations as usual. The CPU must recognize the error condition and handle it as is deemed proper.

Care must be taken, however, not to upset the Bus protocols in any manner whatsoever when ERROR is asserted. In most systems, the ERROR line is expected to cause a high priority interruption of processing, resulting in an immediate READ SPECIAL of the reporting node. In order for this to correctly occur, the sequences of Data always follows Address must be preserved. This will insure that all state machines will stay synchronized. This must be true whether the error occurs on the address or data.

Very importantly, if a system was to ignore the ERROR signal, everything must continue to function in a protocol-proper manner whether or not the data has been corrupted. In this case, once an ERROR has occurred, the ERROR signal would remain asserted indefinitely.

In the case of multiple ERRORs, any one reporting node would be expected to save the pertinent information only for its most recent error.

3.4.1.9

Block Reads and Writes MUST be on even words—that is, Bit 31 must be zero.

3.4.1.10

Interrupts (either the INTR line or the NMI line) may occur at any time. The interrupting node must continue to assert that line until a Read Special is issued to it. However, it is a requirement that the interrupt not impede any other transaction—including one that may be addressing the interrupting node itself.

The INTR is a maskable interrupt and may last many cycles before being serviced. For that matter, it may never be serviced. Response to an NMI may, as well, take many cycles. The node that is interrupting must continue to operate as if there was no interrupt pending at all.

If a second interruptible event occurs on any one node, it may continue to assert INTR or NMI even while the first one is being handled in order to receive multiple interrupt services. In that case it will appear just as though there were multiple nodes interrupting. The sequence of service is determined by the master node.

3.4.2 Page and Node boundaries

Prior-art page boundaries (1K words, or 2KB) have no meaning on the LMB. Reading or writing data that crosses one of these boundaries will appear just as any other read or write. It is up to the CPU (or other processor) to insure that accesses correctly cross (or don't cross) logical pages. Node boundaries, on the other hand, have the following characteristics and restrictions:

Double word read requests that straddle a node boundary will result in only the first word being read. It will be properly aligned on the 16 MSB's of the LMB, with good parity. The second word (16 LSB's of the LMB) will be undefined, with good parity.

Write requests that straddle a node boundary are not allowed. Executing such an operation may cause a loss of memory data, and may degrade memory bus integrity.

Block Transfers (either Reads or Writes) that cross a node boundary are not allowed.

3.4.3 Detailed Descriptions

The following descriptions of various bus operations are accompanied by timing diagrams. CPU 101, MCU 201, and IOC 202 are assumed to be the only requestors but represent any processor, local peripheral controller and local memory node respectively. For lines such as BUSY, WAIT and INTR/NMI, the legends CPU, IOC or MEM indicate the driver of that line at that point in time. The letters A and D are used on the LMB line to indicate whether the LMB is in an address or data phase. The letter X is used to indicate an undefined period on the signal(s). Nodes must ignore any signal which is marked an X at that time.

The description will refer to the diagram by referencing the BCLK cycle number (top line of each example). BCLK cycles are all 80 ns between active edges.

3.4.3.1 Reads

Reads are initiated by a requestor in the cycle following a clock edge in which BUSY and WAIT were not asserted and, if the requestor is not the CPU, when REQ_OUT and not REQ_IN conditions are true. The initiations consists of an address being placed on the LMB and the assertion of BUSY, both done by the requestor.

EXAMPLE #1

Figure 304:
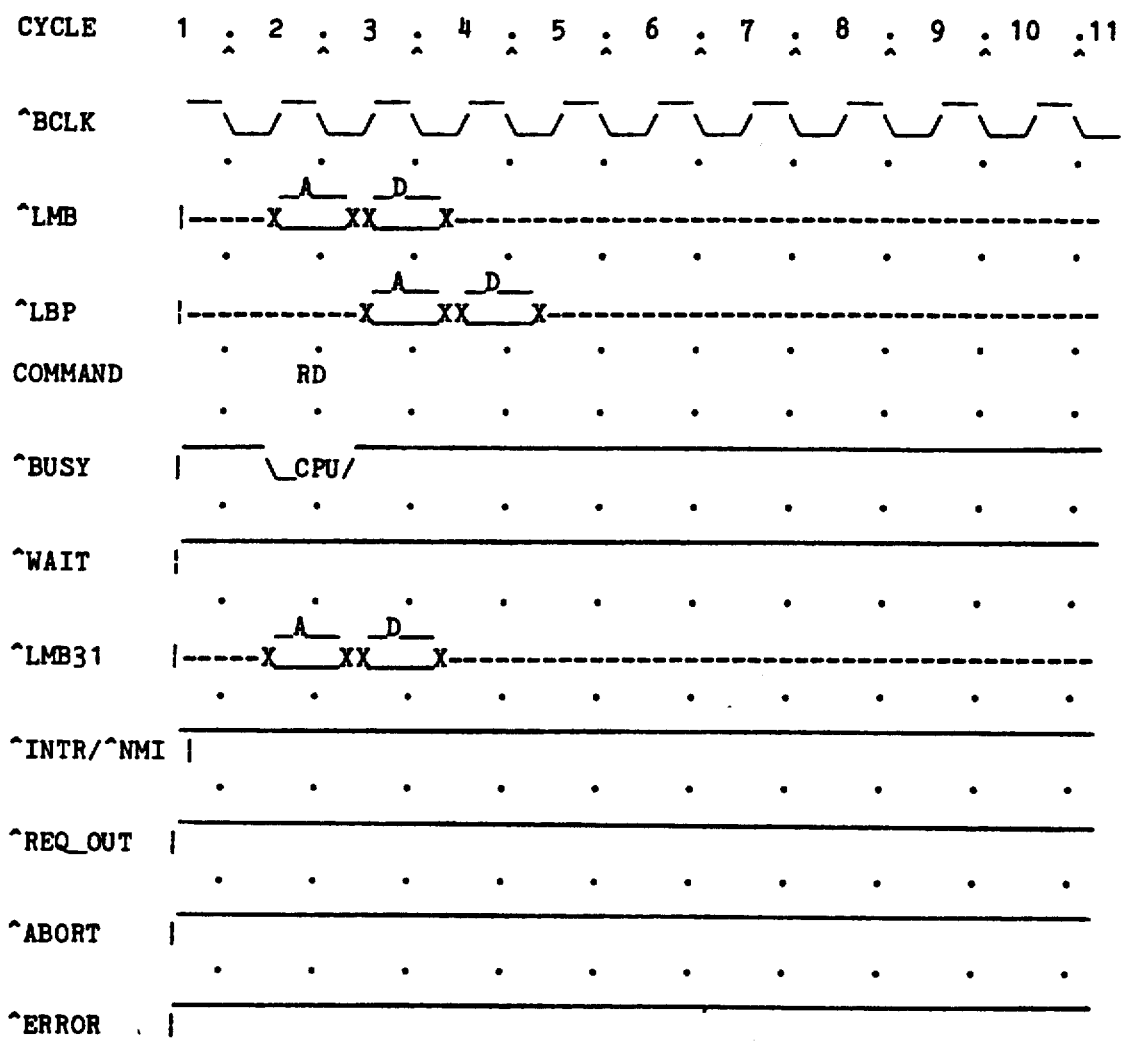
Figure 305:
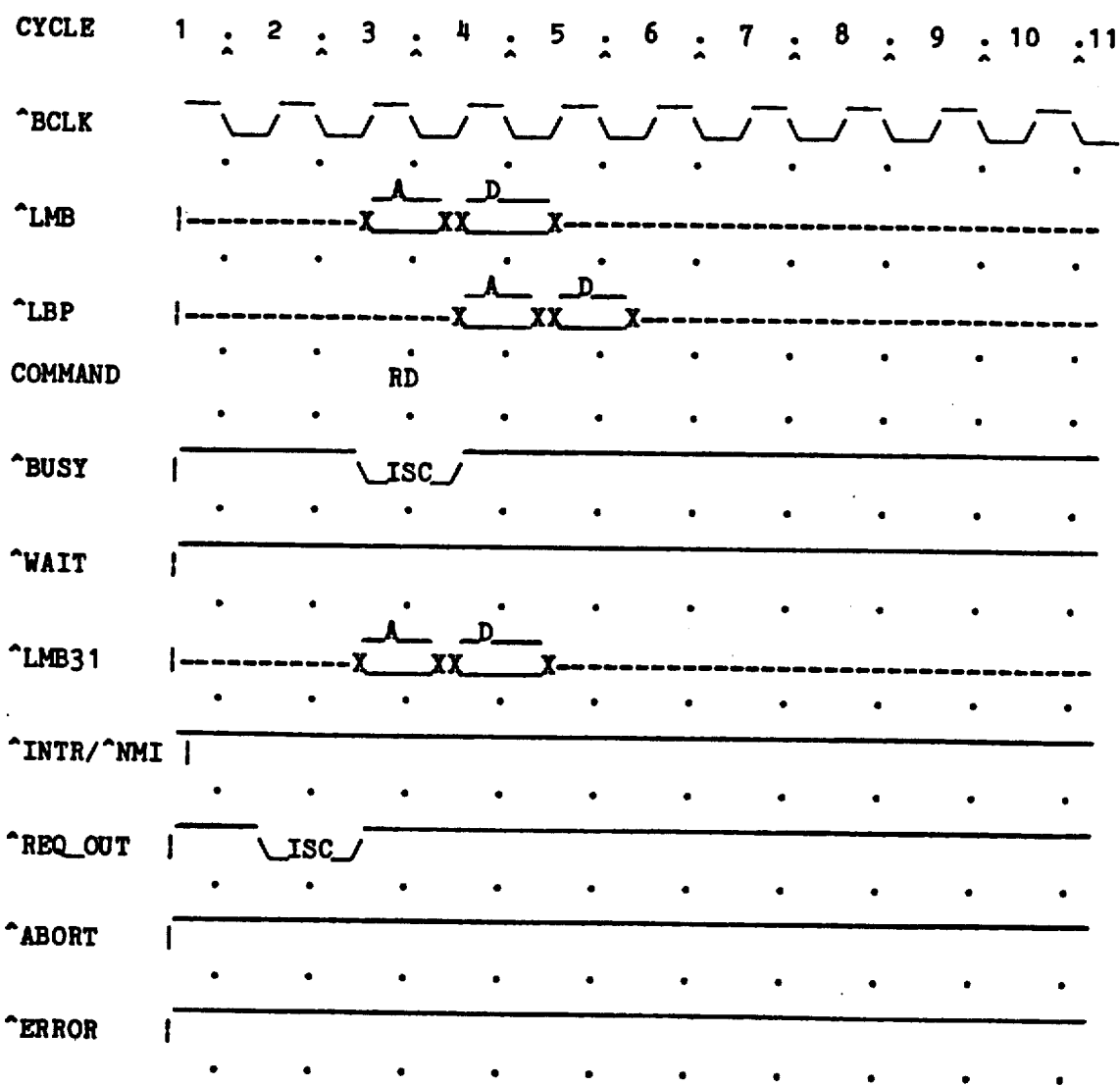
Figure 306:
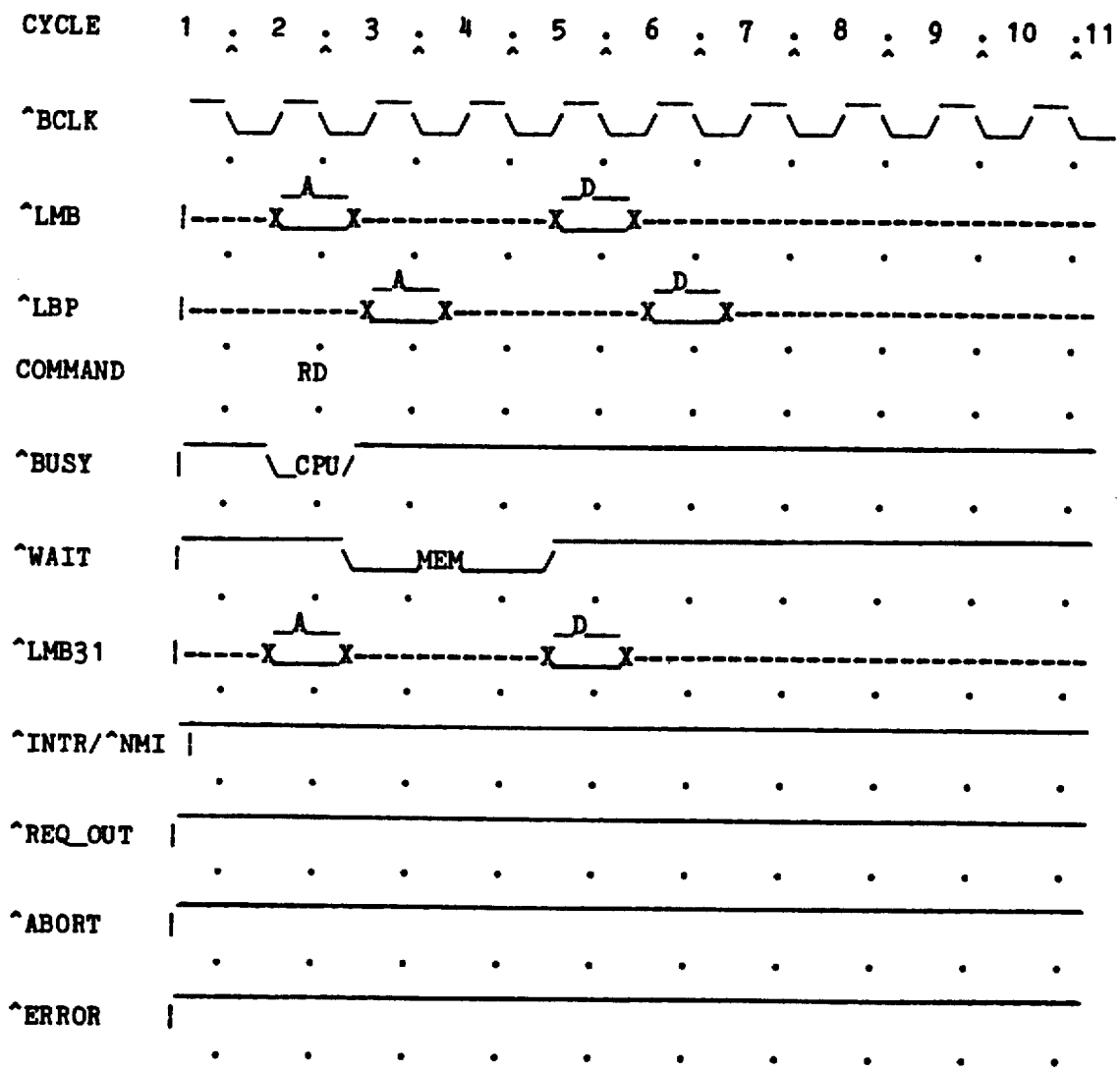
Figure 307:
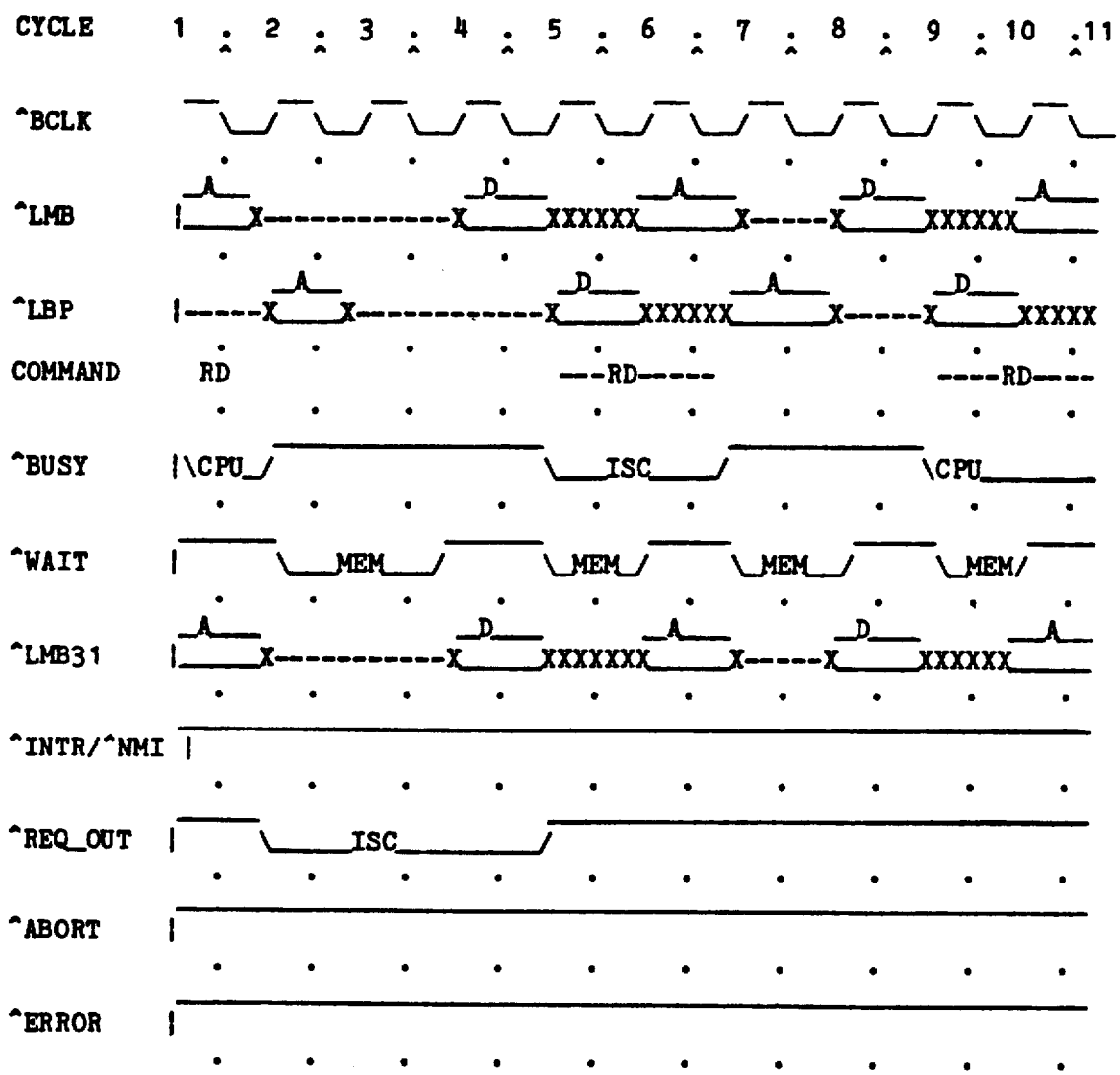
Figure 308:
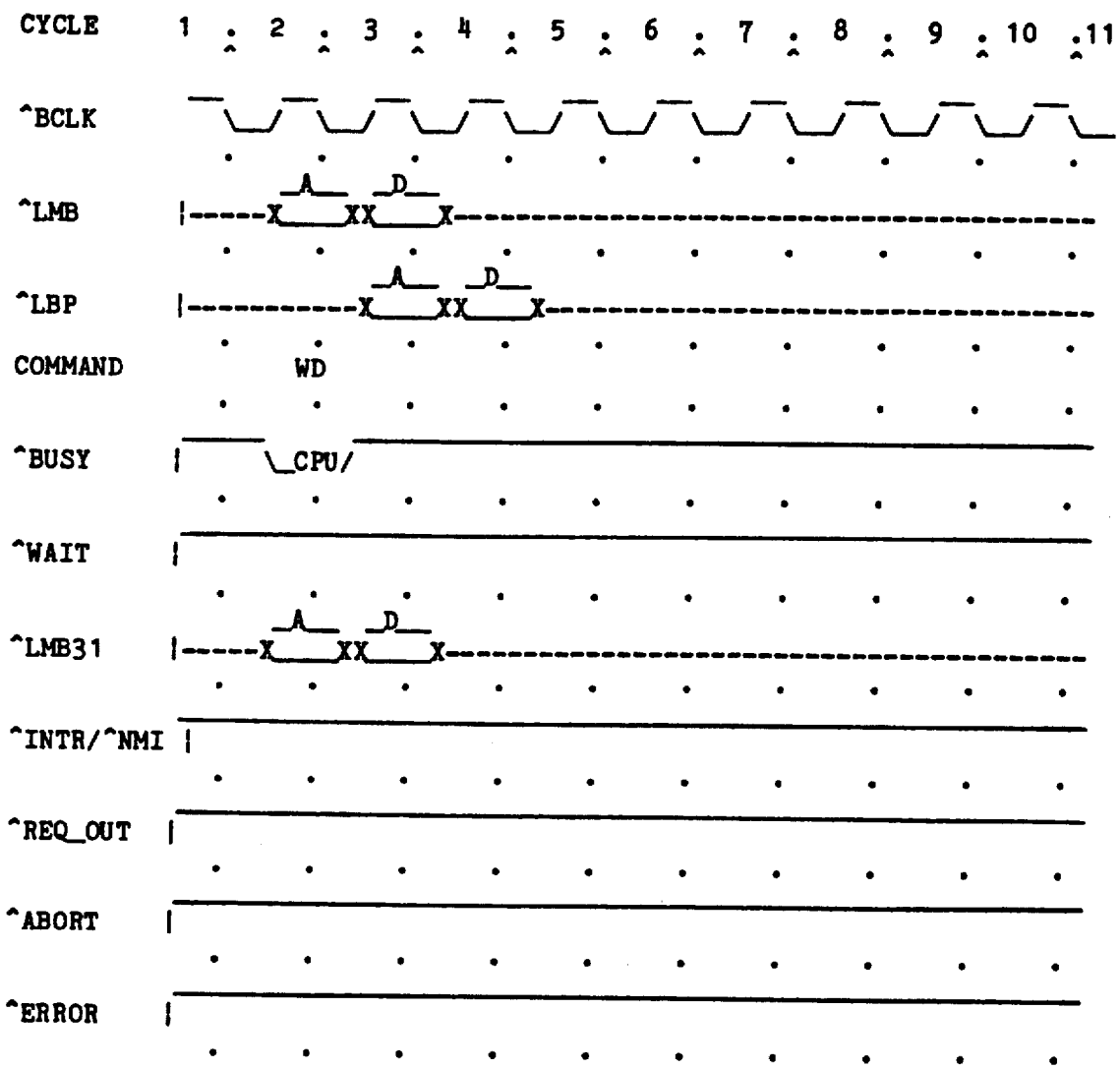

In the first example, "Example #1", the fastest memory operation is described. A timing chart of the example is shown in FIG. 304, and is explained below.

It is likely that a Read Special (RSP) will look like this example since the location read is, as described in connection with MCU 201, actually an internal register in the memory interface.

| Cycle | Description |
| --- | --- |
| 1 | Bus Idle |
| 2 | The CPU places an address on the LMB concurrently with asserting BUSY. This can be done since neither BUSY nor WAIT was asserted in cycle 1. |
| 3 | The memory sees that BUSY is asserted with no WAIT, which indicates that the address that was on the LMB in cycle 2 was valid and that a reference can begin. Assuming a very fast memory system, the valid data can be driven onto the LMB during cycle 3 as shown. The CPU drives correct parity for the address onto the LBP lines. |
| 4 | The CPU knows that there was good data on the LMB in cycle 3 since WAIT was not driven during that same cycle. The parity bits are checked by memory for correctness. The bus is ready to begin another operation in cycle 4 since neither BUSY nor WAIT was asserted in cycle 3. |
| 5 | The CPU checks data parity during this cycle which completes the reference. |
| 6 | Bus Idle. |

The next three examples (Example #2,3 and 4) show various read type operations. A cycle by cycle description will accompany each Example.

Example #2

Example 2 (timing chart shown in FIG. 305) again assumes a very fast memory and shows what the fastest read from a non processor LMB node would look like from the bus standpoint:

| Cycle | Description |
| --- | --- |
| 1 | Bus Idle |
| 2 | IOC has noted that neither BUSY nor WAIT was asserted last cycle and wants to use the bus. IOC 202, then, asserts its REQ_OUT line. |
| 3 | IOC has noted (again) that neither BUSY nor WAIT was asserted last cycle which means it can begin its read operation. IOC 202 asserts its address on the LMB and asserts BUSY. |
| 4 | Since WAIT was not asserted last cycle, IOC 202 knows that the address has been taken and the Read has begun. The MEM, being very fast, drives the data onto the LMB for IOC 202. IOC 202 is driving the LBP parity lines pertaining to the address from cycle 3. |
| 5 | IOC 202 has latched in good data at the end of cycle 4 as indicated by no WAIT was driven last cycle. The parity for the data is being driven by MEM, while the address parity is being checked by IOC 202. |
| 6 | The data parity is checked by IOC 202. Transfer is complete. |
| 7 | Bus Idle. |

EXAMPLE #3

Example #3 (timing chart in FIG. 306) is a realistic read of memory by the CPU. The only difference between this and Example #1 is the WAIT signal:

| Cycle | Description |
|---|---|
| 1 | Bus Idle |
| 2 | The CPU begins driving an address on the LMB, and the BUSY signal after noting that neither BUSY nor WAIT was asserted last cycle and that it needed to make a reference. |
| 3 | The memory begins the access and pulls WAIT since the access will not be complete during this cycle. The CPU drives address parity. The CPU is ready to receive data this cycle. |
| 4 | The CPU sees that the memory was busy last cycle and that good data was not received. The memory is still not ready and continues to drive WAIT. Parity is checked by the memory. |
| 5 | The CPU still sees WAIT so the input latches still do not close. The memory now has good data and begins driving it onto the LMB along with releaseing WAIT. |
| 6 | The CPU now realizes that good data was on the LMB in cycle 5 and takes the data. The memory drives out the parity for the data. |
| 7 | Parity is checked by the CPU, transfer is complete. |
| 8 | Bus Idle. |

Example #4

Example #4 (timing chart shown in FIG. 307) shows 3 back-to-back reads on the LMB. Interaction between data, BUSY and WAIT is shown.

| Cycle | Description |
|---|---|
| 1 | The CPU has begun a read transfer by pulling BUSY and driving the address onto LMB. |
| 2 | The memory drives WAIT, CPU drives address parity. IOC 202 has decided to begin a transfer and drives REQ_OUT. It is the only non-CPU node requesting the bus. |
| 3 | Both the CPU and IOC sees that WAIT was down and knows that the bus was pended last cycle. Memory checks address parity. |
| 4 | Again the CPU and IOC see that WAIT was down. The memory lets go of WAIT and begins driving good data. |
| 5 | The CPU takes the good data since WAIT was not asserted last cycle. The Memory drives data parity. IOC 202 sees that WAIT was not asserted and therefore begins to drive the LMB with an address and BUSY for one cycle. IOC 202, in addition, releases REQ_OUT. Meanwhile, the memory is not ready to accept another transfer, and therefore, drives WAIT. |
| 6 | The CPU checks data parity. IOC 202 sees that WAIT was asserted last cycle and therefore repeats itself by driving the address onto the bus along with driving BUSY for another cycle. Memory is done holding off the transfer, so it releases WAIT. |
| 7 | IOC 202 sees WAIT go away (as well as memory) which indicates that the address was taken. IOC 202 drives address parity, lets go of BUSY and prepares to receive data. The memory pulls WAIT for access time. |
| 8 | Address parity is checked by the memory. IOC 202 sees that WAIT was down last cycle and waits another cycle for data. Memory lets go of WAIT and drives the data onto the LMB. |
| 9 | IOC 202 takes the data since WAIT was not down. The memory drives parity for IOC 202 to check in cycle 10. The CPU sees that neither WAIT nor BUSY were down last cycle so it begins a transfer by placing an address on the LMB and drives BUSY. The memory drives WAIT (maybe for a refresh) which pends the address phase. The CPU will complete the read as usual. |

3.4.3.2 Writes

Writes are initiated in the same manner as reads by a requestor after neither BUSY nor WAIT was asserted last cycle. After the address is accepted, however, the requestor must drive the data (or drive WAIT until it can drive data) for the write. If the memory needs data recovery time (and cannot overlap this with the acceptance of a new address) then it must drive WAIT after the data is accepted, until it is able to accept an address of a new request Examples 5 and 6 show simple Write examples. Note that a non-CPU write would simply be preceded by a REQ_OUT signal as already exemplified by the IOC reads above.

Example #5: FASTEST CPU WRITE TO MEMORY

Example #5 (timing chart depicted on FIG. 308) depicts the fastest CPU write to memory:

| Cycle | Description |
|---|---|
| 1 | Bus Idle. |
| 2 | CPU drives BUSY and address for WD to memory |
| 3 | Memory accepts address and is ready for data. The CPU drives data in addition to the address parity. |
| 4 | Memory accepts data and does write. Memory also checks address parity from CPU. CPU drives data parity. |
| 5 | Memory checks data parity. Operation is complete. |
| 6 | Bus Idle. |

Example #6

Figure 309:
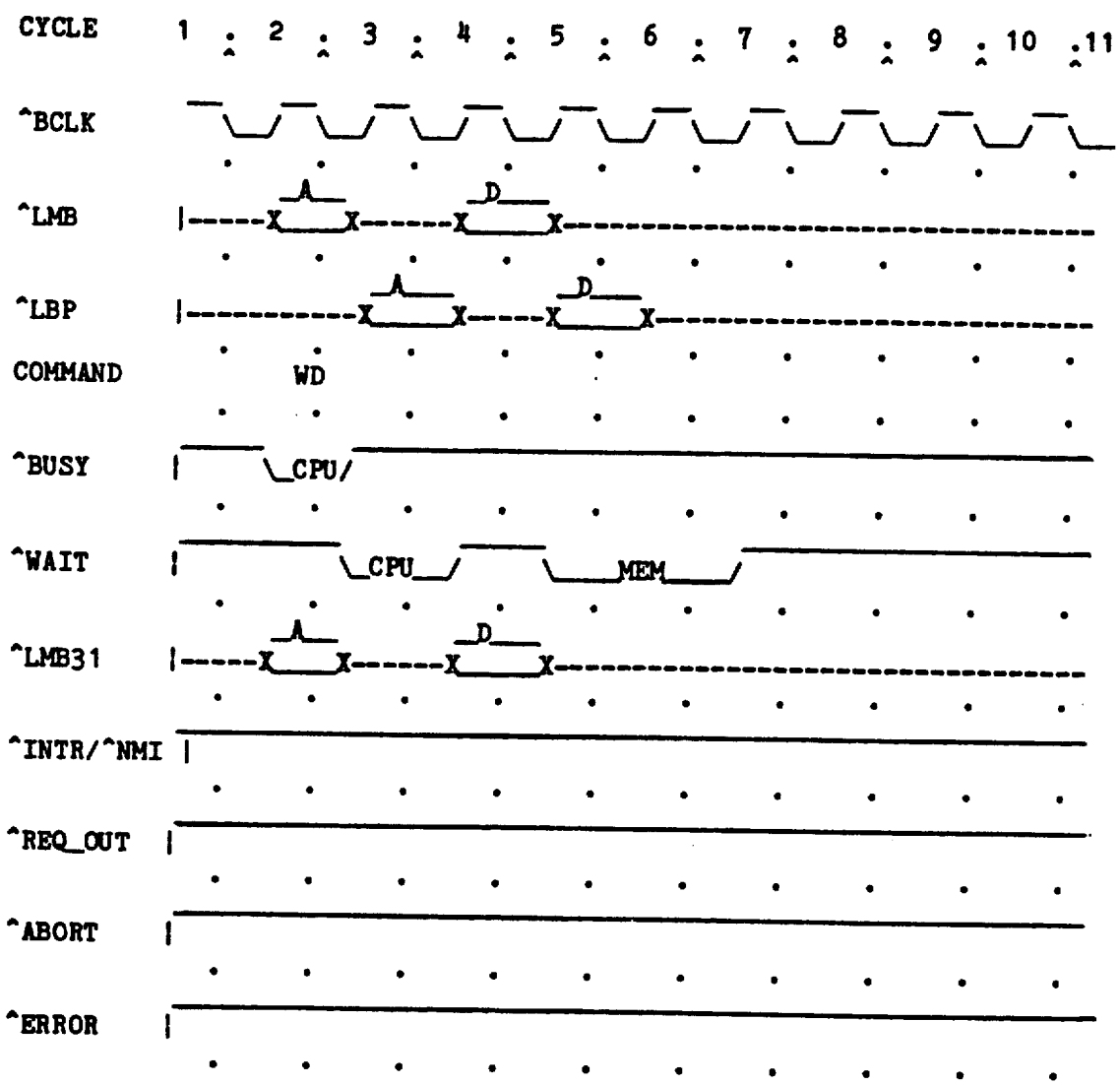
Figure 310:
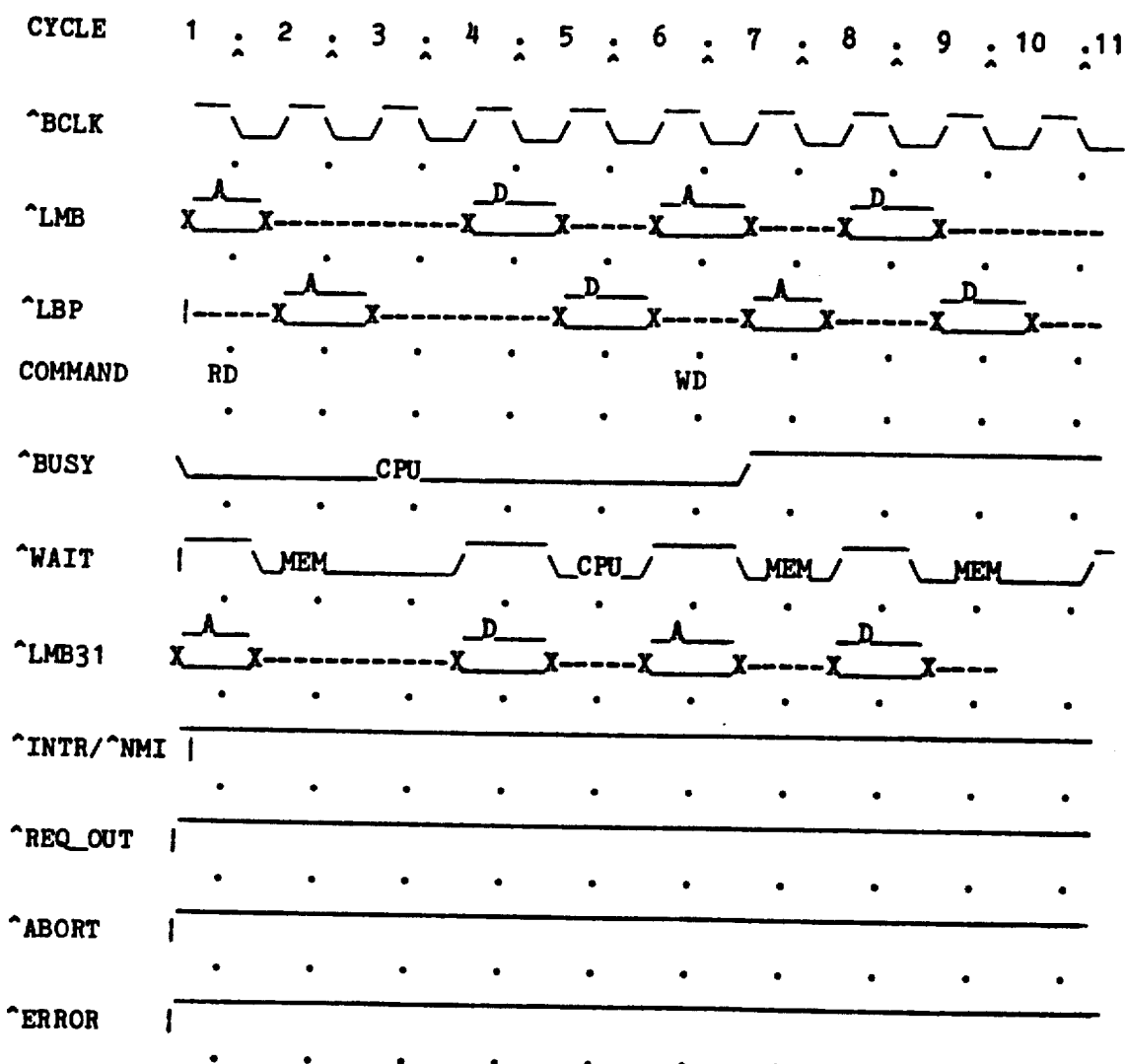
Figure 311:
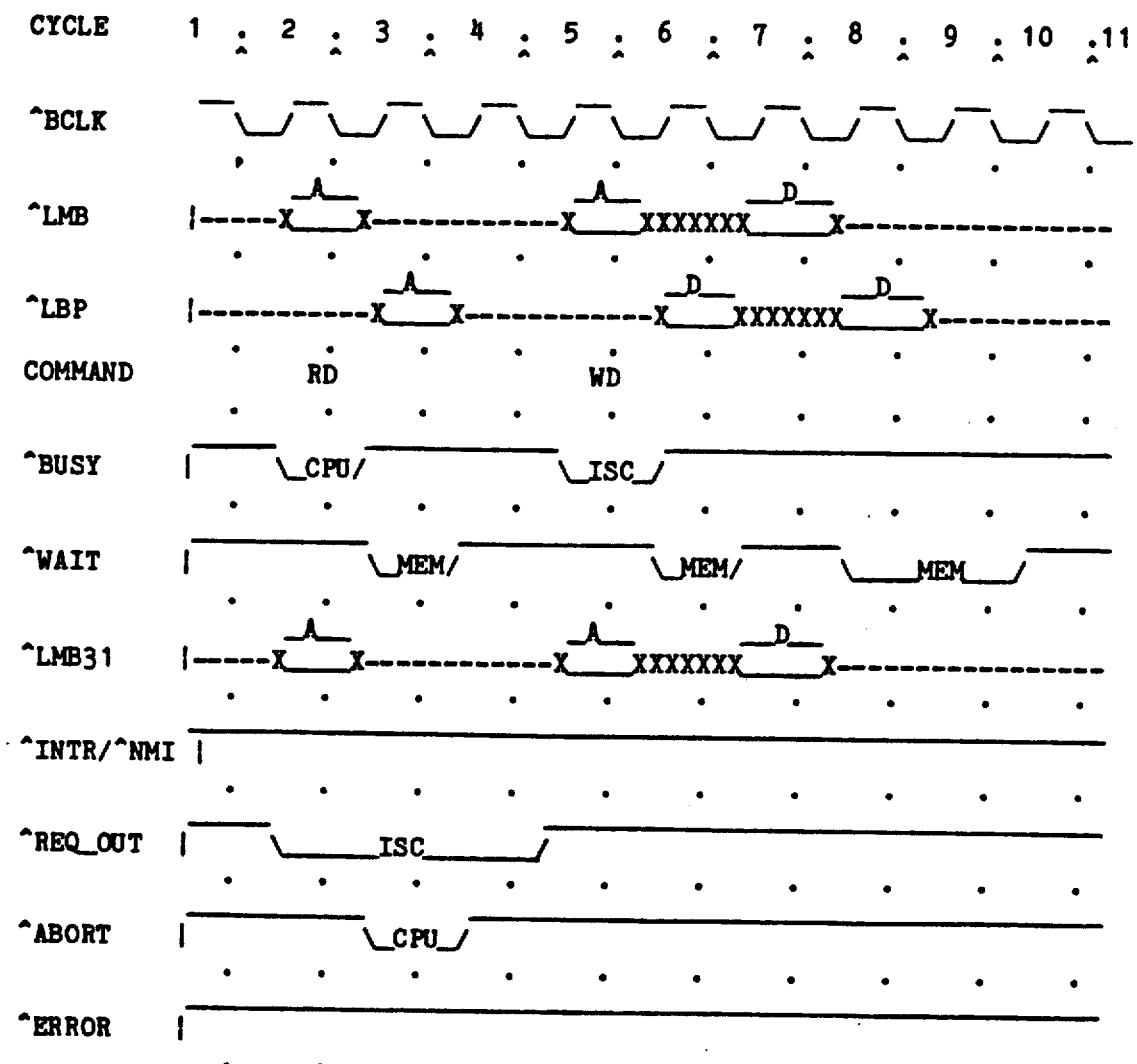
Figure 312:
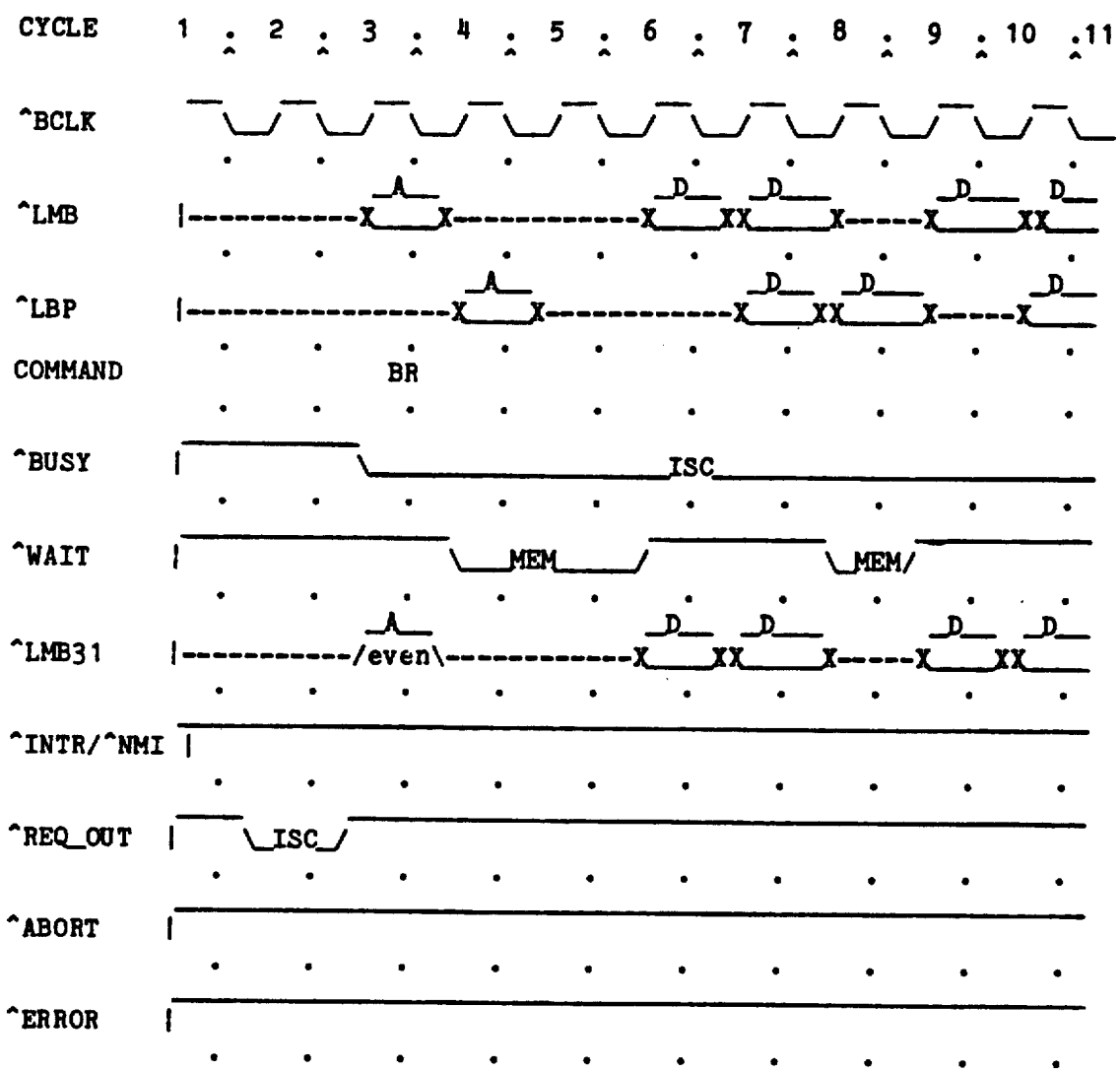
Figure 312:
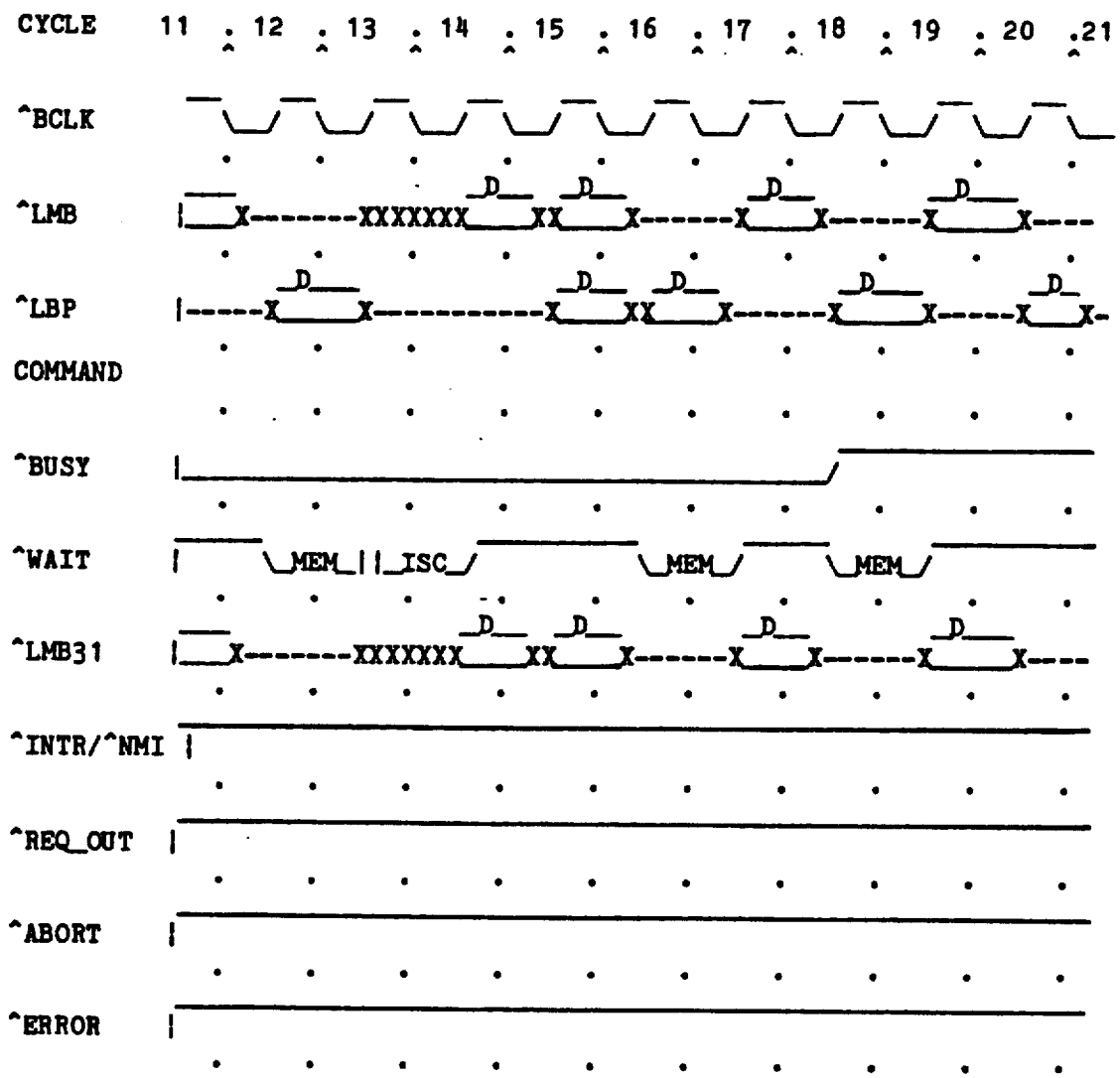
Figure 313:
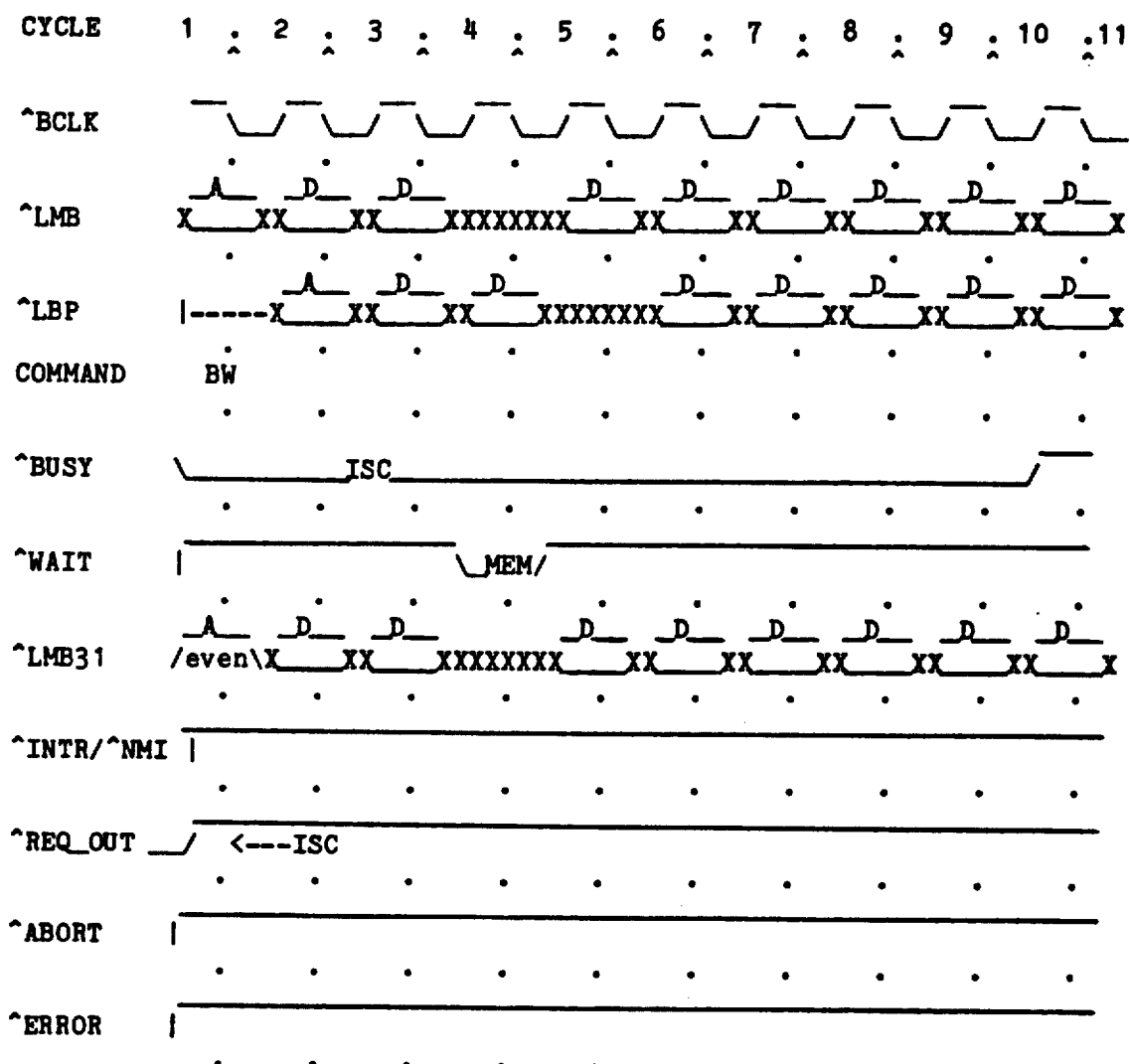
Figure 314:
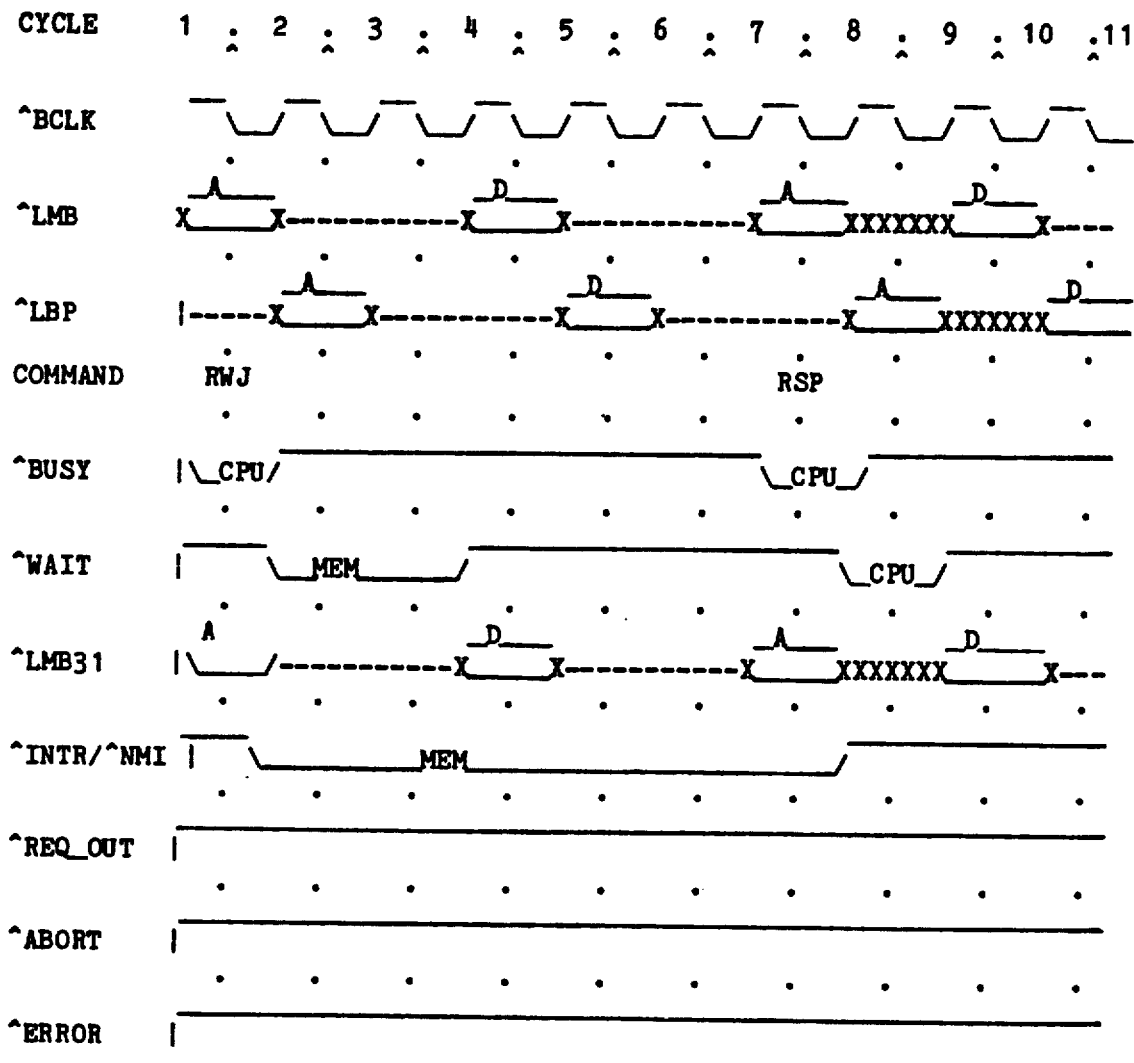

Expected Double Word Write from CPU to Memory (depicted in FIG. 309). Note that a non-CPU write would look identical except that REQ_OUT would be asserted before the transfer as shown for Reads above.

| Cycle | Description |
|---|---|
| 1 | Bus Idle. |
| 2 | CPU drives Address and BUSY since neither BUSY nor WAIT was asserted last cycle. |
| 3 | CPU drives WAIT because it is not yet ready to transmit data to the memory. (Memory may drive WAIT here, as well, for its latching mechanism. Since the CPU is driving WAIT also, this is hidden.) CPU drives address parity. |
| 4 | Memory notes WAIT was asserted so does not write. Memory checks address parity. CPU drives good data onto LMB. |
| 5 | Data is accepted by Memory and Write is started. Data Parity is driven by CPU. Memory drives WAIT for one or two cycles here to hold off any more addresses until the Write is completed. |
| 6 | Data parity is checked by the memory. In this case, Memory is still asserting WAIT so that no address can be driven next cycle. |
| 7 | Bus becomes idle. |

3.4.3.3 Locked Operations

When a requestor wishes to execute an indivisible memory operation, it may use the Locking mechanism on the LMB. This will insure that a memory location will not be seen or changed by any other requestor for the duration of the locked operation. The most common use of this Locked operation is a Read-Modify-Write semaphore type reference.

Locked operations on the LMB take place simply by asserting the BUSY signal for the duration of the desired locked operations. All other signals work as defined for all other operations. Since BUSY is asserted, no other requestor will be able to use the bus while it is locked. Any node, however, will still have the power to pend the bus by asserting WAIT for internal operations such as refresh.

As this does prevent others from using the bus, Locked operations should be used for short periods of time and only when necessary.

To perform the Lock, BUSY is asserted by the requestor at the beginning of the first operation during the address phase. It is asserted at the same time as with any address phase. BUSY must be held, however, throughout this memory operation and subsequently held until the end of the address phase of the last memory operation in the locked set of references. Note that the WAIT signal defines the validity of address and data phases. In the locked situation, WAIT must be used between memory operations (between the data phase on one and the address phase of the next operation) if the locking requestor is not able to begin that address phase immediately (i.e. 80 ns after the end of the last data phase).

Example #7

Example 7 (timing chart depicted in FIG. 310) shows the most common Locked operation. The CPU is doing a read operation and a write operation without allowing any other requestor to divide those operations.

| Cycle | Description |
|---|---|
| 1 | The CPU has begun a RD operation by driving BUSY and the LMB with the address of the read. |
| 2 | The memory pulls WAIT, as usual, for the Read access. The CPU drives BUSY for the locked operation and will continue to hold it. Address parity is driven by the CPU. |
| 3 | Mem continues to drive WAIT while waiting for access time. Mem checks address parity. CPU continues to Lock by driving BUSY. |
| 4 | Mem completes the read and drives the data onto the LMB while releasing WAIT. CPU continues Lock via BUSY. |
| 5 | CPU takes data since it sees that WAIT has gone away. The CPU is not yet ready to write back the data so it drives WAIT. Note that this is required in the Lock operation because BUSY is asserted. The Memory drives data parity. |
| 6 | The CPU is now ready to begin its second reference of the locked set. It therefore drives the LMB with the address while releasing WAIT. BUSY still remains asserted and will now act like the beginning of any normal transfer. The CPU checks data parity. |
| 7 | The Memory accepts the address and, in this case, drives WAIT to hold off the data phase. Address parity is driven by the CPU. BUSY is finally released by the CPU since the last reference of the locked set is in progress. |
| 8 | Mem now releases WAIT and, since the CPU is not asserting WAIT, the LMB is driven with data. Mem checks address parity. |
| 9 | A normal Write transfer is in progress here - data is accepted by the memory; WAIT is driven by the Mem to hold off the next address phase; and data parity is driven by the CPU. |
| 10 | Data parity is checked by Mem. The memory holds WAIT for one more cycle. |
| 11 | WAIT is released and Bus becomes idle. |

3.4.3.4 Aborted Memory Operations

A reference may be aborted by using the ABORT signal. This allows requestors to begin memory references before it has been validated. That is, before it has been determined that the reference should indeed take place.

ABORTs must be done directly following or during an address phase by asserting the ABORT signal for one BUS_CLK cycle. The memory which is executing the read or write operation will cease all work on that operation and stop driving the data lines by the next cycle. It may choose, however, to continue driving WAIT to insure that the state machine is ready for the next address transmission.

Example #8

Example #8 (timing chart depicted in FIG. 311) descusses an aborted memory reference followed by a non-CPU write.

| Cycle | Description |
|---|---|
| 1 | Bus Idle. |
| 2 | CPU has begun a memory operation as usual. IOC 202 has pulled REQ for its own memory operation. |
| 3 | Mem pulls WAIT to begin the address access. The CPU drives Address Parity. IOC 202 sees BUSY asserted which indicates that it does not have the Bus and must continue to drive REQ. The CPU realizes that this operation should not have been started and pulls ABORT. |
| 4 | The Memory sees ABORT and stops driving WAIT. Further, it aborts the access and expects to see an address phase next. The Memory checks address parity as usual. IOC 202 sees WAIT and continues to request the bus via REQ. The CPU stops driving ABORT (it lasts only one cycle). |
| 5 | IOC 202 gets the bus since neither BUSY nor WAIT was asserted and drives the LMB with an address along with BUSY. IOC 202 releases REQ_OUT. |
| 6, etc | IOC 202 completes a normal Write operation. |

3.4.3.5 Block Operations

To increase memory bandwidth for higher speed device transfers, an LMB node may choose to use Block mode transfers. Block transfers will transfer 8 double words (32 bytes) in one operation. One address is transmitted in the usual manner, followed by 8 consecutive data phases without any additional addresses. The memory receiver of the data will read or write all 8 double word to/from consecutive locations by automatically incrementing the address. The transfer must begin on an even address.

Block transfers appear similar to locked operations in that BUSY is asserted during the entire transfer-through to the 7th data transfer. At that time it is de-asserted (unless the bus is being locked by that requestor) and the eighth data transfer occurs. All nodes on the bus must recognize the Block transfer command in order to remain in synchronization with address phases. Other than the multiple data phases and different command, block transfers follow all the rules already set forth for other operations.

Examples 9 and 10 exemplify the Block Read and Block Write operations respectively. They are both shown as non-CPU since, at this time, the CPU does not make Block references.

Example #9

Example #9 (timing chart in FIG. 312) depicts a block read by IOC 202 from memory.

| Cycle | Description |
|---|---|
| 1 | Bus Idle. |
| 2 | IOC 202 drives REQ_OUT to begin operation. |
| 3 | IOC finds neither BUSY nor WAIT down and therefore begins driving address and BUSY. Command is a Block Read. |
| 4 | IOC notes that address was taken since WAIT was not driven. Memory drives WAIT for read access. IOC drives address parity. IOC continues to drive BUSY for the Block Transfer operation. |
| 5 | Address parity is accepted and checked by memory. Mem continues to drive WAIT for access time. IOC continues to drive BUSY. |
| 6 | Memory has completed the access for the first double word and begins driving that data onto the LMB lines. |

-continued

| Cycle | Description |
|---|---|
| | Mem releases WAIT. IOC 202 continues BUSY. |
| 7 | Mem is ready for the next transfer and sees that WAIT was not asserted last cycle. Mem, therefore, drives the next 4 bytes of data. IOC 202 is fast enough to accept tha data and thus does not drive WAIT. The memory drives data parity for the first word. IOC 202 continues BUSY. |
| 8 | Once again, IOC 202 takes the data (no WAIT was asserted). The Memory pulls WAIT this time, which allows it to access the next couple of data words which are to be sent. IOC 202 checks parity on the first transfer of data. IOC 202 continues BUSY. |
| 9-12 | The memory continues to drive Data and Parity out, while IOC 202 is collecting the data and checking parity for the next 2 4-Byte transfers. In cycle 12, Mem drives WAIT to give it time to access the next few data words. IOC 202 still drives BUSY. |
| 13-14 | IOC 202, here, is not ready to accept the data and, to indicate such, drives WAIT. The memory responds by driving the data (again) in cycle 14. (The data in cycle 13 is X'd cut since, by definition, it is not valid because WAIT is asserted.) IOC 202 continues BUSY. |
| 15-17 | The next two double words (fifth and sixth transfer) have been driven and received. Mem pulls WAIT down in cycle 16 to pend once again waiting on access time. The memory drives the seventh data word out onto the LMB in cycle 17 and releases WAIT. IOC 202 continues BUSY. |
| 18 | IOC 202 accepts the seventh data transfer and, since WAIT was not asserted, releases BUSY. This is in accordance with the defined protocol. One more data word is then expected. Memory drives WAIT to indicate that it is not yet ready to return data. Mem is also driving data parity for the seventh data transfer. |
| 19-21 | The final data transfer is completed as with any other read type operation with data parity following right behind it. The operation is complete and bus idle at cycle 21. |

Example #10

The example (timing chart depicted in FIG. 313) shows a very fast Block Write operation from IOC 202 to memory. IOC 202 is shown as being able to transfer all 8 double words in apparently 8 consecutive BUS_CLK cycles. The Memory is shown as being able to accept all of them with only one WAIT inserted after the 2nd double word transfer.

| Cycle | Description |
|---|---|
| 1 | IOC has already made a request and begins driving Address and BUSY since neither BUSY nor WAIT was asserted last cycle. |
| 2 | IOC 202 drives Data #1, Address parity, and BUSY. |
| 3 | IOC drives Data #2, parity for Data #1 and BUSY. Memory checks parity on address. |
| 4 | IOC drives Data #3, parity for Data #2 and BUSY. Memory checks parity on Data #1. Memory is not ready to accept another data transfer, it thus drives WAIT. |
| 5 | IOC drives Data #3 again, since WAIT was down last cycle. IOC continues BUSY. Memory checks parity on Data #2. Memory releases WAIT because it is ready to accept more data. |
| 6 | IOC 202 drives Data #4, parity for Data #3 and BUSY. |
| 7 | IOC drives Data #5, parity for Data #4 and BUSY. Memory checks parity on Data #3. |
| 8 | IOC drives Data #6, parity for Data #5 and BUSY. Memory checks parity on Data #4. |
| 9 | IOC drives Data #7, parity for Data #6 and BUSY. Memory checks parity on Data #5. |
| 10 | IOC notes that the 7th word has been accepted and thus releases BUSY. IOC drives Data #8 and parity for Data #7. Memory checks parity |

| Cycle | Description |
|---|---|
| | on Data #6. |
| 11 (not shown) | IOC drives parity for Data #8. Memory checks parity on Data #7. Any LMB node could begin driving an address on the bus since neither BUSY nor WAIT was asserted last cycle. |
| 12 (not shown) | Memory checks parity on Data #8. Block transfer is complete. |

3.4.3.6 Interrupt Operations

Any node on the LMB may communicate with the bus master (main processing node such as the CPU) via one of the two interrupt lines. The INTR signal and the NMI signal follow the same protocol and cause the master to respond by issuing a Read Special to the node wishing to report some interrupt condition. If multiple conditions are to be reported, INTR and/or NMI may be held asserted until all interrupt conditions are acknowledged by the master vis individual special reads.

Example #11

Example #11 (timing chart depicted in FIG. 314) shows an interrupt line being asserted during a Read Word operation from the CPU. Note that even after the bus becomes free, the interrupt is not immediately acknowledged. The acknowledgement will not necessarily come quickly, nor will it always be the next transfer request (to that, or any other node) on the bus.

| Cycle | Description |
|---|---|
| 1 | CPU begins a single word read by driving BUSY and the address. |
| 2 | Mem wants to report an NMI for the video board due to Break key interrupt. Mem also begins to drive WAIT for its normal read data access time. CPU drives address parity. |
| 3 | Mem now will hold NMI until it becomes acknowledged. Mem is driving WAIT one more cycle and checking address parity for the read in progress. |
| 4 | Data is now driven by the memory and WAIT is released. Mem is waiting for NMI acknowledgement. |
| 5 | Data is received by the CPU, Parity is driven by the Mem. Bus is available for other transactions. NMI still not acknowledged. Note that another Read could occur and would complete even though an interrupt is pending. |
| 6 | Bus Idle. Data parity being checked by CPU. |
| 7 | The CPU is now ready to acknowledge the interrupt and thus does a Read Special to the memory node interrupt register. The CPU drives Busy as usual. |
| 8 | The address was taken as is evidenced by the fact that WAIT was not asserted. It can be seen that the Memory had only one interrupt pending since neither INTR or NMI is asserted anymore. The CPU is not able to receive the data word back from the memory (the results of the RSP command) even though the memory is ready to return the interrupt register data. The CPU drives address parity. |
| 9 | The data is repeated by the memory since WAIT was asserted last cycle. The CPU is now ready to receive it and so it releases WAIT. Address parity is checked by the memory. |
| 10, etc. | The data word is accepted by the CPU, followed by parity and checking of parity, as usual. The CPU will now inform the software of the interrupt condition though a series of microcode and macrocode routines. Proper action will be initiated as a result. |

3.4.3.7 Error Operation

Error conditions are generally fatal errors such as multiple, uncorrectable bit errors in memory, or bus parity errors. Usually, an attempt will be made, by the master processor (e.g. CPU) to retry the transfer that caused the error. In some systems, however, this ERROR signal line will simply be ignored. In either case the bus protocol must remain intact.

The actual protocol is almost identical to that of interrupts. The major difference is the effect and severity of the interrupt. Also, any node is only expected to keep track of the last error, should more than one error occur before a servicing transfer has taken place. In the interrupt case, however, no interrupt can be lost.

Example #12

Figure 315:
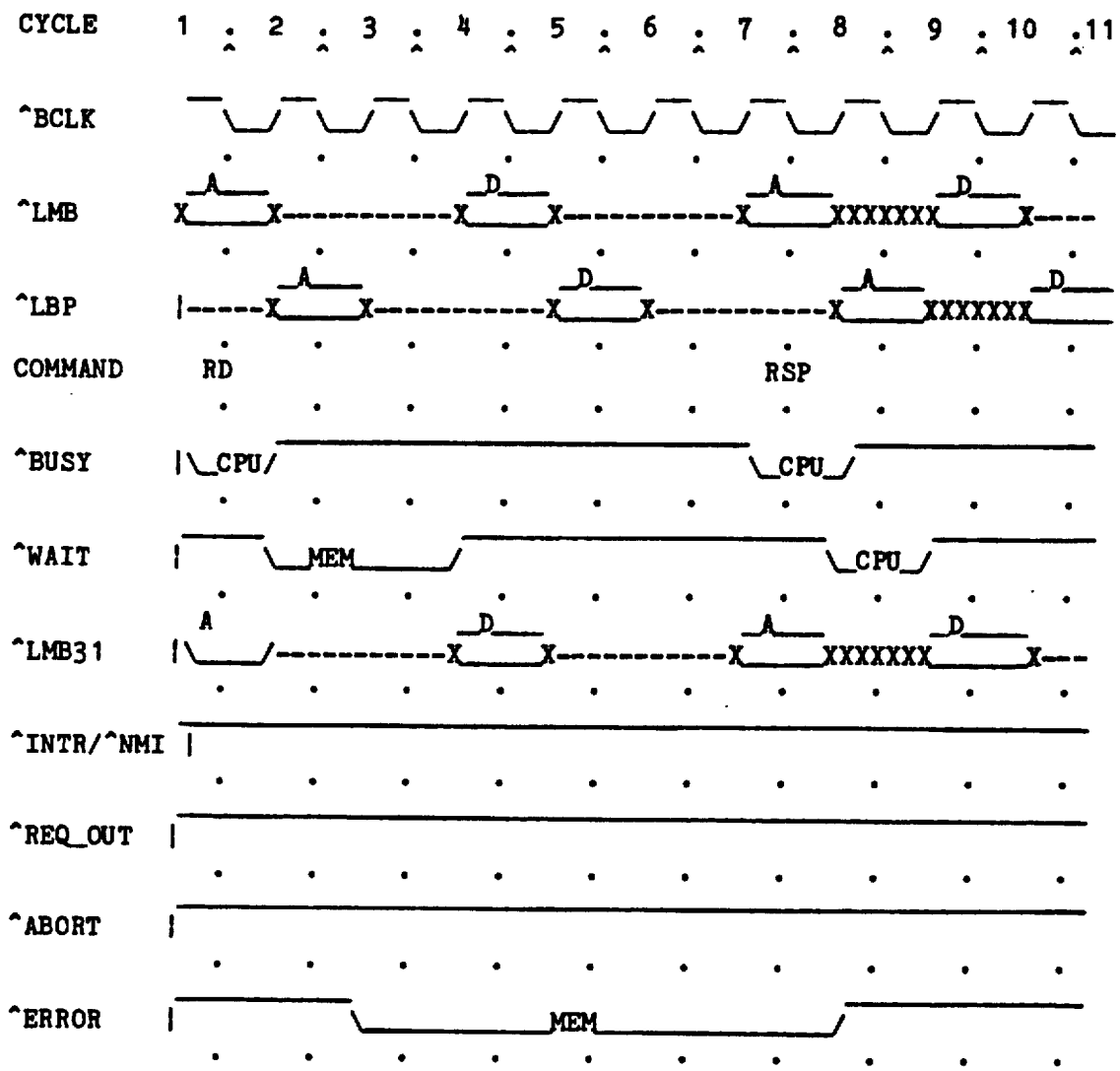

Example #12 (of which the timing chart is depicted in FIG. 315) discusses the timing of an ERROR which happens because of an address parity error and closely parallels the above INTR case. The CPU will handle the error a while after it is notified.

| Cycle | Description |
|---|---|
| 1 | CPU begins a read double by driving BUSY and the address. |
| 2 | Mem begins to drive WAIT for its normal read data access time. CPU drives address parity. |
| 3 | Mem checks the address and finds a parity error. It, therefore, drives ERROR. Since it is a Read, it completes the Read, even though it is probably the wrong data. If this were a Write, the memory may choose not to Write, although this is neither required nor necessary. |
| 4 | Data is now driven by the memory and WAIT is released. Mem will continue to drive ERROR in anticipation of acknowledgement. |
| 5 | Data is received by the CPU, Parity is driven by the Mem. Bus is available for other transactions. ERROR still not acknowladged. Note that another Read could occur and would complete even though the ERROR is pending. |
| 6 | Bus Idle. Data parity being checked by CPU. |
| 7 | The CPU is now ready to acknowledge the ERROR and thus does a Read Special to the memory node error register. The CPU drives Busy as usual. |
| 8 | The address was taken as is evidenced by the fact that WAIT was not asserted. Memory releases ERROR as a result of its error register being read. The CPU is not able to receive the data word back from the memory (the results of the RSP command) even though the memory is ready to return the error register data. The CPU drives address parity. |
| 9 | The data is repeated by the memory since WAIT was asserted last cycle. The CPU is now ready to receive it and so it releases WAIT. Address parity is checked by the memory. |
| 10, etc. | The data word is accepted by the CPU, followed by parity and checking of parity, as usual. The CPU will now take appropriate action as a result of the ERROR. |
| 3.5 | Electrical Characteristics of the LMB: |
| 3.5.1 | Timings: |

All timings are in relation to BCLK on the backpanel:

| Set-Up Time | 15 ns | all signals except REQ_OUT |
|---|---|---|
| Set-Up Time | 55 ns | REQ_OUT |
| Max Prop delay | 10 ns | REQ_IN to REQ_OUT |
| Hold Time | 10 ns | all signals |
| Margin Reqd | 4 ns | 5% of 80 ns cycle |
| Bus Prop Delay | 10 ns | LMB across backpanel |
| Connector Delay | 1 ns | per connector for all signals |

3.5.2 Loading

No more than 5 boards are allowed on the LMB-all on one continuous backpanel.

The Bus is rated at 50 pf max. All nodes must drive that amount within the given timing constraints.

Each node must load the bus with nor more than 8 pf capacitance on any signal except BUS_CLK.

Each node must load the bus with not more than 16 pf capacitance on BUS_CLK.

The bus is rated at 64 ma IOL max. All nodes must be able to sink that much current on all signals driven.

Each node must load the bus with not more than 10 ma of required low level supply on all signals except BUS_CLK.

Each node must load the bus with not more than 5 ma of required low level supply on BUS$_{CLK}$.

3.5.3 Termination

Only the backpanel will terminate the 43 LMB lines (not including BCLK, REQ_IN and REQ_OUT.) Each will be up/down terminated. The values of this termination are to be determined.

All nodes will have ˆ REQ_IN tied high via a 1K ohm resistor. This allows cards to be removed from the lowest priority end without the need for jumpering the backpanel. The CPU will only receive the REQ_OUT line of the lowest priority node.

The will be one point of up-down termination of BUS_CLK. 120 ohms up and 180 ohms down will terminate the 64mA driver correctly to a 72 ohm impedance, 3 Volt level and 41.3 mA required sink current. This termination is located on the backpanel.

Individual boards may place high ohmage (greater than 1K) pull up resistors on any line (provided that it does not violate loading rules) for testing purposes.

4. Detailed Description of MBus 205

4.1 Overview

MBus 205 is a bus used for providing a method of interfacing expansion memory and video memory locally to LMB Bus 203, by means of which data may be transferred to and from CPU 101 and IOC 202. MCU 201 performs all control functions on the MBus 205 and is therefore the only master. MBus 205 is 39 bits wide, 32 bits provided for data and 7 bits for ERCC (error checking and correction) of the memory (ERCC can be disabled). All transfers on MBus 205 are 32(39) bit data transfers; two-way interleaving is supported to help speed accesses. The MBus 205 has been optimized for 120ns, 256K X 1, dynamic rams; however, flexibility has been designed into MBus 205 to provide a reasonable interface for other devices.

MBus 205 provides a method of for CPU 101 and other I-bus nodes to communicate with and use expansion, video, and other space memories. This interface provides up to sixteen, 1 MByte banks of memory to be attached to the OPUS cpu or I-bus node. Two-way interleaving is provided between two adjacent banks of memories. Eight groups of two banks are selected by the RAS select lines, the two banks in a group are used for the memory interleaving.

MBus 205 is designed to provide the following features:

Up to 16 MBytes of memory for the OPUS cpu or I-Bus node.
Video memory Interface.
Auxiliary memory-mapped devices.
Special space memory interface.
Error correction for the memories.
Optimal control of 120nS, 256K, Dynamic rams.
Interrupt support for devices on MBus 205.
4.1.2 Configuration As is seen in FIG. 102, MCU 201 is located on the OPUS cpu card, communications between the cpu and the memory control takes place over LMB bus 203. 2 MBytes of memory are provided on the processor board. Additionally, 8 MBytes of expansion memory may reside on a separate card connected to MBus 205. VCU 206 is also on a separate board and located on MBus 205. The 2 MBytes of memory on the cpu board occupy bank 0 and bank 1, the eight banks on the expansion memory card reside in bank 2 through bank 9, and the VRAMs 113 in bank 10 and bank 11.

4.2. Sectional Overview

This subsection contains general information on the operation of MBus 205.

4.2.1 Definitions

Card

A subset of memory that has its own access control circuitry and has homogeneous parameters of access time, error correction, etc.

Bank

One of the sixteen main subsets of memory. The MBus 205 supplies eighteen bits of address to each bank, providing up to 16 MBytes of memory.

Group

A memory group consist of two banks of memory, selected by one and only one of the RAS/CAS select lines. Two-way interleaving is supported between banks within a group.

Error Correction

The ability to detect a single bit error during the read of a 32 bit double word and correcting that bit producing an error free double word for use by the system. Additionally the double bit errors are detected, and given that one is a hard error, the double bit error can be corrected.

Memory Controller (Controller)

The device which is the master of MBus 205. The controller provides all addresses and all data for write operations. It is the receiver of data from read operations. The controller is responsible for the interface between MBus 205 and any external bus (or interface). The controller is also responsible for Error Correction (each bank must be able to store the 7 bits needed for the correction). The controller also periodically provides refresh for dynamic RAMS.

Double Word

A double word is defined as a 32 bit quantity.

4.2.2 Signals

4.2.2.1 Signal Groups

Physically, MBus 205 consists of 89 lines. These 89 lines can be divided into four groups: Data, Address, Bus control, and Interrupt support. Below is a breakdown of the four groups. (An  indicates that the named signal is asserted when the line is TTL low.)

| Data: | | | | |
|---|---|---|---|---|
| 32 | MBD | Tri | I/O | Data lines. |
| 7 | MBE | Tri | I/O | Correction bits. |
| Address: | | | | |
| 18 | MBA | Tot | Out | Address lines. |
| 8 | RASsel | | Tot | Out RAS Select. |
| 8 | CASsel | | Tot | Out CAS Select. |
| Control: | | | | |
| 1 | STEven | | Tot | Out Start Even Access. |
| 1 | STOdd | | Tot | Out Start Odd Access |
| 1 | SelE/ ˆ O | | Tot | Out Select Even/ Odd CAS. |
| 1 | BUS/ ˆ CNT | Tot | Out | Bus/ controller address. |
| 1 | ˆMBWE | | Tot | Out MBus 205 write enable. |
| 1 | ˆOUTE | | Tot | Out Enable Outputs. |

-continued

| | | | | |
|---|---|---|---|---|
| 1 | ˆ Other | | Tot | Out Other space. |
| 1 | ˆ ERCCDis | O.C. | In | ERCC disable. |
| 1 | ˆMemWait | O.C. | In | Memory access wait. |
| 1 | ˆMBCLK | | Tot | Out Memory Bus Clock. |
| Interupt support: | | | | |
| 1 | NMIA | Tot | In | Non-maskable Intr. A |
| 1 | NMIB | Tot | In | Non-maskable Intr. B |
| 1 | MIA | Tot | In | Maskable interrupt A |
| 1 | MIB | Tot | In | Maskable interrupt B |
| 1 | CNMI | Tot | Out | Clear NMI |
| 1 | CMI | Tot | Out | Clear MI |
| total 91 | | | | |

Notes:
Tri - indicates tri-state bus.
Tot - indicates totem-pole outputs.
O.C. - indicates open collector bus.
I/O - indicates bus is used for both input and output.
In - indicates that the controller uses the signal as an input, and that the contoller will never drive this line.
Out - indicates that the controller uses the signal as an output. Devices other than the controller should never drive this line.

4.2.2.2 Data

There are 39 signal lines in the data group. They are as follows:

| | |
|---|---|
| MBD<0-31> | MBus 205 data lines. These lines are used to transmit data to and from memory. |
| MBE<0-6> | MBus 205 ERC lines. These lines transmit information for the error correction bits. |

4.2.2.3 Address

There are 34 lines used for addressing the memory. They are as follows:

| | |
|---|---|
| MBA<0-17> | MBus 205 address lines. These 18 lines select which byte within a bank is being accessed. The eighteen lines provide 262144 unique addresses within the bank. |
| RASsel<0-7> | RAS Select lines. Each of the eight lines selects one group (2 banks) of memory. During normal accesses only one line is asserted. All RASsel lines are asserted during the refresh cycle. |
| CASsel<0-7> | CAS Select lines. Each of the eight lines selects one group (2 banks) of memory. Only one CASsel line is asserted at any one time. |
| MBD<12-29> | MBus 205 data lines. When Bus/ CNT is high the word address is valid on these lines. |

4.2.2.4 Control signals

There are 10 control signals on MBus 205:

| | |
|---|---|
| STEven | Start even aceess. Indicates that an access to the even bank of a group is to be started. |
| STOdd | Start odd access. Indicates that an access to the odd bank of a group is to be started. |
| SelE/ ˆ O | Select an even or odd CAS. Selects between the even or odd bank within a group. |
| BUS/ ˆ CNT | Address select from Bus or controller. Indicates where the address signal is valid from. If asserted the valid address is on the data lines, if low the address lines contain the valid address. |
| ˆMBWE | MBus 205 write enable. Indicates that the current data on the bus is to be written into currently addressed memory location. |
| ˆOUTE | Enable Outputs. Enable the drivers on the selected memory to place data on the MBus data and error correction buses. |

| | | |
|---|---|---|
| Other | Other space. Indicates that the current transfer is to other space memory. | |
| ^ERCCDis | ERCC disable. Indicates that the currently address board does not use ERC bits and the controller should ignore MBE<0-6> on the MBus. | |
| ^MemWait | Memory access wait. Forces the memory controller to wait until the currently addressed location has completed the operation. MemWait need not be asserted if the memory can perform the operation in 120 ns. | |
| ^MBCLK | Memory bus clock. This is the master clock on MBus 205; it has cycle time of 80 ns. | |

4.2.2.5 Interrupt support

There are eight lines to provide interrupt support film for MBus 205; specifically they provide 2 maskable and 2 non-maskable interrupts.

| | |
|---|---|
| NMIA | Non-maskable interupt A. This interrupt is non-maskable by the memory controller. Asserting this line causes an interrupt to be signalled to the CPU or I-bus node. |
| NMIB | Non-maskable interrupt B. This interrupt is non-maskable by the memory controller. Asserting this line causes an interrupt to be signalled to the CPU or I-bus node. |
| MIA | Maskable interrupt A. This interrupt is a maskable interrupt. If the mask out register is asserted then the interrupt is ignored until the mask out register is de-asserted. When the MIA line is asserted and the mask out register is un-asserted, the CPU or I-bus node is interrupted. |
| MIB | Maskable interrupt B. This interrupt is a maskable interrupt. If the mask out register is asserted then the interrupt is ignored until the mask out register is de-asserted. When the MIA line is asserted and the mask out register is un-asserted, the CPU or I-bus node is interrupted. |
| CNMI | Clear non-maskable interrupts. Indicates that NMI's have been acknowledged and the source of the interrupt should de-assert NMIB. |
| CMI | Clear maskable interrupts. Indicates that MIA's have been acknowledged and the source of the interrupt should de-assert MIA. |

4.2.3 Addressing

The address space is 16 MBytes organized as eight 2 MByte groups, with each group containing two 1 MByte banks. A bank consist of 262144 locations 32 bits wide. Additionally a secondary address space called "special space" exist on MBus 205 as well. This special space is organized identically to regular space with the Other line detemining which area is to be accessed. The eight RASsel and eight CASsel lines correspond directly to the eight groups, (RASsel0 selects group0, which contains bank0 and bank1, RASsel1 selects group1, which contains bank2 and bank3, etc.). The SelE/ ^ 0 lines determines which bank within a group is selected. If the line is high then the even banks (bank0, bank2, bank4, . . . ) is selected, if low, the odd banks (bank1, bank3, bank5, . . . ) is selected. The eighteen address lines (MBA<0-17>) determines the double word location within the bank is to be addressed. See FIG. 401.

Consecutive addresses in memory alternate between banks within a group. The first logical address is location zero in bank0, then next address is location zero in bank1, then location one in bank 0, location one in bank 1, etc. The logical address in group0 is location 262143 in bank1 the next logical address is location zero bank2, location zero bank3, location one bank2, etc. This addressing scheme allows two-way interleaving between banks within a group.

| Location | Bank0 | Bank1 |
|---|---|---|
| 0 | logical 0 | logical 1 |
| 1 | logical 2 | logical 3 |
| 2 | logical 4 | logical 5 |
| 3 | logical 6 | logical 7 |
| . | . | . |
| . | . | . |
| . | . | . |
| 262143 | logical 524286 | logical 524287 |
| | Bank2 | Bank3 |
| 0 | logical 524288 | logical 524289 |
| 1 | logical 524290 | logical 524291 |
| . | . | . |
| . | . | . |
| . | . | . |
| | Bank14 | Bank15 |
| . | . | . |
| . | . | . |
| . | . | . |
| 262143 | logical 4194300 | logical 4194301 |

4.2.4 Control Functions

The MBus 205 performs two data transfers, read of a 39 (32 if ERC is not used on the current bank) bit double word and the writing of a 39 bit double word. The two operations can be combined in the following ways:

Simple read, read one 32 bit double word.

Double read, read two 32 bit double words from consecutive double words, restricted to consecutive double words in the same group, with location addresses being equivalent.

Simple write, write one 32 bit double word. Double write, write two 32 bit double words into memory, restricted to consecutive double words in the same group, with the location addresses being equivalent.

Read-Modify-Write read a 32 bit double word, modify that double word and write it back to the same location.

Double R-M-W two consecutive read-modify-write operations, within the same group and to the same locations.

Refresh/Sniff All banks are RASsel'ed to indicate that a row is to be refreshed, one location is selected by CASsel and SelE/ 0 to be read from, and if an error exists it is corrected and rewritten into the same location.

4.2.4.1 Basic Read Operation

The basic read operation consists of three phases: Address phase, read start, and data phase. The address phase begins by having a valid address placed on MBus 205. The address is initially placed on MBus 205 data lines, and later on the address becomes valid on the MBus address lines. If BUS/ ^ CNT is high then the address is to be taken from the MBus data lines, when low the address is valid on the MBus address lines. Also during this time the RASsel lines become valid.

The read is then initiated on the rising edge of the either the STEven or STOdd lines, at this point in time the address is valid and the memory should begin the operation. The memory is then expected to be able to supply valid data 143 ns from the rising edge of this signal. If the memory is unable to supply the data, the MemWait signal should be asserted until the memory can have the valid data for the MBus.

After at least 143 ns, the memory is requested to place its data onto the MBus via the ^OUTE signal. When the ^OUTE signal is asserted the data is enabled onto the MBus and held until ^OUTE is de-asserted. When the memory controller has latched the data, either OUTE or STEven (STOdd) is de-asserted.

4.2.4.2 Double Read

The double read operation is two simple reads placed back to back, since an operation has taken place already, the RAS percharge time has been met for the second operation. Because of this fact the second read is started immediately, producing the two-way interleaving. The operation is similar in function to the simple read except that the simple read is performed twice.

The double read is initiated by placing a valid address on the MBus, as well as valid RASsel, CASsel, and SelE/ ^0 lines. The transaction is then started by the assertion of STEven, the addressed memory then begins its access. When the MBus has been cleared and 143 ns have passed, ^OUTE is asserted and the value read by the memory controller. The 143 ns access time can be extended by the MemWait signal. After the data is latched STEven is de-asserted. At this time all addresses are still valid.

The second read is immediately initiated with the STOdd command, the odd bank of the group then accesses it addressed location and makes the data ready. After 143 ns the ^OUTE has been asserted and the data latched by the controller, again the access time can be increased by the banks assertion of the ^MemWait line. Both ^OUTE and STOdd are de-asserted. During the middle of the last read the address lines will become invalid.

4.2.4.3 Simple Write Operation

The simple write operation consists of three phases like the read operation: address phase, command initiate phase, and the data phase. The address becomes valid on the MBus address lines, RASsel, CASsel and SelE/ ^0 lines. The command is initiated with the rising edge of either STEven or STOdd, at this point the operation is identical to the read operations. Then the operation varies, instead of the controller asserting ^OUTE, the controller places the data to be written into the memory onto the MBus, when the data is valid the controller asserts the ^MBWE line. On the active edge of this signal the memory is to write the data on the MBus data lines into the memory.

4.2.4.4 Double Write Operation

The double write operation consists of two write operations happening back to back. The first operation is initited by the STEven signal, after the data is written into memory, STEven is de-asserted. STOdd is then asserted and the next double word written into memory. When the double word has been written STOdd is de-asserted and the operation is complete.

4.2.4.5 Read-Modify-Write Operation

The read-modify-write operation begins identically to a simple read operation, the address becomes valid and the access started. ^OUTE is asserted and the data read after 143 ns. The controller then de-asserts ^OUTE and modifies the data internally. The modified data is then placed on the MBus data lines, when the data is stable the MBWE line is asserted and the data written into the currently addressed location. Data is only held for 50 ns after the rising edge of ^MBWE. The operation is complete when STEven (STOdd) is deasserted.

4.2.4.6 Double Read-Modify-Write Operation

The double R-M-W operation consists of two R-M-W operations happening back to back. The first being to the Even bank and the second to the Odd bank.

4.2.4.7 Refresh/Sniff Operation

The Refresh operation is a special operation for the refreshing of dynamic memories. The operation is started by placing a valid address on the MBus. All eight of the RASsel lines are asserted. Both STEven and STOdd are asserted simultaneously, all memories on the MBus should assert their RAS'es refreshing a row. One memory location is selected by the CASsel lines and the SelE/ ^0 line, this location should present its contents onto the MBus when ^OUTE is asserted. If the data needs to be written back into memory, the ^OUTE is de-asserted and the new data presented on the MBus. ^MBWE is then asserted and the data written back into the MBus. At the end of the operation all control signals are de-asserted.

4.2.4.8 ERCC Disable

If a bank of memory does not have the extra bits for error correction, that bank of memory must assert ^ERCCDis during reads. Asserting the line causes the controller to ignore lines MBE<0-6>. Any errors in the read operation are then propagated to the source, as if no error had occurred.

4.2.5 Timing Sequences

The following diagrams illustrate the operations on the MBus, they are intended to describe the sequencing of the operations. For information on electrical and timing values see the chapter on electrical specifications.

FIG. 502 et seq

4.2.6 Dynamic RAM cycle initialization

Immediately after a power up of the MBus MCU 201 provides eight RAS only refresh cycles on the bus. This is supplied to insure the proper start up of the dynamic RAMS. The cycle looks like eight consecutive refresh operations.

4.2.7 Interrupt service

Four interrupts are provided on the MBus. Two maskable interrupts (MIA and MIB) and two non-maskable interrupts (NMIA and NMIB). Two interrupt clear signals are provided (CNMI and CMI) one for the non-maskable interrupts and one for the maskable interrupts. Each interrupt is level sensitive, as long as a line is asserted an interrupt is pending. An interrupt may be asserted at anytime with the following exception, when the corresponding interrupt clear is asserted the interrupt lines must be cleared. New interrupts should not be asserted until after the clear line has been de-asserted. The interrupts MIA and MIB are cleared by CMI. The interrupts NMIA and NMIB are cleared by CNMI. The maskable, non-maskable interrupts, and their corresponding clears are independent of each other.

FIG. 510 illustrates the interrupt sequence:

Because one clear line corresponds to a two interrupts a mechanism for insuring an interrupt is not lost. If during the clock period that the interrupt is asserted, the clear line is also asserted then the current clear pulse is not acknowledging the interrupt. FIG. 511 shows this situation.

4.3. Electrical Characteristics

4.3.1 Signal States

A signal may be in one of two levels, either high or low. A "high" refers to a high TTL level ($> = +2.0$ V), a "low" refers to a low TTL level ($< = +0.8$ V). All signals when valid are to be in one of the two levels, signals are allowed to be in transition ($< = +2.0$ V and $> = +0.8$ V) but are considered invalid during the transition time. A signal is asserted when it is in a valid level and that level represents the signal to be logically on. All signals preceded by a " ^ " are considered asserted when the signal is low. The remaining signals are considered asserted when the signal is high.

4.3.2 Signal types

Their are three types of signals on the MBus 205, totem pole, tri-state, and open-collector. The signal types are determined by the device that can drive the signal. A totem-pole driver is a one that can force a line into both the high and low states. An open colector driver can only force the line into the low state or turn itself off, not affecting the value of the line. A tri-state driver can force a line into both the high and low states as well as turn itself off (not affecting the contents of the MBus).

When a tri-state line is not being driven it is floating, all tri-state lines float into the high state. When an open-collector line is not being forced into the low state, a pull-up (located on the same card as the controller) causes the signal to be a high.

4.3.3 Signal Loading

The following lines have TTL outputs and the following characteristics:

| STEven | STOdd | SelE/^0 | BUS/^CNT |
|---|---|---|---|
| ^MBWE | ^OUTE | Other | ^MBCLK |
| ^CNMI | ^CMI | | |
| MAXIMUM LOAD PER MBUS: | | | |
| High | −12 Ma | | Low 8 Ma |
| Capacitance | 100pf | | |
| MAXIMUM LOAD PER CARD | | | |
| High | −3 Ma | | Low 2 Ma |
| Capacitance | 25pf | | |

The following lines have the following drive requirements:

| NMIA | NMIB | | MIA | | MIB |
|---|---|---|---|---|---|
| Drive Requirements: | | | | | |
| High | 40 uA | | Low | | −17 Ma |
| Capacitance | | 50 pf | | | |

Note:
Only one device should drive these lines.

The following open collector lines must have the following drive requirements:

| ^ERCCDis | ^MemWait |
|---|---|
| Drive Requirements: | |
| Low | −17 Ma |
| Capacitance | 100 pf |

The following tri-state lines have the following drive and load requirements:

| MBD | MBE | |
|---|---|---|
| Drive Requirements | | |
| High | 12 Ma | Low 48 Ma |
| Capacitance | 150 pf | |
| MAXIMUM LOAD PER MBUS | | |

-continued

| High | 8 Ma | | LOW 24 Ma |
|---|---|---|---|
| Capacitance | | 100 pf | |
| Maximum load per card | | | |
| High | 2 Ma | | Low 6 Ma |
| Capacitance | | 25 pf | |

4.3.4 Termination and Pull-ups

All lines except ^ERCCDis and ^MemWait are terminated with 220 ohms to +5 and 330 ohms to Ground. The ^ERCCDis and ^MemWait lines are pulled up with 1K ohm resistors.

4.3.5 Timing

Signals are generally asynchronous; however, some signals are constrained to be valid within certain periods of ^MBCLK.

4.3.5.1 Bus Clock
See FIG. 512
4.3.5.2 Bank select setup and hold
See FIG. 513.
4.3.5.3 Address Setup and hold times
See FIG. 514.
4.3.5.4 Memory Access Requirements: (leaving ^MemWait unasserted)
See FIG. 515
4.3.5.5 Write Data Setup and hold
See FIG. 516
4.3.5.6 ^MemWait signal requirements
See FIG. 517
4.3.5.7 ^ERCCDis times
See FIG. 518.
4.3.5.8 Non-maskable interrupt timing
See FIG. 519.

5. DETAILED DESCRIPTION OF VCU 206

5.1 Overview

Referring to FIG. 102, VCU 206 provides high resolution color graphics (1280 × 1024), using 8 bits per pixel. Video Expansion Unit (VEU) 207 may optionally be included to expand the pixel size to 24 bits, giving the effect of a 24-bit VCU 206. (NOTE: In the ensuing discussion, "VCU 206/8" shall mean that VEU 207 is absent and the pixel size is eight bits; "VCU 206/24" shall mean that VEU 207 is present and the pixel size is 24 bits; bald references to "VCU 206" shall apply regardless of pixel size.) VEU 207 includes augmentation of VRAMs 113; this does not provide additional VRAM locations, but expands the size of the existing locations from 8 to 24 bits. VCU 206 drives a 60 hertz non-interlaced 19" color monitor. The video outputs to the monitor are RGB (RED-GREEN-BLUE) sync-on-GREEN with 75 ohm drive impedance.

Pixel data retrieved from VRAMs 113 are not written to the screen directly, but are input to a table lookup function. The table, contained in a separate RAM and known as a "palette", outputs a 24-bit number. Eight of the 24 bits are converted from digital to analog to provide the RED video signal, eight provide the BLUE, and eight provide the GREEN. There are thus $2^{24}$ or 16 million colors which can be displayed. 8-bit pixels can display any 256 of the 16 million colors at any given time; the selection of which 256 may be altered by reloading the palette RAM. 24-bit pixels can display any of the 16 million colors; the correspondence of pixel value to color may be altered by reloading the palette RAM.

VCU 206 and VEU 207 conform to the Graphics Instruction Set (GIS) (described in U.S. patent application Ser. No. 623,908, filed Jun. 25, 1984).

VEU 207 must be used in conjunction with VCU 206 and connects to VCU 206 via 44 signals on the backplane. It provides an additional 16 bits per pixel bringing the total bits per pixel of the graphics display from 8 to 24. VEU 207, having circuitry analogous to that in VCU 206, will not be described in detail. Section 5.5 addresses the differences between VCU 206 and VEU 207.

Pixel data from the host computer may be written directly into VRAMs 113, or may be combined according to various Boolean rules with data previously in VRAMs 113.

VCU 206 may be operated in "block mode", "plane mode", or "character mode". ("Pixel mode" is a special case of block mode, where one pixel at a time is transmitted, while block mode permits transmission of any number of bits up to 32.) Block mode provides the most flexibility, since any of a great number of colors may be drawn at any screen position, but requires the host to forward every bit of every pixel of a desired display. Plane mode allows the host to modify a particular bit position of a number of pixels simultaneously. Character mode is provided to enhance performance, at the expense of limiting the number of colors that can be displayed for a given palette loading to 9 for VCU 206/8 or to 25 for VCU 206/24. Character mode effects "planes" or "layers" of displays (eight planes for VCU 206/8, 24 planes for VCU206/24) wherein the color of each plane need be specified only once, "higher" planes may obscure "lower" planes, and the host need only send a single bit (denoting "ON" or "OFF") for each pixel position of each plane. For example, if it is desired to display a bar graph in which:

1. the background is blue;
2. a green grid is presented;
3. the bars are yellow; and
4. red labels may appear on the bars, then it is necessary to:
1
   a. specify that the color of the background is blue by:
      (i) loading location 0 of the palette with a number that effects display of the desired blue; and
      (ii) clearing VRAMs 113 to all 0's, meaning that all palette lookups will access palette location 0 yielding the desired blue of the background;
   c. load palette location 1 with a number that is displayed as the desired green for the grid lines;
   d. load palette locations 2 and 3 with a number that causes display of the yellow desired for the bars;
   e. load palette location 4, 5, 6, and 7 with a number that causes display of the red desired for the labels; (at this point, the VRAMs still containing all 0's, the screen will be entirely blue, the color specified in palette location 0);
2. provide one-bits (denoting "ON") to the least significant bit (the "lowest plane") of the pixels at positions corresponding to the screen positions comprising the desired green grid lines; (these pixels will then contain a value of 1, with the result that palette lookups access palette location 1, yielding green; at this point the display will be a green grid on a blue background)
3. "OR" in one-bits to the next least significant bits of the pixels (the "second plane") at positions corresponding to all screen positions constituting the desired yellow bars; (these pixels will have values of 2 if ORed with a blue background pixel or 3 if ORed with a green grid line pixel—in either case, palette lookup yields yellow. Thus, the green grid and blue background are not visible on the yellow bars—those screen positions contain pure yellow, and not a superimposition or mixture of yellow, blue, and green.)
4. OR in one-bits to the next least significant bits (the "third plane") of the pixels at positions requisite to producing the desired labels. (These pixels will then have values of 4 or 5, either of which causes palette output of red.)

The desired bar graph is now displayed on the screen. Although some of the data is obscured (namely, the portions of the yellow bars that are under red labels; the portions of the green grid that are under yellow bars; the portions of the blue background that are under green grid lines) it is still present in VRAMs 113 and will again become visible when the overlaying data is removed. For example, if zero-bits are sent to the third plane, thus erasing the red labels, the yellow bars will again be fully visible with no need to reconstruct any portion of them; likewise, if zero-bits are sent to the second plane to erase the yellow bars, the green grid will again be fully visible without having to reconstruct it.

Full detail on how to accomplish the aforementioned operations is provided hereinbelow.

5.2 FUNCTIONAL DESCRIPTION 5.2.1 Hardware Overview

Refer now to FIG. 501. In the preferred embodiment, VCU 206 and VRAMs 113 are contained on a circuit board (Graphics Processor Board 301) which is a 15"×15"6 layer board with etch width of 8 mils and etch spacing of 8 mils. The board contains the following major components:

- 64 256k VIDEO RAMS 113 with associated drivers and buffers
- Address mapping circuitry 302 for receiving addresses over Memory Bus 205 and translating same to physical addresses within VRAMs 113
- Data manipulating circuitry 303 for performing manipulations on data received over Memory Bus 205 or contained in VRAMs 113, and for storing manipulated data in VRAMs 113. (As will be discussed in further detail below, data manipulation circuitry 303 is mainly constituted by eight Graphics Data Processor (GDP) gate arrays (314 on FIG. 502)).
- MicroProcessor 308 for providing overall timing and control.
- High Speed Output Stage 304 for accessing display data from VRAMs 113 for display.
- Palettes 309 and Lookup Table 305. Each pixel value retrieved from VRAMs 113 is converted to corresponding RED, GREEN, and BLUE values.
- Digital-to-Analog Converters 306 for converting the RED, GREEN, and BLUE values to corresponding analog video signals for directly driving the video monitor.
- Keyboard interface 310 for interfacing keyboard 311 through which the user may manually enter information.
- Mouse interface 312 for interfacing Mouse 313 through which the user may enter information on screen position.

The keyboard, mouse, and vertical blanking for the video monitor all interrupt the host processor via NMIs (non-maskable interrupts). The servicing of NMIs is very fast relative to normal interrupts because the host does not have to issue a VECT instruction, or reschedule tasks upon receipt of the interrupt.

The mouse can interrupt the host as fast as every 33 milliseconds. Servicing of the mouse, which includes cursor plotting/replotting, should require no more 50 microseconds out of every 33 milliseconds of time. This is a total of 0.15% of the host's cpu time when the mouse is moving, which relatively speaking, is not often.

The keyboard constantly interrupts the host at an interval of 80 milliseconds. The time required to service the keyboard when it is idle is about 25 microseconds, a total of 0.03% of the hosts cpu time. If the keyboard is not idle, the time to service it is about 200 microseconds. With a typist who can type 60 words/minute (a word being 6 characters), the interrupt load is equal to about 0.12% of the hosts cpu time.

Vertical blanking interrupts can be used to pace the color palette updates. VCU 206 only updates palettes during vertical blanking. It takes 6 frames to fully update the 3 256-color palettes. Multiple attempts by the system to update the palettes in less than one frame will not be realized. The system can use the vertical blanking interrupt to indicate that VCU 206 has updated the palettes, and to issue another update if required. Since this function can be done via setting a flag, the time to service the interrupt is considered negligible.

Total load on the system, worst case, including both mouse and keyboard, is estimated to be approximately 0.27% of the total CPU time.

5.2.1.1 Pixel Flow Overview (Block Mode or Plane Mode)

(NOTE: This discussion is in terms of 8-bit pixels; a discussion for 24-bit pixels would be analagous.)

Referring to FIG. 502, pixel data is sent from the host CPU over Memory Bus 205, is processed by the Graphic Data Processors 314, and eight-bit pixels are stored in "bit map" form in VRAMs 113.

NOTES

1. The term "host CPU" may refer to CPU 101 of the local processor, or some other node on the I-Bus, as discussed in section 2.)
2. The "processing" performed the Graphic Data Processors 314 may take the form of aligning pixels from the 32-bit bus word onto VRAM pixel boundaries, merging incoming pixel data with pixel data previously in VRAMs 113, and the like, all to be described in detail further below.

As is indicated by the bidirectionality of the arrow connecting GDPs 314 and VRAMs 113, GDPs 314 have the capability, in response to commands from the host CPU, to extract bit map data from VRAMs 113, perform manipulations upon it, and return it to VRAMs 113. Writing to VRAMs from the host is known as an "external" access; the latter case is called an "internal" access.

Circuitry 304 extracts bit map data from VRAM's 113 and transforms each pixel to a desired video representation as directed by palette 309 under control of palette lookup table 305. Digital-to-analog converters (DACs) 306 transform the video representations to red, green, and blue video signals which are forwarded to the video monitor for display.

5.2.1.2 Character Mode Overview

Character mode data follows essentially the same path as pixel data, but is handled differently, as shown in FIG. 503. With reference to the bar graph example set forth in Section 5.1, suppose that as part of writing the red labels on the yellow bars it is desired to write the character "A". A representation of the character "A" (element 315) is shown as it might appear in a "font" of characters (fonts, well known to those in the art, may be thought of as prestored bitmaps of often-used graphic entities). The prestored character-mode (one bit per pixel) bitmap for "A" is shown as element 331. Where the bitmap contains a 1, the color denoted by foreground register 333 will be displayed at the corresponding screen position; where it contains a 0, the color denoted by background register 332 will be displayed. The means of loading the foreground and background registers will be discussed in detail below. The discussion of the bar graph example in section 5.1 did not consider use of these registers; they enhance flexibility by permitting, for example, red labels on a black background on the yellow bars. It is assumed here that the background register contains a value denoting the yellow of the bars and that the foreground register contains a value denoting the desired red of the labels.

FIG. 503 shows the flow of the first line of font bitmap 331; it is sent to VCU 206 via the rightmost five bits of memory bus 205, and is gated into VCU 206 under control of mask register 317, of which only the rightmost five bits are made permissive (set to 1). It is obvious that other font widths can be accommodated by adjusting the pattern in mask register 317 accordingly.

The GDP 314's will now produce the five pixels necessary to display YELLOW-YELLOW-RED-YELLOW-YELLOW on the screen, as is necessary to display the top line of the "A" in font 315 on the background of the yellow bars. Each GDP 314 (it will be recalled that there is one GDP 314 for each screen pixel bit) looks at the five font bits. For each font bit, each GDP 314 outputs its bit of the foreground pixel for a font bit of one, or its bit of the background pixel for a font bit of zero, the overall output thus being pixels of as many bits as there are GDP 314s (8-bit pixels for VCU 206/8). That these pixels are displayed at the desired place on the screen is a function of having provided the appropriate X and Y screen coordinates, to be discussed further below.

5.2.2 Programming Overview 5.2.2.1 General

The video memory (VRAMs 113) contains video information which is continuously displayed on the screen. The smallest picture element that is addressable in the video memory is called a pixel. Each pixel contains information that corresponds to a value that the pixel can take on. For VCU 206/8, a pixel is represented by 8 bits of video memory, and can take on any one of 256 possible values. For VCU 206/24 a pixel is represented by 24 bits of video memory, and can take on any one of 16,777,216 (written as 16M for future discussion) possible values.

There are 1280 pixels displayed horizontally and 1024 pixels displayed vertically. There are actually 2048 VRAM locations horizontally, the last 768 of which are never displayed. This section of the video memory can be used to store temporary pictures, icons, character fonts, or small windows of data.

Each bit of the pixel is called a 'plane'. When configured as an 8 bit per pixel controller (VCU 206/8) there are 8 planes. When configured as a 24 bit per pixel controller (VCU 206/24), there are 24 planes.

The pixel plane bits are passed to the address field of a high speed RAM lookup table. The data returned by the RAM is then passed to the video output stage. This table allows the pixel information stored in the video memory to be redefined before being displayed on the screen. This RAM is called the color palette.

On VCU 206/8, 8 bits of information are placed on the RAM address lines and 24 bits of data are returned. Because each pixel is 8 bits wide, it can take on any one of 256 values. The colors represented by the values can be chosen from a range of 16M, since the palette output is 24 bits.

VCU 206/24, with respect to the color palettes, is essentially 3 VCU 206/8 designs in parallel.

5.2.2.2 NORMAL space and OTHER space

As described in section 4, a control bit is provided on M-Bus 205 indicating whether accesses are to "NORMAL" space or "OTHER" space. All accesses to the video memory are done thru NORMAL space. All registers, except the X and Y, SOURCE and DESTINATION registers, are accessed thru OTHER space. The X and Y, SOURCE and DESTINATION registers are loaded during the address phase of a NORMAL space access. ("Address phase"and "data phase" are also discussed in section 4.) This is necessary because the X and Y values of a pixel position are used to form the video memory address for the pixel and must be set up prior to the data phase of the access.

5.2.2.3 Restrictions

VCU 206 is designed to read and write the video memory on pixel boundaries. To accomplish this, VCU 206 manipulates the data internally. Furthermore, on write cycles, VCU 206 performs a read-modify-write cycle internally. MCU 201, the M-bus controller, is also capable of performing read-modify-write cycles, but cannot manipulate the data in the same manner as VCU 206. VCU 206 expects only simple reads and writes via the M-bus. If MCU 201 performs a read-modify-write to VCU 206, indeterminate results will occur.

To ensure that MCU 201 executes only simple reads and writes to VCU 206 the following programming rules must be followed:

- For NORMAL space accesses to VCU 206 only even double word reads or writes are allowed. Specifically, odd double word reads or writes, byte reads or writes, and word reads or writes are disallowed.
- For OTHER space accesses to VCU 206, by definition, only even double word reads or writes are allowed. Specifically, odd double word reads or writes, byte reads or writes, and word reads or writes, are disallowed in the present embodiment.

5.2.2.4 Types of video memory accesses

VCU 206 is capable of the following types of video memory accesses:

- Host processor to video memory accesses (and vice versa).
- Video memory to video memory accesses.
- Special character write accesses (from host processor to video memory)

The format in which the data is packed is BLOCK form—the 32 bit data word contains 4 consecutive 8 bit pixels for VCU 206/8; and 1 right justified 24 bit pixel for VCU 206/24 for video memory accesses. A special character write contains 32 consecutive pixels in a doubleword access and is independent of the bits per pixel.

5.2.2.5 Keyboard and mouse

The keyboard and mouse interrupt the host processor via NMIs to reduce the interrupt service time per interrupt. VCU 206 will not monitor or manipulate keyboard data, this is the function of the host processor. This permits better emulation of IBM-PC keyboard functions. VCU 206 will convert all mouse/tablet data to a 4 byte format and enqueue it to the host, only interrupting once for every 4 bytes of data. This reduces the interrupt load on the host.

5.3 DETAILED DESCRIPTION OF GRAPHICS DATA PROCESSOR 314

GDP 314, being the seat of pixel-manipulation intelligence within VCU 206 and VEU 207, will now be described in detail.

The GDP 314 is packaged in a a 135 pin gate array designed for graphics products. It accelerates graphics instructions, in particular, the Graphics Instruction Set (GIS) set forth in U.S. patent application Ser. No. 623,908. It can handle a variable pixel depth (see FIGS. 504 and 505). Initial implementation is on the presently described preferred embodiment of VCU 206, in which each GDP 314 handles one bit of each pixel, and in a lesser embodiment not described herein in which each GDP 314 handles two bits of each pixel. For completeness of disclosure, this discussion of the GDP 314 will consider implementation in the configuration of the preferred embodiment, and in other configurations as well.

GDP 314 accelerates the following GIS commands:
(1) BITBLT, (BIT BLock Transfer)
(2) CHARBLT, (CHARacter BLock Transfer)
(3) PIXEL operations,
(4) PLANE operations, and
(5) all read—modify—write operations.

The GDP 314 supports 1–32 bits per pixel, and up to 2k pixels by 2k pixel memory. A video board using a GDP 314 requires a 32 bit Data bus.

Microcode for different boards using the GDP 314 will be identical, except in terms of differing resolution. The speed of most operations is independent of pixel depth.

5.3.1 FUNCTIONAL DESCRIPTION

5.3.1.1 Hardware Overview

Operation

The GDP 314 has special hardware to accelerate:
(1) BITBLT,
(2) CHARBLT,
(3) Plane operations,
(4) PIXEL operations, and
(5) an ALU that can be used with the above to perform read—modify—writes.

An overview of the internal architecture of GDP 314 is shown in FIG. 506. Each GDP 314 controls 32 video rams. The video rams have a read cycle, and a read-modify-write cycle. All writes are read-modify-writes. The memory is organized to provide easy access to plane and pixel data (see Section 5.4.1 for memory organization).

Included in LALU 318 is special hardware to align the bits to and from the video rams, regardless of bits/pixel. It also provides the ability to access 32 bits, right justified, starting at any pixel address. (See FIG. 534 for required Address and CAS (Column Address Strobe) signal generation. CAS is a signal provided by MBus 205; see Section 4.)

5.3.1.2 Control Overview

The GDP 314 is not a state machine. During an access to/with the GDP 314, either a register is updated, or data is manipulated. Since the GDP 314 performs only one function per access, it is flexible and easily tested.

It is possible to construct an embodiment of VCU 206 utilizing a single GDP 314, as diagrammed in FIG. 504. To increase speed of operation, however, the designer is free to utilize more than one, with each handling some portion of each pixel. The preferred embodiment described herein employs a separate GDP 314 for each bit of each pixel. Thus, eight GDP 314's are employed in VCU 206 (see FIG. 505) and an additional sixteen GDP 314's are employed in VEU 207.

PIN ASSIGNMENTS

GDP 314 is a 135-pin gate array. The physical layout of the 135 pins is shown in FIG. 508. The assignment of signals to those pins is depicted in FIG. 509. A tabulation of signal names along with brief descriptions of the signal functions are given in Table 301.

TABLE 301

| PIN NAME | NUMBER | I/O | DESCRIPTION |
|---|---|---|---|
| MBO - 31 | 32 | I/O | M bus data interface |
| VINO - 31 | 32 | I | Video data inputs |
| VOUTO - 31 | 32 | O | Video data outputs |
| QMDO - 3 | 4 | I | Select operation |
| QRO - 1 | 2 | I | Register select |
| QBPO - 2 | 3 | I | Bits per pixel select |
| QIDO - 3 | 4 | I | Chip ID |
| ~QRS | 1 | I | chip reset |
| ~QA4 | 1 | I | Fifth lowest x address bit XOR PLANE1 |
| ~QAO - 3 | 4 | I | lowest 4 bits of x address |
| ~QFS | 1 | I | Suppress foreground |
| ~QBS | 1 | I | Suppress background |
| ~QPO - 1 | 2 | I | Plane enable lines |
| ~QCS | 1 | I | Chip enable |
| QLE | 1 | I | Video input latch enable |
| ~QOE | 1 | I | Video output enable |
| | 58 | | total inputs |
| | 32 | | total outputs |
| | 32 | | total i/o's |
| | 8 | | power/grounds |
| | 130 | | total pins used |

5.3.1.3 Detailed Controls

In a multiple GDP 314 system, successive GDP 314's must have their M-Bus data lines rotated by the number of bits each GDP is handling, as shown in FIG. 507 (an example for two bits per GDP).

The ~QRS line should be pulled low at power up and then remain high for operation.

| ~QRS | 0 = reset, |
|---|---|
| | 1 = operation. |

During RESET ~QCS should go low and then high. ~QCS is used by the GDP 314 to latch all the user registers, and to enable the output drivers. When ~QCS is high all output drivers will be tristated.

The RESET cycle sets the following registers:
(1) MASK = 1111111111111111 1111111111111111,
(2) DATA = 1111111111111111 1111111111111111,
(3) FUNC = 0011 (M bus data),
(4) FORE = 11, and
(5) BACK = 00.

Tell the GDP 314's how many bits/pixel the system uses:

| QBPO-2 | bits/pixel | 0 = 1-2 | bits per pixel |
|---|---|---|---|
| | | 1 = 3-4 | " |
| | | 2 = 5-8 | " |
| | | 3 = 9-16 | " |
| | | 4 = 17-32 | " |

The Bits/pixel indicates the spacing of the pixels. The skewed memory insures that each line of the Mbus is dominated by a single GDP 314. FIG. 510 maps the bits controlled by each GDP 314 onto the Mbus, 132 control, z=disregard:

NOTE: The one bit/pixel system:
(1) is a special case of the 2 bit/pixel system,
(2) it is always in plane mode,
(3) performs character drawing like any other system,
(4) performs BITBLT like any other system, (but micro code should special case BITBLT to improve performance: described later),
(5) should be considered a 2 bit/pixel system in plane mode unless otherwise noted.

An GDP 314 system can manipulate 32 bits, right justified from any pixel address. To do this, the GDP 314 must be given the 5 least significant bits from the x coordinate. A barrel shifter in the GDP 314 aligns the data to the proper boundary.

| ~QA4-0 | 0 = rotate 0 |
|---|---|
| | 1 = rotate 1 |
| | . |
| | . |
| | 15 = rotate 15 |

Because of the memory organization, the fifth bit, ~QAO, does not actually cause a rotate of 16, but rather is used to unscramble data from the video rams: ~QAO=x address lsb 5

The FUNCtion register controls the one cycle read—modify—write. It is loaded from the lowest four bits on the mbus, as shown in FIG. 511.

To perform a simple write, the FUNCtion bits should be set to the function 'M' (0011).

GDP 314 hardware will suppress the foreground, or background, color during character drawing:

| ~QFS | 0 = don't draw foreground |
|---|---|
| | 1 = draw foreground |
| ~QBS | 0 = don't draw background |
| | 1 = draw background |

The GDP 314 performs various functions, the function being determined by the MODE bits (QMDO-3), as shown in FIG. 512.

A more detailed description of each MODE is provided in Section 5.3.2, along with many examples.

Referring to FIG. 513, there must be an external PLANE ENABLE register, one bit/plane, allowing the user to select one, all or a selected group of planes. Only one plane may be enabled during plane mode. Otherwise, two GDP 314's will have a bus conflict. The plane enables should be different for each GDP 314, and correspond to the planes that the particular GDP 314 is handling.

Normally a GDP 314 handles both the odd and even planes. But to extend a system to greater than 1k pixels/line, as in the preferred embodiment:
(1) System has one GDP 314/plane, (2) Each GDP 314 handles one plane of data, and
(3) Two GDP 314's have same ID.

But each GDP 314 will have one of its plane enables tied high, and the other controlled by the plane enable register. In such a case the ID's and plane enables should be as shown in FIG. 514. Such a system will henceforth be called an 'EXTENDED' system.

5.3.2 Detailed Functional Specification

There are three ways to access memory in a GDP 314 system:
(1) access 32 bits of pixel data,
(2) access 32 bits of plane data, or
(3) access of 16 pixels.

Data may be sent to/from the host, an EXTernal access, or it may be stored and retrieved from the DATA register, an INTernal access. Accessing 16 pixels with more than 2 bits/pixel must be an INTernal access.

The GDP 314 performs the following functions, which will be discussed in greater detail later:
(1) EXTernal access (32 bits of pixel data to/from the host),
(2) EXTernal PLANE access (32 bits of plane data to/from host),
(3) INTernal access (16 pixels stored/retrieved in DATA register),
(4) INTernal PLANE access (32 bits plane data in DATA reg.), and
(5) Character accesses (write 16 pixels at a time).

Each GDP 314 has a 32 bit MASK register. A 1 for 1 pattern of bits for pixels to be masked should be sent on the Mbus. The GDP 314 expands the mask to the appropriate bits/pixel. In a read—modify—write cycle, data that is masked out, MASK bit=0, will pass unchanged through the LALU and be written back into the video rams (MASK bit=0: LALU output=video data). If the MASK bit=1 the corresponding bits from the Mbus and Video memory will be operated on by the function of the LALU—whatever that function is (MASK bit=1: LALU output=function (M bus, video). Note: the pattern of pixels masked must be right justified and not exceed 32 divided by the number of bits/pixel.

· NOTE: In the following examples:
(1) the MASK registers have been aligned to the Mbus for clarity, and
(2) depending on the board, the following registers may need to be set:
  (a) the FOREground register,
  (b) the BACKground register,
  (c) the FUNCtion register, and
  (d) the PLANE ENABLE register.

To move only certain planes,
(1) enable the appropriate planes using the PLANE ENABLE register, and
(2) perform a multiple plane access as usual.

5.3.2.1 EXTernal Access

An 'EXTernal' access moves 32 bits of pixel data from/to video memory to/from the host CPU. Both plane enables must be low. Since a one bit/pixel system enables only one plane at a time, it will never perform this type of access. Instead, it will perform an EXTernal PLANE access—described later. An example of register setups and content for an EXTernal Read is given in FIG. 515.

To write using the GDP 314, first set the MASK, then write the data. The MASK must be sent a 1 for 1 pattern of the pixels the user wishes to write. Each GDP 314 knows which bits are assigned to it, and, therefore, loads its MASK accordingly. Note: the pattern of pixels masked must be right justified and not exceed 32 divided by the number of bits/pixel. An example of an EXTernal Write is given in FIG. 516.

5.3.2.2 EXTernal PLANE Access

An 'EXTernal PLANE' access reads/writes 32 bits of plane data to/from the host: one bit of data from 32 sequential pixels. An EXTernal PLANE access is different from other accesses in that all the lines of the M bus are read from/written to a single GDP 314. An example of a PLANE Read is given in FIG. 517. NOTE: PLANE ENABLE register must be set.

Note that any plane may be selected for an EXTernal PLANE access. Only one PLANE ENABLE may be low during PLANE accesses. If two PLANE ENABLES are low, two GDP 314's will try to drive the same M bus line.

To perform an EXTernal PLANE write, first set the MASK, then write the data. The MASK must be sent a 1 for 1 pattern of the pixels the user wishes to modify, similar to the MASK in the HOST access, but note: (1) Since 1 bit/pixel is being accessed, the pixel mask is also a bit mask, (2) Only the GDP 314 with the desired PLANE, loads the mask, the others load zero's, and (3) up to 32 pixels may be manipulated. FIG. 518 gives an example of a PLANE Write.

5.3.2.3 INTernal Access

An 'INTernal' access manipulates 16 pixels at a time. Each GDP 314 manipulates 16 bits from the two planes it controls. Please note:
(1) 16 pixels are read, independent of pixel depth,
(2) the upper 16 bits sent to the mask must be 0's,
(3) all the GDP 314's do exactly the same thing,
(4) data is intermixed by plane,
(5) the DATA register is used, and
(6) the host CPU never receives any data.

FIG. 519 provides an example of an INTernal Read.

To implement an INTernal write, first set the MASK, then writes the data. For an INTernal access, the MASK:
(1) expands the lower 16 bits into the 2 bits/pixel pattern needed for the mask. If a plane has been disabled then the corresponding bits in the mask will load zeros.
(2) needs a 1 for 1 pattern of bits for pixels sent in the lower 16 bits of the Mbus, and
(3) the upper 16 bits must be zero.

An example of an INTernal Write is shown in FIG. 520.

The following two examples are of INTernal PLANE accesses. Please note the differences:
(1) only one GDP 314 is active, because
(2) only one plane of data is enabled,
(3) only one plane of data is manipulated,
(4) the lower 16 bits of the MASK are not expanded, and therefore,
(5) 16 bits, not 16 pixels, are manipulated, AND
(6) an INT write should follow an INT read.

FIG. 521 depicts an INTernal PLANE Read of 32 bits; FIG. 522 shows an INTernal PLANE Write of 14 bits.

5.3.2.4 Character accesses

A 'Character' access is a special case of the INTernal access. time. The only difference is:
(1) the FOREground and BACKground signals,
(2) the upper 16 bits must be zero,
(3) the DATA/~MBUS line is low, and (4) writes only.

If each GDP 314 is handling two different planes, each GDP 314 should get two FOREground and BACKground bits that are correspond with its planes. In the example shown in FIG. 523, the FONT is 10 bits. FIG. 524 is an example for the one-bit-per-pixel scheme of the preferred embodiment.

Pulling the ~QBS or ~QBS low during a Character Write will suppress the FOREground or the BACKground.

5.3.2.5 Using the LALU 318

The GDP 314 internally uses a Logical ALU (318). The user need only identify the truth table of a desired function to the LALU FUNCtion register 327. See FIG. 537 for a list of the Boolean functions that may be performed. The LALU will work in conjunction with all writes. That is, these functions may be performed between the contents of two VRAM locations on an INTERNAL write, or between the contents of a VRAM location and incoming MBus data on an EXTERNAL write.

FIG. 525 shows the character drawing example of FIG. 523 with an exclusive-or (XOR) function between the character data and the video data. Note that the only difference is the FUNCtion bits.

5.3.3 TIMING DIAGRAMS

| LABEL | KEY Application of Epstein et al | |
|---|---|---|
|  | MAX TIME (ns) | MIN TIME (ns) |
| t1 |  | 10 |
| t2 |  | 30 |
| t3 |  | 30 |
| t4 |  | 130 |
| t5 |  | 118 |
| t6 |  | 30 |
| t7 |  | 30 |
| t8 |  | 68 |
| t9 |  | 75 |
| t10 |  | 82 |
| t11 |  | 57 |
| t12 |  | 65 |
| t13 |  | 0 |
| t14 |  | 15 |
| t15 |  | 30 |
| t16 |  | 40 |
| t17 |  | 0 |
| t18 |  | 60 |
| t19 |  | 30 |

Figure 531:
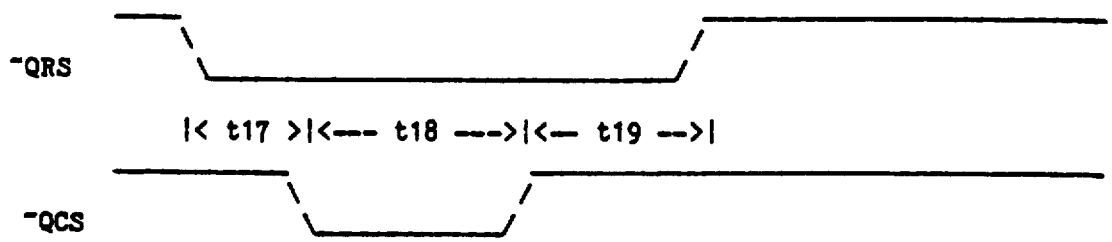
Figure 530:
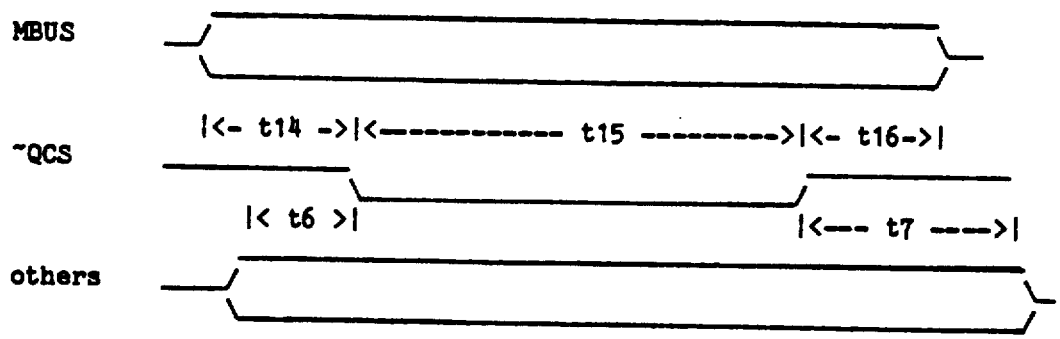

FIG. 526 illustrates the timing of a HOST READ.
FIG. 527 shows the timing of loading the DREG.
FIG. 528 details the timing of a WRITE.
FIG. 529 depicts the timing of loading the FUNCTION REGISTER.
FIG. 530 illustrates the timing of a load of the FOREGROUND/BACKGROUND register.
FIG. 531 shows RESET timing.

5.4 VCU 206 DETAILED OPERATION

Having described the internal operation of GDP 314, the seat of intelligence within VCU 206, the operation of VCU 206 itself will now be described.

5.4.1 Video RAMs

VRAMs 113 comprise 64 256K video RAM chips. Referring to FIG. 532, each video RAM chip is internally organized as 64K locations of 4 bits each. It thus takes two video RAM chips to make up an 8-bit pixel, each video RAM chip containing 4 planes of information. The plane organization of video RAM bank #1 is such that planes A, B, C, D of pixel 32n+0 are shifted out on the serial clock edge 32n+0. Similarly, on the same serial clock edge, video RAM bank #2 produces planes E, F, G, H of pixel 32n+0. The two outputs are combined to produce one eight bit pixel.

The random access data ports on the video RAMs are connecte to GDP 314 gate arrays which control the flow of data coming from the M-bus to the video RAMs. Each gate array connects to one entire plane of pixels (32 chips). Since there are eight planes on a VCU 206/8 board, it takes 8 gate arrays to control the video RAM data.

There are several reasons for this memory organization. First, the gate array needs data in a form where it can access 4 whole pixels at a time (BLOCK MODE) or 32 plane bits at a time (CHARACTER MODE and INTERNAL/PLANE mode). Second, the data needs to be organized so that when it comes out the serial port of the video RAMs all planes per pixel arrive simultaneously and pixels are consecutively sequential. And third, because of the speed of the serial port on the video RAMs, 16 pixels need to be available simulataneously per shift of the video RAM serial clock.

5.4.1.1 Screen Address to Memory Address Mapping

The host CPU, and the user thereof, need not concern themselves with addresses within VRAMs 113, but provide addresses in terms of screen coordinates. VCU 206 automatically translates these to VRAM addresses.

There is circuitry to randomly address any pixel in terms of its screen coordinates, and circuitry to refresh the VRAM's by sequentially stepping through the addresses. The sequential refresh addresses are provided by the 8031 microprocessor. The pixel address circuitry is shown in FIG. 555, and the refresh address circuitry in FIG. 556.

Accesses are performed upon VCU 206 in two phases— an address phase and a data phase. During the address phase, two bus transfers are made: one to transfer the X screen coordinate and one for the Y screen coordinate. Data are then transferred during the data phase.

The screen comprises 1280 × 1024 pixels, each of which is specified by an X and a Y coordinate. The upper-left-most pixel is the origin, with coordinates 0,0. All 1280 pixels on the same horizontal row, called a "scan line", have the same X coordinate.

For simplicity in the following discussion, the "A" and "E" planes will be stressed (referring to FIG. 532), but it should be borne in mind that planes "B", "C", and "D" are associated with plane "A", and that planes "F", "G", and "H" are associated with plane "E".

FIG. 533A shows how each scan line of 1280 pixels is divided into 64 memory columns which cut across all 64 VRAMs. Numbers are in decimal, with hexadecimal equivalents provided in parentheses. Note that the chips are grouped in pairs, each pair receiving the same CAS (column address strobe) and together producing one full pixel. (CAS is provided by MBus 205; see Section 4.)

Figure 533B:
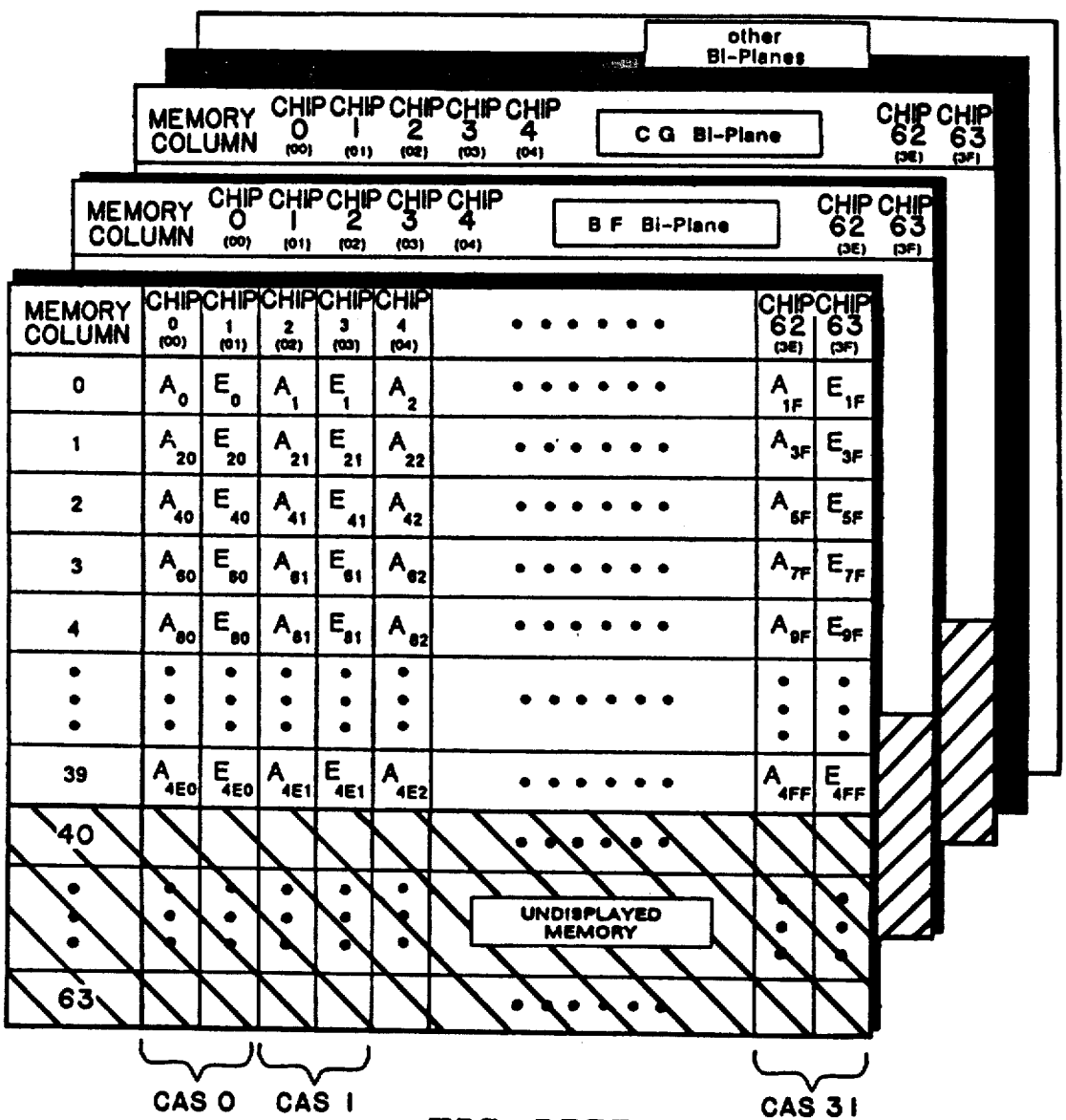

FIG. 533B shows the actual half-planes stored in the first 64 memory columns of each chip (subscripts are in hexadecimal). Note that only the first 40 out of 64 memory columns are displayed on the screen. The other planes associated with "A" and "E" can be thought of as existing behind the plane of the figure, as shown. Note that one memory column access will produce 32 full pixels. Each of the 64 VRAM chips will supply either an "A" or an "E" half-pixel; each chip provides 40 half-pixels per scan line.

Figures 1, 533C:
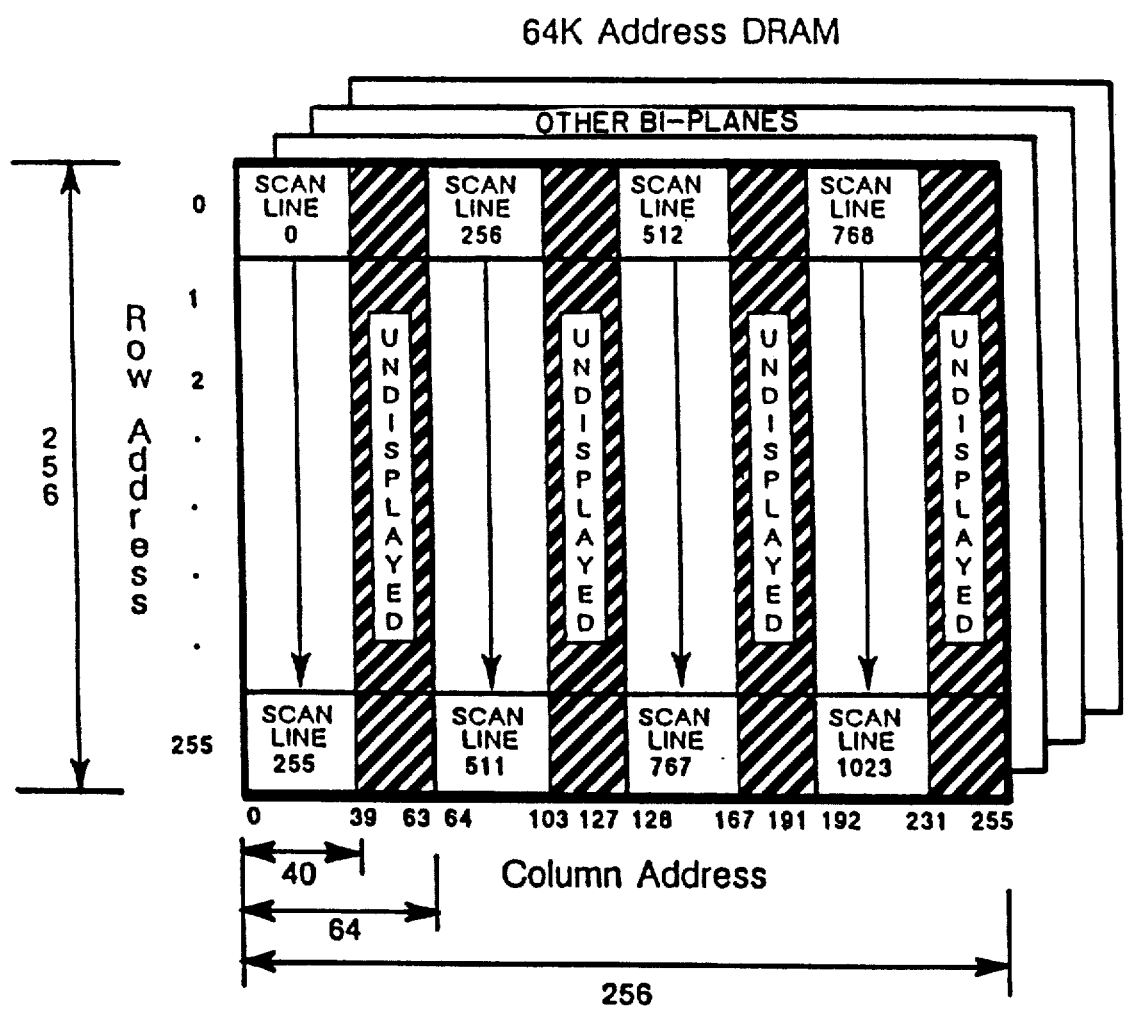
Figures 2, 533C:
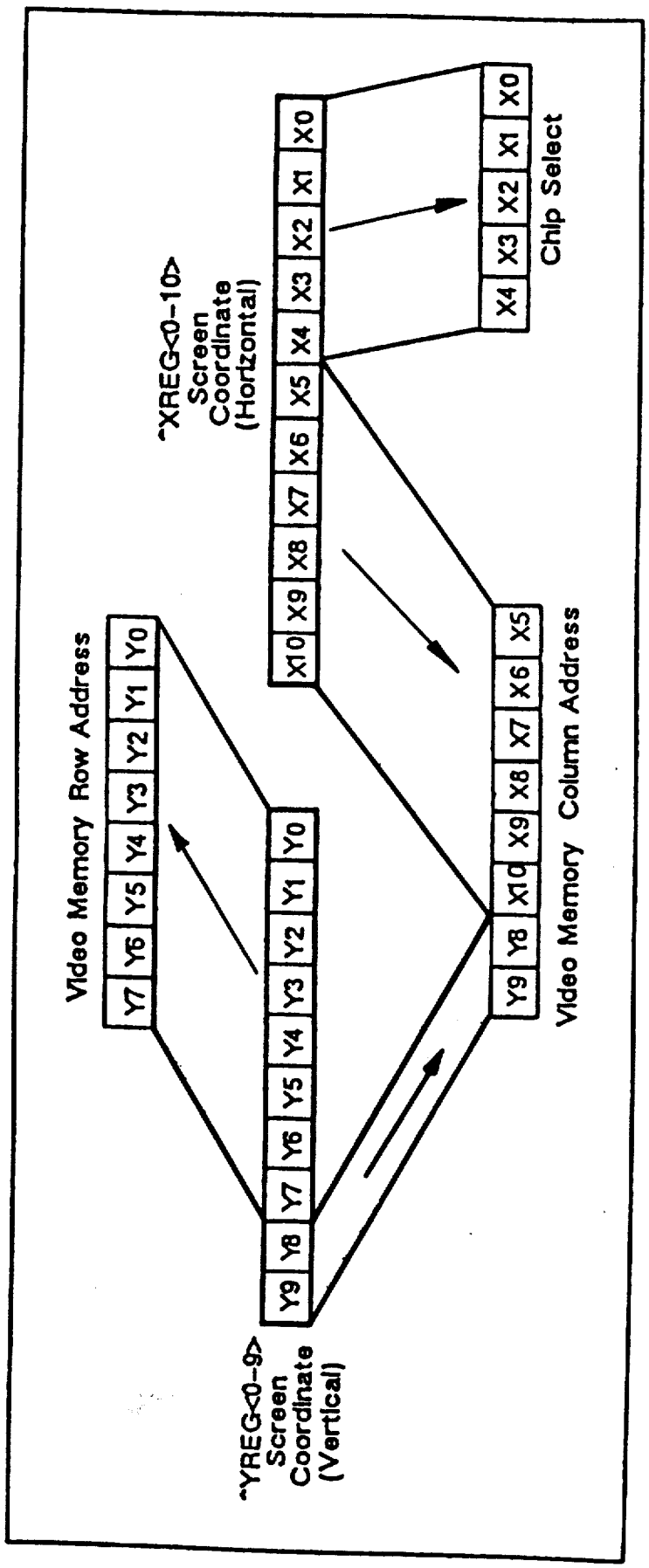

FIG. 533C shows a single 256×256 (64K) VRAM, which will supply 40 half-pixels per scan line. The first 40 columns of row 0 contain all the half-pixels this chip supplies to scan line 0, and so on. Note that with each of 64 VRAM chips supplying 40 half-pixels per scan line, each scan line will contain 1280 pixels, as required.

The X and Y screen coordinates are mapped into VRAM addresses in the following way: XREG(0-4) (the low order bits) are used to provide the CAS signals that select a pair of the 64 VRAMs; the row address of half-pixel in a VRAM is provided YREG(0-7); the column address is provided by XREG(5-10) and YREG(8-9).

Figures 1, 533D:
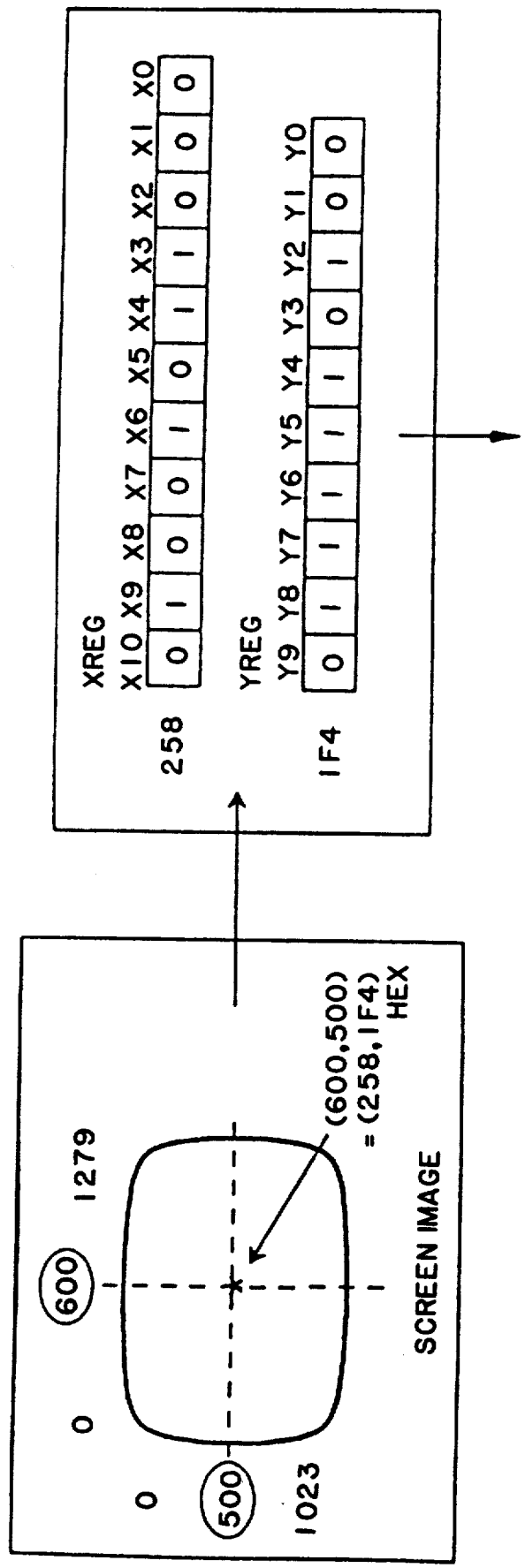
Figures 2, 533D:
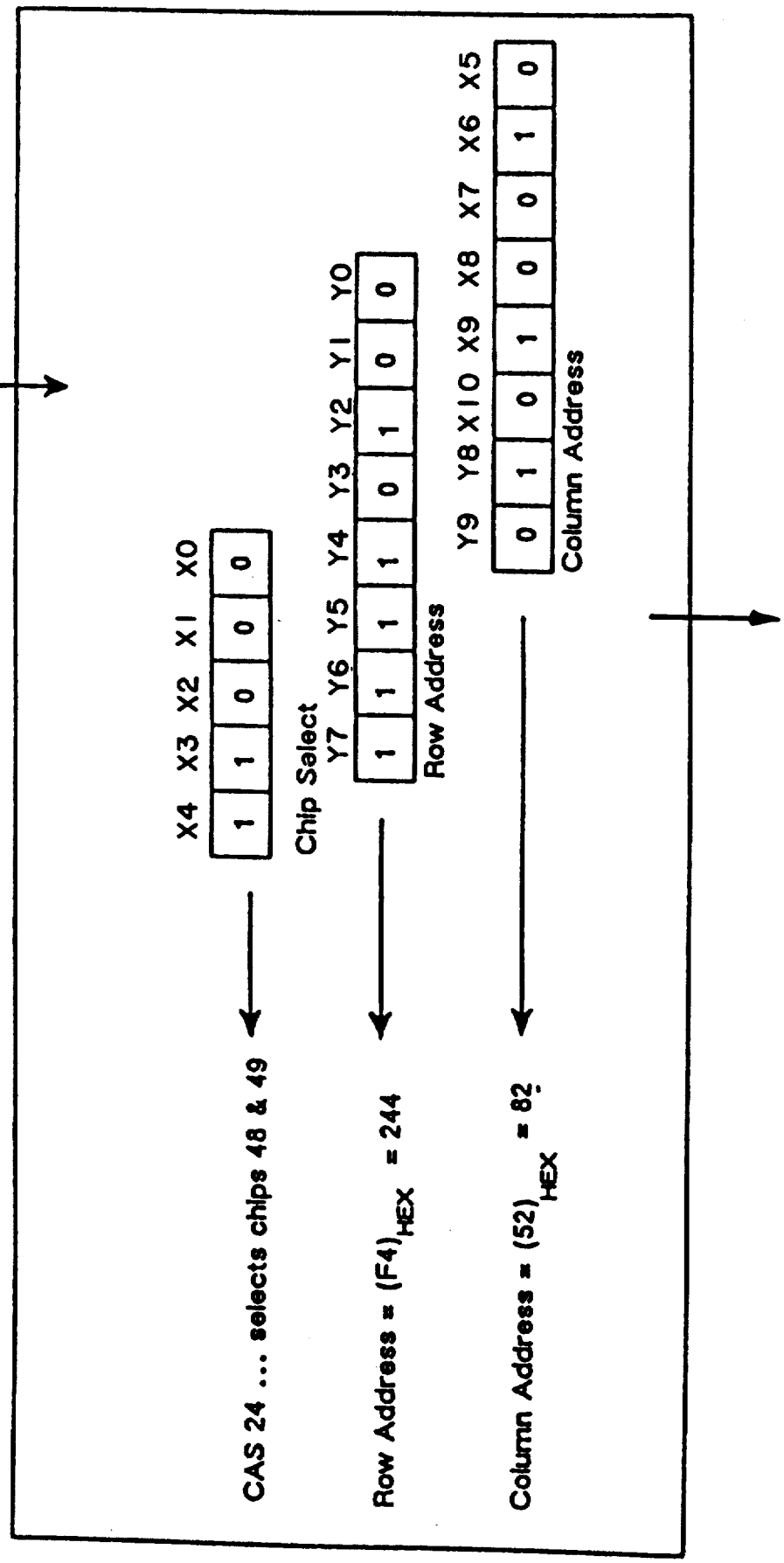
Figures 3, 533D:
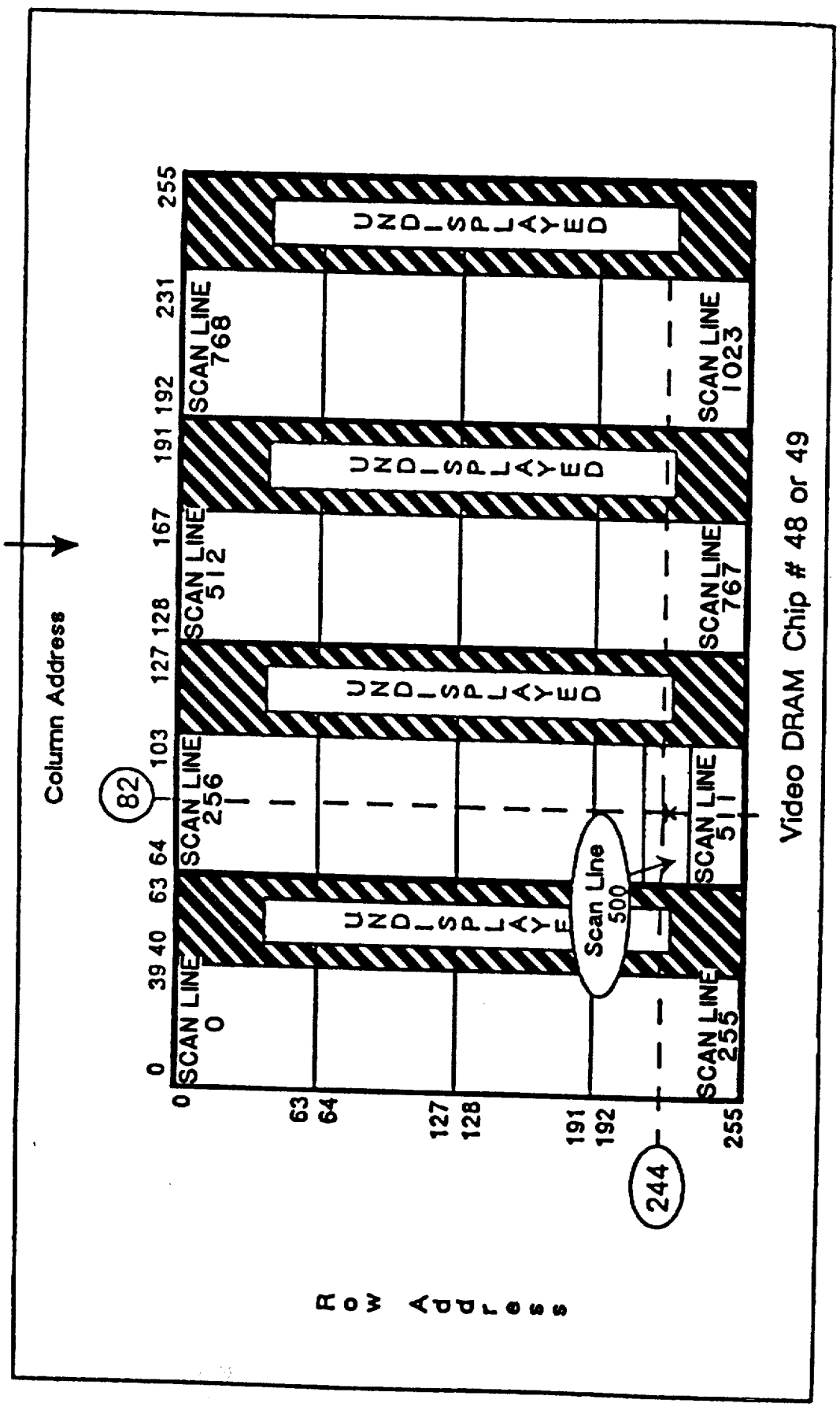

FIG. 533D traces the mapping of a pixel whose screen address is (600,500) to a VRAM address. This pixel can be found near the middle of scan line 500. The coordinates are stored in binary form in the XREG and the YREG. XREG bits 0-4 are used to produce CAS24, which selects chips 48 and 49. YREG bits 8-9 appended to XREG bits 5-10 select column 82, while YREG bits 0-7 select row 244. The VRAM location (244,82) is selected for both cips 48 and 49, which together produce a full pixel.

CAS signals are applied in two phases: Phase 0 and Phase 1. FIG. 534 shows which VRAMs receive which phase.

5.4.2 Video output stage

The maximum shift frequency of the shift register in the video RAMs is much lower than the pixel rate. Because of this, 16 pixels of 8 bits each must appear on the serial data output lines simultaneously. These 16 pixels are then loaded and shifted with high speed shift registers to get to the video dot rate. Since the total number of video RAMs are 64, serial clocking the video RAMs will produce 256 simultaneous bits (4 serial lines per chip), while only 128 are required. Utilizing the SOE0 and SOE1, two control signals that connect to the serial out enables on the video RAMs, only 128 bits at a time are enabled.

Remember that the data stored in the video RAMs comes out as A0, A32, A64, A96 . . . from the first chip in the even bank; and A1, A33, A65, A97 . . . from the first chip in the odd bank.

Physically, the serial out data lines of the video RAMs are connected to 32 TTL shift registers, which are configured as a 8 to 1 shift. The TTL signals are translated into ECL levels and shifted 2 to 1. The pixels are now at the video dot rate which are fed into the 3 palette DACs which drive the 75 ohm RED, GREEN, and BLUE video output lines. The palette DACs also contain the built-in 256×8 palette lookup RAMs which provide for a total of 16M possible palette colors.

5.4.3 M-bus interface

The M-bus interface has 2 PALS for address decode, and three eight bit latches to hold parts of the address field. There are 2 11-bit latches and 2 decimal latches to store the x and y, source and destination coordinates, respectively. Additionally, the outputs of these latches are connected to a PAL which generates address-_minus_1, used by barrel shifters 316 and 323 (see below). These address-minus-1 outputs and the latch outputs are then connected to 2 quad 2-1 muxes which mix the RAs and CAS address lines for the video RAM array.

The data portion of the M-bus interface has 4 octal latching transceivers to buffer and hold the write data during a write operation and drive the data onto the M-bus on a read operation. The internal data bus also has 8 GDP 314 gate arrays connected to it. These gate arrays each handle 1 plane per pixel of video information. Each gate array has, in addition to the 32 internal data bus I/O pins, 32 video data outputs and 32 video data inputs. Each gate array has an assortment of control lines which are used to manipulate the data to and from the video RAMS. It should be noted that MBus 205 cannot access VRAMs 113 directly, the way it can access Memory 102 directly, but accesses VRAMs 113 through the data manipulation circuitry within VCU 206.

The data manipulation circuitry includes two barrel shifters (316 and 323 on FIG. 506) for aligning data from MBus 205 format to VRAM 113 format. Although Memory 102 and VRAMs 113 are double-word (32-bit) oriented, the barrel shifters eliminate the need to transmit data on double-word boundaries, thus enhancing flexibility. For example, referring to FIG. 557, suppose a pixel mode transmission on the MBus sends a right-justified 8-bit pixel "E" to replace pixel "D" in VRAM 113. It is of no consequence that D and E are not co-aligned. Using the address furnished for pixel D, pixels C and D are retrieved from that location; using the derived address-minus-1, pixels A and B are retrieved from the previous location, all keeping their alignment, resulting in "CDAB" being in barrel shifter 319. Barrel (circular) shifting by 16 bits take place, giving "ABCD" in shifter 319; pixel D is now aligned with its replacement, pixel E, which can simply be moved into place. The resulting ABCE is shifted to CEAB, which is returned to VRAM 113.

VCU 206 does not check or generate syndrome bits, and therefore will assert the M-bus signal ERCC DISABLE when accessed.

LAR bits 9-12 define the address space of the VCU 206 board. VCU 206 can reside in RAS select #7 upper or lower 1 Mbyte of memory space.

5.4.4 Basic timing

Basic timing is generated by an 107.352 Mhz crystal module which has ECL compatible outputs. The ECL crystal module is buffered and passed to the VEU 207 board, if it exists. The output of the crystal module, called the 'video dot clock', is divided down by a high speed counter chip to generate the 8031 uP clock, serial control signals for the video RAMS, and serial control signals for the ECL video chain. Where TTL level signals are required, ECL/TTL translators are used.

The following are the clock rates and cycle times on VCU 206:

| description | time/freq |
| --- | --- |
| dot clock | 107.352 Mhz |
| pixel width | 9.315 nsec |
| 8031 uP clock | 10.735 Mhz |
| 8031 uP instruction time | 1.118 usec |
| M-bus cycle time | 80 nsec |
| Read cycle time | 800 nsec |
| Write cycle time | 720 nsec |

5.4.4.1 Video timing

The raw video timing is controlled by the 8031 uP chip. The support circuitry for this chip includes a 4k PROM, which contains the firmware, and an octal latch which latches the lower address field from the 8031. The raw timing outputs (Hblank, Vsync, and Vblank) are connected to flip-flops which are used to syncronize the raw video timing to the video dot clock. The syncronized video timing signals are then passed to the palette DACs.

The horizontal parameters that drive the monitor are as follows:

| description | time/freq | how derived |
|---|---|---|
| sweep frequency | 63.90 Khz | |
| total scan interval | 15.649 usec | 14 - 8031 cycles |
| display scan interval | 11.923 usec | 1280 - pixels |
| blanking interval | 3.726 usec | |
| front porch | 0.242 usec | |
| sync width | 1.118 usec | 1 - 8031 cycle |
| back porch | 2.366 usec | 2 - 8031 cycles |

The vertical parameters that drive the monitor are as follows:

| description | time/freq | how derived |
|---|---|---|
| sweep frequency | 60.00 hz | |
| total scan interval | 16.666 msec | 1065 - h scans |
| display scan interval | 16.025 msec | 1024 - h scans |
| blanking interval | 641.627 usec | 41 - h scans |
| front porch | 46.948 usec | 3 - h scans |
| sync width | 46.948 usec | 3 - h scans |
| back porch | 547.731 msec | 35 - h scans |

5.4.5 Video palette

The 8031 data bus is connected to the data I/Os on the palette DACs.

This enables the 8031 to WRITE and READ the RAM contained in the palette DACs. The address from the 8031 is connected to TTL/ECL translators, and wire-ored with the video data (ECL levels) at the address inputs of the palette DACs. The video data is enabled to the palette DACs during active vertical time. The 8031 addresses, for updating the palettes, are enabled to the palette DACs during vertical blanking time.

5.4.6 Refresh

The video RAMs, being dynamic in nature, must be RAS refreshed every 4 msec. A RAS occurs every horizontal blanking time (for active vertical) during the transfer cycle. The transfer cycle transfers a ROW of memory (256 bits) into the video RAM shift register for display on the next scan line.

Since the horizontal scan time is about 15.65 usec, each row would be refreshed every 256*15.65 usec, or 4.006 msec. This is just slightly over the 4 msec spec for the video RAMs. So, to guarantee the spec will be met, an additional RAS is given to the video RAMs immediately following the transfer cycle, with the msb ROW address toggled. This scheme guarantees that when ROW 0 is refresh/transfered ROW 128 is refreshed, when ROW 1 is refresh/transfered ROW 129 is refreshed, ... when ROW 128 is refresh/transfered ROW 0 is refreshed, etc.

Refresh/transfer addresses are controlled by the 8031 uP chip. The 8031 is connected to a 10 bit counter and a PAL which generates sequential refresh/transfer addresses for the video RAMs. The 10 bit counter is connected to the address driver circuitry going to the video RAMs.

If a host processor attempts to access the VCU 206 board during this refresh time, VCU 206 will hold off the access by asserting the MEMWAIT line. After refresh is complete, the access will be performed normally. Refresh occurs during both horizontal blanking and vertical blanking time (at the horizontal rate).

5.4.7 Keyboard

The keyboard circuitry consists of a shift register, a PAL, and some termination resistors. Data is transmitted serially to the VCU 206 board from the keyboard. The shift register converts the serial data to parallel data for the host to read. When 8 bits of data have been transmitted from the keyboard, an interrupt is generated on the NMIA or NMIB (primary or secondary board) line of the host. The only way to clear the interrupt is for the host to write the LED data word to the keyboard. The shift register in this case takes the host parallel data and converts it to serial data, which is sent to the keyboard.

5.4.8 Mouse

The mouse interface consists of an EIA driver chip for mouse data OUT and a transistor level shifter for mouse data IN. The mouse I/O lines are connected to the 8031 serial port. The 8031 handles all mouse I/O and passes the data to the host via the COM register.

5.4.9 COM DATA/COM STATUS registers

The COM DATA register consists of 2 octal registers and 2 octal transceivers. They are connected to the 8031 uP data bus such that 32 bits of information can be read from the 8031 uP and 16 bits of information can be written to the 8031 uP. The COM STATUS register is a read only register which contains keyboard NMI status, a vertical blanking status bit, 8031 uP self test failed flag, and hand shaking bits for the host-8031 uP communications.

5.4.10 DC/DC converter

A 12 volt to −5.2 volt DC to DC converter supplies 4 amps of −5.2 volts for the ECL chips on VCU 206 and VEU 207.

5.5 VEU 207

VEU 207 is very similar in hardware design to VCU 206. The following paragraphs describe the differences between them.

There are no address generation, refresh control, and X and Y source and destination register sections on VEU 207. The address that goes to the video RAMs is passed via a cable to the VEU 207 board from the VCU 206 board.

There is no 8031 uP and associated circuitry (this includes the COM DATA register and COM STATUS register); the necessary video timing signals and data bus information are passed via a cable to VEU 207.

There are two video output chains (shifters, etc.) and twice as much memory (128 video RAMs) on VEU 207 as there is on VCU 206. Note that this memory does not yield any additional locations, but expands the size of the existing locations. There are only two DACs on VEU 207, one per video output stage.

There is no keyboard or mouse interface on VEU 207.

5.5.1 Converting VCU 206/8 to VCU 206/24

There exists a jumper cable that is connected on the backplane when both VCU 206 and VEU 207 are present in a system. This cable passes signals from VCU 206 to VEU 207 and vice-versa. One of the signals on the cable tells the VCU 206 board that a VEU 207 is connected so that it (VCU 206) configures itself appropriately.

The RED gun and GREEN gun cables are connected to the VEU 207 slot. The BLUE gun, keyboard cable, and mouse cable are connected to the VCU 206 slot.

5.6 PROGRAMMING DESCRIPTION 5.6.1 Board selecting/LAR

The present embodiment allows a maximum of two video boards in a system. The VCU 206 board actually only uses RAS #7 to decode board select (RAS #6 is only looked at to make sure that system refresh is not happening) The primary/secondary board is detected off of MBA12. The total memory space alloted for video boards is 4 Mbytes. A VCU 206 board takes up 1 Mbyte of local memory space. The VEU 207 board, if used, takes up no additional local memory space.

All external accesses to VCU 206 are done via the M-bus. The M-bus address lines indicate how the address is to be interpreted and which registers are to be updated. The address on the M-bus is set by the Logical Address Register (LAR). The LAR is only visible to the microcoder.

The LAR must hold a valid address before a microcode read or write. After a read, data will be latched into the Memory Data Register Input (MDRI). Before a write, the outgoing data must be placed in the Memory Data Register Output (MDRO). ALL three registers are in MCU 205 and are described in section 4.

FIG. 535 illustrates the LAR bit mappings to M-bus Address lines. Bits 9–11 are used to decode one of eight RAS SELECT lines, bits 12–29 for upper eighteen bits of address, bit 30 is the least significant address bit identifying the odd or the even address and to start the memory access, and bit 31 is used as part of the command to decode the type of the access. Bit 31 is always zero for VCU 206 accesses in normal or other space.

5.6.2 OTHER space accesses

Figure 536:
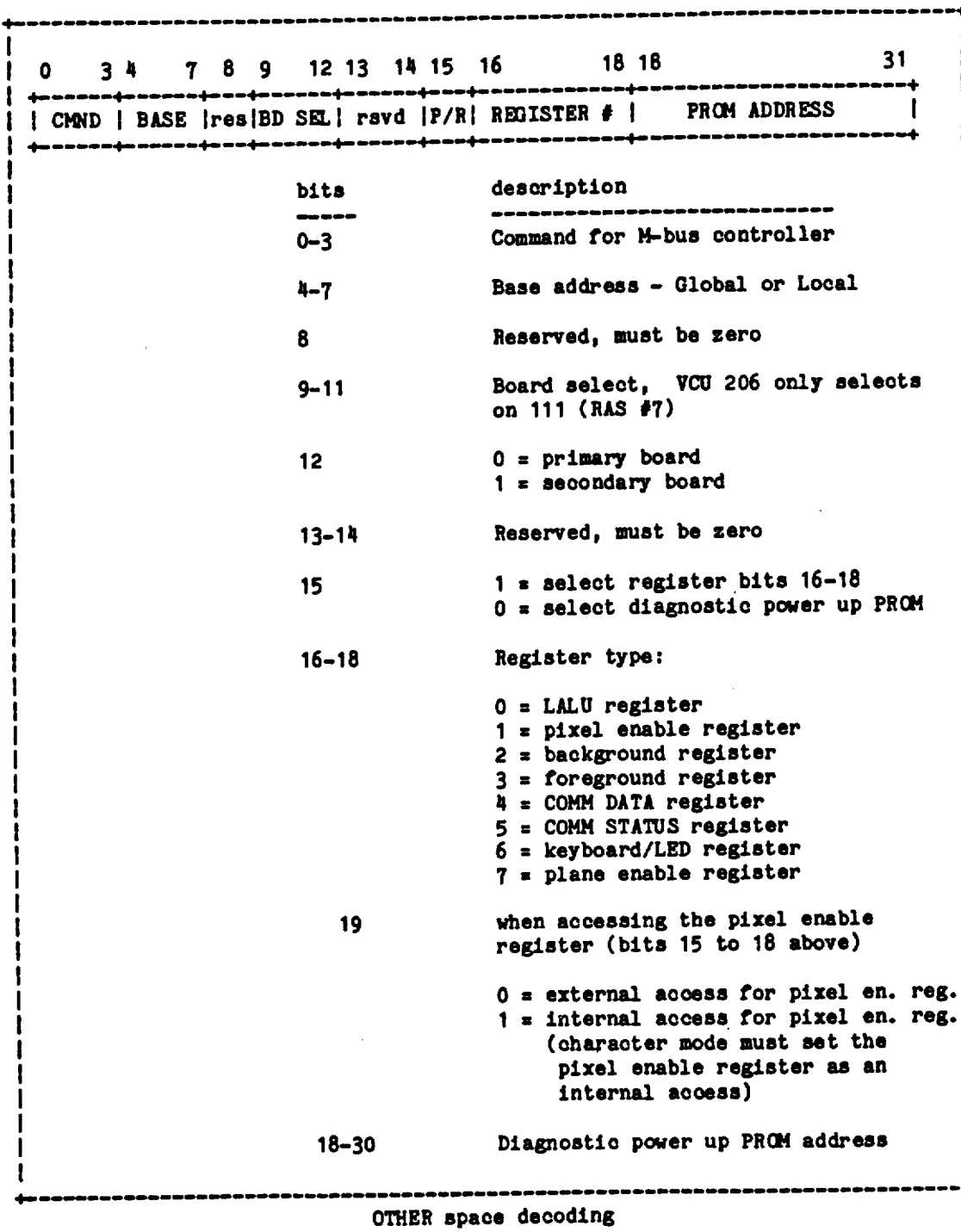
Figure 537:
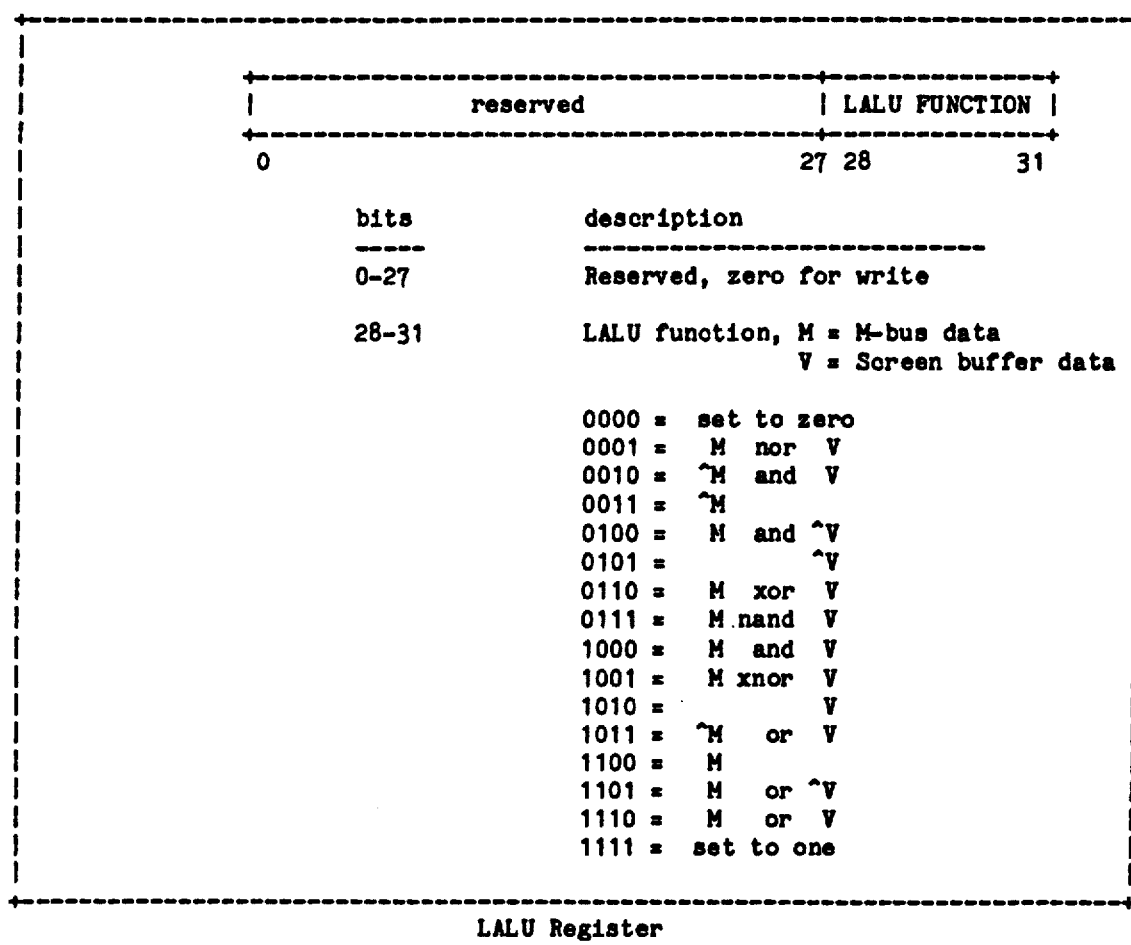

FIG. 536 illustrates how the M-bus address is decoded when the OTHER space bit (on MBus 205, described in section 4) is asserted, indicating an OTHER space access is occurring.

All of the registers on VCU 206, except the X and Y, SOURCE, and DESTINATION registers, are contained in OTHER space.

5.6.2.1 LALU register

The LALU register 327 (see FIG. 537) is 4 bits wide and may be used to select one of sixteen possible logical operations governing the combination of VRAM 113 data and MBus 205 data. The LALU is a write only register.

Figure 538:
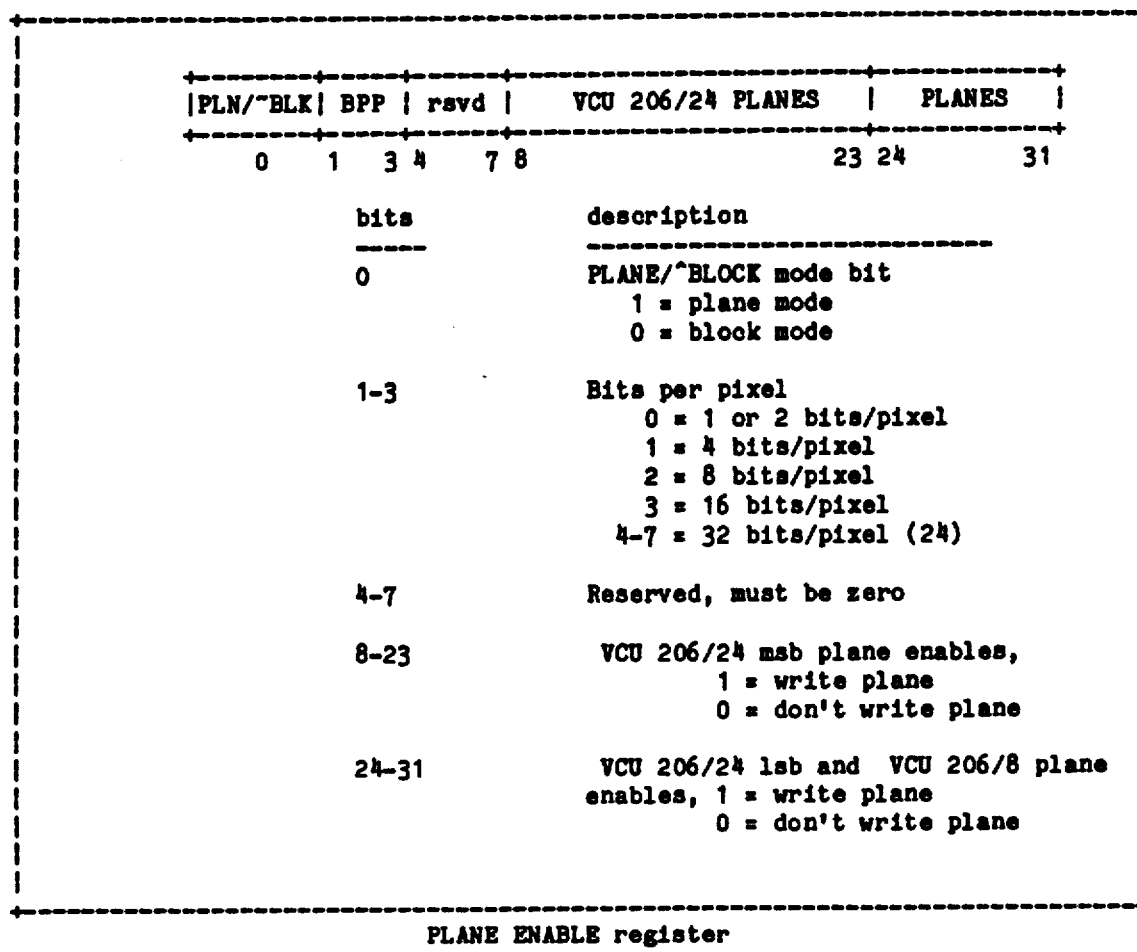

5.6.2.2 PLANE ENABLE register (FIG. 538)

VCU 206 reads or writes data in BLOCK mode. The PLANE ENABLE register is used to enable/disable individual plane bits of a pixel. For VCU 206/8 there are 8 enables, and for VCU 206/24 there are 24 enables. This register is a write only register. The effects of this register are only realized on writes and reads to video memory. A write with a plane disabled causes that plane bit to remain as it was in video memory before the write. A read with a plane disabled causes the data to be returned as a logic one.

The bits per pixel bits of this register define how many bits per pixel are being acted on. Normally, for VCU 206/8 this register is set for 8 bits per pixel, and for VCU 206/24 this register is set for 24 (32) bits per pixel. If, however, only 1 bit per pixel need to be written then this register can be set for 1 bit per pixel. Note that this allows 32 pixels per double word to be written at one time (or read in the case of a read operation) instead of 4 pixels when configured as an 8 bit per pixel controller. If this register is set to less than the number of bits per pixel for what the board is capable of (1,2 or 4 for VCU 206/8; 1, 2, 4, 8, or 16 for VCU 206/24) then the unused planes MUST BE DISABLED. For example, if VCU 206/8 is configured as 2 bits per pixel with this register, then planes A,B,C,D,E,F must be disabled. When performing special character write accesses, bit 0 of the PLANE ENABLE must be 1 (PLANE mode) and individual plane enable bits of a pixel can either be zero or one, as desired. This allows for simultaneous setting or clearing of all 32 pixels in a double word or plotting of a 32 bit wide character font.

Figure 539:
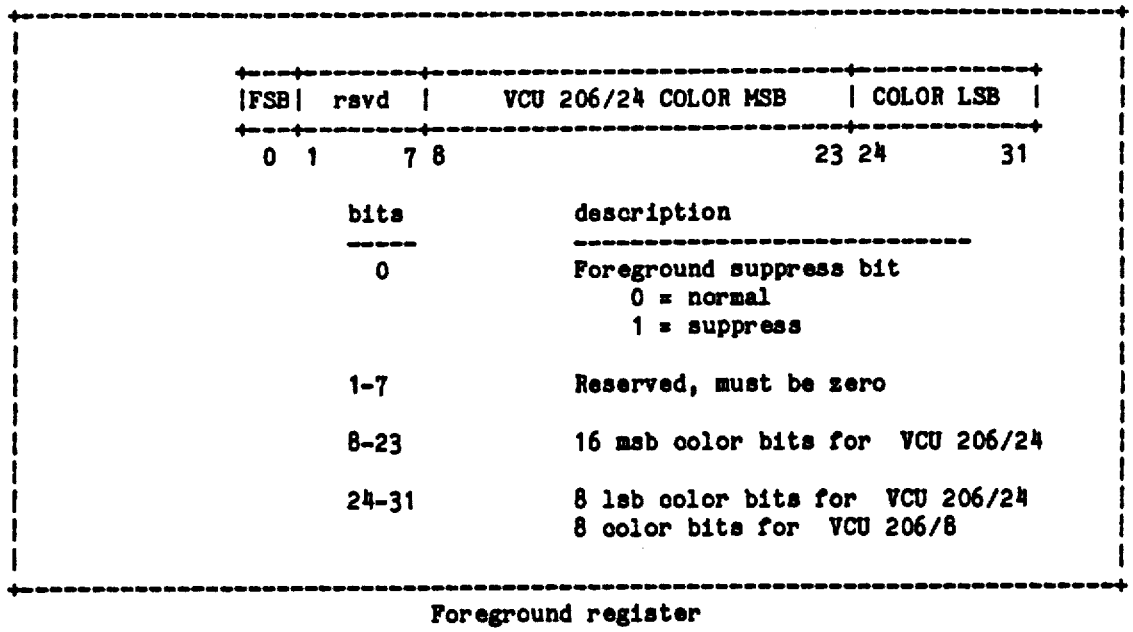

5.6.2.3 Foreground register (FIG. 539)

The ability to plot characters at the same speed on both VCU 206/8 and VCU 206/24 is due in part to the FOREGROUND and BACKGROUND registers. These registers hold the color information (or plane data) for the planes of a pixel. These registers will basically substitute a single bit of pixel information with either 8 bits or 24 bits of color information. This means a write of 32 bits over the M-bus on VCU 206/8 causes a write of 32*8 bits in the video memory, and 32*24 bits on VCU 206/24.

The FOREGROUND register, in character drawing mode, will substitute the foreground color specified when a one is written to the video memory. The FOREGROUND register is write only. If the foreground suppress bit is set, then the data will not be written. This allows the writing of transparent characters, (i.e. the character [foreground bits] remains unchanged, while the background is changed to a particular color). Note that if the foreground suppress bit and background suppress bit are both set then nothing happens.

Figure 540:
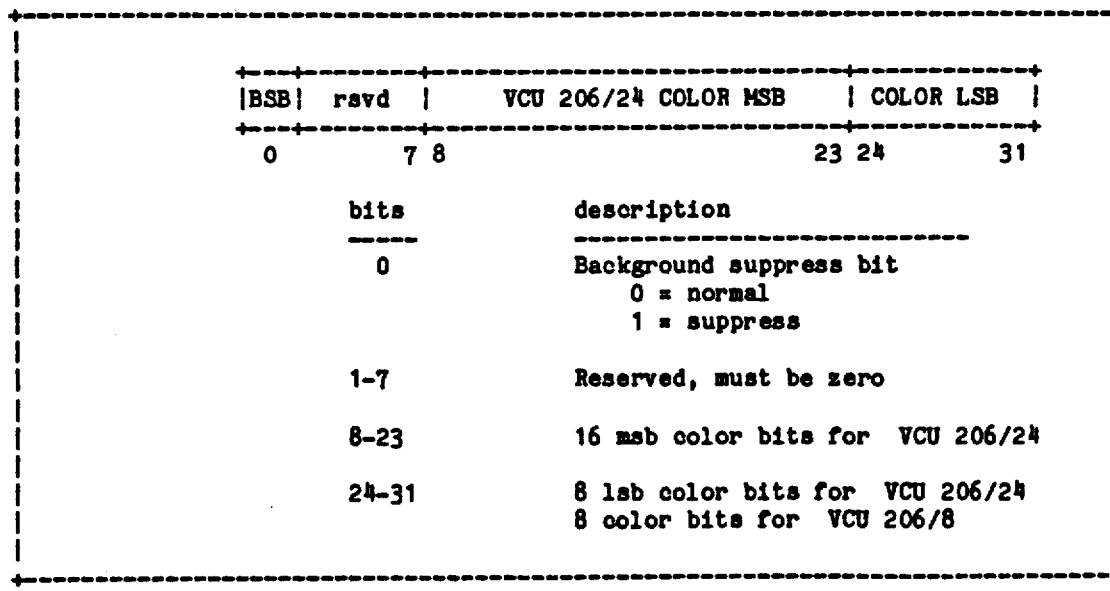

5.6.2.4 Background register (FIG. 540)

The BACKGROUND register, in character drawing mode, will substitute the background color specified when a zero is written to the video memory. The BACKGROUND register is write only. If the background suppress bit is set, then the data will not be written. This allows the writing of transparent character backgrounds, (i.e. the character is changed to a particular color while the background remains unchanged). Note that if the foreground suppress bit and background suppress bit are both set then nothing happens.

5.6.2.5 COM DATA register

The COM DATA register is used to pass information between the host and 8031 uP. The register which holds the data on a host write (host to 8031 uP) is 16 bits wide, and the register which holds the data on a host read (8031 uP to host) is 32 bits wide. The DATA passed by between the host and 8031 uP is defined as the following:

From 8031 uP to host (host read):
  mouse data
  echo (diag) data returned
From host to 8031 uP (host write):
  mouse commands
  palette data
  NMI enable/disable
  blink enable/disable
  set mouse/tablet double click delay
  echo data (diag) command The host read COM DATA register is 32 bits wide. It can be read with one instruction by the host, but the 8031 uP requires four writes to load it. Writing the low byte (it should write the other 3 bytes first) of this register by the 8031 uP sets the DATA VALID bit in the COM STATUS register. This indicates to the host that valid data is in the COM DATA register for it to read. If DATA VALID NMI enable is set an NMI is generated to the host.

The host write COM DATA register is 16 bits wide. Referring to FIG. 541, it can be written with one instruction by the host, but the 8031 uP requires two reads to retrieve it. When the 8031 uP reads the low byte (it should read the high byte first) the READY FOR DATA bit in the COM STATUS register is set indicating the host can write another word to the COM DATA register.

5.6.2.5.1 Mouse/Tablet

Referring to FIG. 543, Mouse/Tablet commands are issued via the COM DATA register. The 8031 uP reads the mouse/tablet command from the host write COM DATA register and ships it uninterpreted to the mouse via the serial port of the 8031 uP.

The mouse/tablet sends 3/5 bytes (respectively) of position information via the 8031 uP serial port to the 8031 uP. The 8031 uP compresses this information into four bytes and writes them to the COM DATA register. An NMI is generated (if enabled) when the 8031 uP writes the last byte. The host then reads the mouse position with one 32 bit read of the COM DATA register.

5.6.2.5.2 Palette loading (FIG. 544)

The 8031 uP can read/write the palette RAM contained in the palette DACs. There are 3 palettes to load for each phase of blinking (phase 0 and phase 1). They are the RED, GREEN, and BLUE gun palettes, each having 256 entries. When the host writes new palette colors to the COM DATA register, the 8031 uP places these colors into a palette table. During vertical blanking the 8031 uP transfers the palette table into the palette DACs. It takes a total of six screen refresh times (or 100 msec) for the 8031 up to update the palette.

Each of the 6 palette tables has a pointer which indicates which entry in the table (0–255) will be written. This pointer is automatically incremented after every write to the palette table. Only the color and phase pointer which was written to increments, the other 5 remain unchanged.

To load the palette table, the RESET ADDRESS function must first be issued. This resets the internal RED, GREEN, and BLUE table pointers. A table pointer points to the next location in the palette table that will get the palette data. Resetting this pointer causes all three table pointers, for that phase, simultaneously to point to the location specified in bits 24 to 31 of the data double word.

The palettes are set to display an all white screen on power-up for approximately 2 seconds. After the 2 seconds the default palettes are loaded. (Note: the default palettes are black.)

Figure 545:
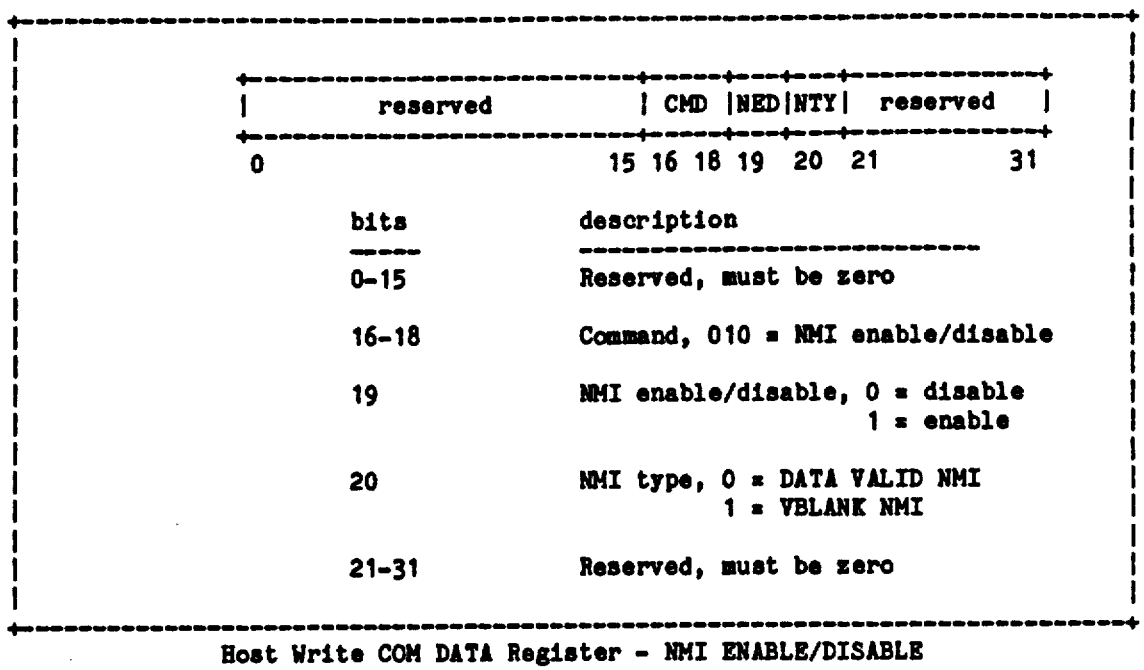

5.6.2.5.3 NMI enable/disable (FIG. 545)

This command to the 8031 uP enables or disables the vertical blanking NMI or DATA VALID NMI. Note that disabling NMIs does not disable the state of these bits in the COM STATUS register. The default on power up is both the ˆVBLANK and DATA VALID NMIs are disabled.

Figure 546:
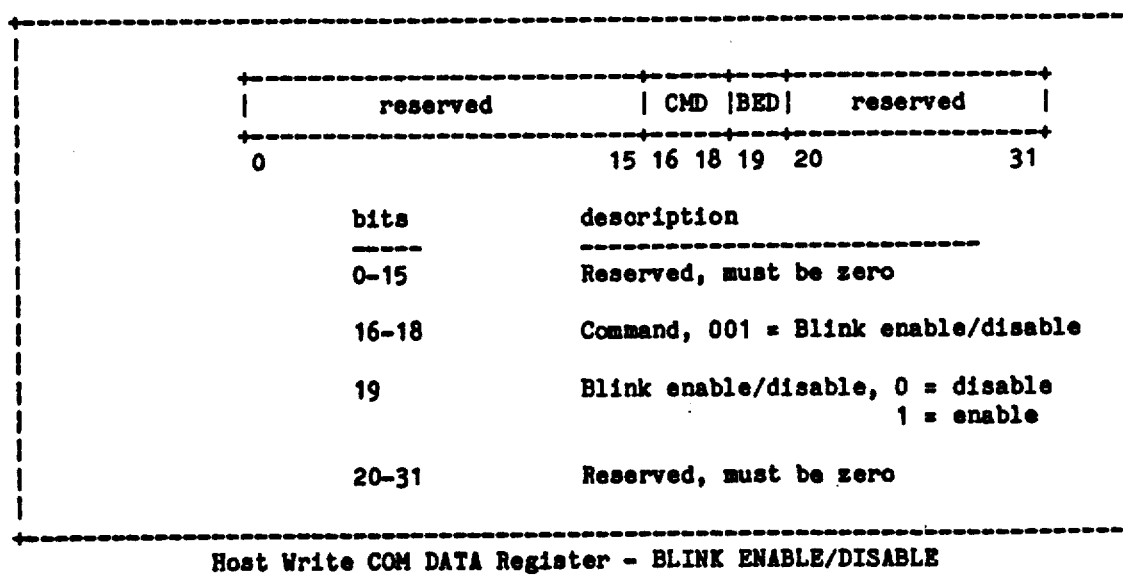

5.6.2.5.4 Blink enable/disable (FIG. 546)

This command enables/disables the blinking feature. Default on power up is blinking disabled. Blinking is done by switching approximately once a second between the palette entries in the phase 0 table and the phase 1 table. If the phase 0 and phase 1 tables are identical then no blinking will occur even if blinking is enabled. When blinking is disabled only the phase 0 table entries are displayed.

Figure 547:
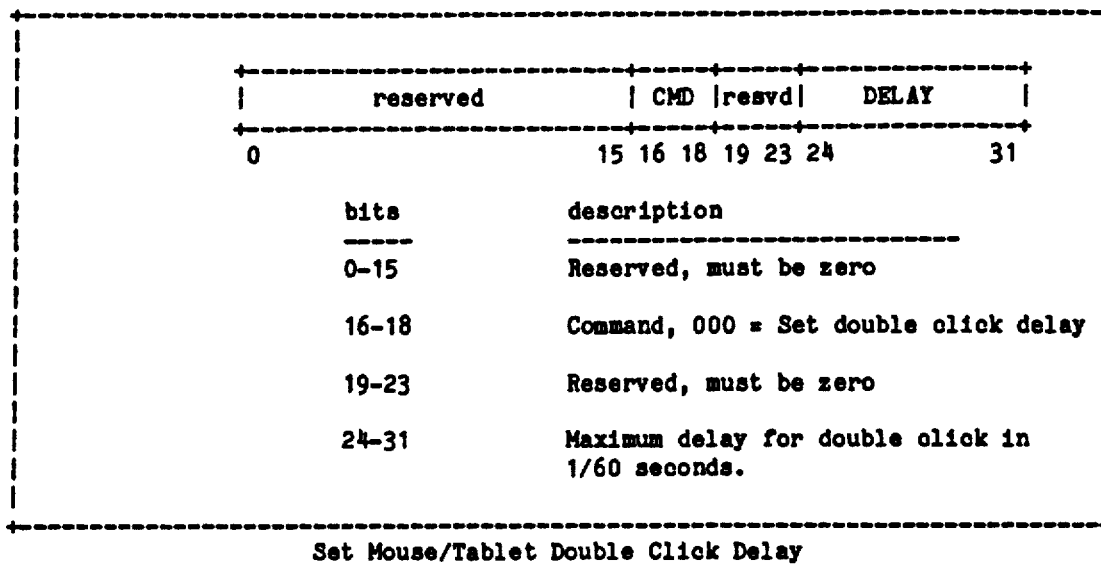

5.6.2.5.5 Set mouse/tablet n-click delay (FIG. 547)

This command sets the delay time between the depression of a button and the timeout packet. Two down key clicks that occur before the timeout occurs are counted as double clicks, three down key clicks that occur before the timeout occurs are counted as triple clicks, those longer than the delay are single. The counting of the clicks is the responsiblity of the host based on the presence of the timeout packet returned.

Figure 548:
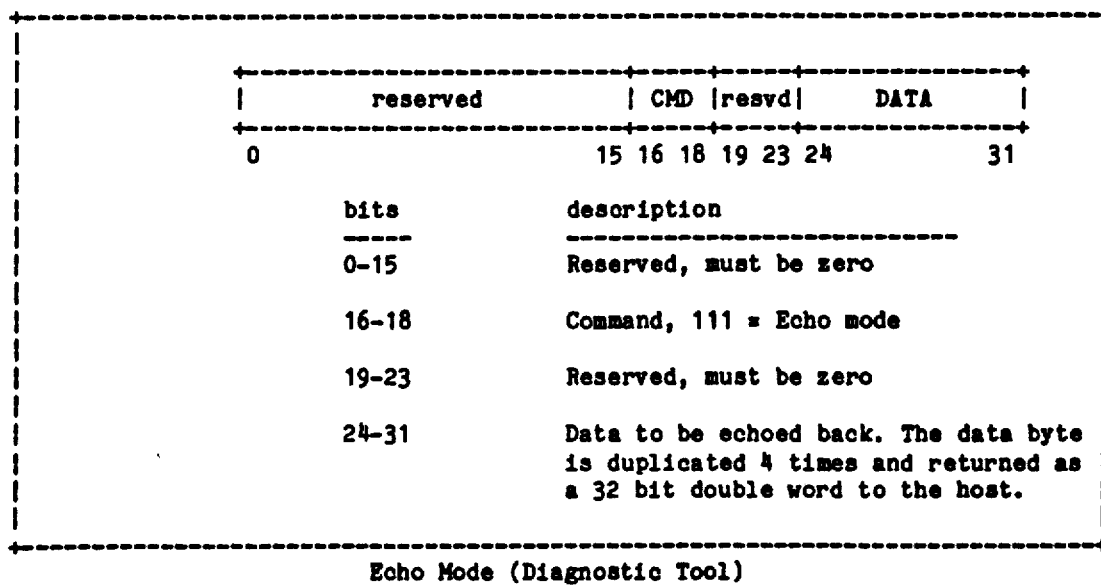

5.6.2.5.6 Echo (diag) mode (FIG. 548)

Used to verify the data path to and from the COM data register. Note that this command will not check the COM DATA register to see if the host has read the last double word placed in it before echoing the data received from the host.

5.6.2.5.7 Manufacturing test mode (FIG. 549)

This command provides to manufacturing and diagnostics a means to further test the status of the board through the 8031 up.

There are 2 significant functions to this mode depending upon the value of bit 19. When this command is executed if bit 19 is zero, the 8031 will immediately jump to the first address space outside the range of its code prom (decimal 4096). This allows the execution of diagnostic code from an area other than the 8031 code prom. If the command is executed and bit 19 is 1, then a status byte is sent back immediately destroying the value of the commdata register, if any.

5.6.2.6 COM STATUS register (FIG. 550)

The COM STATUS register is read only and returns the following information:

vertical blanking state
READY TO ACCEPT data state
DATA VALID state
keyboard interrupting state There are three events that can cause an NMI from VCU 206. All three can be checked via the COM STATUS register. Two of them can be disabled.

An NMI is generated when the KEYBOARD register on VCU 206 is loaded by the keyboard. This NMI will always occur. The only way to clear this NMI is to write the LED register. Refer to the KEYBOARD/LED register section below for more detail.

An NMI is generated when DATA VALID is set by the 8031 uP. This NMI can can be disabled by sending a command to the 8031 uP. This NMI and status bit are cleared when the COM DATA register is read.

An NMI is generated when ˆVBLANK is asserted. This NMI can be disabled by sending a command to the 8031 uP. This NMI is cleared when the COM STATUS register is written. Note that writing the COM STATUS register does not alter anything else, it only clears the NMI for ˆVBLANK. The status bit is cleared when ˆVBLANK is deasserted. (FIG. 15)

5.6.2.7 Keyboard/LED register

The keyboard register and LED register have the same register address. The keyboard register is read only, while the LED register is write only.

Figure 551:
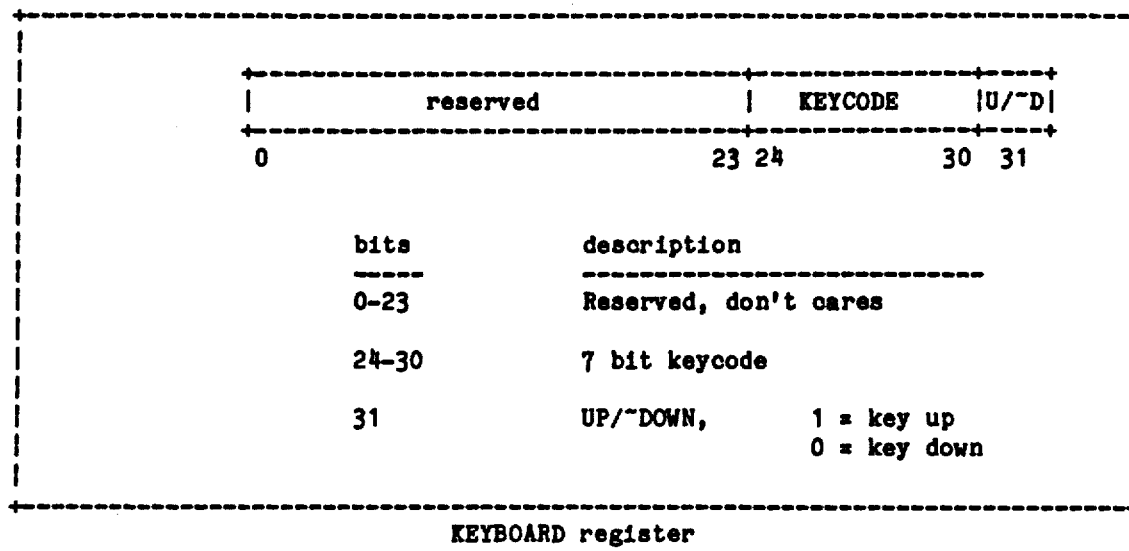

Referring to FIG. 551, when a key is struck on the keyboard, it sends the keycode and position (up/down) to the keyboard register on VCU 206. Loading the keyboard register also sets an NMI to the host to inform the host that the keyboard has just placed data into the keyboard register. Bits 24–31 of the M-bus data word contain the keyboard data during a read of the keyboard register. Bit 24 contains the keystate bit (up/down), and bits 25–31 define the keycode.

Figure 552:
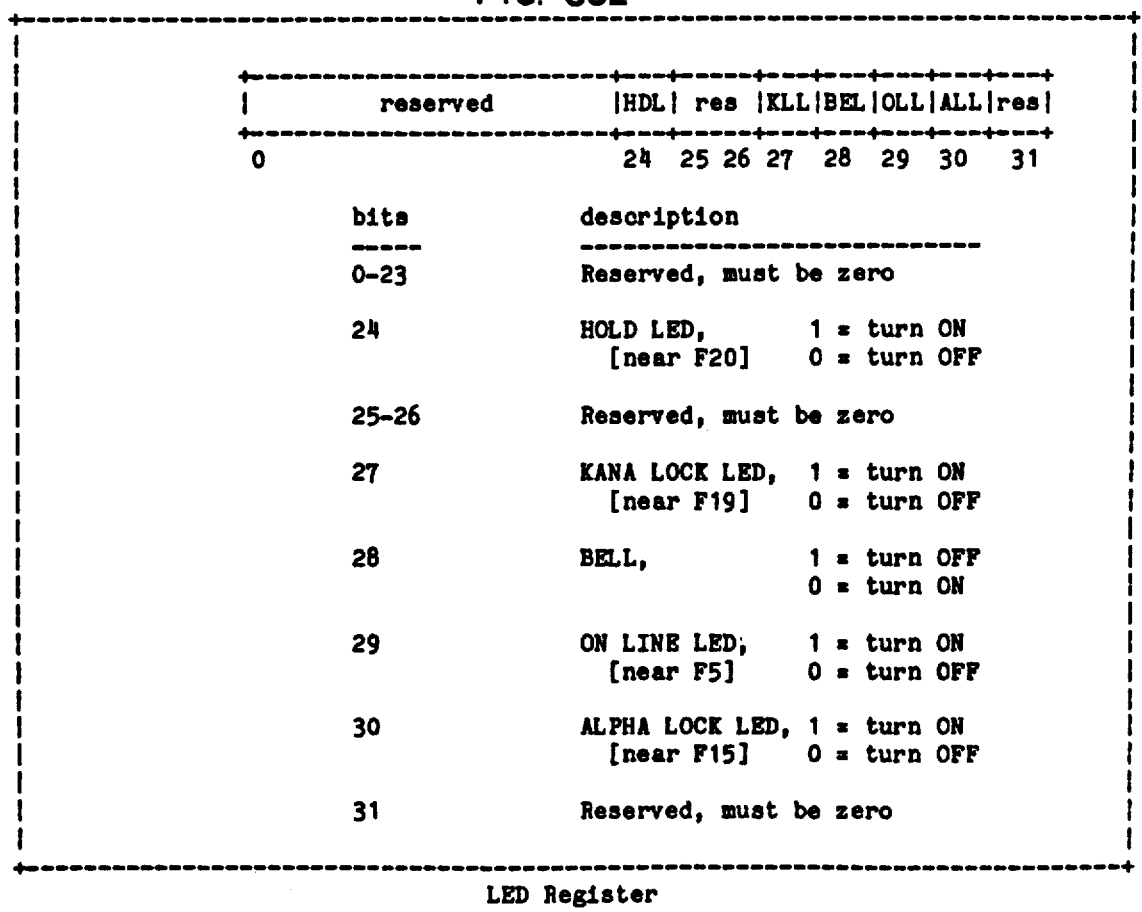

With reference to FIG. 552, the LED register contains bits which set or clear the state of the LEDs on the keyboard, as well as the bell on/off bit. Writing the LED register clears the NMI generated by the keyboard and sends the keyboard a new LED word. The keyboard cannot transmit the next keyword to the host until the NMI is cleared by writing the LED register.

Note that the beeper is programmed exactly opposite the way the LEDs are programmed, namely a 1 turns LEDs ON, but the beeper OFF.

The keyboard generates a timeout word (all ones) every 80 milliseconds if no key changes state. This timeout word can be used for type-o-matic keys and the repeat key to generate a new character after a predetermined amount of timenout words have been received. The timeout word also allows the host to update the LED register, even if no keys have been pressed, and can also used to "force" through pending screen operations that have been interrupted.

Refer to the appropriate keyboard specification for complete information on keycodes and programming.

Figure 553:
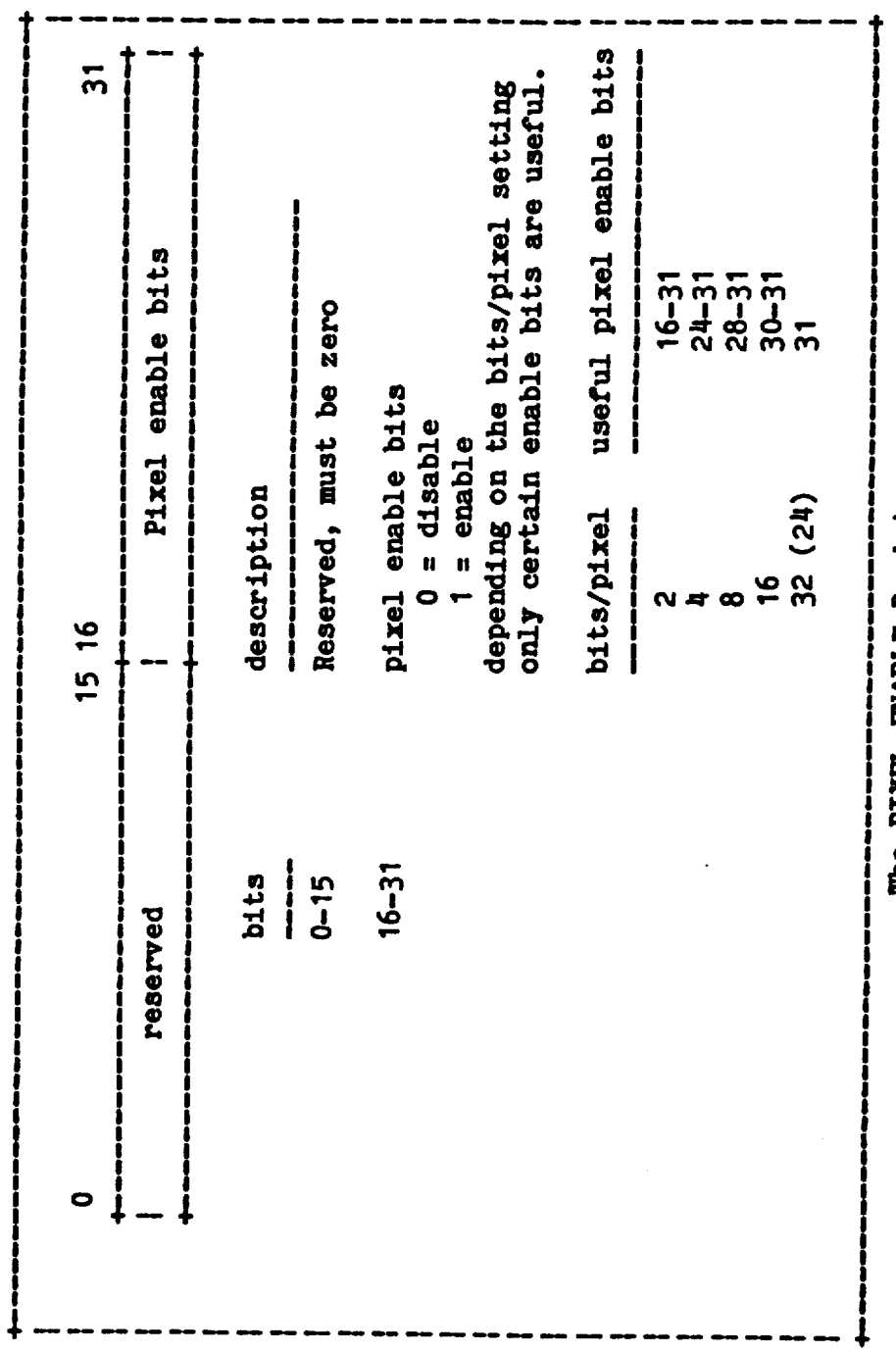

5.6.2.8 PIXEL ENABLE register (FIG. 553)

The PIXEL ENABLE register controls which pixels get written into the video memory. Each bit in the PIXEL ENABLE register corresponds to a pixel in the data word. So, for 8 bits per pixel only the 4 least significant bits of the PIXEL ENABLE register have any meaning, since only 4 pixels can be written at any one time. For 2 bits per pixel only the 16 least significant bits have any meaning, etc. This allows for simple treatment of boundary conditions when the width of the block is not a multiple of 4 pixels on VCU 206/8. This can be very useful in BITBLT and CHRBLT type operations. This also allows single pixels to be written by simply setting only the least significant bit of this register.

5.6.3 NORMAL space accesses

FIG. 554 illustrates how the M-bus address is decoded when the OTHER space bit is not asserted, indicating a NORMAL space access is occuring.

A NORMAL space access can either be an external access, character mode access, or an internal access.

5.6.3.1 Host accesses (external)

External accesses are normal read/write accesses to the video memory via the M-bus.

5.6.3.2 Internal accesses

Internal accesses do not use the M-bus. During an INTERNAL READ data is read from the video memory and stored in an on-board register. On an INTERNAL WRITE operation, the data that was previously stored in the on-board register from the INTERNAL READ is written back to the screen buffer, potentially at another address. Because internal accesses do not use the M-bus, the transfer of data is not bandwidth limited by the M-bus to 32 bits per access; but rather limited to the bandwidth of the video memory data lines. For VCU 206 it is 32 times the number of planes per pixel. This yields a transfer rate of 256 bits per transfer for VCU 206/8 and 768 bits per transfer for VCU 206/24. In both cases, this translates to 32 pixels per transfer.

5.6.3.3 Character drawing

Character mode accesses are a special case of the external access; however, bit 0 of the PLANE ENABLE register must be 1 (plane mode). The gate arrays are loaded with the foreground and background colors for the characters. Only a simple character font (simple means a 0 bit represents the background color, and a 1 bit represents the foreground color) needs to be written to the video memory in this mode, as the mapping of foreground and background colors are done by the gate array. Note that only writes are valid in this mode. The drawing speed here is not a function of the number of bits per pixel (planes), meaning characters will be drawn with equal speeds on VCU 206/8 and VCU 206/24.

5.6.3.4 X and Y, SOURCE and DESTINATION registers

The SOURCE registers are normally used as pointers to a row and a column of the window to be moved or drawn. VCU 206 can use either pair of registers to read to write. This allows for easy handling of block moves and logic operations from video memory to video memory.

By providing seperate SOURCE and DEST registers for X and Y addresses, window moving in either the X or the Y plane can be accomplished much more efficiently because only one coordinate address needs to be sent after the initial X and Y address is loaded.

Note that both the SOURCE and the DEST registers can be used for reading and writing. Labels "source" or "dest" are used for clarity only, although SOURCE register normally holds the top right coordinate of the window to be read and DEST register normally holds the top right coordinate of the window to be written.

5.6.4 Read/write pixel

PIXEL operations may be used to draw lines, circles, and other pixel-by-pixel graphics efficiently. Pixel read and pixel write are just special cases of BLOCK READ and BLOCK WRITE respectively.

All accesses are double word accesses. However, if the pixel enable register contains a value of 00000001 (hex) then on a host write access, a pixel write is accomplished. The pixel to be written must always be right justified. Similarly, on a host read, the right most pixel of the double word read from the video memory is the pixel addressed, the rest of the pixels must be masked out by the host CPU. Note that the PIXEL ENABLE register is used by VCU 206 only on a write cycle.

PIXEL accesses require the setup of the following registers:

(1) the X and Y SOURCE or DESTINATION registers
(2) the LALU register
(3) the PIXEL ENABLE register
(4) the PLANE ENABLE register

5.6.5 Read/Write BLOCK

A double word access will access either 4 consecutive pixels on VCU 206/8 or 1 pixel on VCU 206/24. For VCU 206/8, each pixel is 8 bits wide, so 4 pixels will fit into a double word. For VCU 206/24 each pixel is 24 bits wide, so only 1 pixel will fit in a double word. This 24 bit pixel is RIGHT JUSTIFIED in the 32 bit double word. Note that, setting or clearing of the video video memory is faster if a special character write access is performed instead.

BLOCK addressing may be used when it is required to move or draw a large rectangular blocks of graphics memory more efficiently. CHRBLT, 2DLINE, and BITBLT instructions use BLOCK transfers. Note that BLOCK accesses are NOT limited to double word boundaries of pixels, but are limited to pixel boundaries.

BLOCK accesses require the setup of the following registers:

(1) the X and Y SOURCE or DESTINATION registers
(3) the LALU register
(4) the PIXEL ENABLE register
(5) the PLANE ENABLE register

5.6.6 Interrupts

Interrupts on VCU 206 can be generated by any one of three sources:
COM DATA register
keyboard
vertical blanking Successive commands sent to the 8031 uP can be handled by polling the RTA status bit. However, it is important that the emulator not be sitting around polling for data coming FROM the VCU 206 board (mostly mouse/tablet data). For this reason, the assertion of DV (data valid) causes a non-maskable interrupt to occur, which quickly gives control to the terminal emulation code. The emulation code may then read the mouse data, track the cursor, etc. The interrput is maskable on the VCU 206 board but not by the host. The interrupt and the status bit are cleared when the host reads the COM DATA register.

In addition, the keyboard control logic can generate an NMI. The terminal emulation code must read the VCU 206 status register to determine which device generated the non-maskable interrupt. Keyboard interrupts cannot be disabled. This is important for BREAK key handling.

A third NMI called VBLANK is also available. This is generated by the VCU 206's video timing unit to notify the microcode that it is in vertical blanking period. This is useful for operations like: scrolling, cursor tracking and diagnostics. The VCU 206 status register also contains the VBLANK status to help determine the NMI source (refer to FIG. 12). This status bit cleared when vertical blanking deasserts. However, the NMI does not clear unless a write to the COM STATUS register is performed. This NMI is maskable on the VCU 206 board but not by the host.

6. Detailed Description of the Operating System 6.1 Overview

The most immediate prior art to the present operating system is the AOS/VS operating system, marketed by Data General Corporation. Refer to Data General Corporation publication numbers 069-016 and 093-150 for explanation of some of the terms to be used herein.

Operating systems are well known to those skilled in the art, and have been provided for digital computers almost since the inception of digital computers. An operating system may be defined as an organized collection of programs and data that is specifically designed to manage the resources of a computer system (Harry Katzan, Jr., Operating Systems, van Nostrand Reinhold 1973). Operating systems generally provide services which experience has shown to be required by many of the users of a computer system—rather than requiring each user to program these functions for herself, they are centrally provided for each user to simply invoke. These services typically include such things as editing, compiling, and relocatably loading the user's programs; running the user's programs; allocating memory space and I/O storage space; performing I/O and communications; fielding interrupts; and fielding "traps" resulting from software and hardware errors.

Early computers, and thus early operating systems, provided for one user at a time to run one program at a time. Computers and their operating systems have in recent years evolved into multi-user multi-tasking systems in which a plurality of users jointly run a plurality of programs. FIG. 601 depicts such an environment. For clarity, FIGS. 602A, B, and C show further detail of the interactions between the operation system, the distributed computer system, a single one of the users depicted in FIG. 601, and a single one of the programs depicted in FIG. 601.

Prior-art distributed computer systems have had companion operating systems which, among other things, perform the necessary transmission among the computers comprising the distributed computer system. The operating system of the present invention makes novel use of the novel hardware (MCU 201, IBus 204) to facilitate such transmissions, performing them in a manner that is transparent to the user. That is, the user need not be cognizant of whether a requested resource is resident in the same computer with her program, or in some other computer in the system; the user simply requests the resource from the operating system, which determines whether the resource is local or remote and appropriately carries out the user's request either on the local computer or via IBus 204 on the remote computer.

Refer now to FIG. 602A. The present invention's significant departures from prior-art distributed operating systems center on DCALL (deflection call) handler 502, GNS (global naming service) 503, and TSMI (transport service management interface) 504.

DCALL (deflection call) handler 502 is so named because it may resolve a request on the local computer (the computer which was running the program that lodged the request) or may "deflect" the request to a remote computer on the distributed system.

GNS 503 keeps track of where resources are located, (on the local computer, or on which remote computer) and provides this information to DCALL handler 502.

TSMI 504 handles details of communicating through MCU 201 and over IBus 204 with other computers of the distributed computer system.

FIG. 602A depicts Operating System 501 as surrounding the distributed computer system, and as having multiple occurrences of DCALL handler 502 and TSMI 504. This is the nature of a distributed operating system; it is the composite of all the operating system elements residing in or associated with all of the individual computers comprising a distributed computer system.

As FIG. 602A shows, a request from a user program for an operating system service takes the form of a DCALL, which is fielded by DCALL handler 502, which consults GNS 503 to determine whether the necessary reference can be resolved on the local computer, or must be deflected to a remote computer. FIG. 602B illustrates the former case, and FIG. 602C the latter.

FIG. 602B shows the reference being handled in the local CPU 101, and the result being routed by DCALL handler 502 back to the user program.

FIG. 602C shows the reference being routed to TSMI 504, which transmits the request through local MCU 201 over IBus 204 to the MCU 201 of the appropriate remote computer (the one previously identified by GNS 503). Remote TSMI 504 receives the request and forwards it to remote DCALL handler 502, which fills the request in the same manner it would fill a request originating from the same computer with which it is associated. The result is passed back to the user program over the same path over which the request was forwarded.

6.2 Functional Overview 6.2.1 Distribution Services Functional Overview

The Distribution Services System (DSS), comprising DCALL handler 502 and Global Name Service 503, is the system component responsible for maintaining the database of globally registered resources, performing address translation to determine the location of a resource given its UID (unique identifier, see below), performing the deflection of individual operations when appropriate, and interfacing to the communications subsystem (TSMI 504). These functions fall into two major design areas, the Global Name Service (GNS) 503 and DCALL handler 502.

While these are separate subsystems, the Name and Deflection services are not independent of each other. The deflection operation cannot be accomplished without the use of the information in the Global Name Service's databases, and the Name service exists to supply information necessary to the deflection operation. The design of efficient interface primitives between these two components is, therefore, important to the overall system performance. In particular, if trade-offs will have to be made between such areas as the design of Name Service databases for efficient lookup versus efficient updates, the needs of the more frequent operation (lookup) will dominate.

The DSS components are designed to readily take advantage of a continually evolving operating environment. The initial implementation strategies for many portions of the subsystems in question will evolve with changing technologies and patterns of use. To that end, effort is directed toward defining appropriate (fixed or extensible) interfaces between components. These interfaces will serve to isolate service users for internal changes, and will allow the designs of individual components to evolve as necessary with minimal disruption to their users.

6.2.2 Global Name Service Functional Overview

That portion of the Distribution Services System that deals with the introduction, verification, translation and unlisting of global names will be considered to be part of the Global Name Service (GNS 503) component of OS 501. There are two sets of interfaces to the GNS—system calls available to both end-users and other system services, and special purpose requests that can only be made by other system services.

The Name Service functions that a user is permitted to invoke directly are those pertaining to the addition, deletion and listing of resources in the registry of globally accessible names. While certain system services may be able to determine that a particular resource should be removed from the global registry (for example, a disk might become unavailable as a result of a hardware fault), only users can determine what should be placed in the registry, and, in the absence of a failure, what should be removed. In addition, users will be permitted to interrogate the global registry for a list of all registered names, and their type, or for a list of all names of a given type.

Since the granularity of resource registration operations is an LAU (logical allocation unit, to be described below), updates of the database of globally available resources will occur relatively infrequently. Direct queries by users will be more frequent, but are still presumed to be reasonably uncommon relative to their general system call mix. Thus, direct user interaction with the GNS should not present a significant communications burden.

By far the most common GNS interactions will be with the Deflection Call Service. These will consist primarily of queries requesting the transport service address associated with a particular resource. Other GNS-DCS traffic may be possible, particularly in response to error conditions.

6.2.3 Deflection Call Service Functional Overview

In a distributed operating system, operations are most effectively performed by acting on data at the site(s) on which they reside. OS 501 will provide this environment by means of a function invocation mechanism that indicates that an operation is location-sensitive, and it execution should occur at the location of the key object indicated. This mechanism allows implementors to use a single interface for all data, regardless of its location. In addition, the choice of the appropriate execution site for a distributable operation can be deferred to execution time, at which point the Deflection Service will be responsible for deciding whether or not to deflect the operation to a different location.

The actual Deflection Call Service is invoked by use of the Deflection Call (DCALL) mechanism. Briefly, DCALL provides the means for indicating that a particular operation is to be performed against a parameter list, with the location-sensitive parameter's UID specified. The exact syntax of DCALL invocation is described in section 6.4.4

When a DCALL is used to invoke a function, the UID of the resource whose location will determine the site of execution of the function is indicated. The caller has no knowledge of where the resource resides, only that it has the potential for being on a remote system. Regardless of whether the function is excuted locally, the issuer of the DCALL will see the same behavior—the DCALL is executed (in place of a strictly local function invocation mechanism), and execution of the caller resumes following the DCALL, just as it would with a strictly local mechanism.

The Deflection Call Service actually performs a bidirectional function. When a DCALL is issued, the DCS is responsible for either deflecting the operation to a remote system, or causing efficient invocation of the local function. When a deflection occurs, it is received and processed by the Deflection Call Service on the remote host. In handling this portion of its function, the DCS must cause the appropriate functions to be invoked and results returned to the issuer of the original DCALL. Section 6.4 provides further details on both the specific interface to, and the internal operation of, the DCS.

6.3 Global Naming

OS 501 extends the AOS/VS resource naming and management scheme by adding the concept of Logical Allocation Units (LAU). LAU's are a collection of objects to be managed by the same servers and providing a scope for AOS/VS names. LAU's will act as the distribution key for OS 501's deflection mechanisms. The naming syntax, however, has been extended by the addition of the use of Registered Resource names, rather than LAU names. While these may, in certain cases coincide, the use of individual resource names allows the user to control resource usage at a more appropriate level.

To allow further control of naming, and allow for interconnection of networks without redefinition of names, OS 501 provides COMMUNITIES which identify the scope within which names are to be interpreted. Registered resource names and COMMUNITIES will be managed by GNS 503.

6.3.1 Goals

OS 501's main goal is to provide a distributed operating system environment in a natural, "seamless" manner. An essential component in such an environment is the use of a consistent global naming mechanism for all resources. Such a naming scheme will be host independent and will also allow consistent naming for both local and remote resources.

Additionally, the global naming mechanism should provide for splitting a OS 501 network into one or more administrative subnetworks of users and resources. This mechanism must provide administrative boundaries in a consistent manner that permits access across these boundaries as necessary. Finally the mechanism should allow for the merger of disjoint machines or networks in a manner with little or no impact to the individual users.

6.3.2 Name Format

The format of global names in OS 501 is:

::community::registered_name:VS_name where objects such as directories or process execution groups are identified by registered names. The global name format is an extension of the existing AOS/VS naming scheme, and functions according to very similar rules. Just as a simple filename can currently be resolved, by means of working directory and/or searchlist, into a single fully qualified pathname, making it unnecessary to always use explicit full pathnames, similar conventions will be used to provide default values for the COMMUNITY field.

While OS 501 is being designed with support for connection and subdivision of networks, this functionality will not be visible to users in the initial release. The portion of the global name format that will be exposed to users initially will consist of:

::registered_name:vs_name

This format will support future introduction of the use of default community name settings and explicit naming syntax extensions in a compatible manner when communities are made visible.

6.3.3 Logical Allocation Units

Logical Allocation Units (LAU's) function as containers for system resources. The LAU is a group of resources, such as processes or files, that reside on a single system and are logically grouped. The LAU provides a control point for the naming, location, and management of objects in the system. Three specific examples of types of objects found in LAU's in OS 501 are file trees, peripherals, and processes.

While all resources are contained in LAU's, not all LAU's are visible to users or serve as the names that are known to the Global Name Service as registered resources. For example, process groups (which are LAU's) are the unit of registration for process management resources on OS 501. On the other hand, file system LAU's correspond to logical disks (LDU's), but resource registration actually occurs on directories.

A LAU will be given a unique identifier (LAUID) at creation time; this number will provide a unique handle for referencing the LAU in all communities. Resources within each LAU will be referred to by an additional identifier that is unique within the LAU, known as the Object Serial Number (OSN). Together, the two numbers will create a network-wide unique identifier (UID) for any resource.

6.3.4 Registered Names

Registered names must be unique within a community, just as two files may not have the same name in a directory (in this sense, the Global Name Registry may be viewed as a directory of registered names). When a user attempts to register a resource that would result in the duplication of an existing registry entry, the system will report the error. A user then has two options: he may rename the resource he was trying to register, and then register it by its new name, or he may register the object under an alternate name that is only interpreted by the GNS.

6.3.5 Communities

The COMMUNITY field designates the Name Service within whose scope an object resides. The community provides for partitioning the collection of registered resources in the network to bound name scopes. It also allows for interconnection of networks in an easily named manner that is an extension to, rather than a redefinition of, the naming used within previously independent environments.

Communities have no relationship to systems except in the fact that LAUs in a community reside on one or more systems. A system with two LAU's may have each LAU registered in a different community. A common example of this will be a central file server with different file system LAU's for each of several different communities in the network. Another common case will be a computational node with different process LAUs for each community it serves.

Since the community indicates the Name Service which will be interrogated for a particular registered name, the same name can exist in each of several interconnected communities without causing any naming conflicts. This provides a straight forward way for previously isolated networks to be joined without invalidating existing name usage, since, for example, ::ADMIN::UTIL:FOO.PR is different from ::LANG-::UTIL:FOO.PR.

The current community can, and generally will, be defaulted; a community need only be specified to refer to an object not located in the user's default community. A user in a community would, by means of the COMMUNITY setting in his enviroment, actually be addressing a particular Name Service when looking for ::UTIL:FOO.PR, without explicitly naming the community.

The format specified for names provides for growth in the future, should it become necessary. While it should be possible for the administration of unique community names to be accomplished within an organization, allowing previously independent networks to be connected without name collisions, it is not reasonable to assume that large, or physically disjoint or independent organizations will want to centralize such name selection. To accomodate interconnection of such groups of networks, extensions to the naming structure will be defined. By supporting default values for these added fields, existing name usages will continue to be valid.

6.3.6 Application of Global Naming to OS 501 Subsystems

As mentioned earlier, OS 501's global naming strategy is actually a set of extensions to the current AOS/VS naming rules. To accomodate these additions, the components included in a process' environment will be expanded to provide default values for the new name fields as well for those found in AOS/VS. In this way, OS 501 users will be able to use both full and partial pathnames according to not only the rules currently defined by AOS/VS, but also according to rules that reflect the naming extensions provided by OS 501.

The uses of global names in the file system, process management and peripheral management services of OS 501 are discussed below. Where appropriate, the OS 501 model will be compared to that provided by the prior-art AOS/VS.

6.3.6.1 File System

For basic file system uses, the unit of resource registration will be at the individual directory level. While the file system design specification contains a detailed description of the implications of this functionality, it is summarized here.

The registration of a directory makes the entire subtree of which the directory is the root, a globally visible resource. All users, regardless of their physical location then have the potential to use any portion of the subtree, subject to the usual access rights constraints. Those directories that are not registered are "invisible" to users not initially running on the same system as the files themselves reside.

In this way, users have flexible control over the amount and portions (if any) of their local file resources that remote users can manipulate.

6.3.6.2 Peripherals, Queues and Global IPC Ports

One of the benefits OS 501 will offer is the ability to place expensive peripherals such as plotters or high quality printers in a few locations on a network, and make them easily available to all users. Currently, users name all devices they wish to use by means of either placing @ or :PER in their searchlist, or by giving the fully qualified pathname to the device. This works in the AOS/VS context because there can only be one peripherals directory on a system.

Two other classes of resources, global IPC ports and spool queues, are named in :PER in addition to peripherals. Global servers currently establish "well-known" ports for use by their customers by means of agreed upon convention. The corresponding files are placed in :PER. Most spooled devices are referred to by the name of the associated spool queue, not by the device name. These queues are named in :PER. Both of these mechanisms need to be extended by OS 501 so that servers and spoolers can function in a distributed enviroment and provide globally accessible service. The registration of global ports and queues into ::PER would parallel the extensions provided for devices, and would serve to make these resources available on a global basis.

The PER directory on any node could be registered, making, the devices named in that directory globally available, but that presents certain problems. If more than one system had a resource in :PER that it wished to register, several directories, only one of which could be named ::PER, would have to be created. In addition, a user with any device or similar resource that he desired to share would have to make all his local devices visible, and rely strictly on ACL protection to prevent their use by others.

Finally, locating resources registered in this way would require either placing ::registered_name on the user's searchlist for every global peripherals directory, or knowing that the device is named through a particular registered directory. While this is not necessarily a problem in all cases, the number of directories that can be placed on the searchlist is limited, and gaining access to physically dispersed peripherals through anything other than explicit references to the containing LAU could be impossible.

OS 501 will solve the naming and searchlist problems by creating a separate name registry for peripherals. This registry will be treated as a directory, although it will only support a limited set of directory-like operations. It will be called ::PER. The act of registering a device will serve to effectively to create a link of the given name in the global peripherals directory. A user can place ::PER in a searchlist and be able to list and reference devices in much the same way as he can manipulate files.

6.3.6.3 Processes

In the AOS/VS-defined model, processes may be referred to by two basic mechanisms: a text process name, or a numeric process identifier (PID). The AOS/VS model imposes the requirement that both types of identification must be space unique—that is, no two processes can exist simultaneously in the same system system that have either the same process name or PID. Since many VS applications make these assumptions about their environment, OS 501 needs to provide these features for compatibility. The distributed environment makes this much more complex than it is in AOS/VS.

While VS can easily guarantee at the time a process is created that no other process of that name exists in that system, OS 501 can only cheaply ensure this within a given node. To provide such uniqueness throughout the distributed environment, OS 501 will use process LAU's.

A process LAU will act in a similar, but not identical, manner to today's AOS/VS process tree. PIDs and process names will be allocated uniquely in the LAU, with network-wide uniqueness guaranteed by the LAU name being unique and being required as a qualifier. Process names will be returned and dealt with in the same manner as network host names may be used today with AOS/VS networking. This includes the ability of the various network calls involving host and virtual pids (i.e. PID's from another LAU) to work as they currently do in AOS/VS.

Unlike the AOS/VS model, process trees may cross LAU's. FIG. 603 shows a possible environment.

Note that two process in the same tree may have the same simple process name as long as they are in different LAU's.

A system may manage more than one process LAU. A global service may be created in its own process LAU so that it will have the same name no matter what system it resides on. A name such as ::INFOS:OP:IN-FOS is completely host independent, and will be the common form for all global services.

6.4 Deflection Call Interfaces

The Deflection Call Service (DCS) provides the interface between the rest of the operating system (and users) and the actual mechanisms used to deliver a request to the appropriate (possibly remote) host. It is the component of OS 501's Deflection Service System that actually determines where a resource is located, and therefore is responsible for invoking either the local or remote copy of the function being requested.

The DCS is designed to both initiate remote requests and respond to them. When an operation is deflected from another system, it is the DCS that reconstructs the original request and causes the proper function to be invoked on the system that manages the resource. Once the activity is complete, its results are returned via the DCS to the requesting system, where that host's DCS returns the results to the requesting task.

6.4.1 Goals

By providing a general purpose interface, the DCS becomes responsible for actually interacting with the communications transport function. This isolates the rest of the system from understanding the particular requirements of the particular protocols involved, meaning only one system component must learn to package network messages. As a result, changes to the protocols will have minimal impact on the system itself.

Similarly, the transport service will be defined in such a way that the interface it presents to the DCS will be independent of the actual communications hardware being used. This isolation will permit the evolution of local networks to provide better performance characteristics with only minimal (e.g. driver level) changes in the software. A further advantage of this interface definition is that it permits OS 501, including the DCS itself, to perform distributed functions without regard to the actual connection mechanisms, so that user-visible operations are performed independently of the underlying hardware. While individual hardware configurations may make some links inherently more expensive to use, they will not be any more difficult to use.

6.4.2 Identifying and Locating Resources

OS 501 provides a transparent distributed environment at two levels. By the use of the global naming scheme for user-visible resource names, any resource in a globally registered LAU can be identified by using a single set of conventions regardless of its location. In an analogous way, the interfaces to the DCS must provide callers with a single mechanism to operate on resources regardless of their location.

Internally to OS 501, every resource is identified by a unique identifier (UID) that consists of two portions. The first, the LAUID, fully identifies the Logical Allocation Unit in which the resource resides. This, in turn, can be used by the Distribution Service to determine the location, in terms of both the machine and community, of the subsystem operating on the LAU (i.e. the object manager for the LAU). The second portion, the Object Serial Number (OSN) is interpreted by each subsystem, and only has meaning to that subsystem.

Many internal system operations are performed on a resource identified by some non-textual handle, or by a pair of identifiers, one of which is not a text string. The handles currently in use generally correspond to the OSN portion of a UID. Within OS 501, full UIDs will be used for these handles. Just as systems must have a means of deriving the internal representations from text names, the GNS will provide a mechanism to determine the LAUID portion of a UID from a text name (each subsystem provides the OSN portion independently).

There is a second class of internal system identifier for an object, and that is a context-sensitive "nickname". These identifiers, e.g. channels, allow the system to accelerate the mapping between a particular resource user, the resource itself, and the particular use being made of the resource. The DCS will want to use a similar mechanism to indicate the continued use of a particular global resource. To accomplish this, an (optional) accelerator will be passed back for later use in this way.

The Deflection Call Service uses the LAUID portion of a resource's UID to determine the location of the object, and thus whether the requested operation will occur locally, or if not, on which remote system. This determination is made by querying the Name Service component of the system. The Global Name Service (GNS) and its local component maintain the registry of local and globally registered LAUs. This registry will provide the DCS with the information needed to invoke the communications transport service if the LAU is on another host.

6.4.3 Invoking the DCS

The Deflection Call Service will be invoked by means of a procedure call interface. The actual deflection call is designed to be substituted for the current invocation mechanisms for internal system subroutines and services. That is, rather than using LCALL or LJSR to invoke a system routine, operations that would most appropriately be performed at the location owning the resource would be invoked by means of a deflection call (DCALL). The existing calling sequences to routines invoked in this manner may have to be reorganized to provide for the addition of the specific parameters the DCS will use to determine the processing paths it selects.

The DCALL deflection mechanism distributes based on the location of a resource, identified by either a UID or an accelerating handle, passed as an argument to the call. It is intended to function, in the local case, as much like an LCALL or LJSR as possible, with the target routine being indicated by a function type, and the arguments that would be passed to the local routine being included in the DCALL's parameter list. In both the local and remote cases, DCALL will provide for normal and error returns in the same fashion as is currently done for subroutine calls.

If the resource is local, control is transferred to the routine indicated on the DCALL. If the resource is remote, however, some preprocessing must be performed to allow the deflection of the operation to occur. The DCS will dispatch to a message packaging routine based on a function type parameter, and this routine will massage the arguments passed to the target routine into a self-contained packet with no references to memory addresses. This packet will then be used by DCS in the message it sends to the deflection handler on the remote system. A parallel unpackaging routine on the remote system will reconstruct the argument stream for the function to be executed there.

6.4.4 The Deflection Call

There are many operating system deflection points that either perform "one shot" operations (e.g. getting the fully qualified pathname of a file), while others mark the beginning of a continuing series of transactions or operations to be performed against a particular resource (e.g. opening a file). Both types of operations share the feature that they occur asynchronously to previous operations, and so do not occur within the context of an ongoing relation between a process and the particular remote resource in question, although the second group initiates such a pattern of use. This group of deflection points will benefit from the DCS returning an accelerator to the caller that can be used to indicate the ongoing relationship, and shortcut the procedures needed to determine the resource's location.

A third group of deflection points consists of the operations that occur within an ongoing relationship between a caller and a resource. The deflection of these operations can be accelerated by the use of the handle returned by the DCS when the relationship was established.

The deflection call is designed to allow the DCS to use both short hand and full identification, as appropriate, to locate an operation's target resource. When a DCALL is issued, it is the caller's responsibility, based on the function involved, to know whether to resource identifier is a UID or an accelerator, and to indicate this to the DCS. In addition, when a UID is being passed it is the caller's responsibility to request that an accelerator be returned for future reference to the object.

The actual syntax of a DCALL is:

DCALL(func_type_&_flags,UID_or_handle,arg_block_ptr)

where
  func_type_&_flags
    indicates the processing routine and packaging/unpackaging routines to be used in handling the deflected operation. This argument also includes flags to indicate special processing options. The only flags defined initially are:
      ?ACEL the value passed in the first argument is the short hand accelerator for the resource.
      ?GHNDL return an accelerator for the resource's location on returning from the DCALL.
  UID_or_handle
    is the UID or accelerating handle of the resource that will determine the execution location of the operation. If the ?ACEL flag is set in the flag/function argument, this is an accelerating shorthand for referring to the resource's location. If the ?GHNDL flag is set, the DCALL will return an accelerator in this argument.
  arg_block_ptr
    Points to a block of data consisting of either the argument list as outlined in the discussion below on generic parameter passing conventions, or the specific argument block expected by routines that do not conform to the conventions.

DCALL is a boolean function with a true result indicating an error has occurred. In the event of an error, the FUNC_TYPE_&_FLAGS argument will contain the error code being returned by the DCS.

6.4.5 Parameter Passing and Packaging Data

Many of the argument lists being manipulated at deflection points include pointers to buffers containing data to be acted on by a routine. The exact nature of the data depends on the operation involved, and generally such arguments are passed without any explicit indication of the length of the buffered data, since the routine being called can determine this in context.

These mechanisms are effective in a strictly local environment, since the memory containing the buffers is directly addressable, and therefore, will not have to be copied before being manipulated. When a routine is invoked by a DCALL, however, the potential exists for the routine having to be run on a remote system against the same parameter list. In cases where the operation must be deflected to another system, the arguments must be incorporated into a message to be passed to that system.

For a remote system to act on data, all pointers must, at some point, be resolved to indicate data that can be incorporated into a message. Since this involves copying data from one place in memory to another, it should only be done when necessary, i.e. when a DCALL will really result in a deflection. Two basic approaches exist for dealing with this requirement.

The first is that argument lists be tuned for strictly local reference, much as they are now. As part of the deflection operation, the resolution of pointers and the buffers they indicate into a bounded set of data would be accomplished by calling a specific massaging routine for each function or class of functions.

This would impose no overhead on local operations, but would require an extensive set of data translation routines be written and supported for putting argument lists into, and taking them out of, messages being sent to remote sites.

A second way to build the argument list portion of the message is to organize the original parameter list in a more bounded, generic fashion. If the argument list actually consisted of an argument count, followed by pairs of argument pointers and their lengths, then a single message building routine could operate on all argument lists. Since the data bounding operation must always be performed locally at some point in processing an argument list, the only additional overhead associated with this method is the addition of the argument count value, a minimal overhead addition.

6.4.5.1 Generic Parameter List Convention

It should be possible to use the second format at the majority of deflection points in OS 501. This will provide both good response for local operations, and minimize the number of DCS operations that will be dependent on the actual functions being deflected.

The generic parameter list format for the contents of the ARG_BLOCK_PTR block is as shown in FIG. 604.

The total length of the argument list indicated by ARG_BLOCK_PTR is, therefore, $(8*n)+(?alhln*4)$ bytes.

Within each argument block, the parameter type/data type entry is used to determine the format of the data being sent (the data type), as well as when it is used by the caller or target function (the parameter type). The possible values for parameter type are:
  input—the parameter is passed by the caller and never modified by the receiving function.
  output—the parameter is returned to the caller; the value sent to the called function is not important.
  update—the parameter is read by the receiver, and is returned to the caller after having been (possibly) modified.

The amount of data actually transferred either over the LAN or between memory buffers can be minimized by using the parameter type value to indicate in which direction(s) DCALL arguments must actually be sent. These optimizations can be particularly important when an argument is a block (or larger) buffer that is only being read (or written).

The data type value indicates the format of the data being pointed to by the parameter address field. The possible values include the expected range of bit, byte, and word, as well as page (to minimize data re-copying) and immediate. In the case of imediate data, the actual data is passed in the parameter address field, since it is known to be capable of fitting in the 64-bit field. This convention eliminates the need to construct a pointer to data that is of equal or smaller size to the pointer itself.

Users of the generic parameter convention will be identified as such to the GNS as part of the database maintained for function code mappings. If all system-supplied routines use the generic convention, this information will not be necessary, since any user-visible DCALL mechanism would only permit the use of the generic interface.

6.4.5.2 Specific Parameter Passing Convention

For those operations that do not lend themselves to this format because of other processing requirements (some I/O operations, for example), it will still be possible for the DCS to dispatch to function-specific routines. The goal has only been to minimize the need for such routines, not eliminate them. In such cases, the ARG_COUNT parameter still determines the number of pairs of arguments that follow.

When the function requires the use of a specific parameter packaging/unpackaging routine, the DCALL parameter ARG_BLOCK_PTR is used to point to a block whose format is to be interpreted by the specific routine that will do the formatting. The interface to those routines will be of the format:

```
xxx_PACK(arg_block_ptr,message_buf_ptr)
``` where
- routine_&_arg_ptr points to the argument block passed in on the DCALL.
- message_buf_ptr is a byte pointer into the message buffer being built, indicating the start of the data area. On return, it will have been updated to indicate the first unused buffer location.

For each packaging routine required to format data for transmission to a remote system, there will be a corresponding unpackaging routine for the receiver to use to reassemble the request prior to issuing it. The interface to the messages consists of the same arguments, bu in this case, the ARG_BLOCK_PTR points to the buffer that will receive the reformatted argument list, and MESSAGE_BUF_PTR indicates the source of the data.

6.5 Global Name Service Interface

The Name Service (NS) is called by OS 501 through a fixed interface of internal calls. These calls manipulate local and global databases of the Name Service providing support for:

- Deflection Call Service—routines to translate UID's to transport addresses and function codes to routine addresses.
- Name Resolution—routines to translate UID's to and from LAU names.
- LAU Manipulation—routines to create, delete, register and deregister LAU's.
- Object Management—routines to add and remove function code support.

The system interface level routines described here presume that all input has been validated.

6.5.1 Goals

The Name Service's goal is to provide a fast, redundant distributed database of Logical Allocation Unit entries. In particular the service must provide very fast support for deflection calls.

The Name Service will be designed with an interface that will allow the internal implementation to change, allowing it to reflect usage patterns and new algorithms found once OS 501 is in the field. Also, the interface will be general enough so that extensions to the global naming scheme will not affect the calling conventions for the Name Service.

6.5.2 Name Service Database

The Name Service manages a network wide global database of entries describing Logical Allocation Units. This database is conceptually two pieces consisting of a collection of local LAU's for each system and a database of global LAU's visible to the network.

The local database contains entries for all LAU's on a system of the network. A LAU is invisible to the system until it is entered into the Name Service's local database. The system will have entered the file system root and initial process tree as LAU's in the Name Service at boot time.

LAU's are supported by object managers which may be either system services or user processes. These object managers operate on LAU's which they support in response to specific function requests from either local or remote service requestors. Remote requests are issued by means of the Distribution Service's deflection call (DCALL), which routes requests to the proper object manager, and permits both the requestor and the service provider to treat both local and remote requests alike. The type of objects contained in a LAU will determine the actual action taken in response to certain function codes.

The Name Service's local database consists of an entry for each LAU on the system. Each entry has three primary pieces of information:

Local Name

The local LAU name is a 1 to 31 character name of the same form as a file name. This is a user visible handle for the LAU, and is visible from the time the LAU is created until it is deleted. This name must be unique on the system, and cannot conflict with any globally registered name (see 'Registered Name' below). Multiple systems in a single community may within the community use the same local LAU name in strictly local usage.

Unique Identifier (UID)

The UID is the unique identifier of the LAU. This is a normal UID with a special value for the Object Serial Number (OSN) to indicate it is the LAU id. This identifier is network-unique. The allocation of LAUID's is one of the Name Service's responsiblities.

Function Codes

The LAU has associated with it a list of function codes the object manager for the LAU supports and the addresses of the routines to support these functions.

The global database contains entries for all LAU's visible to the network. A LAU is invisible to other than the local system until it is entered into the Name Service's global database. This Name Service database represents a community in the context of global naming.

The Name Service's global database consists of an entry for each LAU in the community. Each entry has four primary pieces of information:

Registered Name

The Registered Name has the same format as the local name described above. This is the network wide user visible handle for the LAU entered into the Name Service when the LAU is registered.

Unique Identifier (UID)

The UID is the unique identifier of the LAU as described for the local database. This is the identifier that the deflection call service routes its requests on.

Transport Address

The transport address is the address used by the network transport service to route messages to the system where the LAU resides.

Subsystem Data Area (SDA)

The SDA is a subsystem specific value retained by the Name Service on behalf of the subsystem. This is information used by the subsystem that would be available in context for strictly local resources, but may not readily be accessible on the system originating the call in OS 501.

6.5.3 Deflection Service Support Routines

The Name Service is primarily a database server for the deflection call service. The following calls reflect the requirements of the DCS as presently defined.

6.5.3.1 Return Transport Address

When handling a DCALL the deflection call service, uses a UID to deflect to the proper node in the network. To locate the target node of the call, the DCS will call the Name Service with XADDR to get the transport address to deflect to. This call will be tuned to provide the fastest possible response for the deflection service. The syntax of the call is:

XADDR (UID, Transport_Address)

Where
   UID is a pointer to the UID whose address on the network is desired.
   Transport_Address is the transport address of the resource returned by the Name Service

6.5.3.2 Return Function Address

Once a DCALL request has been routed to the node containing the LAU, the DCS must be able to dispatch to a service routine for the specified function in the object manager for that LAU. This information is stored in the Name Service of the node containing the LAU. The deflection call service will call FADDR for the address to dispatch to. The syntax of the call is:

FADDR (UID, Function, Paddr)

where
   UID is the UID whose object manager function is desired
   Function is the function code to be executed by the object manager for the LAU
   Paddr is a pointer to a two entry block whose entries will be returned by the Name Service. The first entry is the address of the process table of the process the service routine for the function resides in. The second entry is the logical address in the process of the function service routine.

6.5.4 Name Translation Routines

The most common interaction of the Name Service and the OS 501 system not involved with deflection will be in the resolution of global names to and from a UID. The following calls were designed for ease of writing generalized name resolution routines.

6.5.4.1 Lookup by Name

This is the primary translation service of the NS. For system calls involving resolution of pathnames or process names, this call returns the UID of the global portion of the name. The actual syntax of the call is:

GET_UID (Name, UID, SDA)

where
   Name is a bytepointer to a pathname or process name of the resource to be resolved. (Note: this is a pointer to the string after the leading ::, identifying the name as global. The Name Service returns with the pointer at the character after the global portion of the string
   UID is the UID of the innermost default context to resolve in, (normally COMMUNITY, when OS 501 supports more than a COMMUNITY, it may be one the higher scopes), 0 if no default. The Name Service returns the UID of the LAU or ::PER entry
   SDA is the subsystem specific data area for this LAU returned by the Name Service

6.5.4.2 Lookup by UID

This is the inverse of the GET_UID operation. This call provides the full global portion of the name of a resource, given its UID. GET_NAME will be used by the system to provide the global portion of a name for calls such as ?GNAME. The call will always return the the registered name of the LAU if possible, otherwise it will return the local LAU name. The leading double :: is not returned by GET_UID for the convenience of process management which will not return a :: in its process name to the user. The syntax of the call is:

GET_NAME (UID, Name, Name_length)

Where
   UID is a pointer to the UID whose name is desired to be returned
   Name is a byte pointer to a buffer to receive the fully qualified LAU name, i.e. community::lau. Note no leading colon is returned, and the byte pointer will point to the character after the returned global name string.
   Name_length is input with the length of the buffer to receive the name of the LAU, and returns the length of the name

6.5.4.3 Get a list of global names for a community

This call is the working portion of the ?GNGN call. The call returns a fixed block of names for each time entered. No template matching is performed at this level. The syntax of the call is:

LIST_LAU (Start, Community, Buffer)

Where
   Start is a value returned by the previous LIST_LAU call. Initially LIST_LAU is called with 0. The returned value should be used for next invocation of the routine
   Community is a byte pointer to the community name to scan, a value of zero means scan the locally entered LAU's
   Buffer is a bytepointer to a 1024 byte long buffer to receive 32 LAU names. A null LAU name indicates the end of the list, if the routine returns an EOF error.

6.5.5 LAU Manipulation Routines

The following routines are the Name Service portion of the user visible system calls to manipulate LAU's. These calls directly support the LAU creation and deletion functions of ?CLAU and ?DLAU. The registration routine will be used by the ?REGISTER and ?CLAU calls, with the deregister routine provide the inverse for ?DEREGISTER and ?DLAU.

6.5.5.1 Enter a LAU into the Name Service

This operation makes a LAU known to the Name Service of the node the LAU resides on. For many LAU's this can be thought of as a create operation. The operation associates a LAU name with a UID and a SDA. The operation will generate the UID if required. This call must be performed before any other operation is valid on the LAU. The format of the call is:

LAU_ENTER (Name. UID, SDA)

where
- Name is a bytepointer to the LAU name of the resource
- UID is a pointer to the UID of the LAU, if the field contains −1 the UID is to be returned by the Name Service
- SDA is the subsystem specific data area to be associated with the LAU 6.5.5.2 Register a LAU or ::PER entry This routine makes a LAU globally visible in the current community of the process invoking the call. The LAU must be known to the Name Service of the node it resides on, by a previous call to LAU_ENTER. This interface is analogous to creating a link to the LAU in the community. Note the interface handles the special case of the ::PER LAU. The interface is assumed to be invoked on the system with the resource being registered, i.e. the register system call must deflect on the UID of the resource being registered using a DCALL. The syntax of the call is:

REGISTER (Name, UID)

where
- Name is the name to register the LAU as in the community, or a name of the form ::PER:device_name to register a peripheral entry
- UID is the UID of the resource to be registered 6.5.5.3 Deregister a LAU or ::PER entry This operation removes a LAU's global visibility. The operation deletes the UID to Name association from the global Name Service, leaving the LAU only visible on its local node. The interface, unlike REGISTER, is may be invoked on any node, since the node where the LAU resides may have failed, causing a user to issue the DEREGISTER to remove the LAU entry. The interface of the call is:

DEREGISTER (UID)

where
- UID is the UID of the resource to be deregistered from the Name Service 6.5.5.4 Remove a LAU from the Name Service This operation completely removes a LAU from the Name Service. The operation deletes the function table for the LAU, and will deregister the LAU if it is currently registered. This call is analogous to the deletion of a LAU. The interface to the call is:

LAU_REMOVE (UID)

where
- UID is the UID of the LAU to be removed from the Name Service 6.5.6 Object Manager Support Routines The following object manager support routines provide the deflection call service on the machine the LAU resides on with a database of function support routine address to be used by FADDR. Initially, this functionality will be only available to the system, but eventually system calls corresponding to the following routines will be supported.

6.5.6.1 Enter support for one or more function codes

A LAU is serviced by an object manager to support the appropriate functions. The object manager must identify to the Name Service of the node where it and the LAU resides, which functions are supported and what address should be dispatched to for each function. This routine may be called multiple times for a given LAU until all services are identified. The syntax of the call is:

FUNC_ENTER (UID, Func_List)

where
- UID is the UID of the LAU whose object manager is being defined
- Func_List is a pointer to a list of function code, support routine address pairs that are terminated with a pair of −1 for function code, and address 6.5.6.2 Duplicate a LAU's function list This call allows a service to specify that the function code for two LAU's should be tied (for example the file system would only have to issue FUNC_ENTER for the first file system LAU the could use this call to specify all other support). Issuing this call means that any FUNC_ENTER or FUNC_REMOVE operation performed on any LAU connected by a FUNC_DUPLICATE affects all LAU's so connected. The syntax of the call is:

FUNC_DUPLICATE (UID, SUPPORTED_UID)

where
- UID is a pointer to the UID of the LAU to define an object manager for
- SUPPORTED_UID is a pointer to the UID of the LAU whose function table is to be associated with the LAU specified by the UID.

6.5.6.3 Remove support for one or more function codes

An object manager may remove support for one or more functions. This may be all functions served by this object manager such as when the process is terming, or it may be a selective removal of a group functions. The syntax of the call is:

FUNC_REMOVE (UID, Func_List)

where
- UID is a pointer to the UID of the LAU whose object manager is removing the support for the given functions
- Func_List is a pointer to a list of functions no longer to be supported for this LAU or −1 for all functions supported by the caller 6.6 Deflection Call Service Details The Deflection Call Service consists of two components, one that performs the initial processing and invokes the requested function either locally or remotely, and one that processes a request from a remote DCS, causing the requested function to be performed as though initiated by a process running locally to the serving system. The first component is said to be the INVOKING side, and the second is the SERVING side.

In keeping with the system design philosophy of OS 501, the INVOKING functions will be executed in the system by the running user task. This will, in turn, help minimize the overhead associated with DCALLs that resolve to strictly local processing.

The operations of the SERVING side are not, however, associated with a currently running user process on the system providing service. A pool of system tasks must be made available to perform these functions.

These tasks will be provided by a second system process that will perform all of the Distribution Service Subsystem's functions that cannot be executed by a running user task.

All of the descriptions that follow assume that the interface to the transport service will be that specified by Lyman Chapin of the ACS group. The actual protocol and communications management will be performed by transport functions that will be included in the Distribution Service process, but will be provided (and maintained) by the ACS group.

6.6.1 Invoking Side Operation

The executing task enters the DCS by calling the DCALL routine with ACO containing the function to be invoked by the DCS and AC1 containing a pointer to the UID of the target object. Since AC2 does not contain an argument specific to the operation of DCALL itself, it can contain data to be used by the routine that will perform the indicated function. Any remaining arguments to the specified function will be pushed on the stack.

"Packaging" of the function's arguments into messages will be performed by a routine that will be able to determine the exact format of the arguments involved. Since the packaging involves the resolution of addresses into pointers to portions of the message to be sent, it need only occur when the DCS determines that the function must be performed on a remote system. Deferring the building of the message until that point will make handling strictly local processing more efficient, and will not have an adverse effect on remote processing. The actual mechanism for determining how packaging occurs will be determined following further study of the different message/argument formats that will be necessary.

The processing flow, beginning with the call to the DCS will be as shown in FIG. 605

6.6.2 Serving Side Operation

The system receiving the request from an Invoking DCS will have a pool of (1 or more) tasks to function on behalf of remote users. Any tasks not currently processing a remote request will be pended; one of these waiting tasks will handle the next incoming message. Flow control can be affected by altering the priority of the Distribution Service process, or by limiting the number of resources, either tasks or buffers, available to the DCS function. Until the task limit (if any) is reached, the receipt of a message by the last waiting task will cause it to create another task to wait for the next message.

The flow is as shown in FIG. 606.

6.6.3 General Comments

The database referred to in the preceding sections is intended to serve two purposes. The first is to provide the invoking side DCS with a cache of currently used LAUID-host address pairs, to accellerate the determination of an object's location. The second, and more significant purpose, is to permit the DCS on both the invoking and serving sides to be able to track remote resource users in the event of node or process failures. The exact content and format of these database entries will be determined in part by the final design of the other subsystems' data structures and error handling requirements.

6.7 TRANSPORT SERVICE MANAGER INTERFACE (TSMI)

TSMI 504, it will be recalled from the discussion above and from FIG. 602C, is the Transport Service Manager Interface.

The Transport Service Message Interface (TSMI) gives OS 501 Distribution Services transaction-oriented access to the Transport Service. The TSMI uses a simple protocol to manage Transport connections and transactions (request-response message pairs). The TSMI operates as an "entity" in an "entity environment" and provides system-independent support for event-driven entity scheduling and efficient inter-entity parameter passing.

The basic relationships between the TSMI, the DTSI, and the Transport Service are shown in FIG. 607. From the architectural standpoint of Open Systems Interconnection (OSI) (well known to those in the art), the TSMI provides a rudimentary Session Layer service.

GROUND RULES

1. Most of the communication that will take place to support OS 501 distribution will be transaction-oriented; that is, it will consist of independent request/response pairs (analogous to the familiar system-call/system-call return).

However, some functions, such as distributed system management, the global name service, and the global user profile service may require an asynchronous (unpended) send/receive capability as well.

2. The Transport Service is not responsible for user-level authentication or access control. Transport Service users (such as OS 501) must implement an appropriate remote resource access control policy. Authentication could be provided as a TSMI service, but would require the definition and implementation of a third-party authentication server.

3. The TSMI does not support atomic transactions. If no response to a transaction request is received (perhaps because the remote system crashed and never sent a response, or because the response message was irretrievably lost in transit), the TSMI will inform the originator of the transaction; but it is up to the originator to determine (if it must know) whether or not the requested operation was in fact performed by the remote server, and to implement (if necessary) a commitment strategy that allows failed transactions to be "backed out" without side effects. Similarly, if the originator of a transaction aborts the transaction or the originator terminates before the transaction is completed, TSMI will clean up locally, but it will not take any user-level error recovery action and will not inform the remote user.

4. When one host in a distributed system crashes (or suffers a non-transient separation from the rest of the distributed system, which amounts to the same thing), each host that was acting as a customer of or server to the failed host must be informed of the crash, so that cleanup routines can be run to ensure that resources held by the failed host are deallocated. This is analogous to what happens in an AOS/VS system when a process terminates: the operating system runs a termination demon to close open files, delete IPC-type files, notify processes ?connected to the dead process, etc. If the TSMI has a Transport connection to a host at the time that host crashes, it will inform the local management entity of the identity of the host that crashed; however, from the standpoint of the Transport Service, there is no way to distinguish between a host that has crashed and one that has become "unreachable". The TSMI can therefore only report that a remote host can no longer be reached via Transport; whether that host has in fact "crashed" is not known. There may be situations in which a host is operating normally and is not aware that it has become unreachable from another host. There may also be situations in which the TSMI does not have a Transport connection to a remote host at the time that host dies, and therefore cannot inform the local management entity of a host crash. The management entity must provide its own mechanism for determining whether the other hosts in the local management domain are active or inactive.

In the case of OS 501 Distribution, the individual operating system termination paths are responsible for sending messages (via TSMI) to remote hosts to explicitly close open files (and perform any other cleanup operation that might be required) when a process terminates or a LAU is deregistered.

5. Although for most purposes the distribution of OS 501 functions will be limited to hosts that are connected to a common high-speed medium (a single LAN or I-Bus), it is highly undesirable to design the Transport Service in such way that cooperating hosts must be connected to the same high-speed medium. OS 501 distribution should work consistently regardless of how the pieces of the distributed system are interconnected, although of course the design of the Transport Service will optimize the performance of OS 501 in the single-LAN case.

6.7.1 TSMI FUNCTIONAL DESCRIPTION
6.7.1.1 Overview

The TSMI provides datagram, send, transaction, and broadcast services. These services are all "connectionless", in that they do not maintain state information across service-invocation boundaries. No explicit connection service is provided by the TSMI.

Most of the functions that are needed to provide these TSMI services are actually performed by the underlying Transport Service. The TSMI itself performs two basic functions: it provides a pended Transaction service, which associates transaction request messages with the corresponding transaction replies; and it manages Transport connections, maintaining a single Transport connection between each pair of hosts and multiplexing all transactions (and other TSMI traffic) over that connection. It also defines a standard "message" as the unit of information exchange between cooperating TSMI users; the concept of a "port" as the source and destination of messages; and a port identification scheme based on standard Transport Addresses. Messages, ports, port identifiers, and the TSMI services are all described in the following sections.

6.7.1.2 Messages

A message is an ordered, unstructured, unbounded block of bytes. A message may be of any length that is an integral number of bytes. The TSMI transmits messages without regard to their content. Messages may be fragmented and reassembled during transmission, but are always presented intact at the destination. The Transport Service guarantees the integrity of messages, so that the message received at the destination contains the same bytes in the same order as the message sent from the source.

A number of design-level buffer management optimizations will be necessary to ensure that the TSMI, and the Transport service underneath it, can operate efficiently. These are discussed in section 6.7.2.2

6.7.1.3 Ports

The TSMI transmits messages between ports. Ports represent queues defined within the TSMI, and must be explicityly created. When a port is created, the TSMI associates the port with a semaphore declared by the creator, which is then signalled whenever a message arrives on that port's queue. A port may be created with attributes that explicitly limit the number and source of messages that may appear on its queue. As of the first revision of TSMI, no port attributes are supported. There is no intrinsic limit to the number of ports that may be created, although in any implementation there will be a practical upper bound. In the first release of TSMI, an upper bound of 256 ports has been implemented.

A port must be created before any messages can be received through TSMI. At least one port should be created by a TSMI user to receive unsolicited messages from remote peers (that is, messages that arrive spontaneously as a result of remote events rather than in response to messages previously sent from the local host), if these are expected (the obvious example is the serving side of OS 501 Distribution, which waits for requests deflected from remote customers). Since each of the message-sending primitives (Transaction, Send, etc.) includes as a parameter the source port address, a TSMI user must also create an appropriate source port before sending a message; in the normal course of events, if a reply to the message is expected from the remote peer, it will come in on that port. It is not necessary to create a new port for each new message.

6.7.1.3.1 Port Identifiers

A TSMI port is identified by a port identifier (port ID), which consists of a standard Transport Address followed by a port selector suffix. The relationship between a OS 501 user-visible name and the port identifier of a TSMI port belonging to a server giving access to the named object is maintained outside the Transport Service and TSMI by the OS 501 Global Name Server; the TSMI identifies ports by port identifier only. As an internal matter, of course, OS 501 distribution may choose to give its callers a short handle to use for repetitive operations like reading from or writing to an open file (e.g., a local channel number), and maintain a table associating the short handles with full port IDs.

The standard Transport Address consists of a Network Address followed by a Transport Service Access Point Identifier (TSAP-ID). The Network Address part of the Transport Address identifies a particular host system; the TSAP-ID serves to subaddress different users of the transport service within a single host. The Network Address component is assigned according to the international standard ISO 8348/DAD2, and consists of a string of up to 20 octets (bytes). The TSAP-ID component is identified in the international standard ISO 8073 (the Transport Protocol Specification) as part of the standard Transport Address, but its length and permissible values are not defined. The TSAP-ID component of the Transport Address of the TSMI on each host host system will be the same; the precise value will be chosen during the design of the TSMI.

The Transport Address may be formally defined as:

```
TYPE byte.type = [1 ... 256];
TYPE transport.address.type =
RECORD
        network.address: ARRAY [1 ... 20] OF byte.type;
        tsap.id: ARRAY [1 ... 4] OF byte.type
```

-continued

```
END;
```

The TSMI port identifier may be formally defined as:

```
TYPE port_identifier.type =
RECORD
        transport_address: transport_address.type;
        port_selector_suffix: ARRAY [1 . . . 4] OF byte_type
END;
```

The TSMI port selector suffix values are chosen by the users of TSMI when TSMI ports are created. It is assumed that the OS 501 developers will pick a suffix value for the DCALL TSMI port (and possibly for other ports), and will use that value for all DCALL-based distribution; this suffix therefore does not need to be stored in the OS 501 directory. Similarly, since TSMI will always use the same TSAP_ID value in its interactions with the Transport Service, it does not need to get this from OS 501. At the interface to TSMI, therefore, what TSMI needs from OS 501 is the Network address of the target host, and the user's port selector suffix.

At least initially, for the purposes of OS 501 distribution we will use only the "Local" format of the standard Network address (identified by the value "49" encoded as "0100 1001" in the first byte of the address; refer to ISO 8348/DAD2). The actual LAN station address (MAC address and LLC LSAP selector) of the target system will be directly encoded in the remainder of the Network address field as a sequence of binary-valued bytes following the initial ("49") byte. Since the LAN station address consists of at most 7 bytes, the total maximum length of this "Local" Network address format is 8 bytes.

It should be emphasized that using this "Local" format restricts OS 501 distribution, at least initially, to a DG-only, single-LAN (or multiple real LAN, single logical LAN) environment. To support general Transport level access to other systems (whether through DCALL or via a direct interface to the Transport service), the directory service designed for OS 501 should be capable of handling full Network addresses, which may be as long as 20 bytes. The global management server should also be designed in such a way that it can tell a newly-initialized host what its Network address is, if its Network address is something other than "49" followed by its local LAN station address. Depending on how we decide to handle access to the DG and non-DG "outside world", individual stations on the LAN either will or will not ever have to know what their "real" (externally visible) Network addresses are.

It is assumed that some mechanism exists for both the TSMI and its users to find out what the local Network address is. This implies that there is some "automatic" means whereby the local LAN station address can be obtained, either directly from the LAN controller, or indirectly during system initialization.

6.7.1.3.2 Well-Known Ports

All ports defined on the same host system have the same port identifier up to the port selector suffix; that is, only the port selector suffix is different for ports on the same host. Ports on different hosts must have different port IDs up to the port selector suffix, but may have the same suffix. This provides a convenient mechanism for associating ports on different hosts that belong to a single type of distributed service, by defining a convention that reserves specific values of the port selector suffix for use by specific servers on each host. Such a port is "well-known", in that the nature of the service available at the port, regardless of the host it happens to be on, can be determined from the port selector suffix and knowledge of the convention for assigning suffixes to distributed service types.

For the purposes of OS 501 distribution, a "well-known" port (OS 501_PORT) is defined within the TSMI to be the receive port for OS 501 Distribution Services. The port selector suffix of the OS 501_PORT port ID is the same for all instances of the OS 501 operating system. Other operating systems using the TSMI may create a OS 501_PORT and define a OS 501-to-Other translation mechanism to interpret messages coming in on that port. Other well-known ports may be defined; for example, it may be useful to have a separate well-known port for the OS 501 Name Server.

6.7.1.4 TSMI Services

A user of the TSMI Transaction service will always be informed if the remote host that contains the target of the Transaction request fails (becomes unreachable) before the Transaction is completed. However, there may be circumstances in which the completion of a Transaction does not end the user's need to be informed about the failure of the target host. It is the responsibility of the management component of the distributed system to keep track of the active/inactive status of other hosts within the local management domain, and to signal host crashes to those TSMI users who have declared a need to know about them.

6.7.1.4.1 TSMI Datagram Service

The datagram is an unpended, unconfirmed connectionless service. The specified message is sent using the connectionless Transport Service, which makes no guarantees about the success or failure of the message to reach its destination. Errors that are detected in the local system (such as transmitter failures, invalid destination addresses, and the like) are reported (although no attempt is made to recover from them), but errors that occur after the message has left the local system (such as destination host errors) are not detected or reported.

6.7.1.4.2 TSMI Send Service

The send service is essentially an "acknowledged datagram": the TSMI sends messages over Transport connections, which ensures that the message is delivered even in the presence of soft errors (errors recoverable by retransmission and/or connection reestablishment within the Transport Service). Unless the TSMI reports a hard (unrecoverable) Transport-level error, the sender can be sure that his message reached at least the Transport Service component on the correct destination host. Send does not guarantee, however, that the message was correctly processed by the remote TSMI component; that it was RECEIVEd by the sender's peer on the remote host; or that the sender's peer correctly interpreted the message. Unrecoverable transport errors may not be identified until after a message has been sent to the transport service and the user has been released with a successful completion. This means that transport errors may be reported only the the management entity.

6.7.1.4.3 TSMI Transaction Service

The transaction service is a pended, synchronized, and reliable request/response interface. If the Transport Service is able to deliver the request message to the correct destination, the TSMI pends the caller until either the response to the caller's request message is received or a transaction-specific timer expires. In the latter case, the caller knows that his remote peer did not respond within the timeout period, but does not know whether or not his remote peer actually performed the requested operation; a transaction response that arrives after a timeout will be discarded by the TSMI without notification to the user. The timeout interval may be adjusted through OS 501 distributed systems management to accomodate variations related to the size of the local transport domain, the speed of the underlying communications network, and the speed of the host machines participating in the distributed system. Users of the transaction service may also influence the timeout interval on a pre-transaction basis, to account for variations in the expected delay attributable to the type of operation the remote server is being asked to perform.

The task that requests the transaction service remains pended until the transaction is completed (either normally or abnormally). A transaction will always be completed eventually, but at any time prior to its completion, it may be explicitly aborted by the originator. When a transaction is aborted, the pended task returns with an appropriate error indication. Abort requests for transactions are completely local requests. A transaction response that arrives after the corresponding transaction has been aborted is discarded by the TSMI (since there is no longer any pended user task waiting to receive the response). This facility enables OS 501 distribution to recover a user task pended on a transaction, if the user redirects or kills the task (?TABT), or the user's process dies.

The sequence of events at the sending and receiving host systems during a transaction is illustrated in FIG. 608.

6.7.1.4.4 TSMI Broadcast Service

Broadcast distributes a single message of no more than the maximum number of data bytes contained in a single buffer, a constant value limited by the nature of the broadcast medium, probably between 1400 and 1500 bytes, to one port on every potential receiver host without confirmation. The set of "potential receiver hosts" includes only hosts connected to the same subnetwork (e.g., to the same LAN). The TSMI does not guarantee the delivery of a broadcast message to each of these ports (the conditions are the same as for the Datagram service described above), and will report only global (rather than destination-host specific) errors to the sender.

A broadcast message is delivered to ports with the same (specified) port selector suffix (only one port on each potential receiver host, therefore, can be the destination of a broadcast message). Thus, for example, a broadcast message can be directed to a particular server on all potential-receiver hosts if each of the servers is known to be accessible via a specific ("well-known") port within its host.

6.7.1.4.5 TSMI Abort Service

An Abort request is a purely local service. A user issuing an Abort for a particular transaction id will cause the task pended on that transaction to return in error. All state information concerning that transaction will be destroyed. If a reply to that specific transaction is received after the Abort is processed, it will be discarded. When the transaction task returns, the transaction id is available for reuse.

Any "backing out" of an aborted transaction on the remote side is the responsibility of the user and must be done through another transaction. The remote side will get no indication that the transaction has been aborted. It is not necessarily true, however, that the remote side has actually received and processed the transaction since the reply will be discarded.

6.7.2 TSMI DESIGN CONSIDERATIONS

6.7.2.1 Tasking Structure and Control Flow

TSMI activities that are prompted directly by the action of a user task can run on that user's task, which enters TSMI via one of the TSMI primitives (described below) until it needs to access TSMI global resources. At this point, control must be passed to the XTS Entity Environment. Other activities, such as the processing of messages that arrive asynchronously from other host systems, unrelated to any immediate activity of local users, cannot be handled by user tasks, and must run under the XTSEE.

All of the pieces of the Transport system except for a small interface to TSMI will run as entities in the XTS entity environment. During system initialization, one task will be created to run the XTSEE scheduler; all XTSEE entities run off this task. There will be parts of TSMI that run on user tasks and parts that run on the XTSEE task coming up into TSMI with Transport messages to be processed by TSMI.

Specifically, for outgoing messages (DCALL calls into TSMI with data to be sent via TRANSACTION, SEND, DATAGRAM, or BROADCAST), the user task will do any work possible without acessing TSMI resources, and pend while the XTSEE task continues processing. XTSEE event code will unpend the user task when processing is complete and it will return to DCALL. For incoming messages, the XTSEE task processing the Transport-level event will plow into TSMI with an appropriate Transport-interface Indication (such as a T_CONNECT Indication, T_DATA Indication, etc.), and will run whatever TSMI code is called for by the particular Indication. This will result either in signalling a DCALL task waiting on a semaphore declared at the time the target TSMI port was created (if this is a message destined for such a port), and handing the message off to that task when it does a TSMI_RECEIVE, or completing a transaction by handing off to a user task that is pended in TSMI waiting for just such a completion (if this is a transaction-response message). In both cases, the XTSEE task then returns to the XTSEE world. FIG. 609 illustrates this task flow.

6.7.2.2 Buffer Management and Data Flow

One of the goals of OS 501 distribution is to avoid copying data from one place to another unless either (a) it is absolutely unavoidable, or (b) the side effects of the efforts to avoid copying are more destructive than the copying itself (it is usually better, for example, to accept a memory-to-memory data move if the alternative is an extra data channel transfer between the host and a communications controller). TSMI expects its users to pass it blocks of data of arbitrary length, described by a byte pointer to the start of data and a byte count of its size. The interface expects a list of descriptors, along with other request specific parameters. TSMI must concatenate these blocks of data for the Transport system to transmit. By allowing multiple blocks of data input with arbitrary lengths, it should not be necessary for DCALL to move its user data before passing it to TSMI. TSMI will move the data from the users context when it knows it can get the resources to send the data.

It is assumed that the TSMI and its users (initially, the OS 501 Distribution Services) have access to a common memory pool, such that a buffer allocated by a TSMI user can be released by TSMI. When passing buffers to TSMI, DCALL must indicate in the buffer descriptor whether the ownership of the page or pages that the data block touches will be passed along with the data. If TSMI is given ownership, it can optimize its data movement if the format of the passed block matches the format needed by the transport system. If ownership is not passed, TSMI must copy the data and the user is responsible for freeing the page. When TSMI passes data up to users like DCALL, ownership of the pages will NEVER be passed and therefore, users are required to return all buffers to TSMI via TSMI_FREE.

FIGS. 610 and 611 illustrate the data flow between users, OS 501, and the TSMI. In FIG. 610 user data, in the form of an argument block containing data descriptors to buffers, is passed to DCALL. DCALL builds blocks of data (the first is its own header with the argument block (a)) and references each block of data with an entry in the buffer block. TSMI receives the request and begins to format transport page buffers. It first inserts its header, and then, one by one, moves user data into the page buffers. If the data does not all fit, TSMI will allocate another page buffer and continue filling it until all the buffer descriptors in the buffer block are exhausted. There is no fixed limit to the size of a TSMI message, and therefore no fixed maximum number of buffers that can be chained together for a single TSMI request. If the user instructs, the Transport service will release the buffer pages to the free memory pool after the Transport operation is complete, otherwise, the user will get them back.

FIG. 611 ("Incoming") is similar to FIG. 610 with the direction of data flow reversed. This example covers only the case of an arriving TSMI_TRANSACTION response; incoming data may also contain OS 501 Distribution-specific control messages, new Transaction requests from remote hosts, and other messages that do not go to a local User; the data flow for these will be slightly different, in that OS 501 will process the data in the page buffers (rather than moving them into user buffers) before returning them to TSMI.

Multiple buffers can be passed to TSMI on TSMI_TRANSACTION, TSMI_SEND, and TSMI_REPLY requests and returned on TSMI_RECEIVE requests by listing those buffers in a Buffer Block attached to the request packet. The Buffer Block will contain a list of buffer descriptors (byte pointer and byte length pair). The request packet will contain the number of buffer descriptor entries in the buffer block in the buffer block size field. If only one buffer needs to be associated with a request, the user may set the Buffer Block size to 0 and place the buffer pointer and length directly in the request packet. If a buffer block is used, each entry in the block will indicate the length of the block it references. Refer to FIG. 612 on buffer layouts for clarification.

On TSMI_RECEIVEs and TSMI_TRANSACTION replies, TSMI will allocate and pass a buffer block in much the same way. The incoming buffer block size field will contain the number of buffer descriptors in the block and the incoming buffer block pointer field will contain a pointer to the buffer block. If the buffer block size field is zero, the buffer block pointer field becomes a buffer pointer and points to the one buffer that was received, and the data length field will hold the byte count of the data received. The data length field is only valid if no buffer block is returned. The incoming data fields are only valid if the request completes successfully.

6.7.3 TSMI SERVICE PRIMITIVE SPECIFICATION

The individual TSMI primitives are defined below. All requests made to TSMI will pass a pointer to a request specific parameter packet. The following sections describe the format of these packets and other request specific information. For all primitives, the STATUS parameter either indicates the successful completion of the operation or returns an error code. Where a parameter is specified as "dest_transport_addr" or "source_transport_addr", it indicates the Transport Address part of a TSMI port identifier; where a parameter is specified as "port_number", "dest_port_number", or "source_port_number", it indicates the port selector suffix part of a TSMI port identifier.

Each function will be explained in a subsection which follows. In the offset tables, the column marked "R/W" may be translated as follows:

| | |
|---|---|
| [R] | - Field to be Read by TSMI, filled in by user. |
| [W] | - Field to be Written by TSMI, read by user. |
| [R/W] | - Field is Read by TSMI for a request or response; Written by TSMI for an indication or confirm. |
| [ ] | - Field not used to communicate between user and TSMI. |

6.7.3.1 TSMI_CREATE_PORT

A TSMI user must specify that a port be created with a particular port selector suffix; the specified value will be used as long as it is not already in use (this capability is provided to support the use of "well-known" ports). The creation of a port defines a queue structure within the TSMI, and associates a set of attributes with the queue. A created port persists until it is deleted.

The return from TSMI_CREATE_PORT conveys to the caller the full TSMI port identifier for the newly created port. The full port ID contains the Transport address as well as the TSMI port selector suffix (see section 6.7.1.3.1).

When a port is created, the creator must specify the address of an initialized semaphore to be signalled when a valid message arrives at the port (the message may then be dequeued via the RECEIVE primitive).

CREATE PORT PARAMETER PACKET:

| | | |
|---|---|---|
| [W] | status | 2 words |
| [W] | ecode | 2 words |
| [ ] | reserved | 4 words |
| [R] | port_number | 2 words |
| [R] | attributes | 4 words |
| [R] | semaphore_address | 2 words |
| [W] | transport_address | 12 words |

The port_number will be used to identify the port as long as it is not already in use.

The attributes that may be associated with a port are:
(a) receive from <same source port_id> only
(b) receive only from sources within hosts connected to the same subnetwork as this host
(c) reject messages longer than <message_length_upper_bound>
(d) restrict queue size to <maximum_number_of_messages>

The semaphore_address is the address of a semaphore to be signalled when a valid message arrives at the port. The user is responsible for initializing the semaphore.

The transport_address returned by TSMI is the nodes local transport address.

The status field will contain the result of the create port request. The possible values are:
Operation Successful
Local System Error (ENTLSE)
Local Interface Violation (ENTLIV)

The ecode field will contain a more specific error code if an error occured.
Port Already Exists (ENTPE)
Invalid Attribute (ENTINVAT)
Assorted system errors The four reserved words are for TSMI's internal use. Their values will be modified by TSMI.

6.7.3.2 TSMI_DELETE_PORT

When a port is deleted, any messages that may remain on the queue are discarded. The semaphore is signalled with a "broadcast error" signal waking all tasks waiting on that semaphore with a port deleted error. If a RECEIVE is then performed against the port, it will return with a "port does not exist" error. This ensures that the task waiting on the semaphore can be retrieved when the corresponding TSMI port is deleted.

DELETE PORT PARAMETER PACKET:

| [W] status | 2 words |
|---|---|
| [W] ecode | 2 words |
| [ ] reserved | 4 words |
| [R] port_number | 2 words |

The port_number is the same value which was used on the TSMI_CREATE_PORT.

The status field will contain the result of the transaction request. The possible values are:
Operation Successful
Local Interface Violation (ENTLIV)

The ecode field will contain a more detailed description of an error if one occurred.
Port Does Not Exist (ENTLPNE)
Assorted system errors The four reserved words are for TSMI's internal use. Their values will be modified by TSMI.

6.7.3.3 TSMI_TRANSACTION

The TRANSACTION primitive initiates a pended request-response sequence that is guaranteed to complete (either successfully or unsuccessfully) within a fixed time period. The message to be sent must be contained in page buffers as described in section 6.7.2.2.

TRANSACTION PARAMETER PACKET:

-continued

| [W] status | 2 words |
|---|---|
| [W] ecode | 2 words |
| [ ] reserved | 3 words |
| [W] buff desc id | 1 word |
| [R] origin_port_number | 2 words |
| [R] dest_port_number | 2 words |
| [R] dest_transport_addr | 12 words |
| [R] out buffer_ptr/buffer_blk_ptr | 2 words |
| [R] out data_len | 2 words |
| [R] outgoing buffer_blk_size | 1 word |
| [W] incoming buffer_blk_size | 1 word |
| [W] inc buffer_ptr/buffer_blk_ptr | 2 words |
| [W] inc data_len | 2 words |
| [R] transaction_id | 2 words |
| [R] timeout_interval | 1 word |
| [R] options | 1 word |

The transaction_id is chosen by the caller, so that the caller may ABORT the transaction (see below) if necessary. With respect to a given TSMI port, the transaction_id must be unambiguous; that is, the caller must ensure that only one transaction with a given transaction_id and source_port_number is outstanding at any one time. For the purpose of OS 501 Distribution, a simple way to choose unique transaction_ids for deflected system call transactions would be to use the concatenation of the calling user's PID and task id as the transaction_id.

The origin_port_number field contains the source_port_number. It has been given the name origin_port_number on a transaction request to avoid confusion over which port number is meant in the transaction reply.

The timeout_interval provides information about the extent to which the server's activities in performing the specific requested operation will affect the expected request-response delay. This parameter will be in seconds. A−1 indicates that this request should not be timed out.

Note: Actual timeout intervals may exceed the timeout requested, but will never be less than the requested value. Also, small timeout values (< =5 sec) are not recommended since the request may be returned with a timeout error rather than a permanent node unreachable error if the remote node is down. This is due to a race condition between the transport services connection setup and TSMI timeouts.

If the "encrypt" option is selected, the entire message will be encrypted before leaving the source (sending) host, and decrypted after entering the destination (receiving) host prior to delivery at the destination port (see section 6.7.1.4).

Separate buffer blocks must be used for the outgoing transaction data and the incoming transaction reply so that the user can locate his transmit buffers on the return of the transaction request. The buffer_blk_size fields indicate the number of buffer descriptors in the buffer blocks attached to the request. The buffer_blk_ptr fields point to these blocks. The user will set all these parameters for the outgoing buffers, and TSMI will set them for incoming buffers. If only a single buffer is being transmitted, the outgoing buffer_block_size should be zero and the request block will contain the buffer pointer and data length. The same is true on incoming data if only a single buffer is received. The incoming data length field is only valid if a single buffer is returned.

The buffer block is a block of memory that contains a fixed (buffer_blk_size) number of buffer descriptor entries. Each entry looks like:

| | buffer_byte_pointer | 2 words |
|---|---|---|
| Owner_flag | buffer_byte_length | 2 words |
| | reserved | 1 word |
| | buff desc id | 1 word | where
buffer_byte pointer is a byte pointer to the start of the buffer,
buffer_byte_length is the length in bytes of the data in the buffer,
and owner_flag is the ownership bit. It is the high order bit of this doubleword. It is set by the user if ownership of the page or pages touched by the buffer pointed to by this buffer descriptor is being passed along with this buffer. This field is valid only on requests to TSMI and has no significance when set in a buffer block returned to a user. If set, TSMI will be responsible for freeing the pages that the buffer touches. If not set, the caller will still own the pages when the request returns.

If the ownership bit is set, TSMI will not just free the buffer, it will free all pages that the buffer touches. It is required that any pages that a user wishes to have TSMI free be allocated through the standard system memory allocation primitive, be allocated as single pages (page aligned 1024 word blocks) and be addressed by ring 0 pointers.

Users should not pass ownership of buffers to TSMI unless owning that buffer will allow TSMI to not have to copy it. In a LAN-based XTSEE environment, where transport buffers have a strict formats, unless the format is matched exactly, TSMI will still have to copy the buffer. It is recommended that buffer ownership not be passed unless the formats will match, since it forces the user to allocate his buffer space in page blocks and forces TSMI to incur overhead calculating where these pages begin to free them. This feature is intended to optimize page passing for some other transport mechanism other than LANs, like the I-bus. This feature may not be available in early (rev. 1 release) LAN-only versions of TSMI.

The buffer descriptor id field contains TSMI specific information about the associated buffer, so that TSMI can free it correctly. This field is relevant only on buffers passed to the user from TSMI and must be passed back to TSMI (via TSMI_FREE) in tact.

The status field will contain the result of the transaction request. The possible values are:

Operation Successful
Local Interface Violation (ENTLIV)
Tsmi Error (ENTERR)
Local System Error (ENTLSE)
Node Unreachable-Permenant (ENTNUP)
Node Unreachable-Temporary (ENTNT)
Severe Local Transport Error (ENTNSEV)

The ecode field will contain a more detailed description of an error, if one occurred.
Unrecognized Option (ENTUNOP)
Destination Port Does Not Exist (ENTDPNE)
Request Timeout (ENTTO)
Transaction Aborted (ENTABORT)
Assorted transport, link and system errors.

The reserved words are for internal TSMI use. Their contents will be modified by TSMI.

The events that take place on the sending host when the TRANSACTION service is invoked are illustrated in FIG. 613.

6.7.3.4 TSMI_RECEIVE

After the semaphore identified in CREATE_PORT has been signalled, a RECEIVE on the corresponding port will retrieve a message enqueued to the port. Only complete messages may be dequeued.

RECEIVE PARAMETER PACKET:

| [W] | status | 2 words |
|---|---|---|
| [W] | ecode | 2 words |
| [ ] | reserved | 3 words |
| [W] | buff desc id | 1 word |
| [R] | port_number | 2 words |
| [W] | source_port_number | 2 words |
| [W] | transaction_id | 2 words |
| [W] | unique_id | 2 words |
| [W] | remote_transport_addr | 12 words |
| [W] | buffer_ptr/buffer_blk_ptr | 2 words |
| [W] | data_len | 2 words |
| [W] | buffer_blk_size | 1 word |

The port_number is used to identify the user's port.

The RECEIVE is the result of incoming data (SEND, DATAGRAM, BROADCAST, or incoming TRANSACTION), and was initiated by TSMI signalling the user's semaphore address.

If a transaction_id is returned to the user on the RECEIVE completion, a REPLY is expected to complete a transaction at the sending port (see FIG. 608).

An incoming transaction_id, source_port_number, and unique_id form a unique message id for a transaction. These fields must be echoed to TSMI on the corresponding REPLY, if a REPLY is required.

The buffer_blk_size, buffer_ptr/buffer_blk_ptr, and data_length fields are explained fully in the TSMI_TRANSACTION portion of this section, as well as in the Buffer Management portion in section 6.7.2.

The transport address of the remote node will be returned in the remote_transport_address field.

The status field will contain the result of the receive request. The possible values are:

Operation Successful
Local System Error (ENTLSE)
Local Interface Violation (ENTLIV)
The ecode field will contain a more detailed error code if an error occurred.
   No Data Available (ENTNDA)
   Local Port Does Not Exist (ENTLPNE)
   Assorted System Errors
The reserved words are for TSMI's internal use. Their values will be modified by TSMI.

The events that take place on the receiving host when the TRANSACTION service is invoked by the sender and a RECEIVE is issued by a signalled receiver are illustrated in FIG. 614.

6.7.3.5 TSMI_ABORT

The ABORT primitive can be used only to abort a transaction, since the transaction service is the only one that pends the calling task on a remote action. ABORTs are only locally significant.

ABORT PARAMETER PACKET:

| [W] | status | 2 words |
| --- | --- | --- |
| [W] | ecode | 2 words |
| [ ] | reserved | 4 words |
| [R] | source_port_number | 2 words |
| [R] | transaction_id | 2 words |

The transaction_id is the identifier supplied in the TSMI_TRANSACTION request that is to be aborted. If no transaction_id is specified (e.g., = −1), all outstanding transactions associated with the specified source port number are aborted. The pended task(s), when scheduled, will return from the aborted transaction(s) with an appropriate error in the STATUS parameter of the TRANSACTION primitive.

The source_port_number is the local port identifier.

The status field will contain the result of the transaction request. The possible values are:
   Operation Successful
   Local Interface Violation (ENTLIV)
   Local System Error (ENTLSE)
The ecode field will contain a more detailed error code if an error occurred.
   Transaction Not Found (ENTTNF)
   Assorted System Errors
The reserved words are for TSMI's internal use. Their values will be modified by TSMI.
Note that the TSMI does not authenticate ABORTers; it allows any task to ABORT a transaction.

6.7.3.6 TSMI_BROADCAST

Broadcast messages are limited to a fixed maximum length, since the TSMI and the Transport Service can support a broadcast service only by mapping it onto the native broadcast facilities of an underlying subnetwork. This length is the same as the maximum number of bytes that can be conveyed from a user to TSMI in a single page buffer (see section 6.7.2.2), and is expected to be in the range of 1400–1500 bytes.

TSMI_BROADCAST will return an error to the caller if the source host is not connected to a subnetwork that provides a native link-level broadcast.

BROADCAST PARAMETER PACKET:

| [W] | status | 2 words |
| --- | --- | --- |
| [W] | ecode | 2 words |
| [ ] | reserved | 4 words |
| [R] | source_port_number | 2 words |
| [R] | dest_port_number | 2 words |
| [R] | buffer_ptr | 2 words |
| [R] | data_length | 2 words |
| [R] | options | 1 word |

The reserved words are for TSMI's internal use. Their values will be modified by TSMI.

The "dest_port_number" must be specified; BROADCAST attempts to deliver the message only to ports with that port selector suffix on every potential receiving host (see section 6.7.1.4.4). The value of "data_length" is the number of bytes in the TSMI user's message.

If the "encrypt" option is selected, the entire message will be encrypted before leaving the source (sending) host, and decrypted after entering the destination (receiving) host(s) prior to delivery at the destination port(s) (see section 6.7.1.4).

The status field will contain the result of the broadcast request. The possible values are:
   Operation Successful
   Local System Error (ENTLSE)
   Local Interface Violation (ENTLIV)
The ecode field will contain a more detailed error code if an error occurred.
   Unrecognized Option (ENTUNOP)
   Buffer Too Large (ENTBFOV)
   Assorted System Errors

6.7.3.7 TSMI_DATAGRAM

The DATAGRAM primitive uses the connectionless Transport service to send a datagram to the destination port. The message to be sent is limited to a fixed maximum length. This length is the same as the maximum number of bytes that can be conveyed from a user to TSMI in a single page buffer (see section 6.7.2.2), and is expected to be in the range of 1400–1500 bytes.

DATAGRAM PARAMETER PACKET:

| [W] | status | 2 words |
| --- | --- | --- |
| [W] | ecode | 2 words |
| [ ] | reserved | 4 words |
| [R] | source_port_number | 2 words |
| [R] | dest_port_number | 2 words |
| [R] | dest_transport_addr | 12 words |
| [R] | buffer_ptr | 2 words |
| [R] | data_length | 2 words |
| [R] | options | 1 word |

The four reserved words are for TSMI's internal use. Their values will be modified by TSMI.

The status field will contain the result of the datagram request. The possible values are:
   Operation Successful
   Local System Error (ENTLSE)
   Local Interface Error (ENTLIV)
The ecode field will contain a more detailed error code if an error occurred.
   Unrecognized Option (ENTUNOP)
   Buffer Too Large (ENTBFOV)
   Assorted System Errors
The value of "data_length" is the number of bytes in the TSMI user's message.

If the "encrypt" option is selected, the entire message will be encrypted before leaving the source (sending) host, and decrypted after entering the destination (receiving) host prior to delivery at the destination port (see section 6.7.1.4).

6.7.3.8 TSMI_SEND

The SEND primitive uses a Transport connection (shared with all other traffic between the same two hosts) to send a message to the destination port. The message to be sent must be contained in page buffers as described in section 6.7.2.2.

SEND PARAMETER PACKET:

| [W] | status | 2 words |
|---|---|---|
| [W] | ecode | 2 words |
| [ ] | reserved | 4 words |
| [R] | source_port_number | 2 words |
| [R] | dest_port_number | 2 words |
| [R] | dest_transport_addr | 12 words |
| [R] | buffer_ptr/buffer_blk_ptr | 2 words |
| [R] | data_length | 2 words |
| [R] | buffer_blk_size | 1 word |
| [R] | options | 1 word |

If the "encrypt" option is selected, the entire message will be encrypted before leaving the source (sending) host, and decrypted after entering the destination (receiving) host prior to delivery at the destination port (see section 6.7.1.4).

Use of the buffer_blk_size, buffer_ptr/buffer_blk_ptr and data_length fields is described in the TSMI_TRANSACTION portion of this section. See section 6.7.1 on buffer management for more information.

The status field will contain the result of the send request. The possible values are:
Operation Successful
Local Interface Violation (ENTLIV)
Local System Error (ENTLSE)
Node Unreachable-Temporary (ENTNT)
Node Unreachable-Permenant (ENTNUP)
Severe Local Transport Error (ENTSEV)

The ecode field will contain a more detailed error code if an error occurred.
Unrecognized Option (ENTUNOP)
Assorted transport, link and system errors.

The four reserved words are for TSMI's internal use. Their values will be modified by TSMI.

6.7.3.9 TSMI_REPLY

REPLY is similar to SEND, except that in addition to the destination port identifier, a transaction_id is specified: REPLY completes a transaction at the receiver, and is used to return a message containing a response to a request previously RECEIVED (see FIG. 614). The message to be sent must be contained in page buffers as described in section 6.7.2.2

REPLY PARAMETER PACKET:

| [W] | status | 2 words |
|---|---|---|
| [W] | ecode | 2 words |
| [ ] | reserved | 4 words |
| [R] | local_port_number | 2 words |
| [R] | origin_port_number | 2 words |
| [R] | transaction_id | 2 words |
| [R] | unique_id | 2 words |
| [R] | dest_transport_address | 12 words |
| [R] | buffer_ptr/buffer_blk_ptr | 2 words |
| [R] | data_length | 2 words |
| [R] | buffer_blk_size | 1 word |
| [R] | options | 1 word |

The local_port_number is the port number of the user sending the TRANSACTION REPLY. Local_port_number was used to avoid confusion over the duration of the transaction.

The origin_port_number is the port number of the user that initiated the TRANSACTION. Origin_port_number was used to avoid confusion over the duration of the transaction.

The origin_port_number, transaction_id and unique_id fields must be echoed to TSMI as they appeared in the corresponding incoming TRANSACTION.

The local_port_number is the user's port number.

The destination_transport_address is the transport address of the remote host.

The reply to a transaction request is always encrypted if the request was, and is not encrypted if the request wasn't; there is no "encrypt" option on the REPLY primitive.

The buffer_blk_size, buffer_ptr/buffer_blk_ptr, and data_length fields are used to send REPLY data to the remote host. These fields are explained fully in the TSMI_TRANSACTION portion of this section, and the Buffer Management portion in section 6.7.2.

The status field will contain the result of the reply request. The possible values are:
Operation Successful
Local Interface Violation (ENTLIV)
Local System Error (ENTLSE)

The ecode field will contain a more detailed error code if an error occurred.
Assorted Transport, link and system errors.

The four reserved words are for TSMI's internal use. Their values will be modified by TSMI.

The SEND and REPLY primitives are illustrated in FIG. 615.

6.7.3.10 TSMI_FREE

TSMI_FREE is a TSMI module which must be used by TSMI users to free buffers passed back to them by TSMI. TSMI_FREE takes buffer information exactly as it is returned to users from the other TSMI entry points.

CALLING SEQUENCE: TSMI_FREE(bb_size,bblk,bdes)

The bb_size parameter is the size of the buffer block as returned by TSMI from any of the other TSMI entry points. If this is zero, a single buffer, and no buffer block will be freed.

The bblk parameter is a buffer block/buffer pointer union type as returned by TSMI from any of the other TSMI entry points.

The bdes parameter is the buffer descriptor id as returned by TSMI from any of the other TSMI entry points.

The buffers passed to this routine are assumed to be buffers that have been passed to TSMI users through TSMI_RECEIVES and TSMI_TRANSACTIONS.

6.7.3.11 ERRORS

This section explains the errors which can be returned by TSMI, and what their implications are. All TSMI request packets contain two error fields: status, ecode. The status field returns an error category which users can look at to determine the basic type of error which occurred. The ecode field returns an error code which more explicitly describes an error. This field will be useful in determining the exact problem. The ecode field will return such things as transport and link error codes which can be used to pinpoint a network problem, system error codes which can be used to identify system problems (low on memory), and specific user errors. The following is a list of the status errors returned, and the ecode errors associated with them:

OPERATION SUCCESSFUL (0)—No errors occurred.

LOCAL INTERFACE VIOLATION (ENTLIV-)—Error is viewed as a user error.

UNRECOGNIZED OPTION (ENTUNOP)—The option specified in a TSMI parameter packet is undefined.

LOCAL PORT DOES NOT EXIST (ENTLPNE)—The local port number specified in a TSMI RECEIVE request does not exist.

NO DATA AVAILABLE (ENTNDA)—There is no data awaiting the user. This error is returned on receive requests.

TRANSACTION NOT FOUND (ENTTNF)—This error is returned on an abort if the transaction being aborted could not be found. This error is not necessarily fatal since the transaction may have already completed.

PORT ALREADY EXISTS (ENTPE)—This error is returned on create port requests if the requested port already exists.

INVALID ATTRIBUTE (ENTINVAT)—An attribute requested in a create port packet is invalid.

BUFFER TOO LARGE (ENTBFOV)—This error may be returned on broadcast or datagram requests if too much data is sent to TSMI. Remember, these requests have size limitations.

TSMI ERROR (ENTERR)—These errors are usually non-fatal errors specific to the TSMI interface. I.e., they are more like informative messages.

DESTINATION PORT DOES NOT EXIST (ENTDPNE)—This error is returned on a transaction if the destination port set by the user does not exist on the remote machine.

TRANSACTION TIMEOUT (ENTTO)—This error is returned on timed out transactions.

TRANSACTION ABORTED (ENTABORT)—This error is returned on aborted transactions.

LOCAL SYSTEM ERROR (ENTLSE)—This error type is returned when any local system errors occur. These include errors from GSMEM, RSMEM, system termination errors, or any error returned from system calls.

NODE UNREACHABLE—PERMANENT (ENTNUP)—This error type is returned on transport errors considered "permanent". Permanent here means that the node is unreachable as far as the transport system can tell, and unless something is done about it, another attempt to get to that node will probably fail. (Fix the cable, bring the other machine back up . . . ) As of now, the only error considered "permanent" is NO RESPONSE FROM REMOTE.

NODE UNREACHABLE—TEMPORARY (ENTNT)—This error type is returned on transport errors considered "temporary". Temporary here means that the node was unreachable on this attempt, but another attempt may succeed. All transport errors not permanent are considered temporary. If a seemingly temporary error is actually permanent, it will show up as permanent in the next attempt to reach that node.

SEVERE LOCAL TRANSPORT ERROR (ENTNSEV)—This error type is returned when the request cannot be completed because of a severe problem with the local system.

LINK NOT AVAILABLE (ENLNAV)—No link is available over which to send data. This probably means that there was some fatal problem when the link was brought up.

LINK NOT ENABLED (ENLNE)—No link is available over which to send data. This probably means that there was some fatal problem when the link was brought up.

SUFFICIENT RESOURCES NOT AVAILABLE (ENRNA)—There were not enough resources available to complete the request.

Other errors can mean that the transport system is sick.

The Transaction Timeout error can only be returned on a Transaction request in which a timeout value (other than $-1$) was specified. The error indicates that a Reply to the Transaction request was not received by TSMI within the time period specified. TSMI makes no guarantee that the remote system did not perform the requested action, however. Timeouts will be started as soon as a transaction request is received from a TSMI user. It is therefore possible for a transaction to time out befor it is sent. The assumption here is that a user has a reason to want a transaction to stop and the requesting task to be released within a specific amount of time, whether or not the transaction was send. The user may reissue the Transaction, or perform peer to peer error recovery with a new Transaction.

6.7.4 Comprehensive Examples

The following examples assume two users, User 1 and User 2, running in different computers of a distributed computer network, with each initiating actions that must be fulfilled in the other's computers. The ensuing action is described in narrative form, and depicted in state diagrams.

6.7.4.1 Example 1

The state diagram for example 1 is presented in FIG. 616.

User 1-initiated actions
1. Registers the local directory :MYDIR as ::GLOBAL via th ?REGISTER system call.
2. The System Call Handler calls the "REGISTER code in the GNS, which invokes the File System's pathname analysis (using Resolve and Operate) to get the UID of :MYDIR.
3. The GNS then creates an entry in the Global Name Registry (::P) for GLOBSAL, matching it with the UID from the File System and the local transport address.
4. Next the GNS updates the GNR databases on all other nodes by issuing a GNS primitive via TSMI's broadcast facility.
5. The user creates an IPC port (file) called PORTR in the global directory ::GLOBAL.

User 2-initiated actions
A. The user program issues a ?ILKUP system call to obtain the IPC port associated with the IPC file ::GLOBAL :PORTR.
B. The SCH calls IPC Management, which in turn issues a ?FSTAT system call to get the necessary information.
C. The File System decomposes the ?FSTAT into two operations. The first is to perform pretix analysis, which requires it to obtain the UID of ::GLOBAL from the GNS.
D. The next File System step is to use DCALL to invoke the filestatus version of Resolve and Operate to obtain the information based on the known UID and the partial pathname PORTR.

E. DCALL obtains the transport address of the node ::GLOBAL is on from the GNS, and determines that it is on other node.

F. DCALL uses TSMI to deflect the Resolve and Operate request to the Serving DCALL Subsystem on the proper node.

G. The SDCS invokes the local File System routine (located by the GNS database) to process the request.

H. The results returned to the SDCS are returned to the invoking DCALL service, and ultimately to the caller of DCALL.

I. The File System returns the ?FSTAT information to IPC Management.

J. IPC management constructs and returns an IPC part number.

6.7.4.2 Example 2

The state diagram for Example 2 is presented in FIG. 617.

User 1-initiated actions

1. The program issues an ?IREC system call to wait for an IPC message on the agreed upon port (::GLOBAL :PORTR). This request will be satisfied by an IPC message received in step F as a result of actions initiated by User 2.
2. After processing the received message, the User 1 program issues an ?ISC-ND to send a response to User 2 via the IPC Port.
3. IPC management invokes its send-message code via DCALL.
4. The DCALL processor queries the GNS for the transport address corresponding to the target process of message sent by this port.
5. Since the target process is remote, the DCALL processor invokes the transport service to initiate remote serving of the request.
6. TSMI on User 2's system notifies the Serving DCALL Subsystem that there is a remote request for it.
7. The SDCS interrogates the GNS to determine the correct local service address, and invokes the appropriate IPC Management function.
8. The IPC Management subsystem performs the local processing to satisfy the locally issued receive request made by User 2 (in step H below).
9. Successful completion of the ?ISEND is reported back to the initiator (User 1).

User 2-initiated actions

A. The program issues an ?ISEND system call via the agreed upon IPC port, to send a message to the User 1 process.
B. IPC management invokes its send-message code via DCALL.
C. The DCALL processor interrogates the GNS to determine that the target process is remote.
D. DCAL invokes TSMI to initiate remote servicing of the request by the SDCS component on the target system.
E. SDCS on the target system obtains the proper local service address from the GNS, and invokes the IPC Management subsystem.
F. The OIPC subsystem performs the local processing on this request, including using it to satisfy the locally issued ?IREC initiated by USER 1 in Step 1.

G. Successful completion of the ?ISEND is reported back to the original remote initiator.

H. Following notification that the message was successfully sent, User 2 issues an ?IREC call to receive the reply from User 1. This is the request that is satisfied by the processing in step 8.

APPENDIX A

Data Transfer Flow Diagrams

A.1 8-bit Transfers

In all 8-bit transfers, the unused 24 source bits are undefined and the unused 24 destination bits are unchanged.

A.1.1 Write to Byte 0 from Byte 0 (Unjustified)

The following is sent out during the address phase:

DA line  0 1 2 3 4 ... 30 31
         [0|0|0|0| address |0]

The following is the result during the data phase:

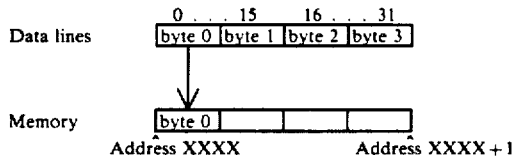

A.1.2 Write to Byte 1 from Byte 1 (Unjustified)

The following is sent out during the address phase:

DA line  0 1 2 3 4 ... 30 31
         [1|0|0|0| address |0]

The following is the result during the data phase:

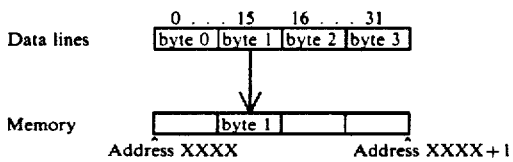

A.1.3 Write to Byte 2 from Byte 2 (Unjustified

The following is sent out during the address phase:

DA line  0 1 2 3 4 ...... 30 31
         [ 0 | 0 | 0 | 0 | address | 1 ]

The following is the result during the data phase:

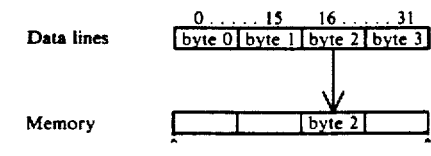

A.1.4 Write to Byte 3 from Byte 3

The following is sent out during the address phase:

DA line  0  1  2  3  4 ...... 30  31
         | 1 | 0 | 0 | x |  address  | 1 |

The following is the result during the data phase:

Data lines   0 ..... 15  16 ..... 31
             | byte 0 | byte 1 | byte 2 | byte 3 |

Memory       [                        | byte 3 |]

Address XXXX          Address XXXX+1

A.1.5 Write to Byte 0 from Byte 3 (Justified)
The following is sent out during the address phasae:

DA line  0  1  2  3  4 ...... 30  31
         | 0 | 0 | 0 | 1 |  address  | 0 |

The following is the result during the data phase:

Data lines   0 ..... 15  16 ..... 31
             | byte 0 | byte 1 | byte 2 | byte 3 |

Memory       [ byte 0 |                         ]

Address XXXX          Address XXXX+1

A.1.6 Write to Byte 1 from Byte 3 (Justified)
The following is sent out during the address phase:

DA line  0  1  2  3  4 ...... 30  31
         | 1 | 0 | 0 | 1 |  address  | 0 |

The following is the result during the data phase:

Data lines   0 ..... 15  16 ..... 31
             | byte 0 | byte 1 | byte 2 | byte 3 |

Memory       [         | byte 1 |              ]

Address XXXX          Address XXXX+1

A.1.7 Write to Byte 2 from Byte 3 (Justified)
The following is sent out during the address phase:

DA line  0  1  2  3  4 ...... 30  31
         | 0 | 0 | 0 | 1 |  address  | 1 |

The following is the result during the data phase:

Data lines   0 ..... 15  16 ..... 31
             | byte 0 | byte 1 | byte 2 | byte 3 |

Memory       [                  | byte 2 |     ]

Address XXXX          Address XXXX+1

A.1.8 Read from Byte 0 to Byte 3 (Justified)
The following is sent out during the address phase:

DA line  0 1 2 3 4 ... 30  31
         | 0 | 1 | 0 | 1 | address | 0 |

The following is the result during the data phase:

Address XXX           Address XXXX+1
Memory       [ byte 0 |                       ]

Data lines   | byte 0 | byte 1 | byte 2 | byte 3 |
             0 ..... 15  16 ..... 31

A.1.9 Read from Byte 2 to Byte 3 (Justified)
The following is sent out during the address phase:

DA line  0 1 2 3 4 ... 30  31
         | 0 | 1 | 0 | 1 | address | 1 |

The following is the result during the data phase:

Address XXX           Address XXXX+1
Memory       [                  | byte 2 |    ]

Data lines   | byte 0 | byte 1 | byte 2 | byte 3 |
             0 ..... 15  16 ..... 31

A. 2 16-bit Transfers
In all 16- bit transfers, the unused 16 source bits are undefined while the unused 16 destination bits are unchanged.

A. 2.1 Write to Word 0 from Word 1 (Justified)
The following is sent out during the address phase:

DA line  0 1 2 3 4 ... 30  31
         | 0 | 0 | 1 | 1 | address | 0 |

The following is the result during the data phase:

Data lines   0 .... 15 16 .... 31
             | word 0 | word 1 |

Memory       [ word 0 |        ]

Address XXXX   Address XXXX+1

A.2.2 Write to Word 0 from Word 0 (Unjustified)

The following is sent out during the address phase:

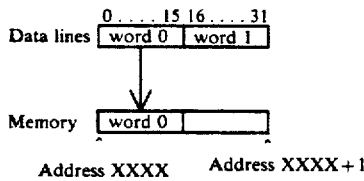

The following is the result during the data phase:

Data lines, Memory, Address XXXX, Address XXXX+1

A.2.3 Write to Word 1 from Word 1
The following is sent out during the address phase:

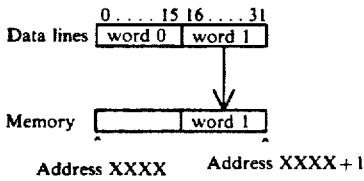

The following is the result during the data phase:

Data lines, Memory, Address XXXX, Address XXXX+1

A.2.4 Read from Word 0 to Word 1 (Justified)
The following is sent out during the address phase:

DA line  0  1  2  3  4 ... 30  31
         | 1 | 1 | 0 | 1 | address | 0 |

The following is the result during the data phase:

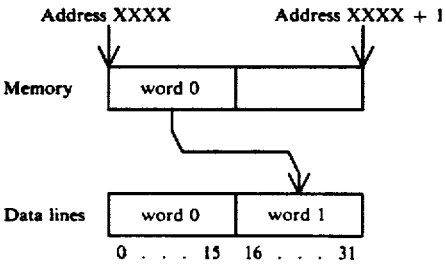

A.2.5 Read from Word 1 to Word 1
The following is sent out during the address phase:

DA line  0  1  2  3  4 ... 30  31
         | 1 | 1 | 0 | 1 | address | 1 |

The following is the result during the data phase:

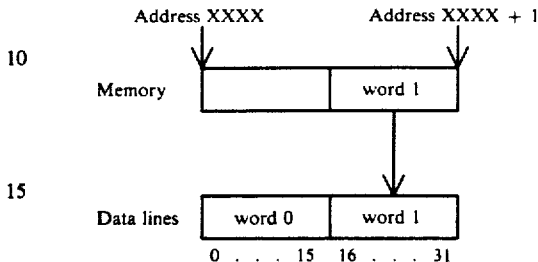

A.3 32-bit Transfers
A.3.1 Write Odd Double Word
The following is sent out during the address phase:

DA line  0  1  2  3  4 ... 30  31
         | 1 | 0 | 1 | 1 | address | 1 |

The following is the result during the data phase:

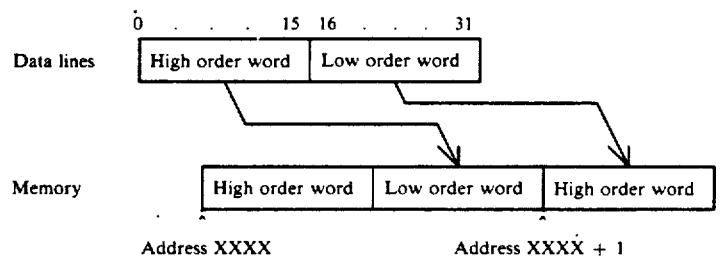

A.3.2 Write Even Double Word
The following is sent out during the address phase:

DA line  0  1  2  3  4 ... 30  31
         | 1 | 0 | 1 | 1 | address | 0 |

The following is the result during the data phase:

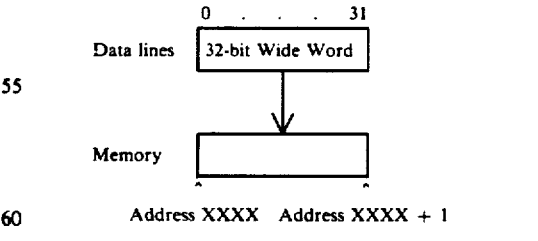

A.3.3 Read Odd Double Word
The following is sent out during the address phase:

DA line  0 1 2 3 4 ... 30 31
         | 1 | 1 | 1 | 1 | address | 1 |

The following is the result during the data phase:

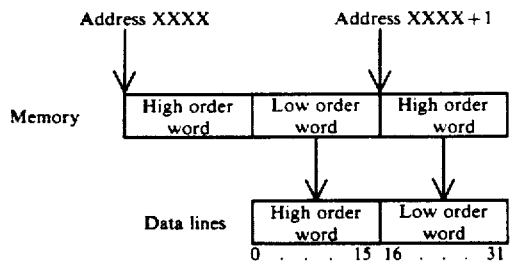

A.3.4 Read Even Double Word
The following is sent out during the address phase:

```
DA line  0 1 2 3 4 . . . 30 31
         |1|1|1|1| address |0|
```

The following is the result during the data phase:

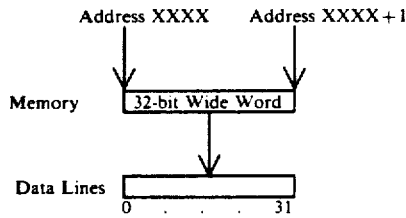

A.4 Block Transfers
A.4.1 Write Block
The following is the result during the address phase:

```
DA line  0 1 2 3 4 . . . 30 31
         |0|1|1|0| address |0|
```

The following is the result during the data phase:

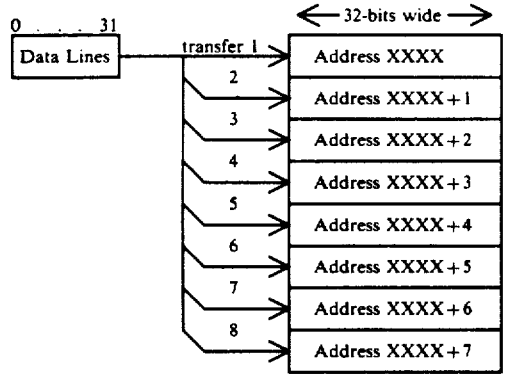

Note:
All address locations must be from the same node.

A.4.2 Read Block
The following is sent out during the address phase:

```
DA line  0 0 2 3 4 . . . 30 31
         |0|1|0|0| address |0|
```

The following is the result during the data phase:

```
 ←— 32-bits wide —→                       0 . . . 31
┌──────────────────┐  transfer 1    ┌──────────────┐
│  Address XXXX    │───────────────→│  Data Lines  │
├──────────────────┤ 2              └──────────────┘
│  Address XXXX+1  │──┐
├──────────────────┤ 3│
│  Address XXXX+2  │──┤
├──────────────────┤ 4│
│  Address XXXX+3  │──┤
├──────────────────┤ 5│
│  Address XXXX+4  │──┤
├──────────────────┤ 6│
│  Address XXXX+5  │──┤
├──────────────────┤ 7│
│  Address XXXX+6  │──┤
├──────────────────┤ 8│
│  Address XXXX+7  │──┘
└──────────────────┘
```

Note:
All address locations must be from the same node.

Appendix B - Programming the 8031

This section is intended for the design engineer writing 8031 code which generates timing signals, and handles the mouse. Careful programming is required to guarantee that timing signals are generated continuously, even when the mouse are being taken care of.

Several 8031 signals are used directly to drive control hardware on the VCU 206 board. These signals and their functions are listed below in Table B-2. In addition, the MOVX instruction is used to talk to external registers and memory. These are outlined in Table B-1.

TABLE B-1

| Address 13...8 | R/W | MOVX instructions Function |
|---|---|---|
| x00xxx | R/W | Read/Write the palette storage RAM |
| 001xxx | R | Read the palette storage and write the palette DACS on VCU 206 (1 operation). |
| 101xxx | R | Read the palette storage and write the palette DACS on VEU 207 (1 operation). |
| 010xxx | R | Read the palette DACs on VCU 206. |
| 110xxx | R | Read the palette DACs on VEU 207. |
| x11x11 | W | Write COM DATA byte 3. |
| x11x10 | W | Write COM DATA byte 2. |
| x11x01 | R/W | Read/Write COM DAIA byta 1. |
| x11x00 | R/W | Read/Write COM DATA byte 0 and set DV (write)/clear RTA (read). |

TABLE B-2

| Port pin | 8031 pin number | signal name | I/O | function |
|---|---|---|---|---|
| P0.0-7 | 32-39 | UAD0-UAD7 | I/O | register data, see table C-1 above. |
| P1.0 | 1 | STF | O | 0 = 8031 uP self test passed. 1 = 8031 uP self test failed. |
| P1.1 | 2 | ^REFRST | O | used to reset the refresh counter at the start of every new frame. Must be asserted prior to the first ^HPULSE signal (scan line zero) and removed prior to the next ^HPULSE signal. |
| P1.2 | 3 | VCU 206/8 | I | 0 = VCU 206/24 1 = VCU 206/8 |
| P1.3,4 | 4,5 | | | Not used. |
| P1.5 | 6 | VSYNC | O | vertical sync, 0 = vert sync not asserted 1 = vert sync asserted |
| P1.6 | 7 | ^HPULSE | O | controls the trailing edge of HBLANK on the high to low transition. |
| P1.7 | 8 | ^VBLANKO | O | raw vertical blanking, 0 = vert blanking asserted 1 = display active |
| P2.0-5 | 21-26 | A8-A15 | O | High portion of 8031 uP address field. |
| P2.6,7 | 27,28 | | | Not used. |
| P3.0 | 10 | MOUSEIN | I | Mouse/tablet receive data serial port. |
| P3.1 | 11 | MOUSEOUT | O | Mouse/tablet transmit data serial port. |
| P3.2 | 12 | DV | I | When asserted, indicates that 8031 uP has placed data into the COM DATA register for the host to read. Cleared when the host reads the data. |
| P3.3 | 13 | DVEN | O | When asserted enables an NMI to occur when the DV bit is asserted. When deasserted the NMI does not occur but the DV status is still valid and can be read via the COM STATUS register. |
| P3.4 | 14 | RTA | I | When assarted, indicates that the 8031 uP has read the data last sent to the COM DATA register by the host, and is ready to accept another. Cleared when the 8031 uP reads the data. |
| P3.5 | 15 | VBINTEN | O | When asserted enables an NMI to occur when vertical blanking is asserted. When deasserted the NMI does not occur but the vertical blanking status is still valid and can be read via the COM STATUS register. |
| P3.6 | 16 | ^UWR | O | Asserted when an external write accurs. |
| P3.7 | 17 | ^URD | O | Asserted when an external read accurs. |

We claim:

1. In a digital logic system, a method of resolving contention among contenders for a resource, the contenders being members of a group of n potential contenders, the method comprising the steps of:
  (a) denominating the potential contenders zero through n−1;
  (b) providing each potential contender with n digital signal lines, where:
    the digital signal lines are denominated zero through n−1;
    each potential contender signifies entering contention by bringing its zero-denominated digital signal line to the TRUE condition; and
  any certain potential contender senses that another potential contender is contending when one of the certain potential contender's digital signal lines other than its zero-denominated one goes to a TRUE condition, each other potential contender being associated with a different one of the certain potential contender's digital signal lines, (c) providing n conductors denominated zero through n−1;

(d) connecting each of the n digital signal lines of each of the n potential contenders to one of the n conductors according to the algorithm $$k = (n - i + j) \text{ MODULO } n$$

where:

i is a number in the range zero to n−1 denoting a potential contender;

j is a number in the range zero to n−1 denoting a digital signal line on a potential contender; and k is a number in the range zero to n−1 denoting a conductor to which the digital signal line identified jointly by i and j is to be connected;

(e) providing each potential contender with means for determining $i_{last}$, the denomination of the potential contender which most recently had control of the resource, and means for determinging its priority index p, according to $$p = (n + i - i_{last} - 1) \text{ MODULO } n$$

where i is the potential contender's denomination among the n potential contenders, and (f) allowing the contender with the lowest value of p to take control of the resource.

2. In a digital logic system having n potential contenders for control of a resource, where n is greater than two and where each potential contender has an individual resource request line, is connected to the individual resource request line of each other potential contender, and is assigned a different identifier from a circular sequence of n identifiers;

a method of resolving contention among contenders comprising the steps of:

(a) each potential contender retaining the identifier of the contender most recently having had control of the resource;

(b) each potential contender monitoring all resource request lines for the occurrence of a resource request signal;

(c) when a resource request signal is detected, each potential contender determining if it should take control of the resource by performing the additional steps of:

(i) determining the identifiers of all contenders that are requesting control of the resource;

(ii) determining which contender identifier is next in the sequence after the retained identifier, and (iii) determining if the identifier determined in step (c) (ii) is its own identifier.

3. In a digital logic system having n potential contenders for control of a resource, where n is greater than two and where each potential contender has an individual resource request line, is connected to the individual resource request line of each other potential contender, and is assigned a different identifier from a circular sequence of n identifiers;

a method of resolving contention among contenders comprising the steps of:

(a) retaining the identifier of the contender most recently having had control of the resource;

(b) monitoring all resource request lines for the occurrence of a resource request signal;

(c) when a resource request signal is detected, performing the additional steps of:

comparing the retained identifier with the identifiers of all contenders that are currently requesting control of the resource; and granting control of the resource to the contender having the identifier which occurs next in the sequence after the retained identifier.

4. In a digital logic system having n potential contenders for control of a resource, where n is greater than two and where each potential contender has an individual resource request line, is connected to the individual resource request line of each other potential contender, and is assigned a different identifier from a circular sequence of n identifiers;

a method of resolving contention among contenders comprising the steps of:

(a) retaining the identifier of the contender most recently having had control of the resource;

(b) monitoring all resource request lines for the occurrence of a resource request signal;

(c) when a resource request signal is detected, granting control of the resource to the contender having the identifier which occurs next in the sequence after the retained identifier.

5. In a digital logic system having n potential contenders for control of a resource, where n is greater than two, each potential contender having an individual resource request line and each potential contender being connected to the individual resource request line of each other potential contender, a method of resolving contention among contenders comprising the steps of:

(a) creating a circular sequence of n identifiers;

(b) assigning one identifier to each potential contender such that each potential contender has a different identifier;

(c) retaining the identifier of the contender most recently having had control of the resource;

(d) monitoring all resource request lines for the occurrence of a resource request signal;

(e) when a resource request signal is detected, each contender performing the additional steps of:

monitoring all resource request lines to determine the identifiers of all contenders that are requesting control of the resource; and initiating control of the resource if (i) the contender has requested control and (ii) no other contender, having an identifier which is later in the sequence than the retained identifier but earlier in the sequence than the contender's identifier, has also requested control;

(f) repeating step (c)–(e).

* * * * *